Aug. 23, 1960       P. E. FOX ET AL       2,950,465
ELECTRONIC DATA PROCESSING MACHINE
Filed March 22, 1954                     61 Sheets-Sheet 1
| FIG. 1a | FIG. 1e |
| FIG. 1b | FIG. 1f |
| FIG. 1c | FIG. 1g |
| FIG. 1d |         |
FIG. 1
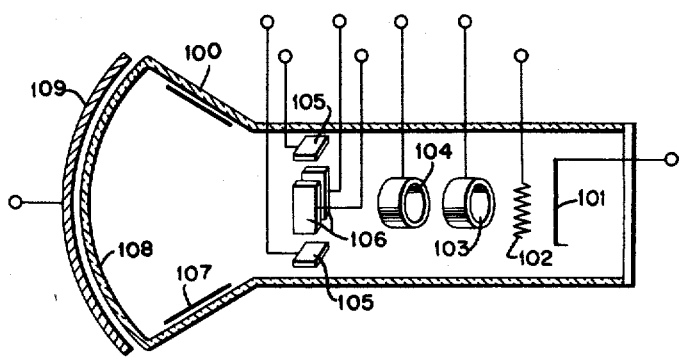
FIG. 1h
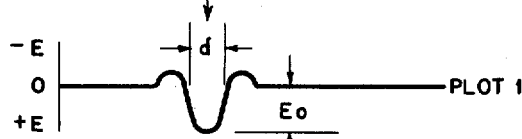
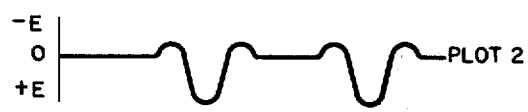
FIG. 1i
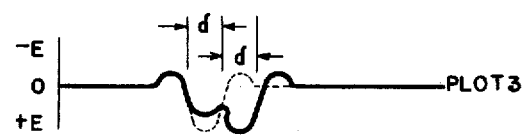
FIG. 1j
DOT   DASH   RELATIVE POSITION
 ●     ━━        ━
INVENTOR.
P. E. FOX
J. E. BARTELT
D. J. CRAWFORD
N. ROCHESTER
BY  John F. Hanifin
ATTORNEY

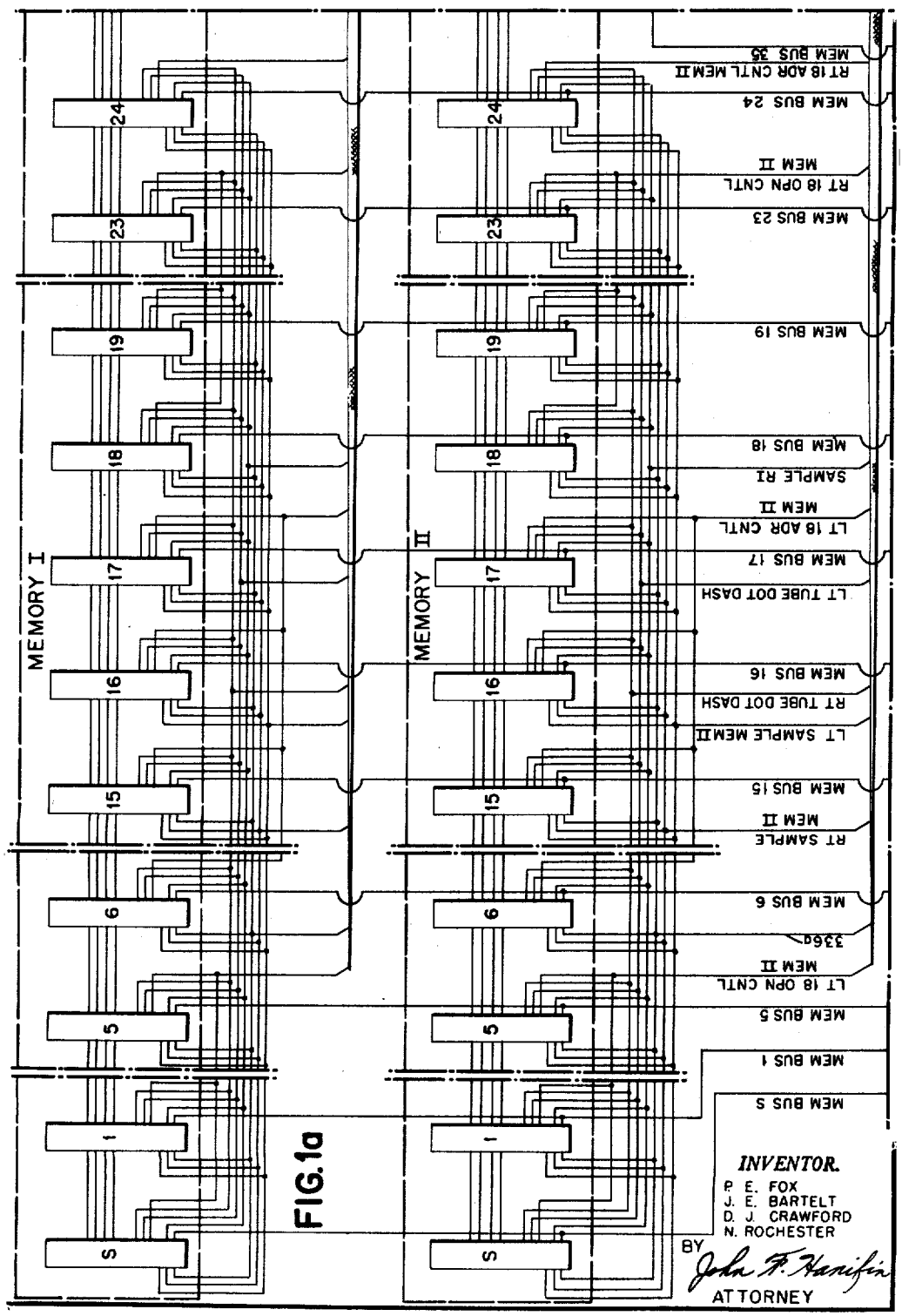

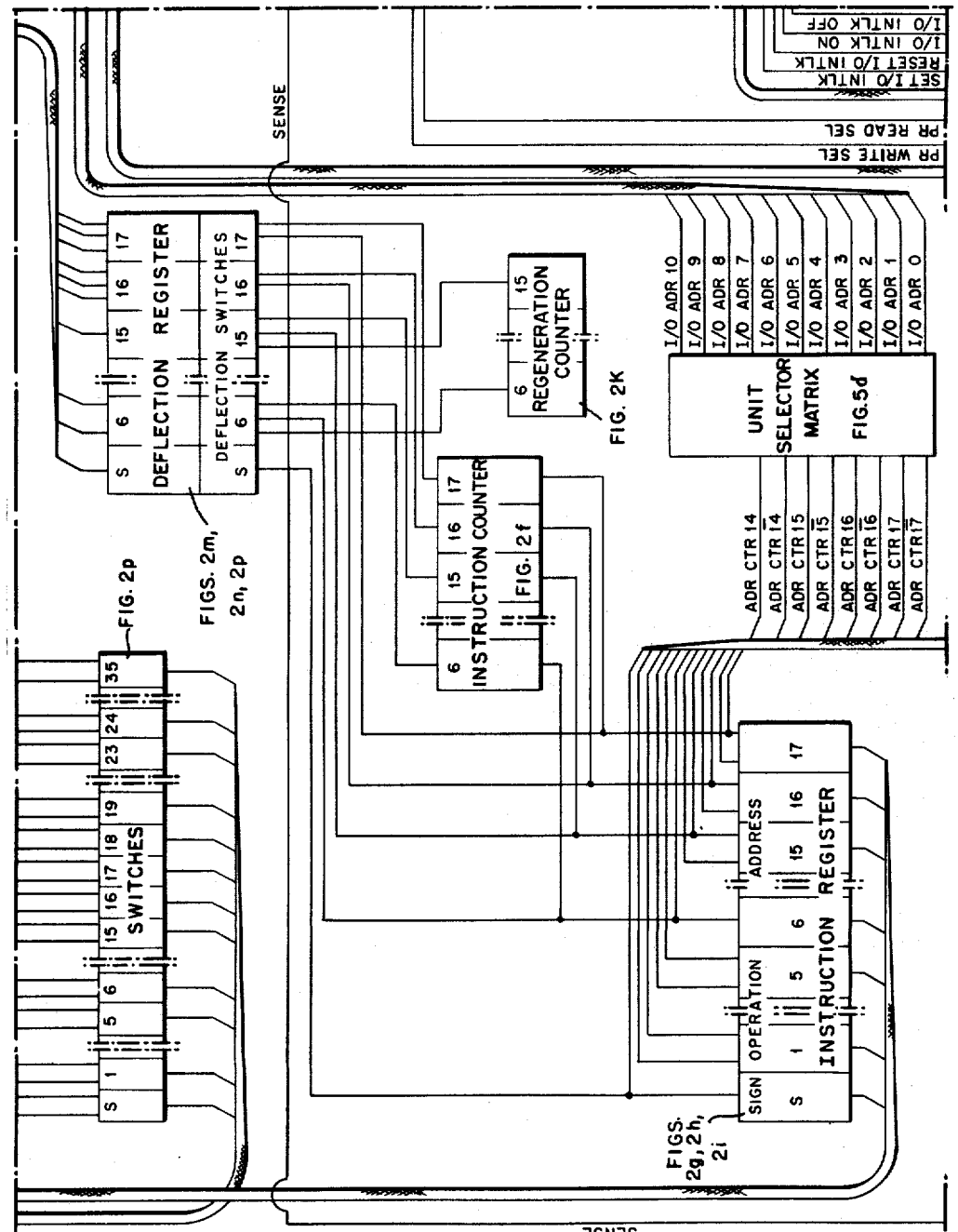

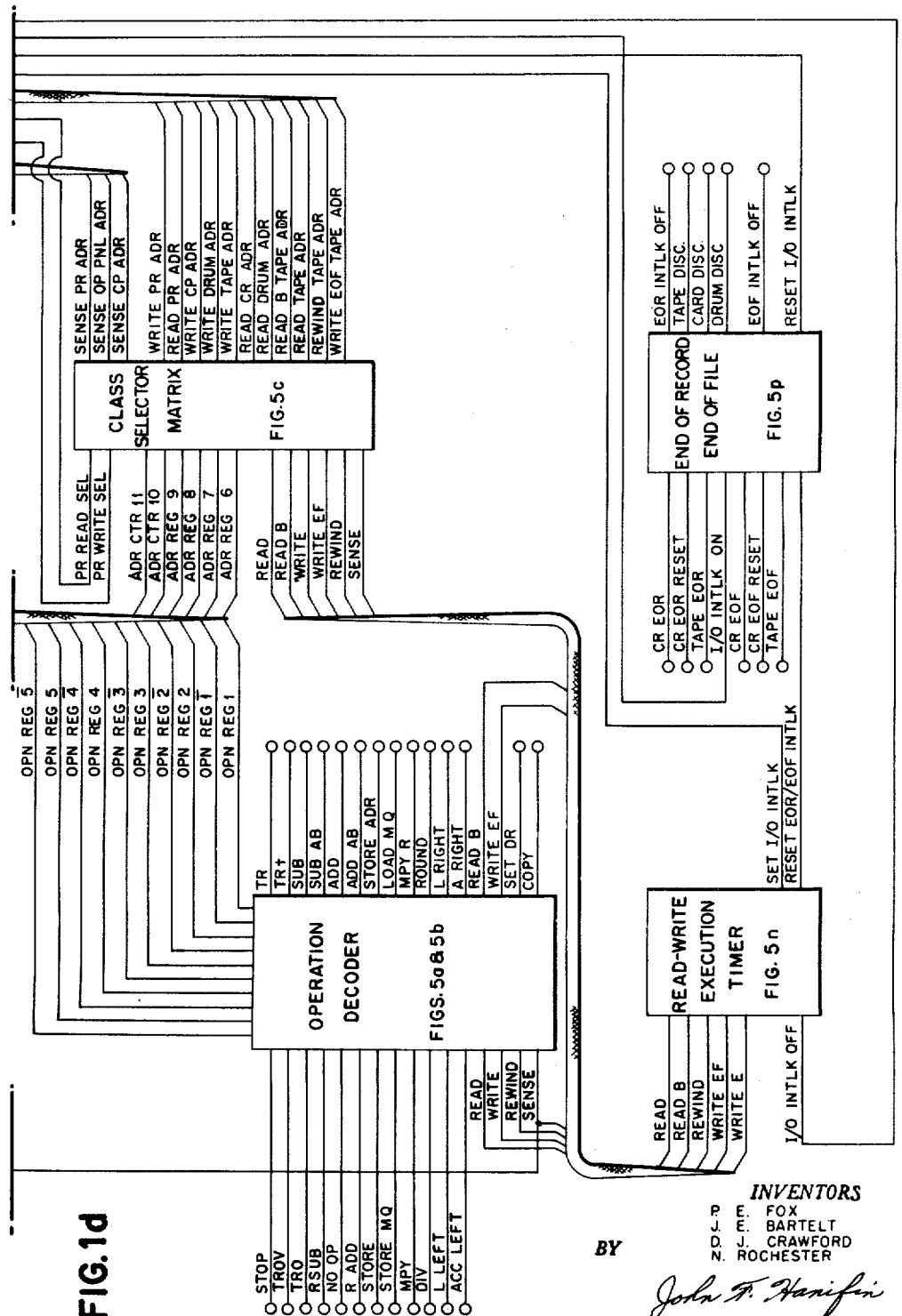

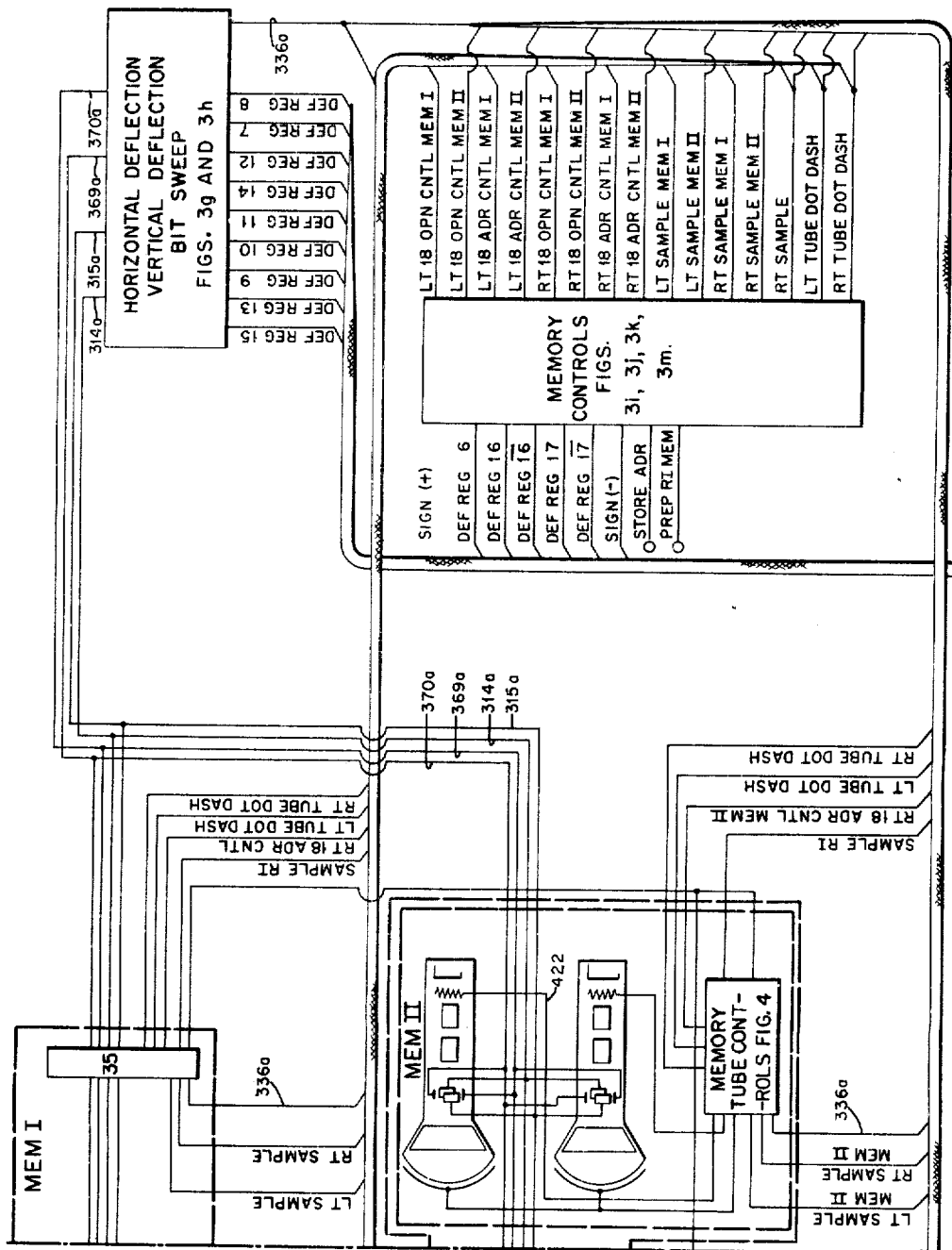

Aug. 23, 1960     P. E. FOX ET AL     2,950,465
ELECTRONIC DATA PROCESSING MACHINE
Filed March 22, 1954     61 Sheets-Sheet 7
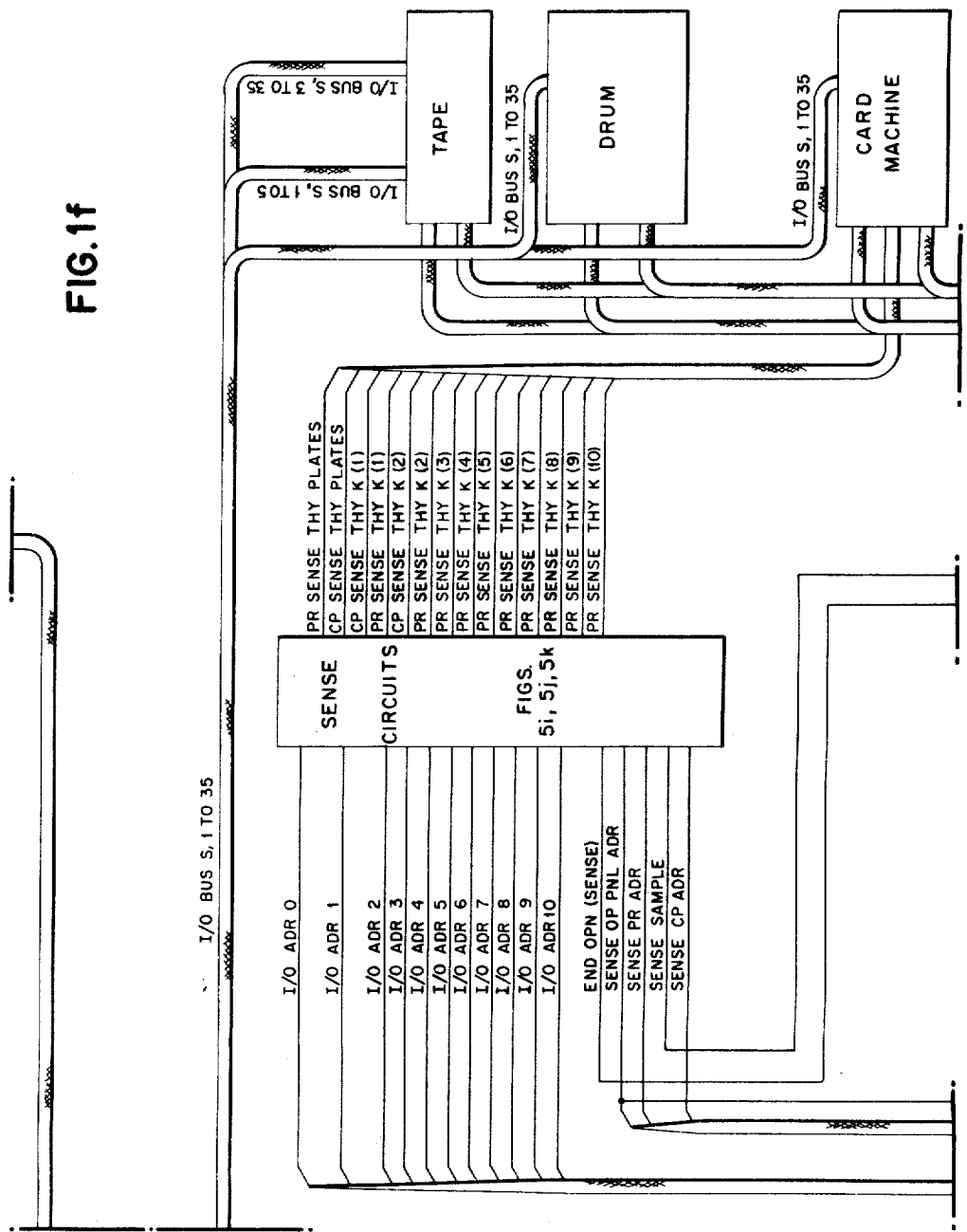
INVENTORS
P. E. FOX
J. E. BARTELT
D. J. CRAWFORD
N. ROCHESTER
BY
ATTORNEY

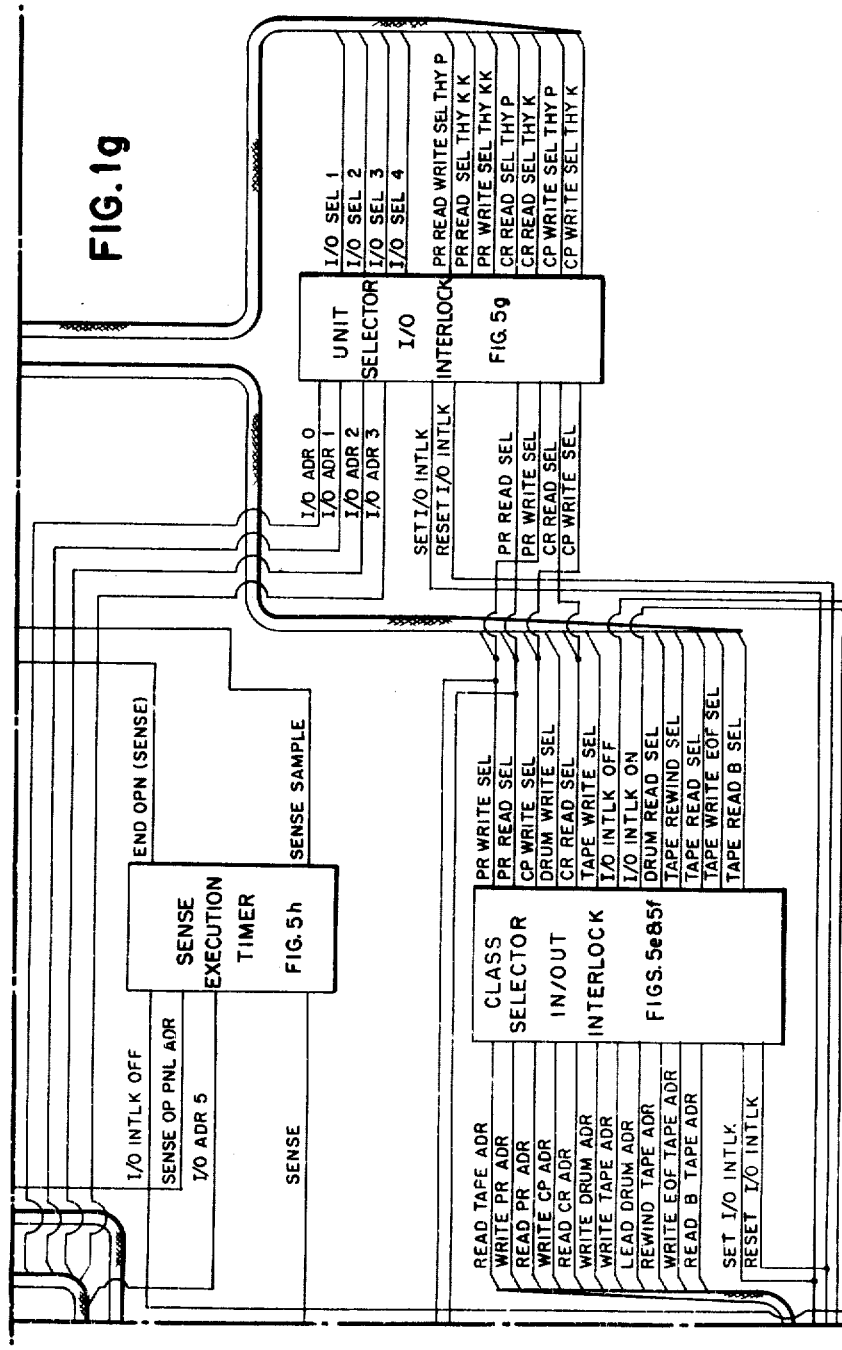

Aug. 23, 1960          P. E. FOX ET AL          2,950,465
              ELECTRONIC DATA PROCESSING MACHINE
Filed March 22, 1954                      61 Sheets-Sheet 9
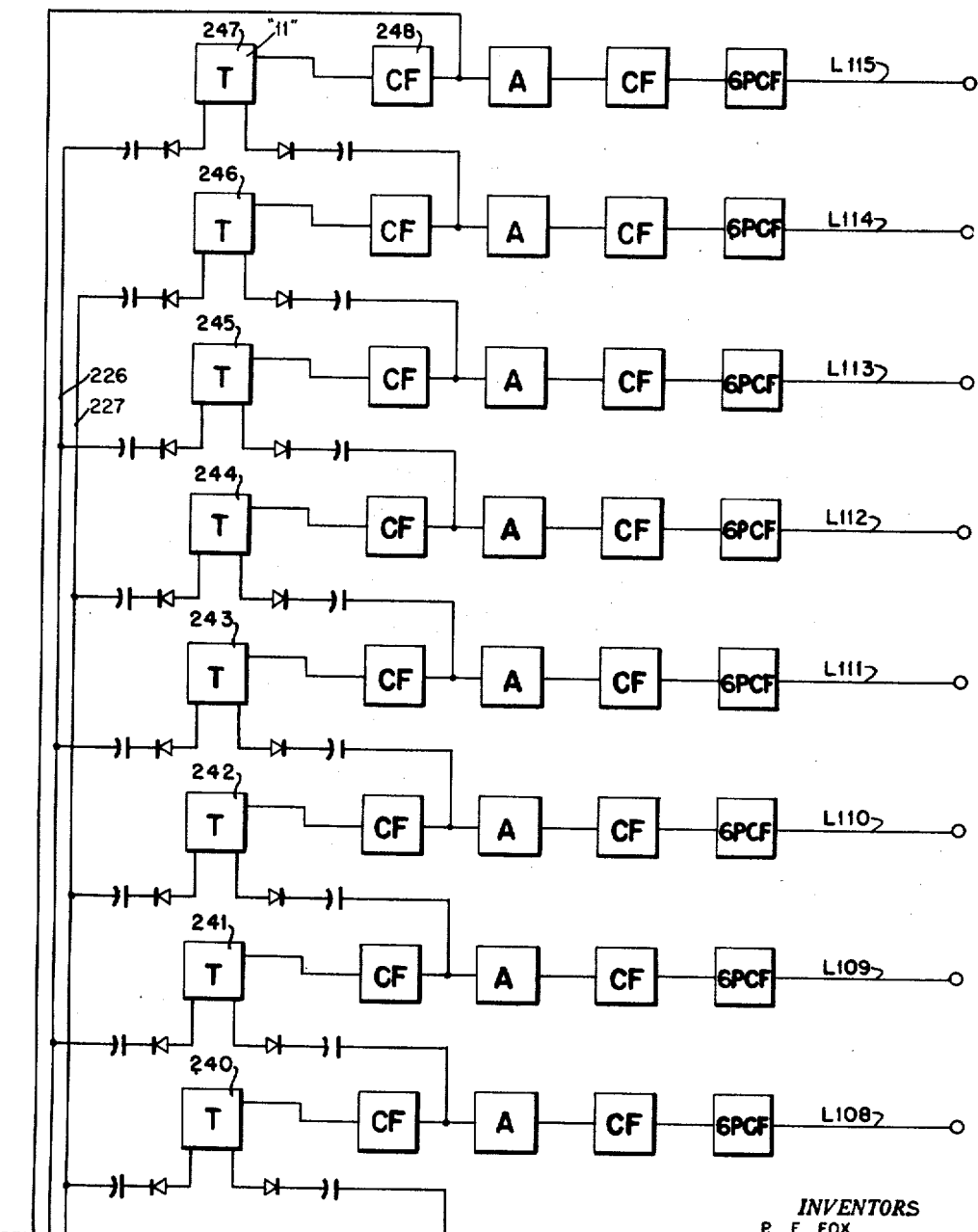

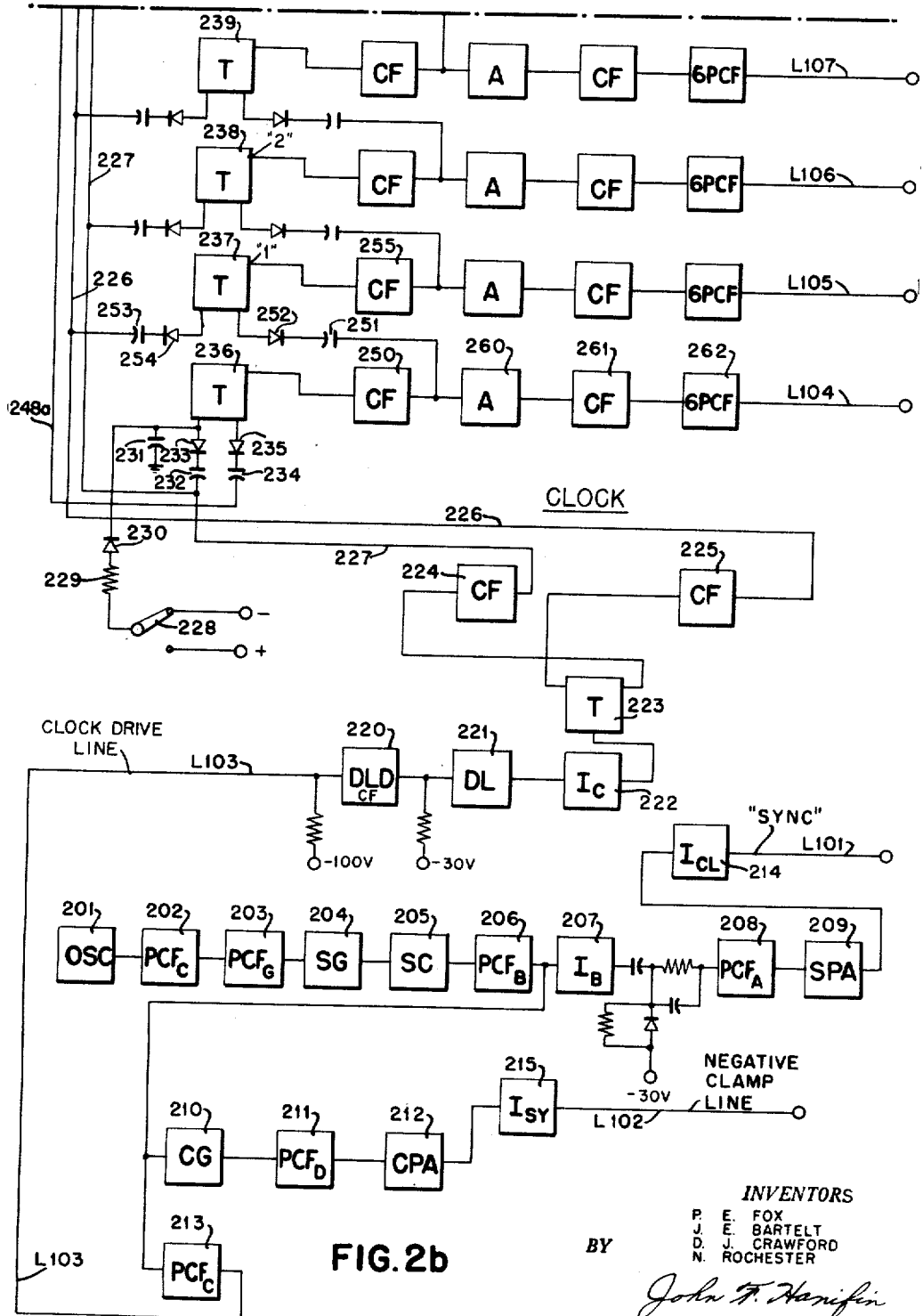

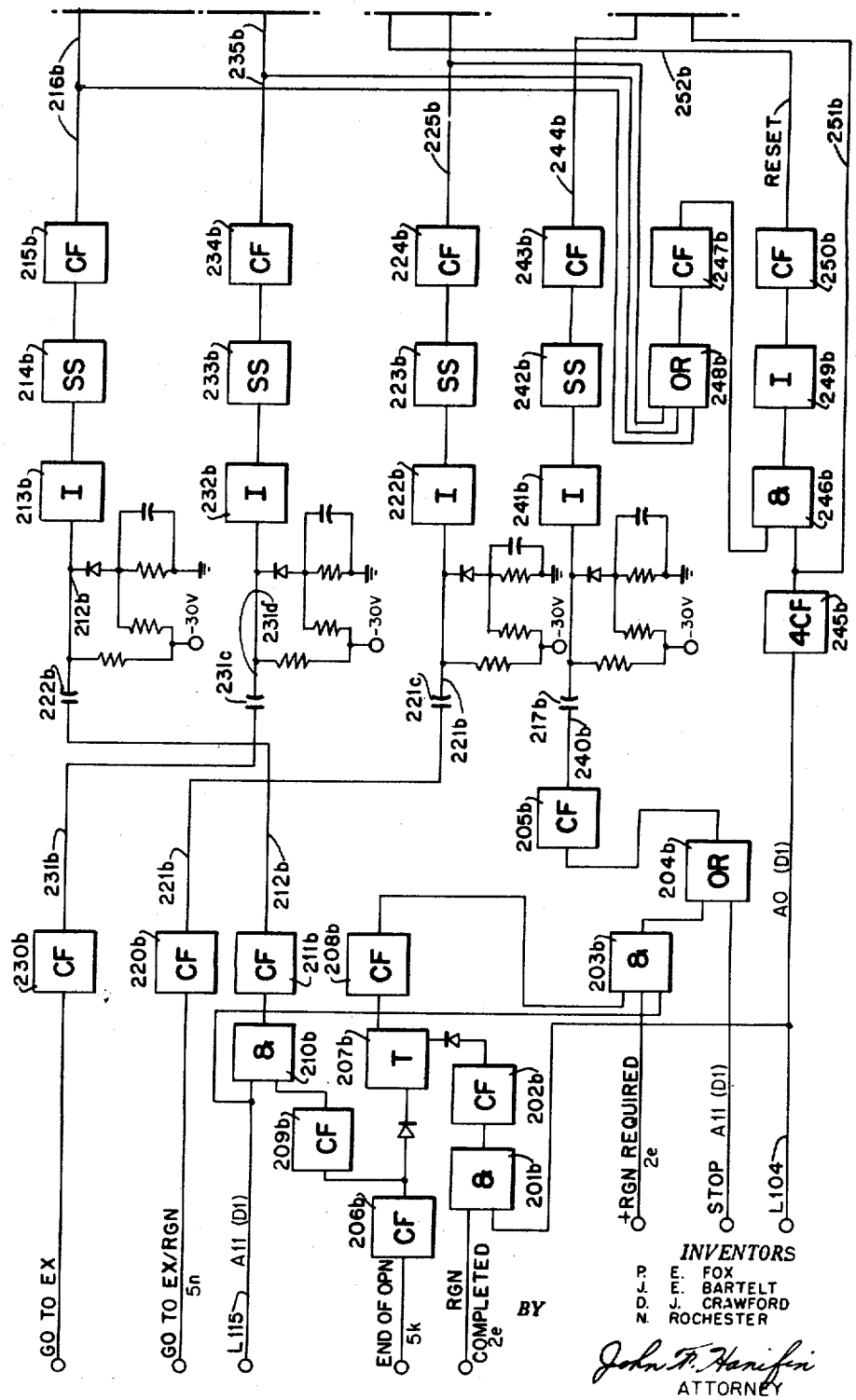

Aug. 23, 1960 P. E. FOX ET AL 2,950,465
ELECTRONIC DATA PROCESSING MACHINE
Filed March 22, 1954 61 Sheets-Sheet 12

FIG.2d

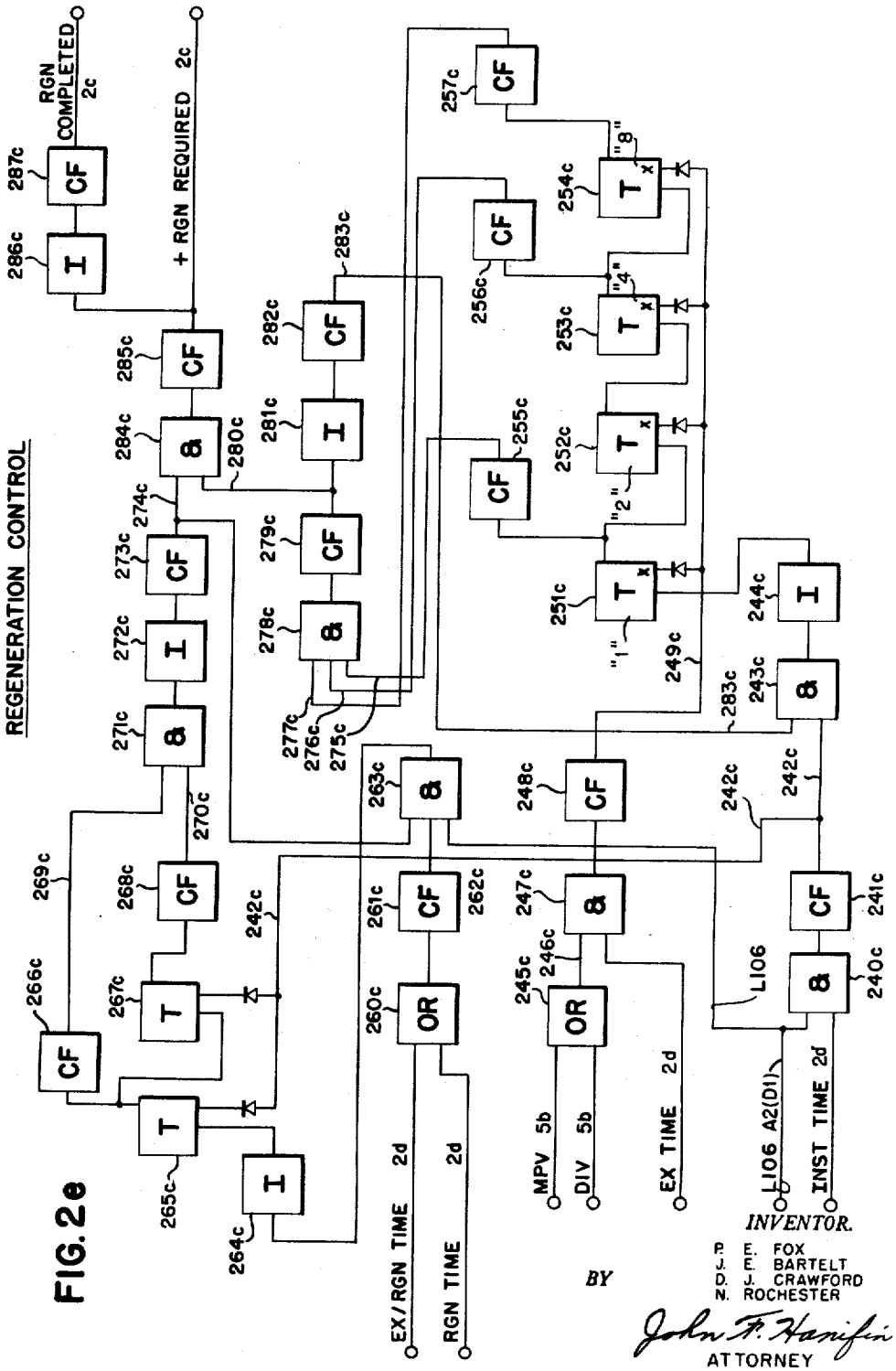

Aug. 23, 1960
P. E. FOX ET AL
2,950,465
ELECTRONIC DATA PROCESSING MACHINE
Filed March 22, 1954
61 Sheets-Sheet 14
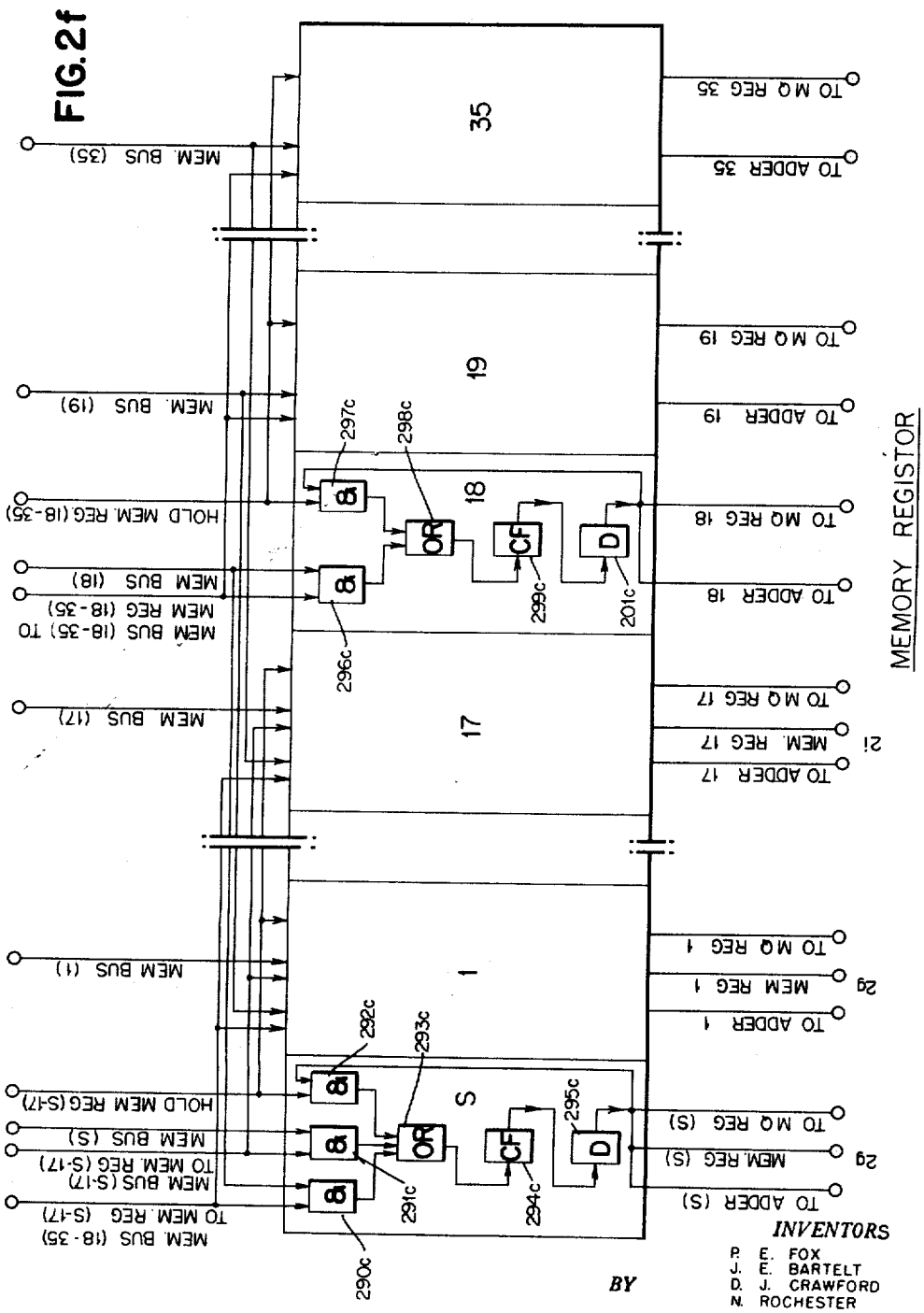
INVENTORS
P. E. FOX
J. E. BARTELT
D. J. CRAWFORD
N. ROCHESTER
BY John F. Hanifin
ATTORNEY

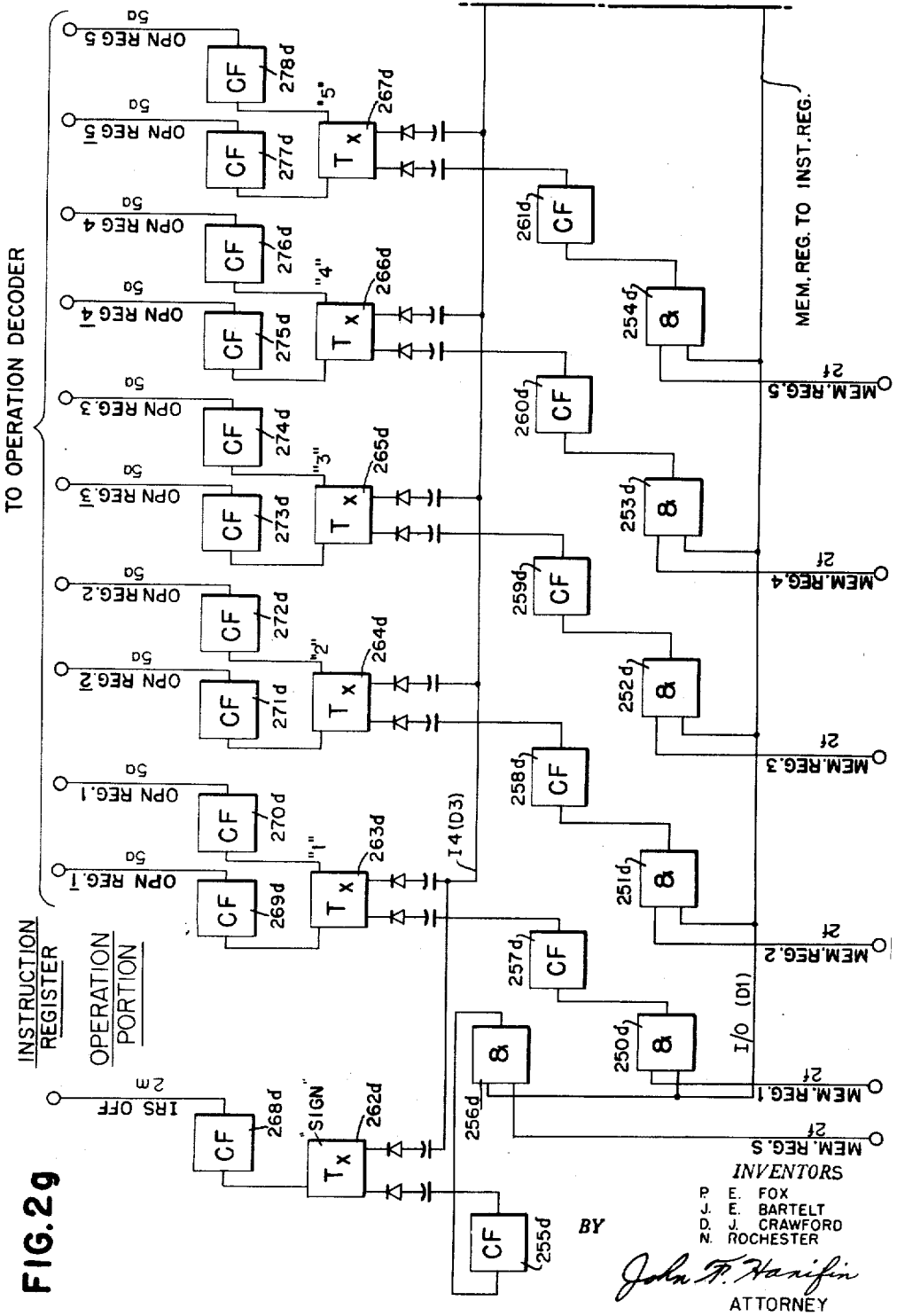

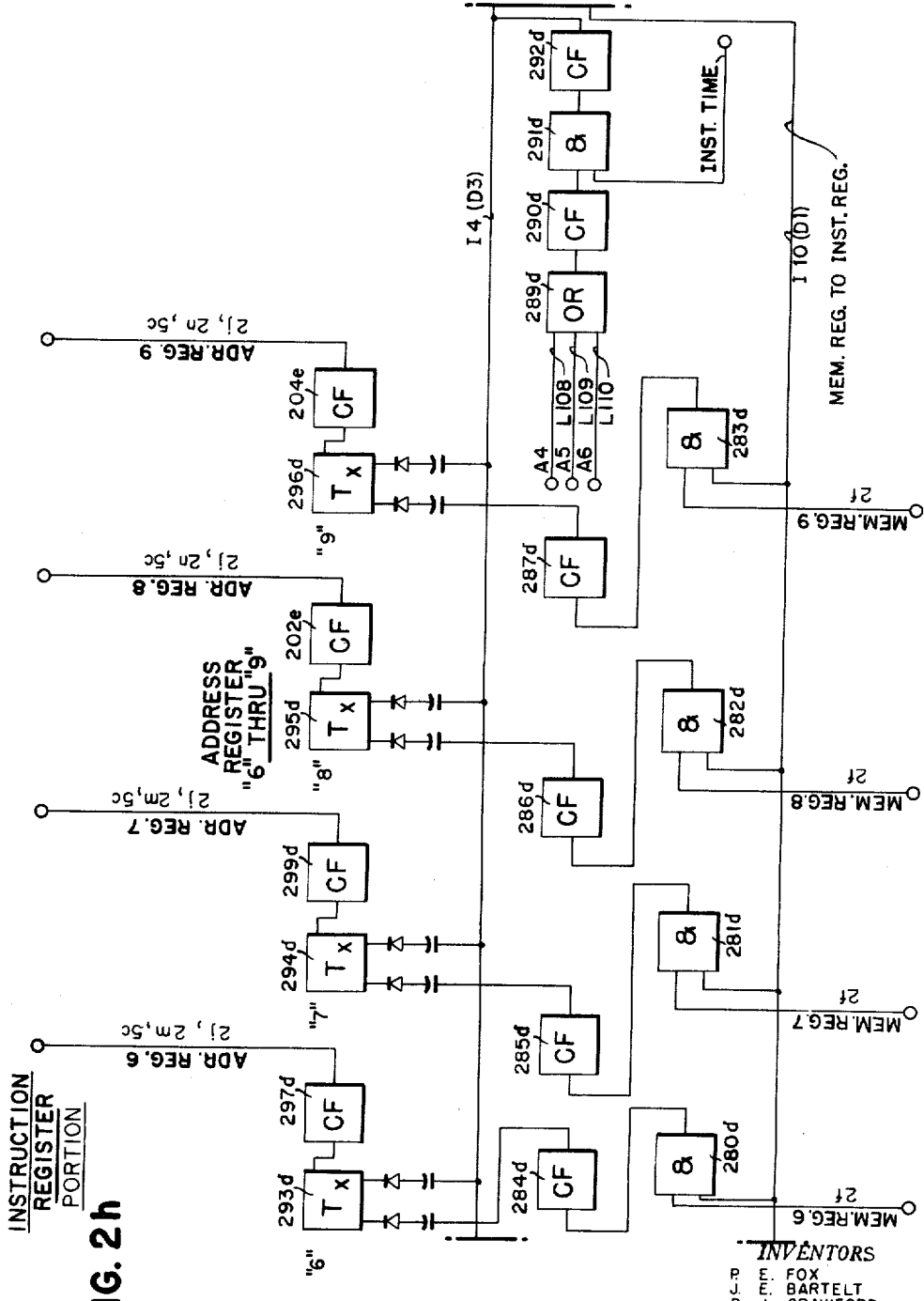
Aug. 23, 1960    P. E. FOX ET AL    2,950,465
ELECTRONIC DATA PROCESSING MACHINE
Filed March 22, 1954    61 Sheets-Sheet 16
INVENTORS
P. E. FOX
J. E. BARTELT
D. J. CRAWFORD
N. ROCHESTER
BY
John F. Hanifin
ATTORNEY

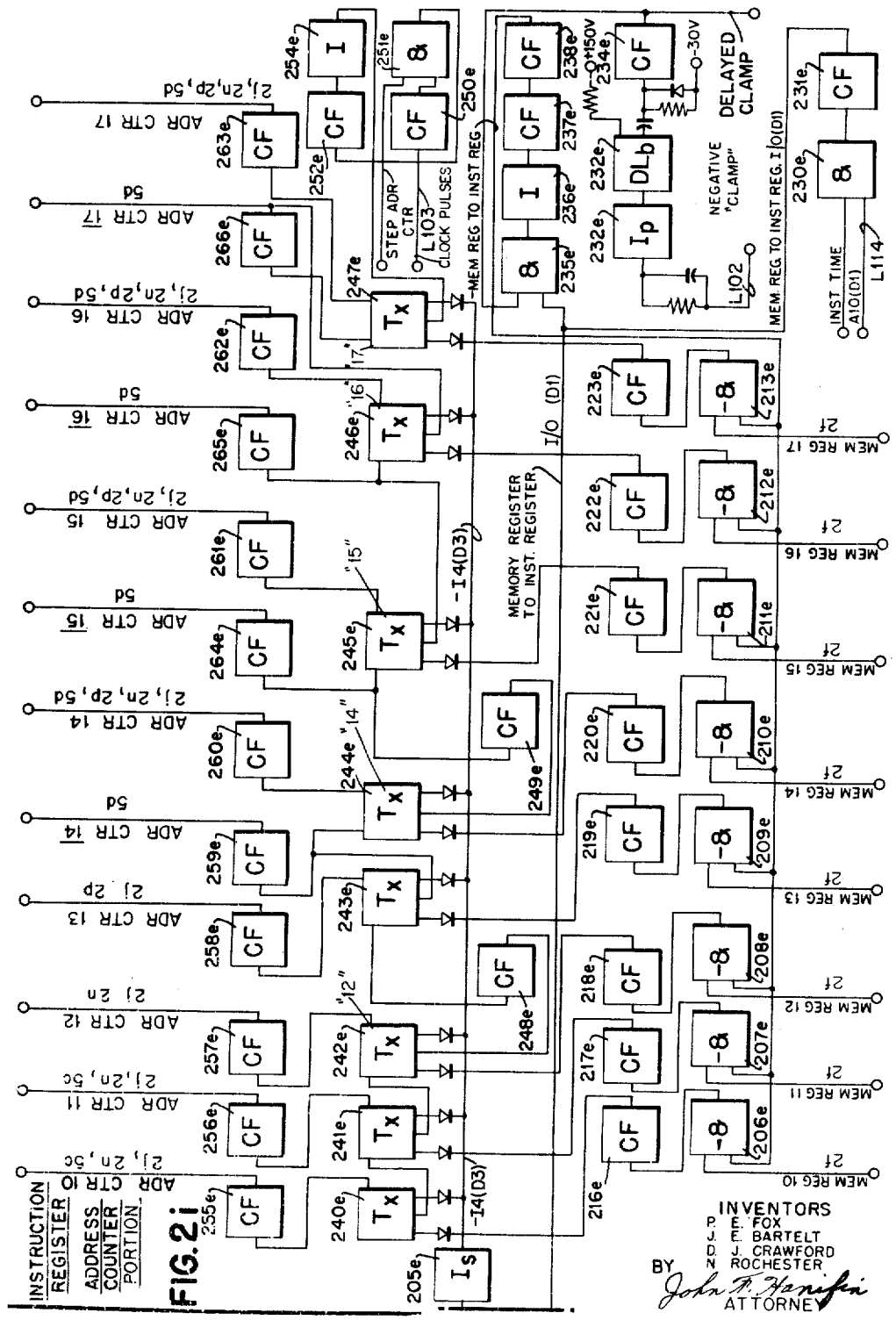

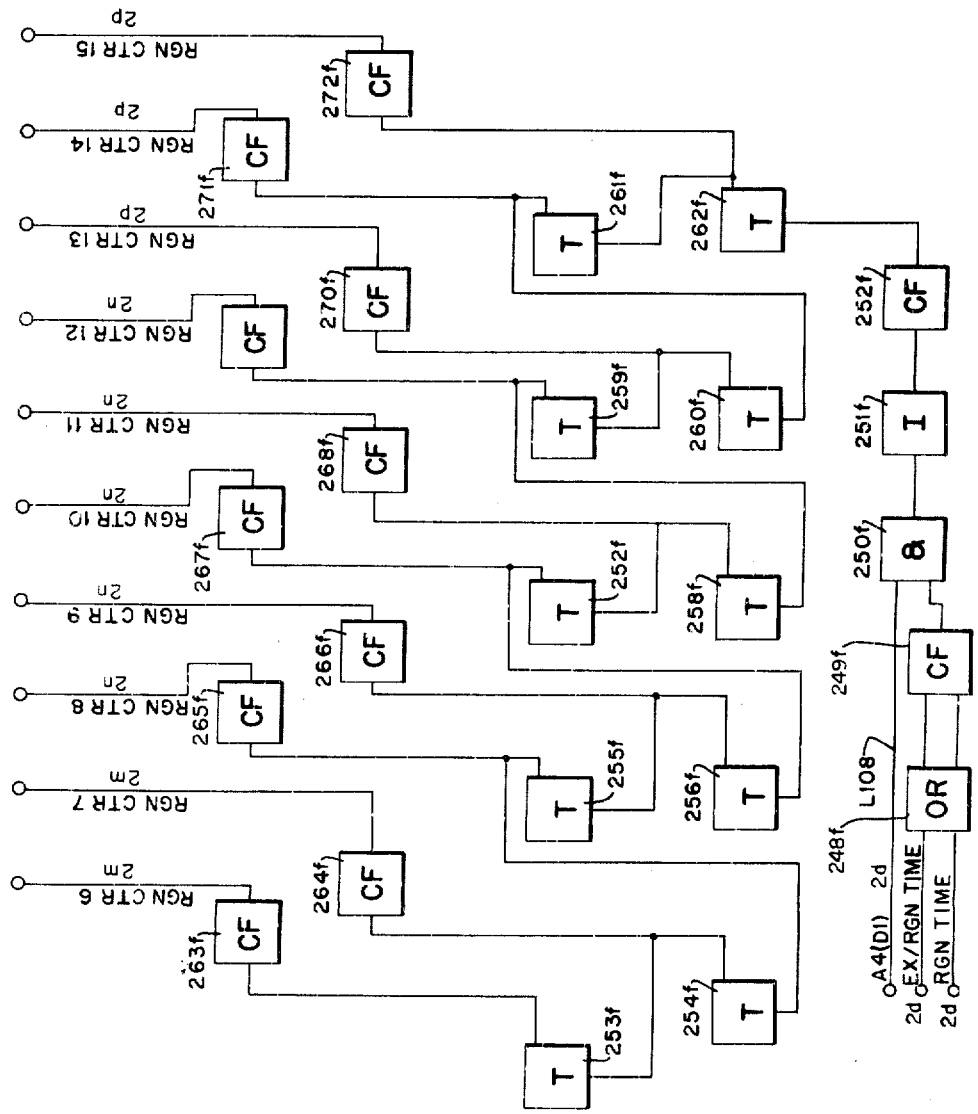

Aug. 23, 1960 P. E. FOX ET AL 2,950,465
ELECTRONIC DATA PROCESSING MACHINE
Filed March 22, 1954 61 Sheets-Sheet 20

DEFLECTION SWITCHES
AND DEFLECTION REGISTER

INVENTORS
P. E. FOX
J. E. BARTELT
D. J. CRAWFORD
N. ROCHESTER
BY John F. Hanifen
ATTORNEY

DEFLECTION SWITCHES AND DEFLECTION REGISTER

Aug. 23, 1960          P. E. FOX ET AL          2,950,465
                ELECTRONIC DATA PROCESSING MACHINE
Filed March 22, 1954                              61 Sheets-Sheet 22

DEFLECTION SWITCHES
AND DEFLECTION REGISTER

INVENTORS
P. E. FOX
J. E. BARTELT
D. J. CRAWFORD
N. ROCHESTER

BY John F. Hanifin
ATTORNEY

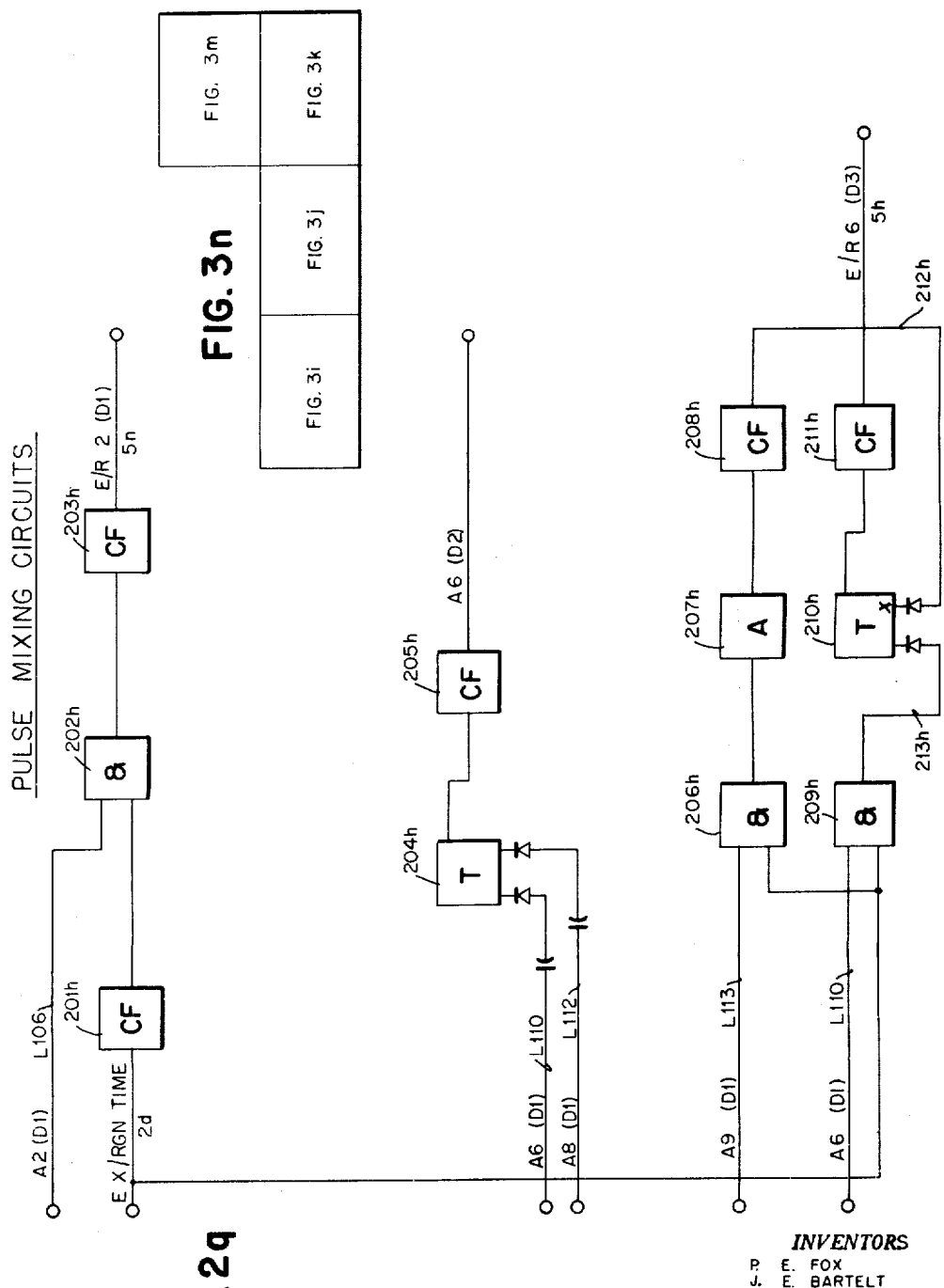

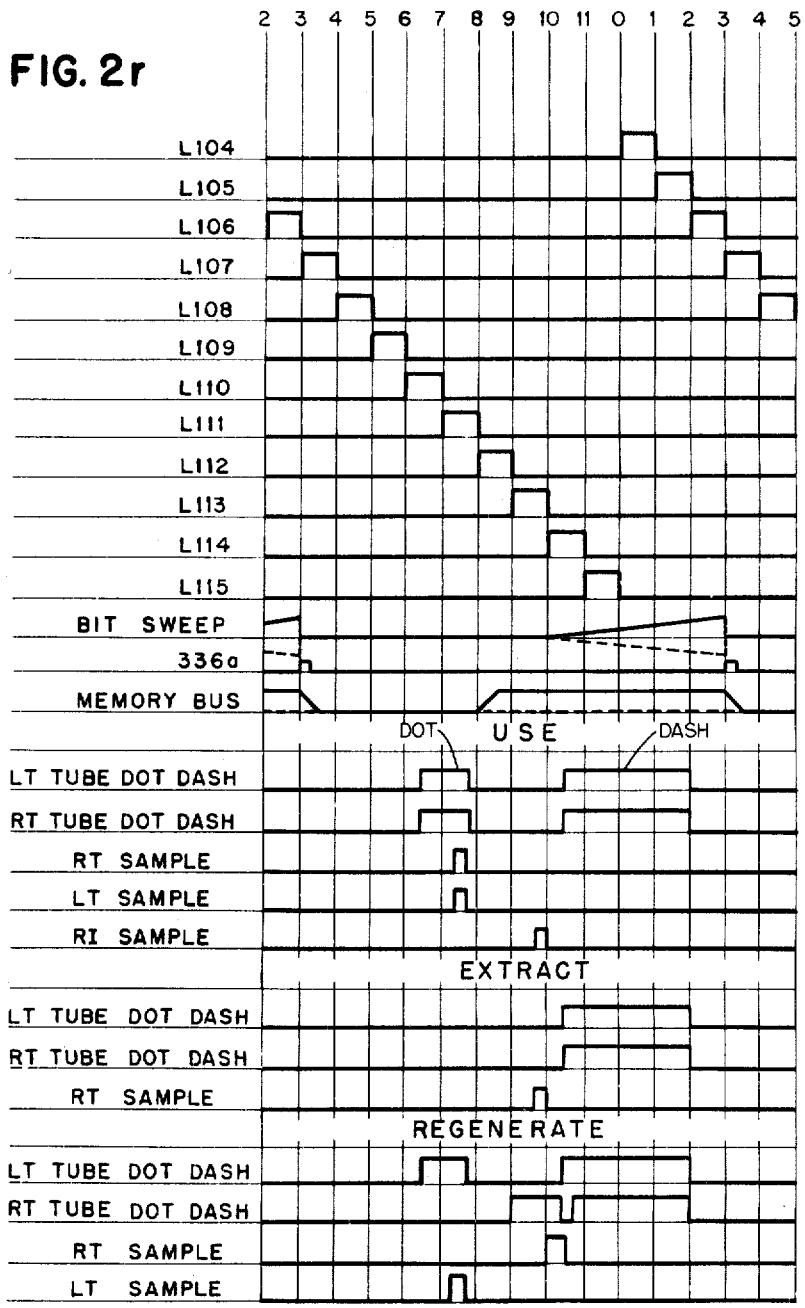

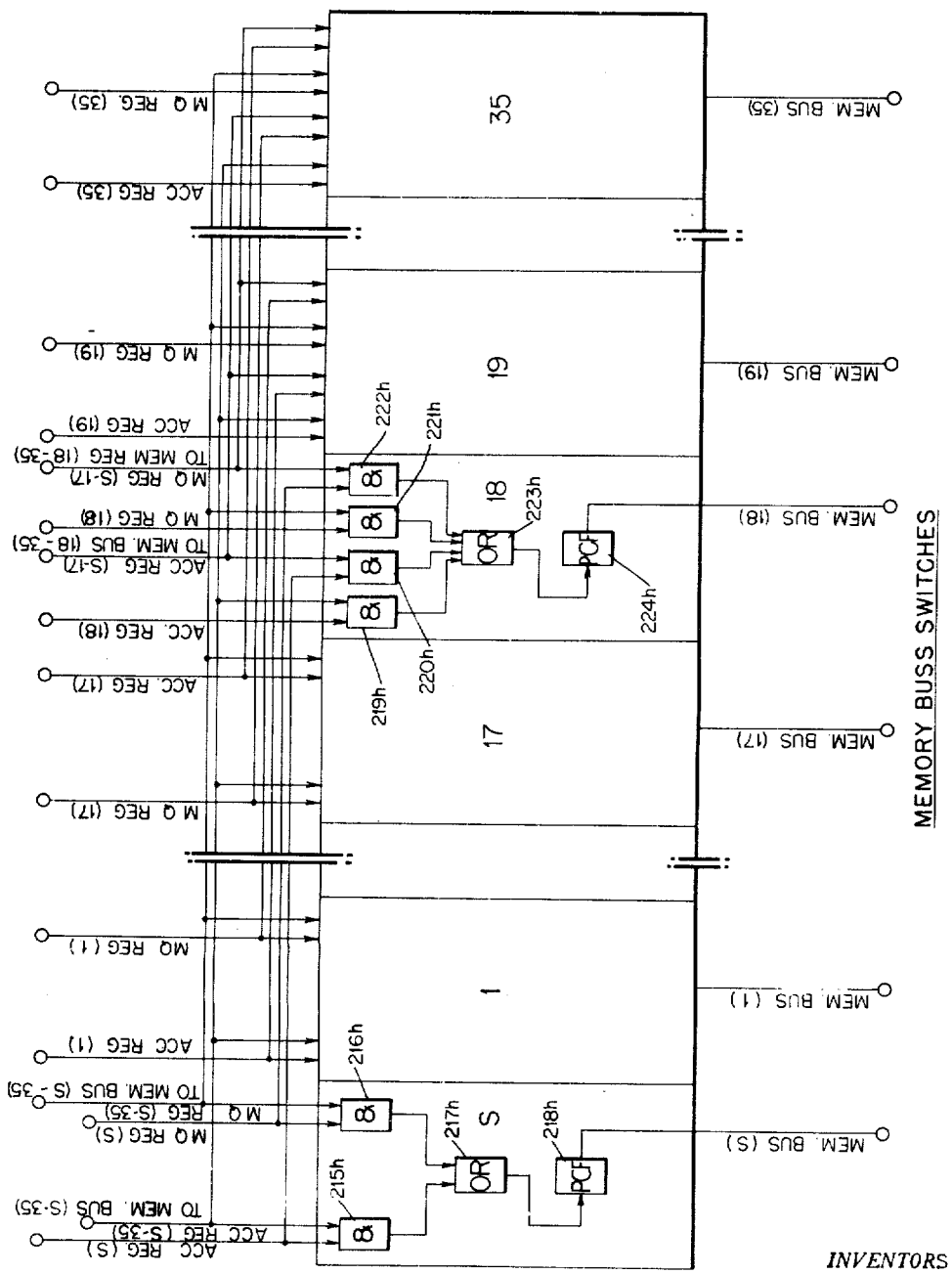

Aug. 23, 1960   P. E. FOX ET AL   2,950,465
ELECTRONIC DATA PROCESSING MACHINE
Filed March 22, 1954   61 Sheets-Sheet 26

FIG. 2t

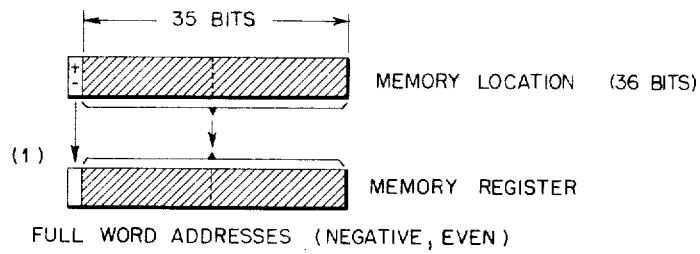

FULL WORD ADDRESSES (NEGATIVE, EVEN)

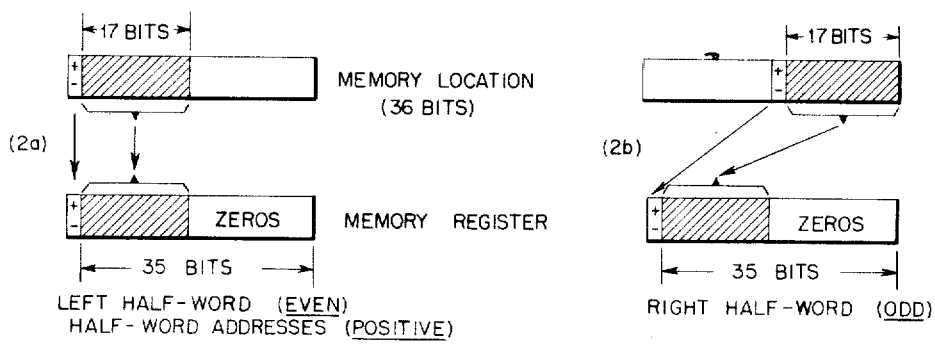

LEFT HALF-WORD (EVEN)   RIGHT HALF-WORD (ODD)
HALF-WORD ADDRESSES (POSITIVE)

FIG. 2u

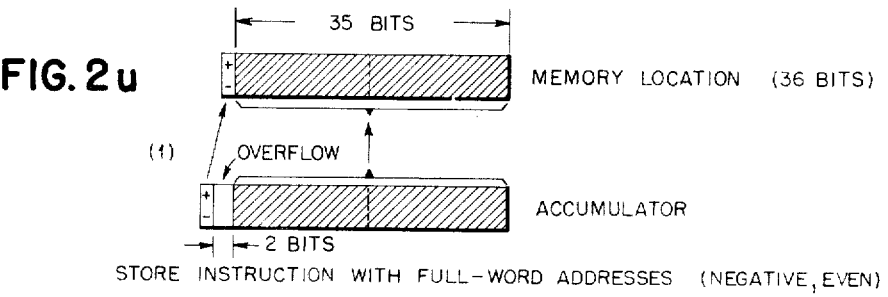

STORE INSTRUCTION WITH FULL-WORD ADDRESSES (NEGATIVE, EVEN)

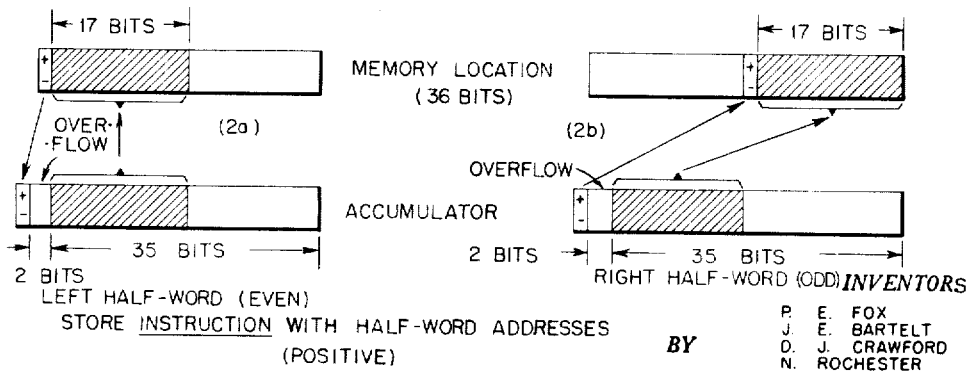

LEFT HALF-WORD (EVEN)   RIGHT HALF-WORD (ODD)
STORE INSTRUCTION WITH HALF-WORD ADDRESSES
(POSITIVE)

INVENTORS
P. E. FOX
J. E. BARTELT
D. J. CRAWFORD
N. ROCHESTER

BY  John F. Hanifin
ATTORNEY

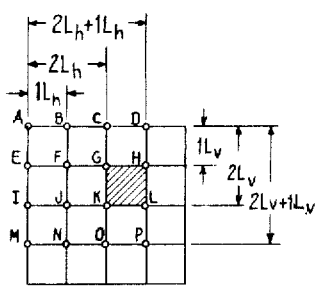
FIG.3a
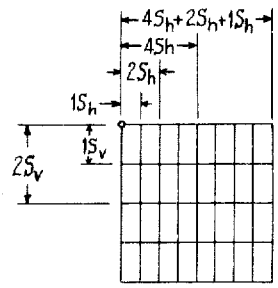
FIG.3b
FIG.3c
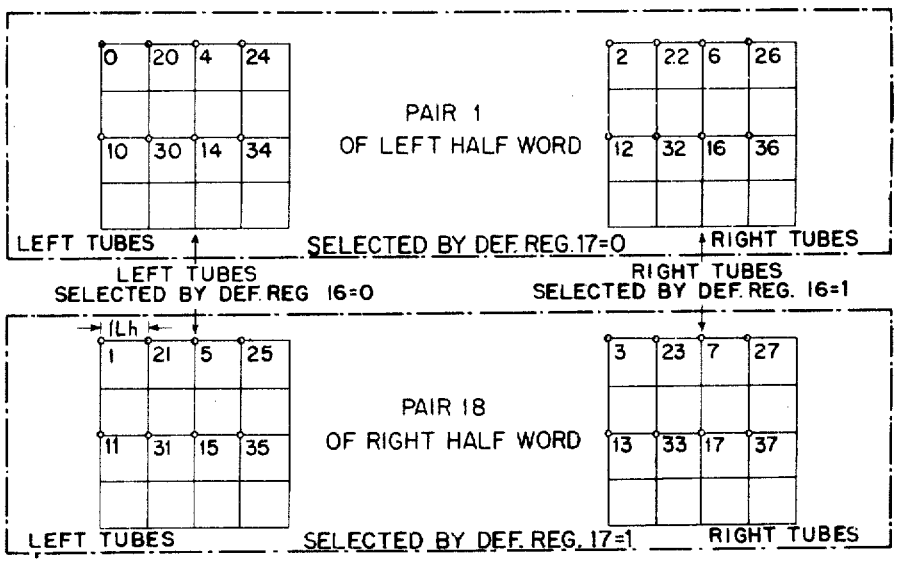
FIG.3d
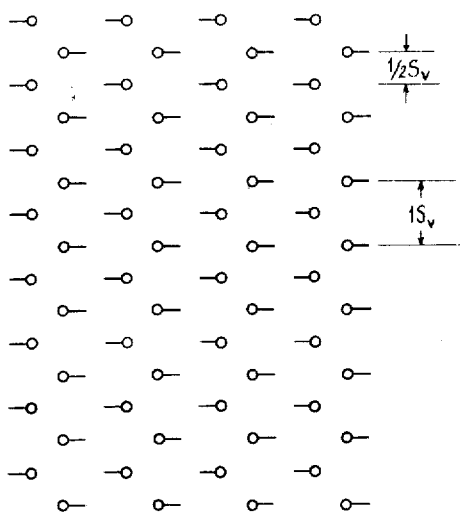
INVENTORS
P. E. FOX
J. E. BARTELT
D. J. CRAWFORD
N. ROCHESTER
BY John F. Hanifin
ATTORNEY Aug. 23, 1960   P. E. FOX ET AL   2,950,465
ELECTRONIC DATA PROCESSING MACHINE
Filed March 22, 1954   61 Sheets-Sheet 28

| 0 | 128 | 256 | 384 | 16 | 144 | 272 | 400 | |
|---|---|---|---|---|---|---|---|---|
| | 64 | 192 | 320 | 448 | 80 | 208 | 336 | 464 |
| 512 | 640 | 768 | 896 | 528 | 656 | 784 | 912 | |
| | 576 | 704 | 832 | 960 | 592 | 720 | 848 | 976 |
| 1024 | 1152 | 1280 | 1408 | 1040 | 1168 | 1296 | 1424 | |
| | 1088 | 1216 | 1344 | 1472 | 1104 | 1232 | 1360 | 1488 |
| 1536 | 1664 | 1792 | 1920 | 1552 | 1680 | 1808 | 1936 | |
| | 1600 | 1728 | 1856 | 1984 | 1616 | 1744 | 1872 | 2000 |
| 32 | 160 | 288 | 416 | 48 | 176 | 304 | 432 | |
| | 96 | 224 | 352 | 480 | 112 | 240 | 368 | 496 |
| 544 | 672 | 800 | 928 | 560 | 688 | 816 | 944 | |
| | 608 | 736 | 864 | 992 | 624 | 752 | 880 | 1008 |
| 1056 | 1184 | 1312 | 1440 | 1072 | 1200 | 1328 | 1456 | |
| | 1120 | 1248 | 1376 | 1504 | 1136 | 1264 | 1392 | 1520 |
| 1568 | 1696 | 1824 | 1952 | 1584 | 1712 | 1840 | 1968 | |
| | 1632 | 1760 | 1888 | 2016 | 1648 | 1776 | 1904 | 2032 |
| 8 | 136 | 264 | 392 | 24 | 152 | 280 | 408 | |
| | 72 | 200 | 328 | 456 | 88 | 216 | 344 | 472 |
| 520 | 648 | 776 | 904 | 536 | 664 | 792 | 920 | |
| | 584 | 712 | 840 | 968 | 600 | 728 | 856 | 984 |
| 1032 | 1160 | 1288 | 1416 | 1048 | 1176 | 1304 | 1432 | |
| | 1096 | 1224 | 1352 | 1480 | 1112 | 1240 | 1368 | 1496 |
| 1544 | 1672 | 1800 | 1928 | 1560 | 1688 | 1816 | 1944 | |
| | 1608 | 1736 | 1864 | 1992 | 1624 | 1752 | 1880 | 2008 |
| 40 | 168 | 296 | 424 | 56 | 184 | 312 | 440 | |
| | 104 | 232 | 360 | 488 | 120 | 248 | 376 | 504 |
| 552 | 680 | 808 | 936 | 568 | 696 | 824 | 952 | |
| | 616 | 744 | 872 | 1000 | 632 | 760 | 888 | 1016 |
| 1064 | 1192 | 1320 | 1448 | 1080 | 1208 | 1336 | 1464 | |
| | 1128 | 1256 | 1384 | 1512 | 1144 | 1272 | 1400 | 1528 |
| 1576 | 1704 | 1832 | 1960 | 1592 | 1720 | 1848 | 1976 | |
| | 1640 | 1768 | 1896 | 2024 | 1656 | 1784 | 1912 | 2040 |

FIG. 3e

INVENTORS
P. E. FOX
J. E. BARTELT
D. J. CRAWFORD
N. ROCHESTER

BY   *John F. Hanifin*
ATTORNEY

FIG. 3f

Aug. 23, 1960   P. E. FOX ET AL   2,950,465
ELECTRONIC DATA PROCESSING MACHINE
Filed March 22, 1954   61 Sheets-Sheet 30

INVENTORS
P. E. FOX
J. E. BARTELT
D. J. CRAWFORD
N. ROCHESTER
BY John F. Hanifin
ATTORNEY

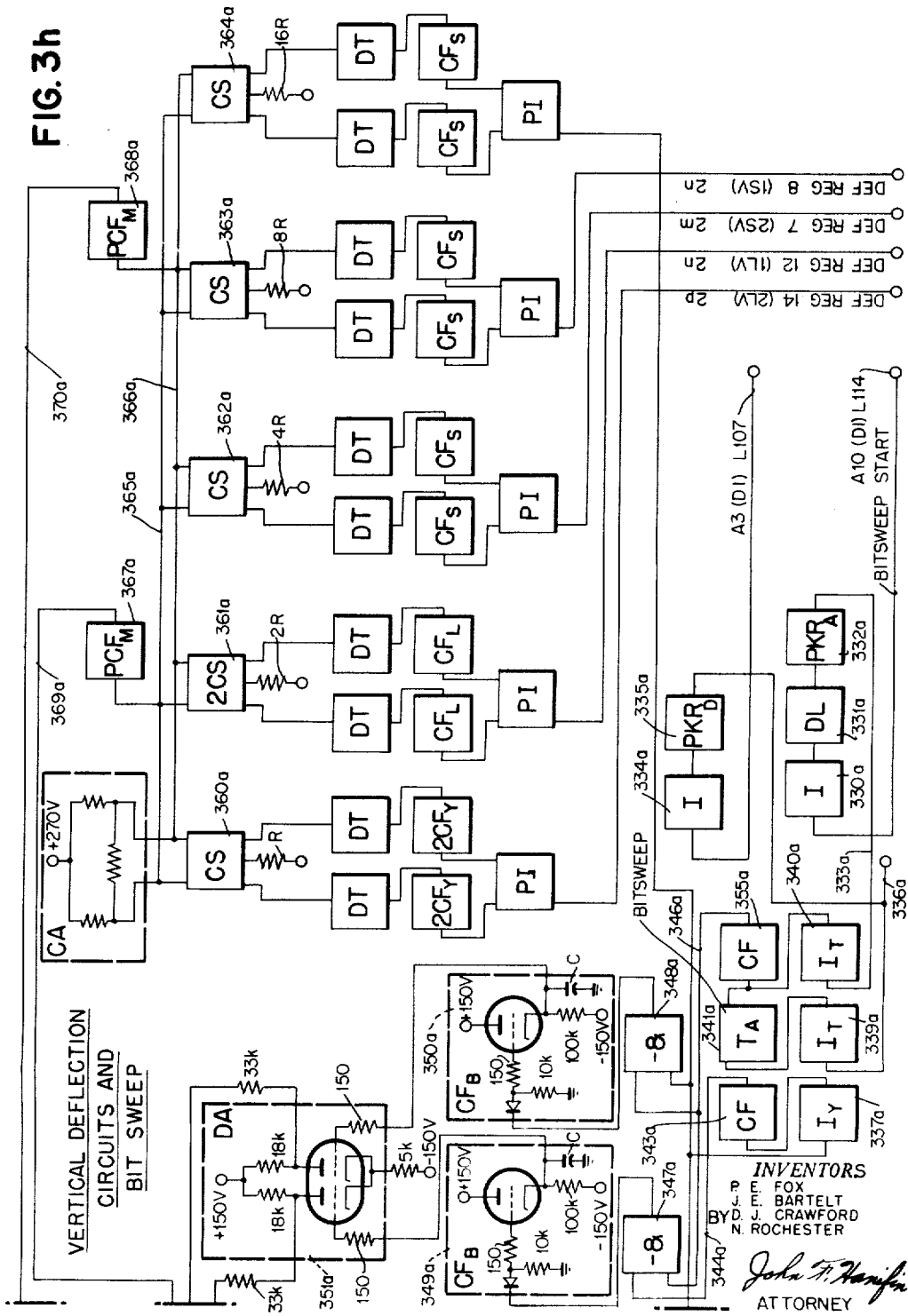

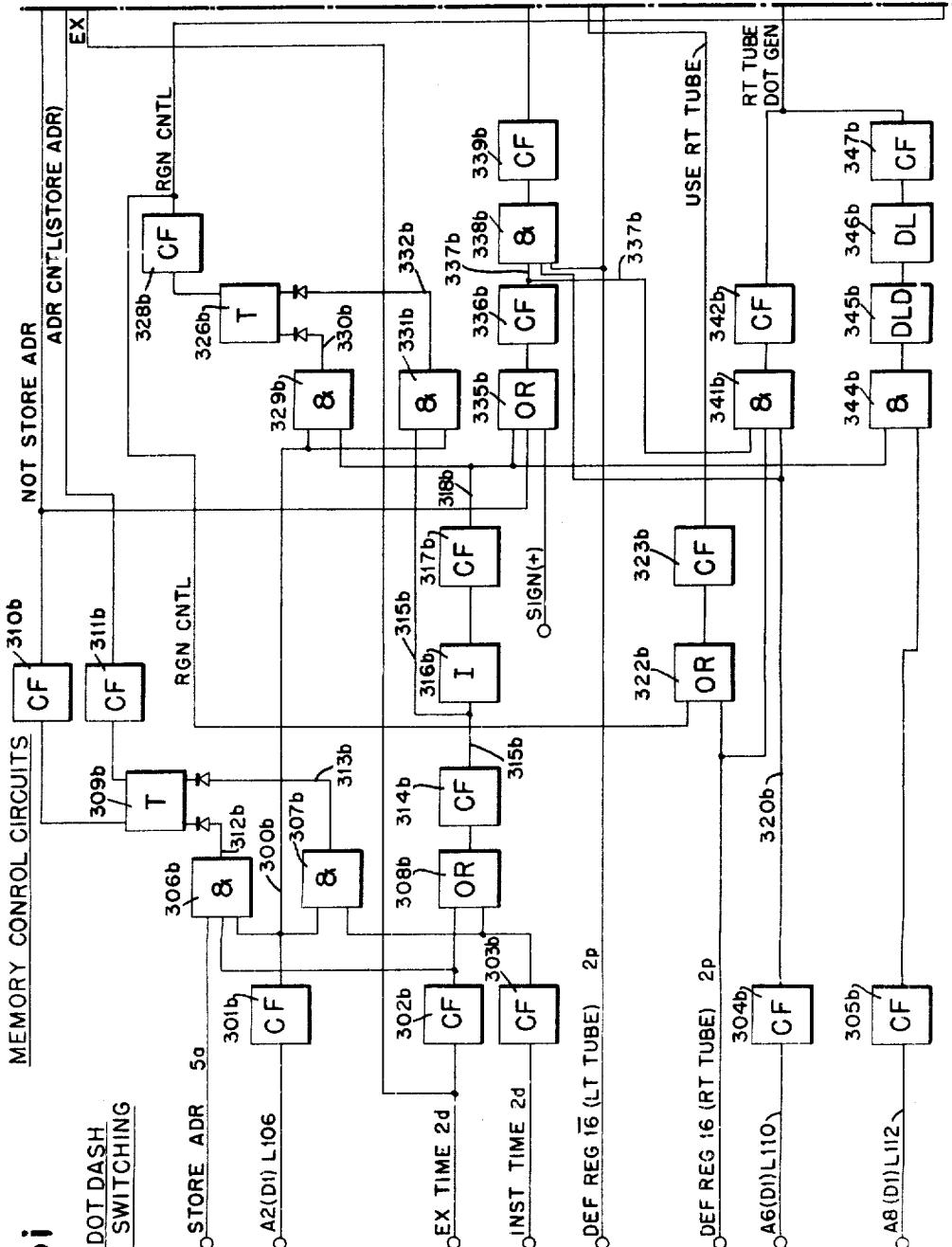

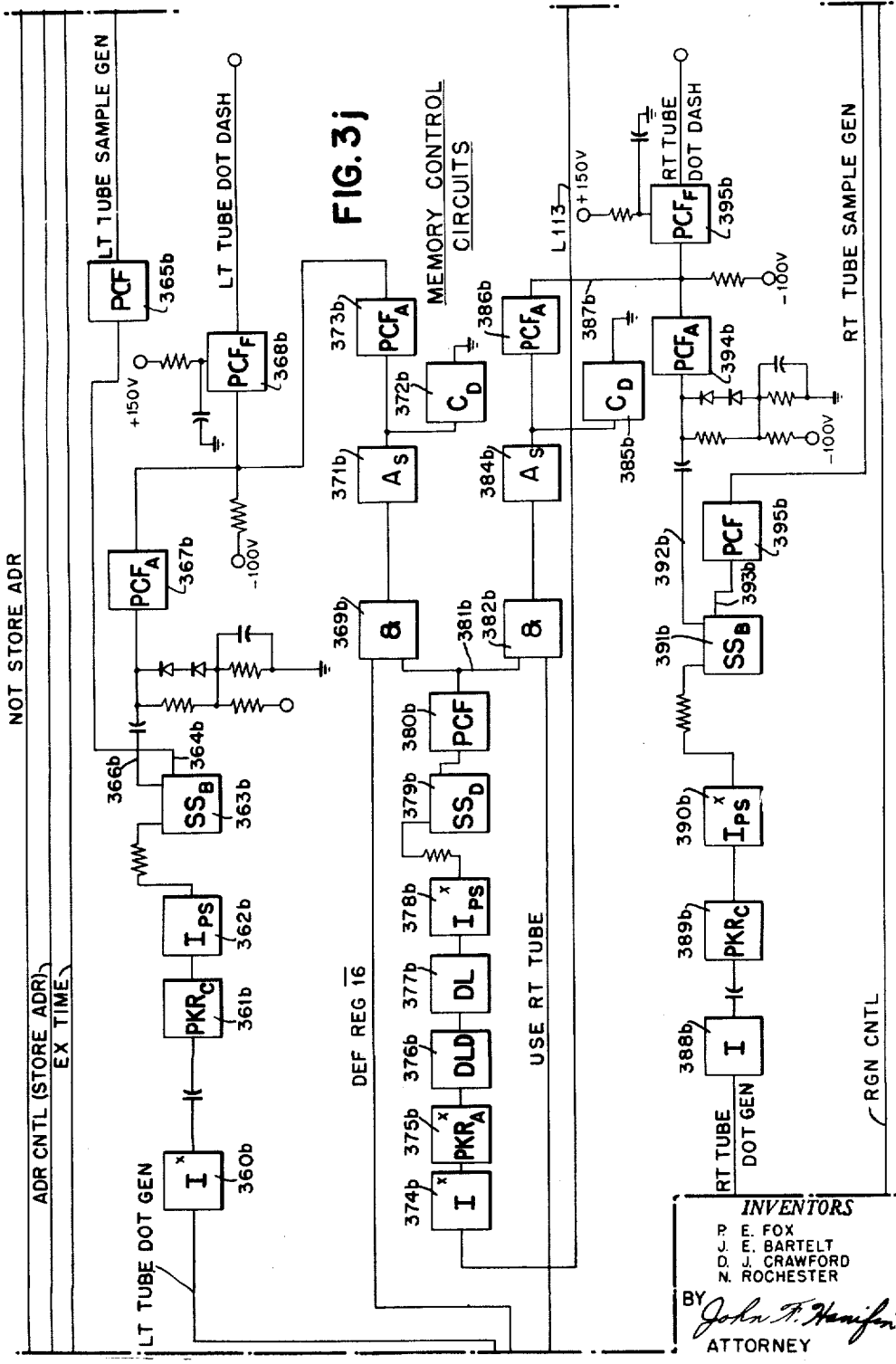

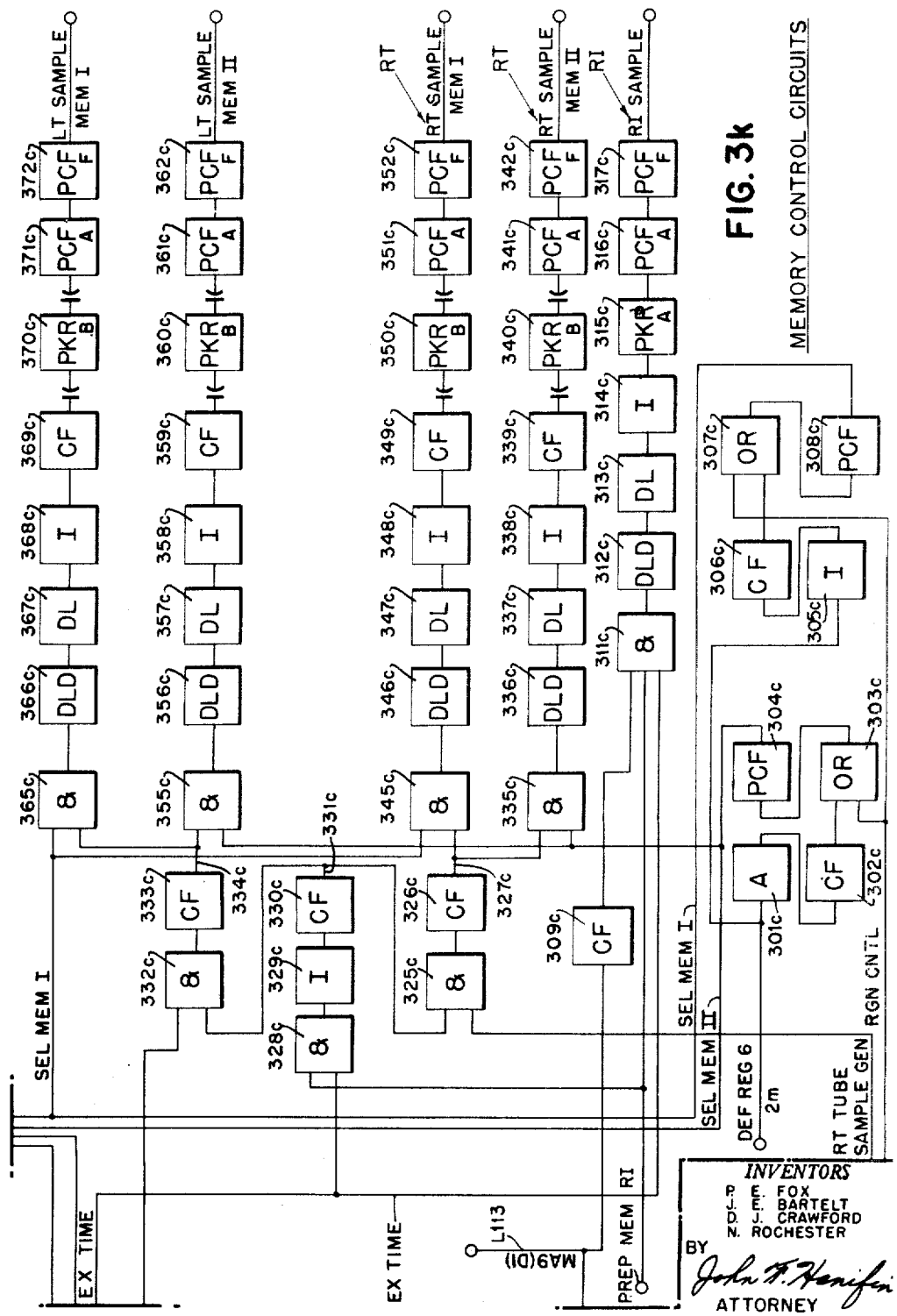

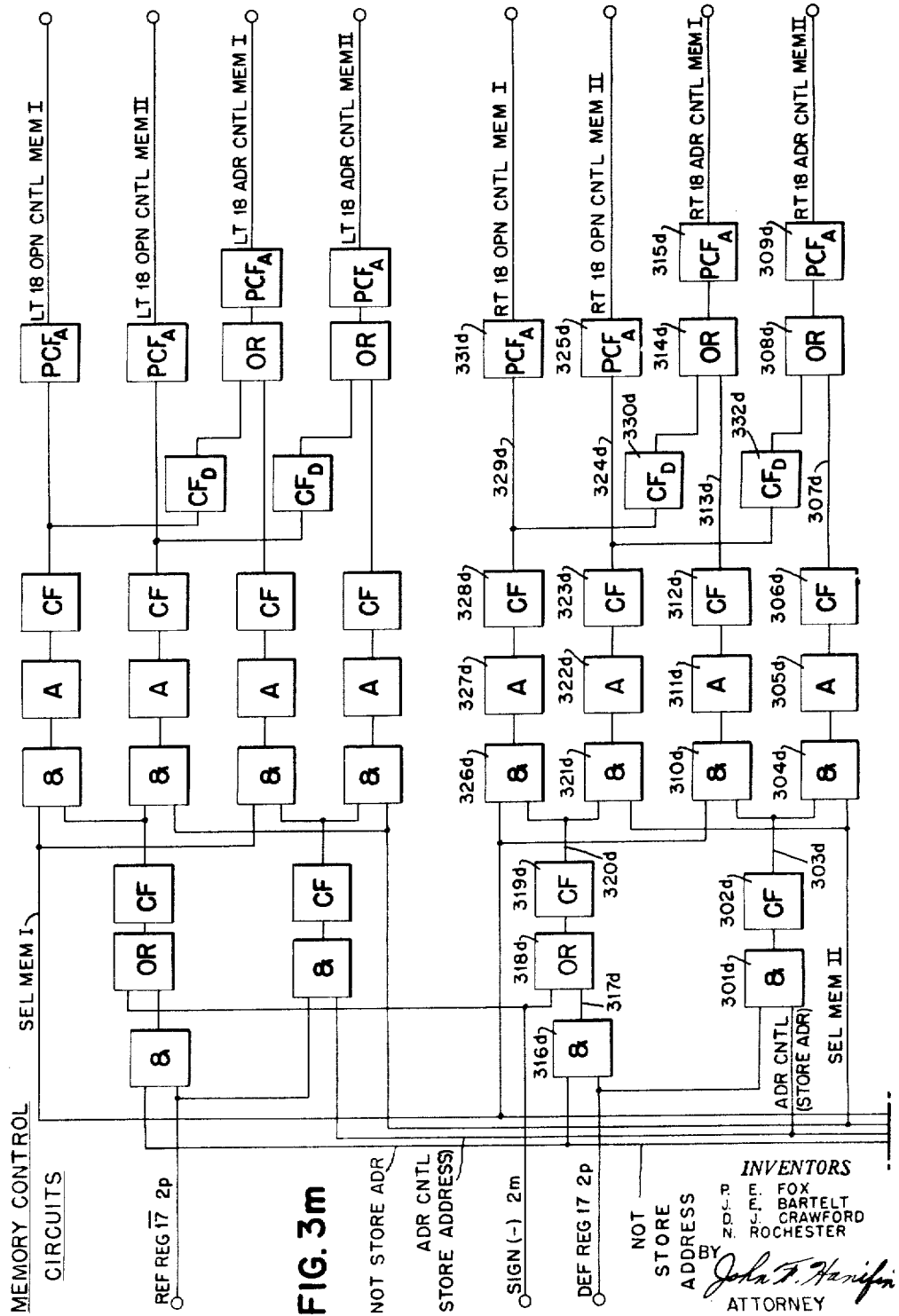

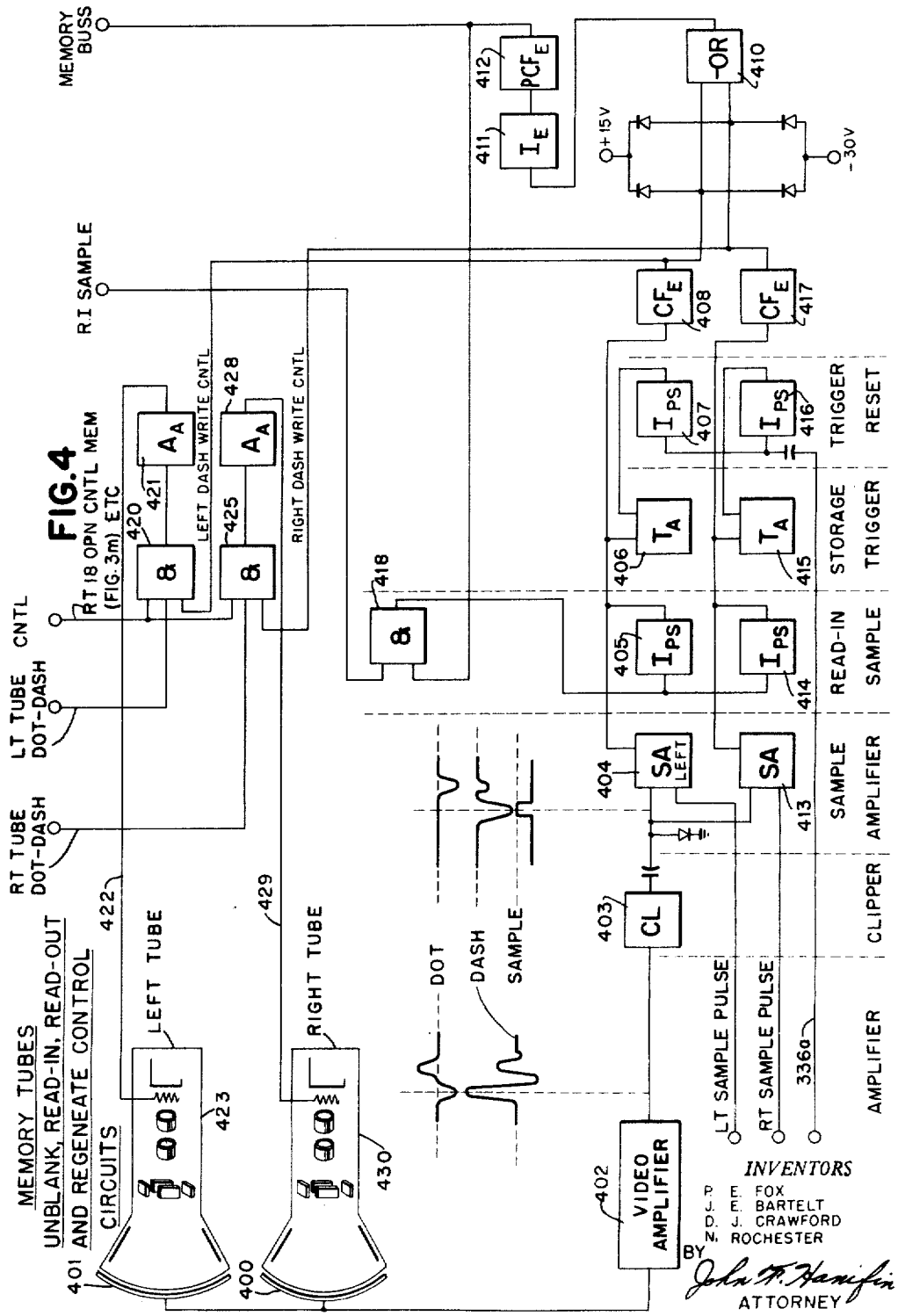

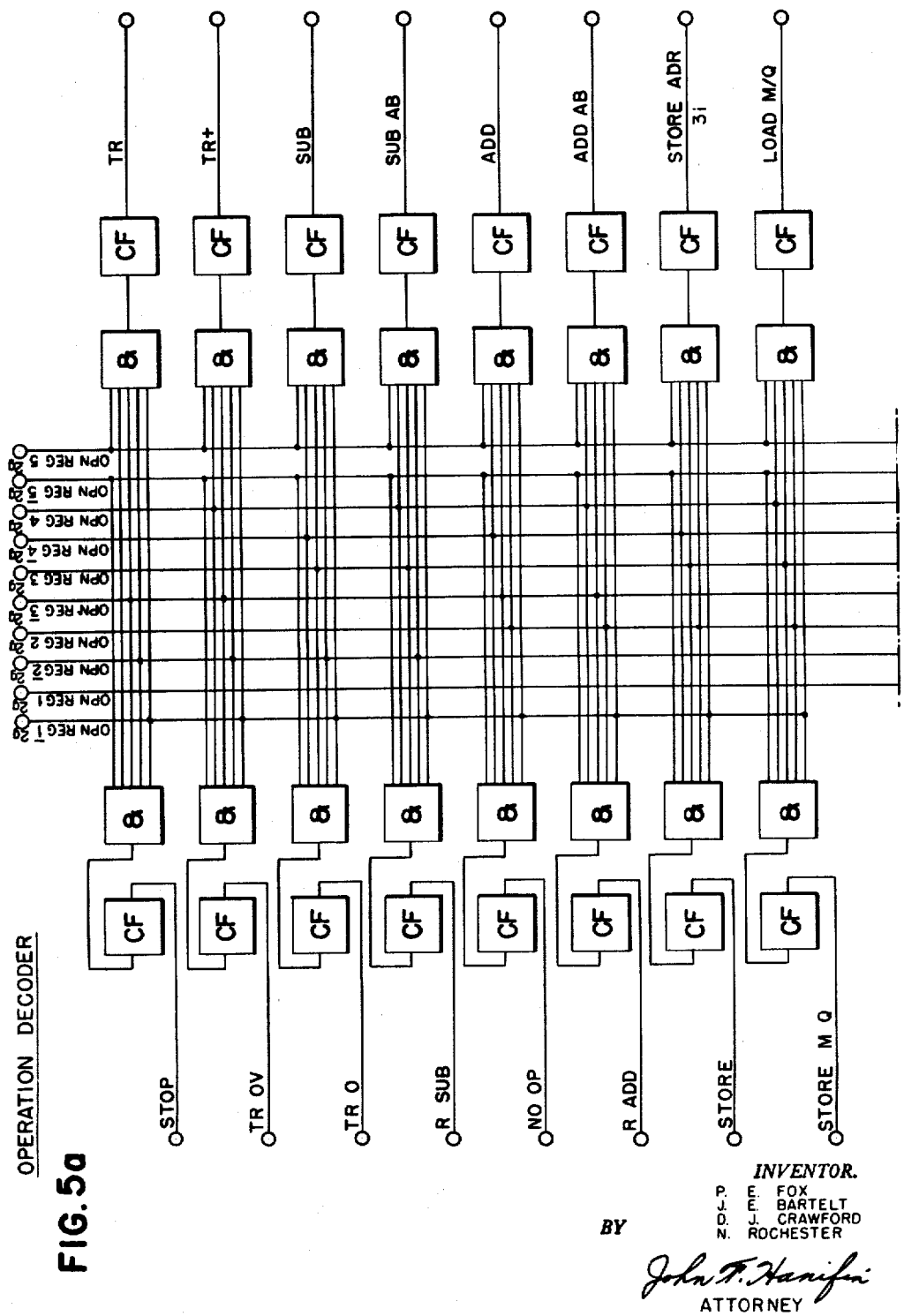

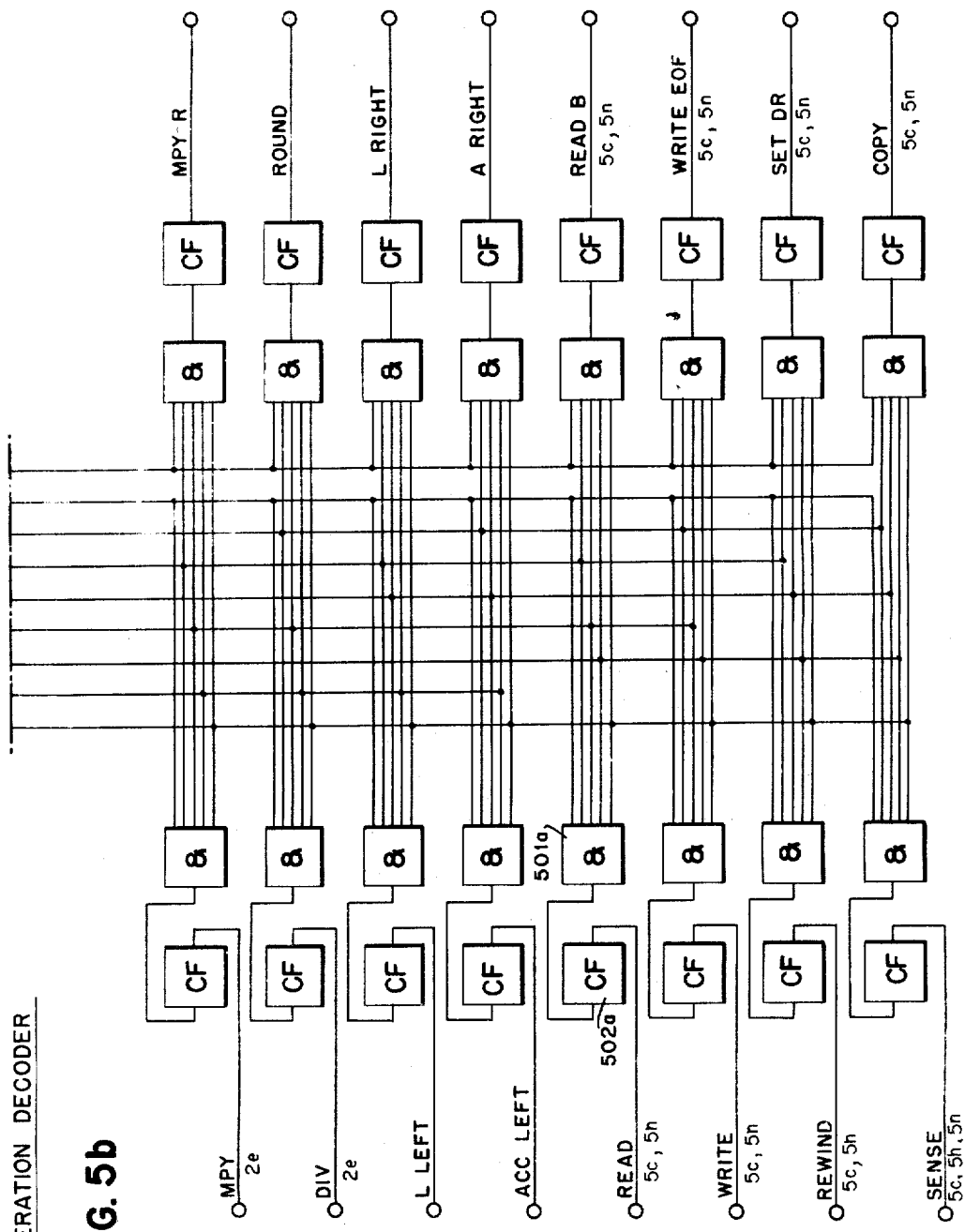

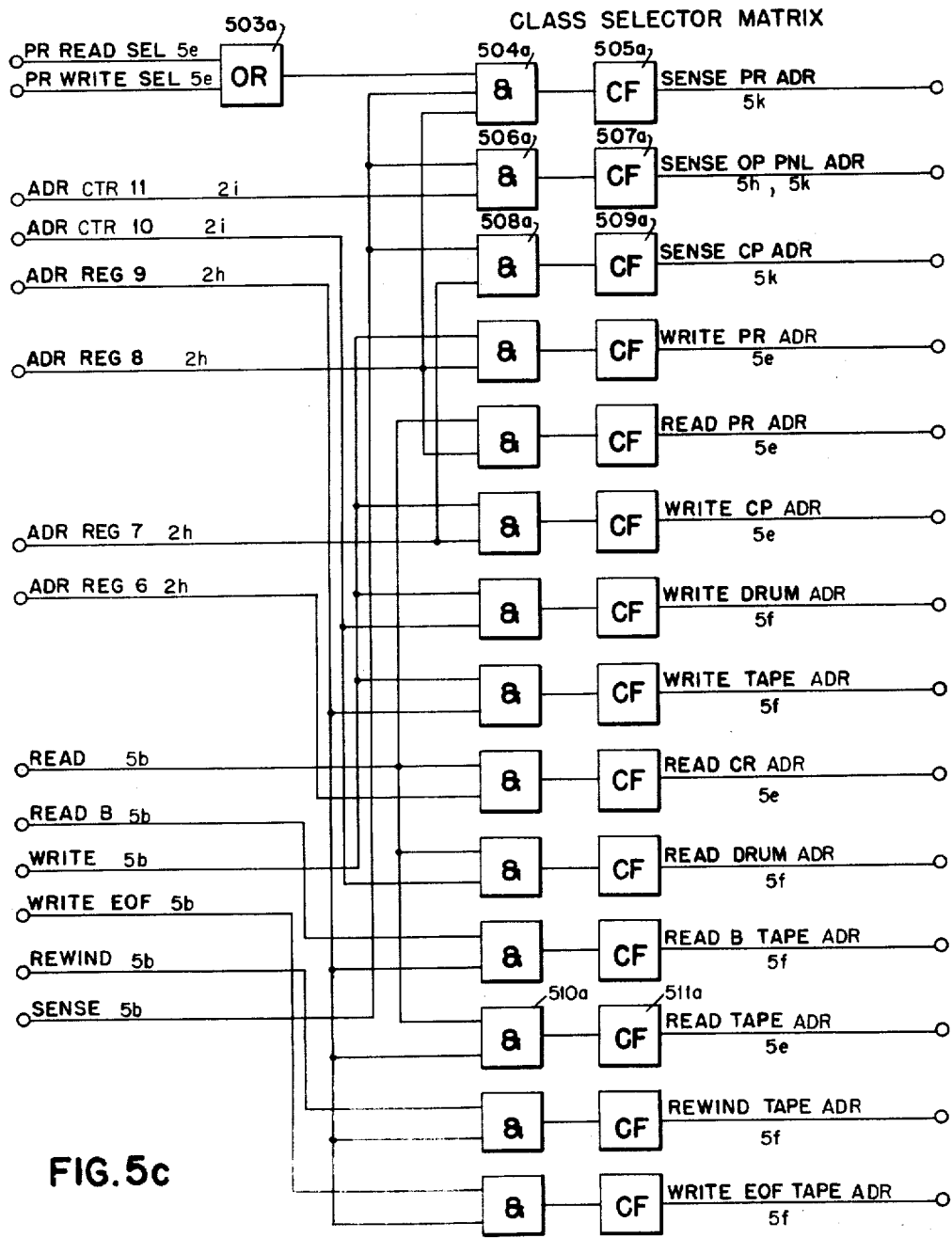

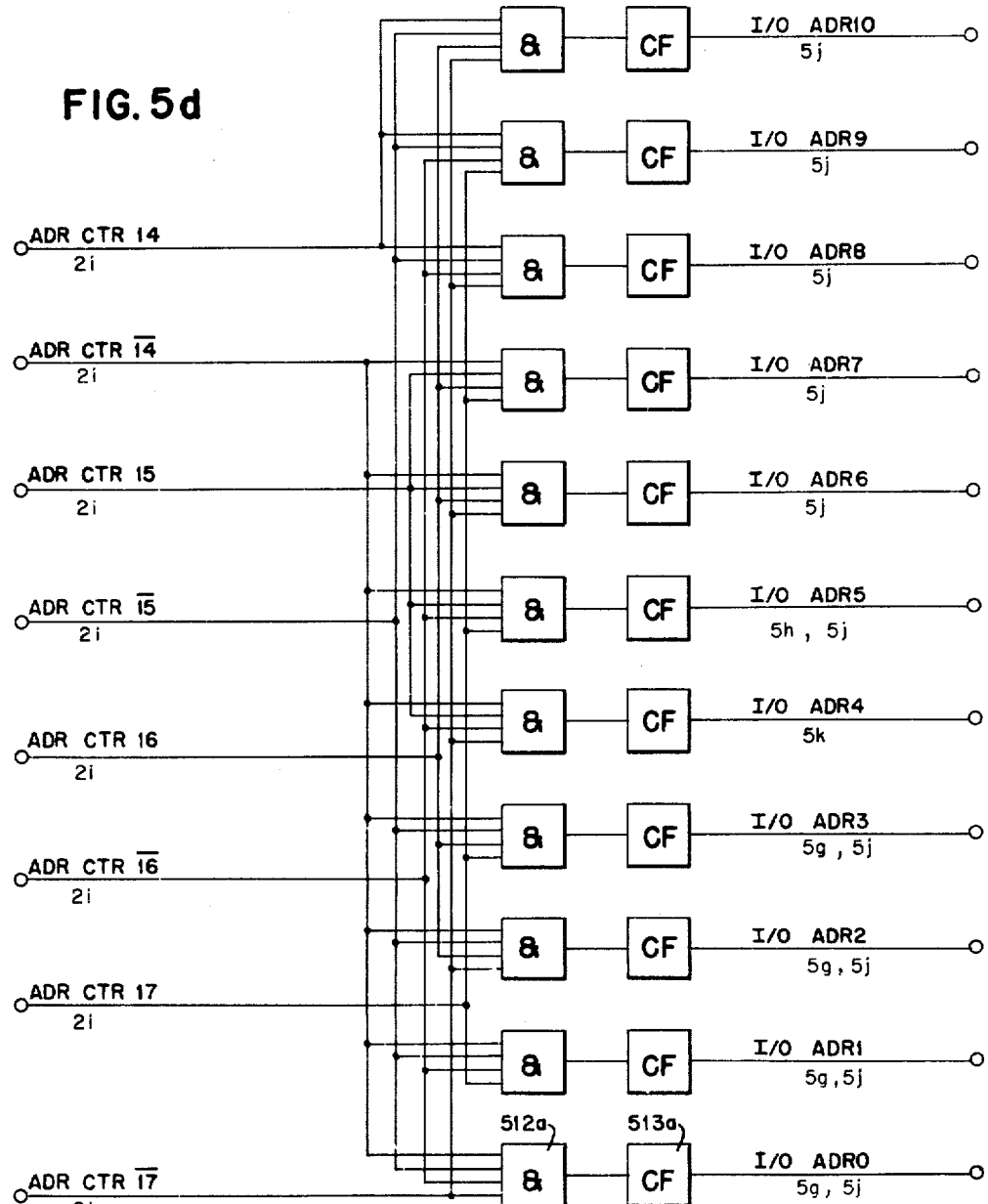

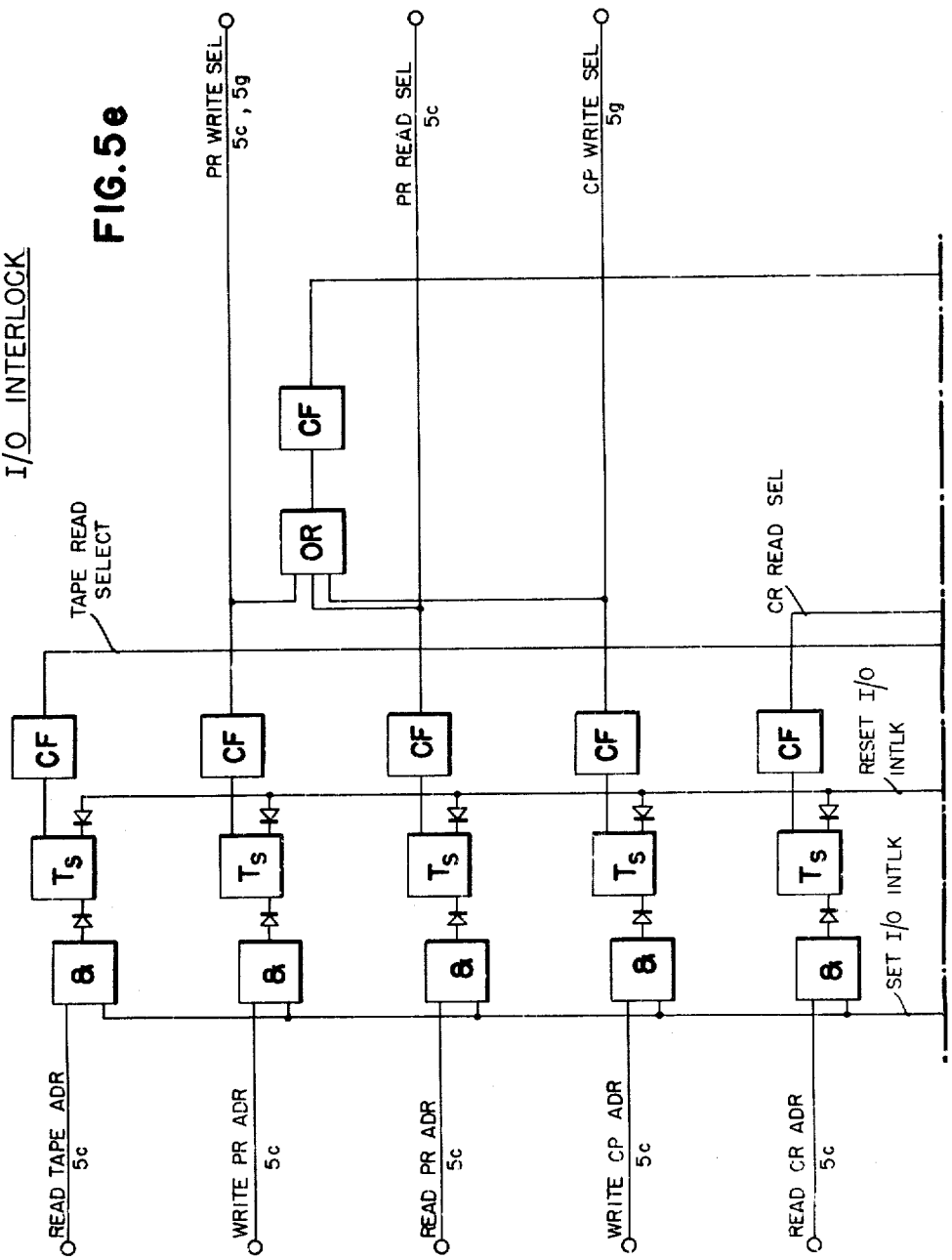

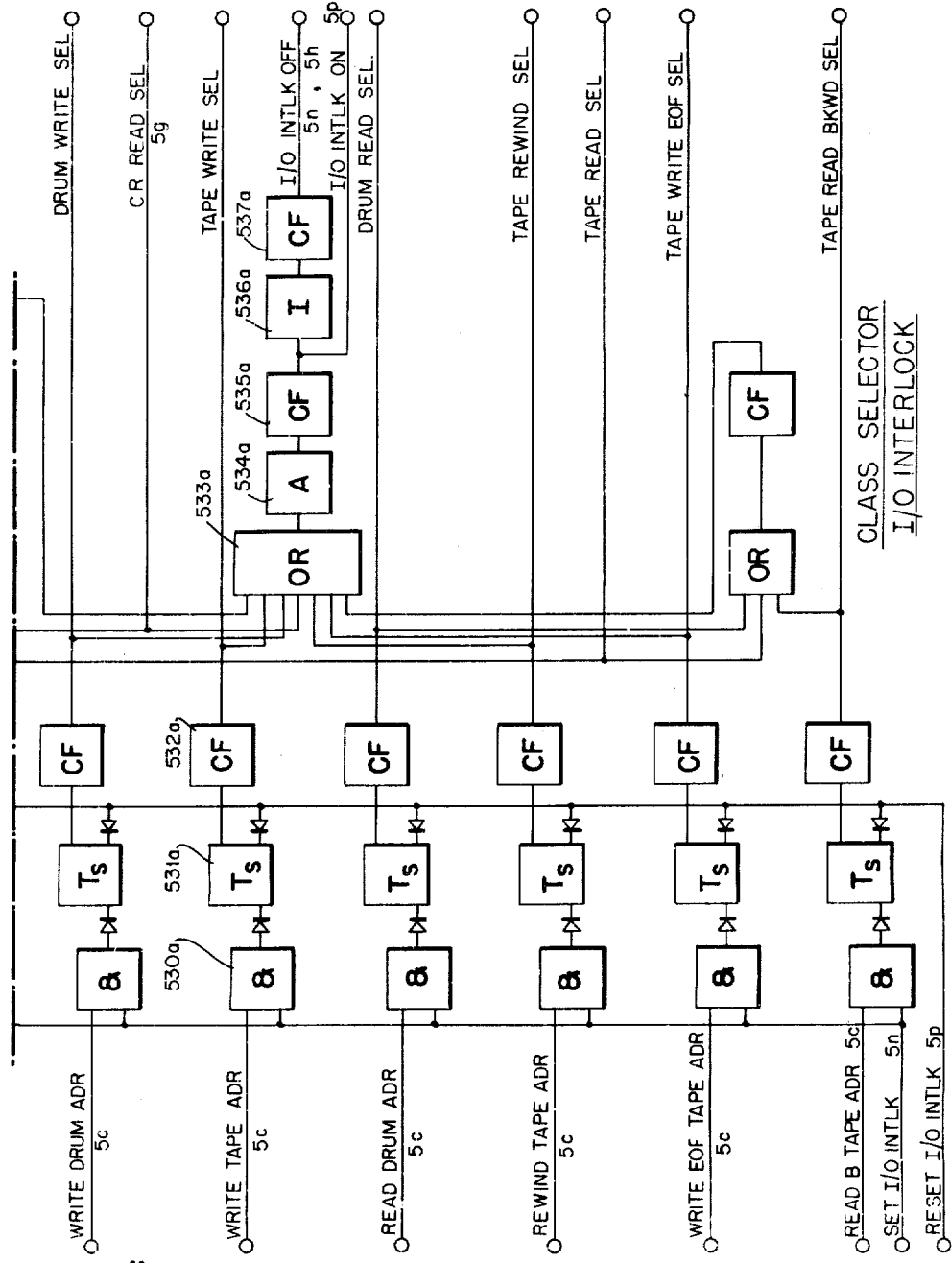

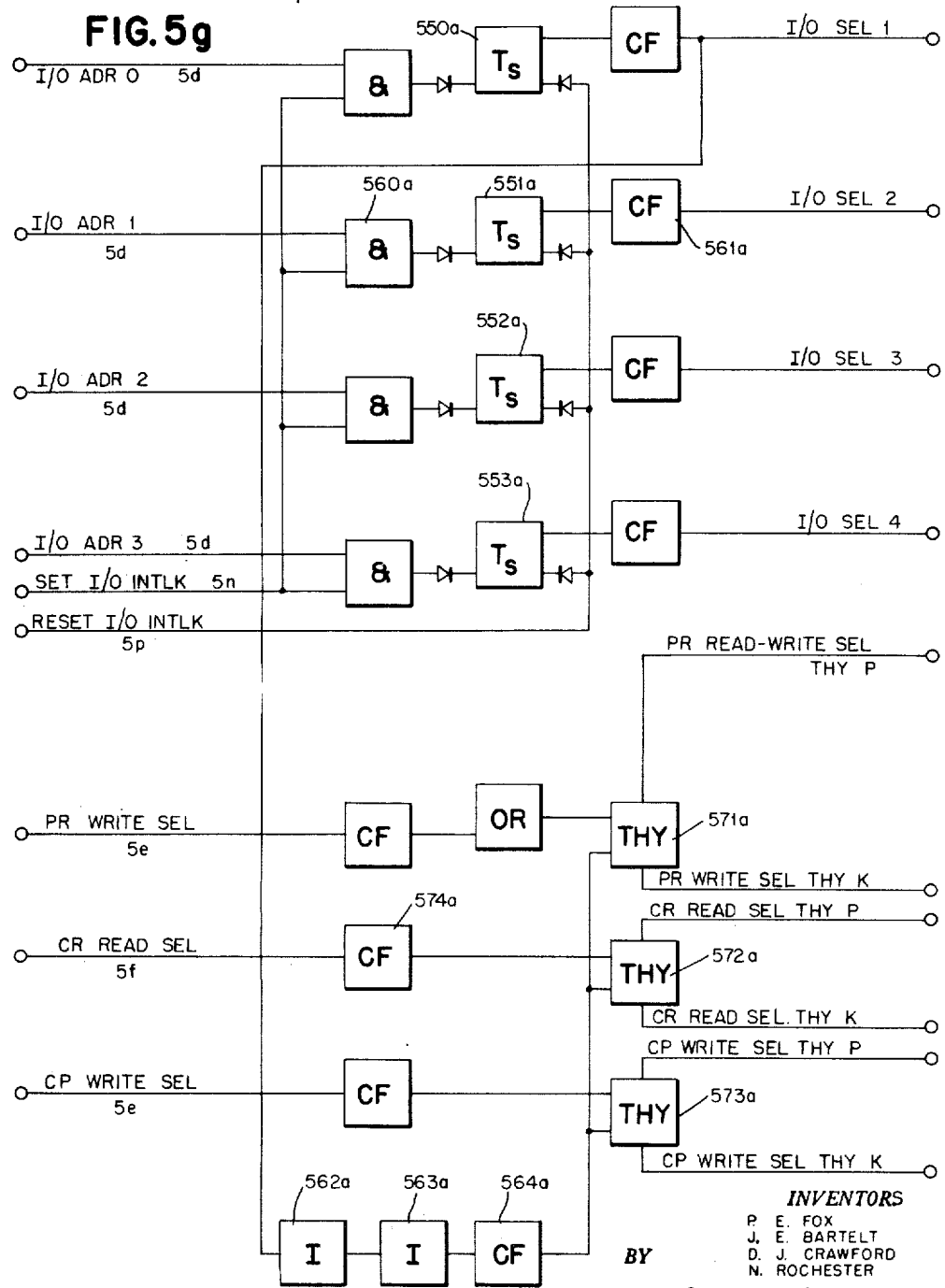

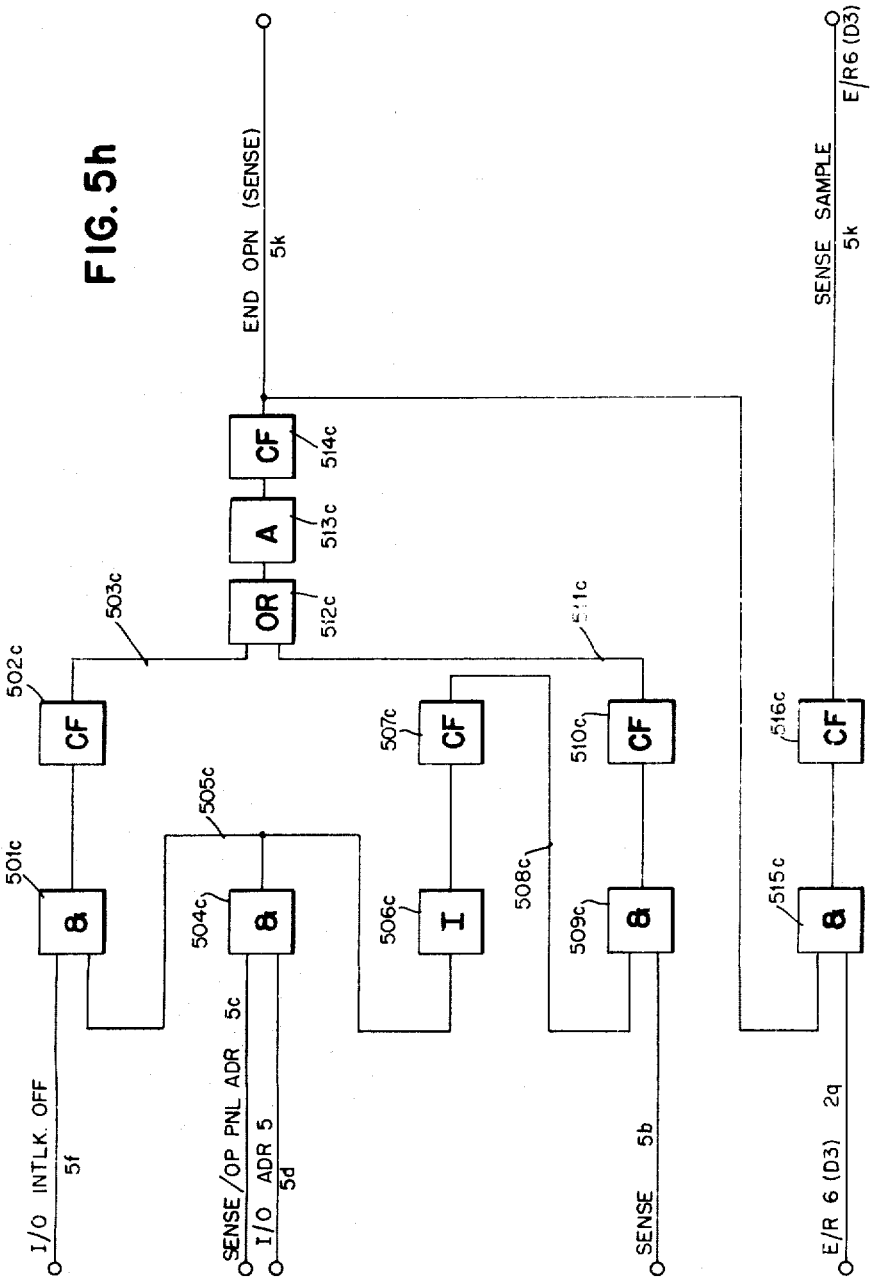

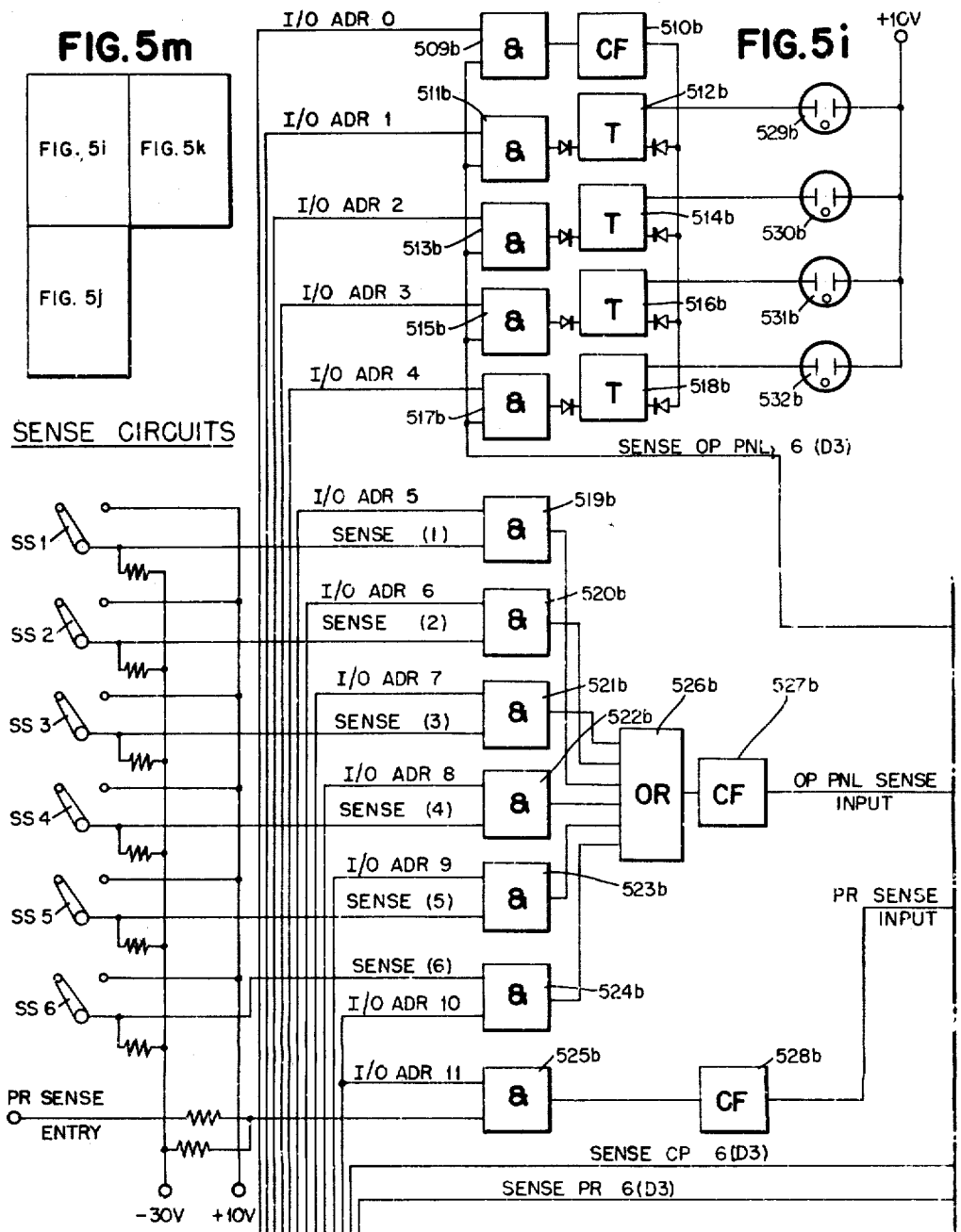

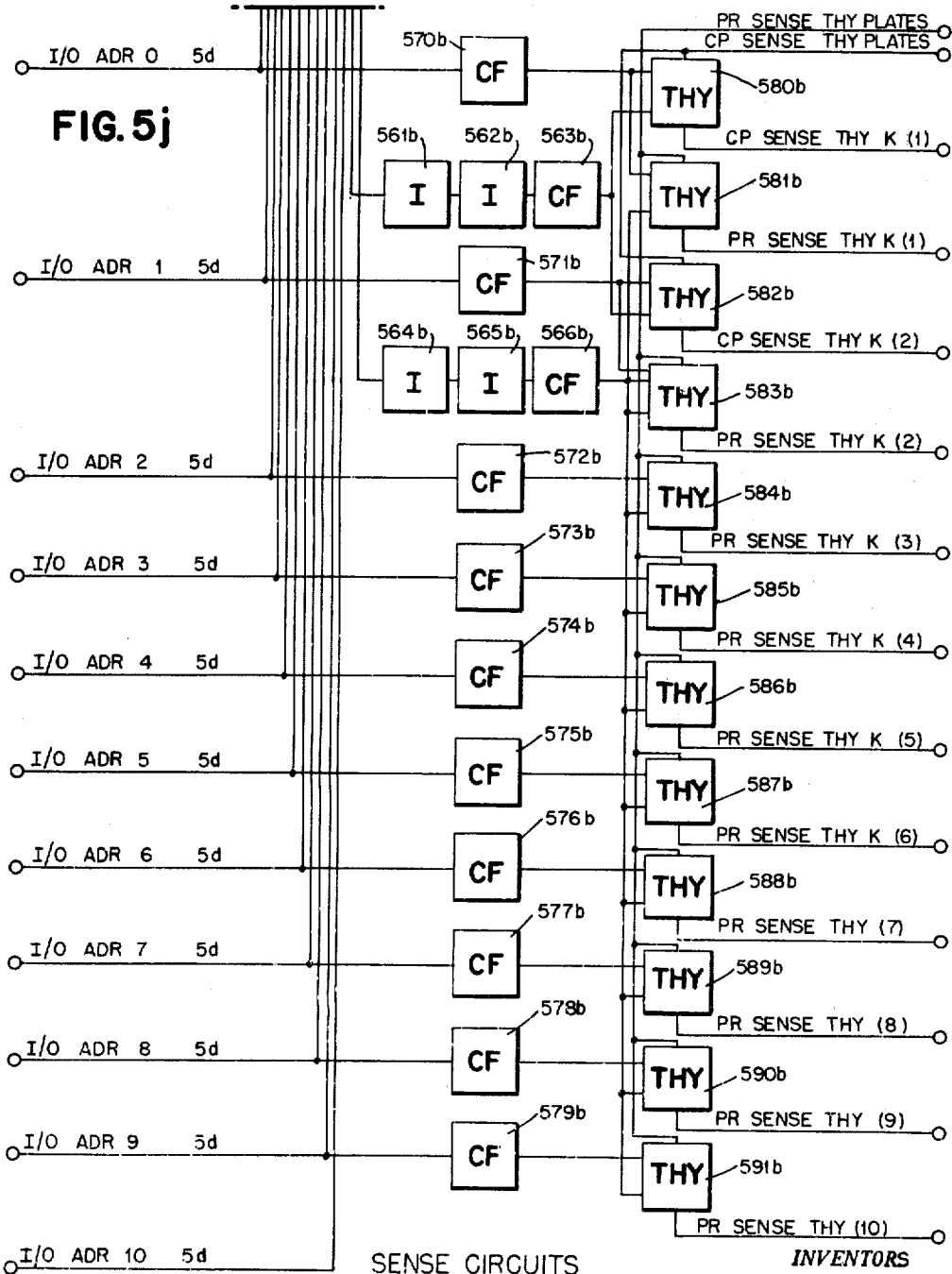

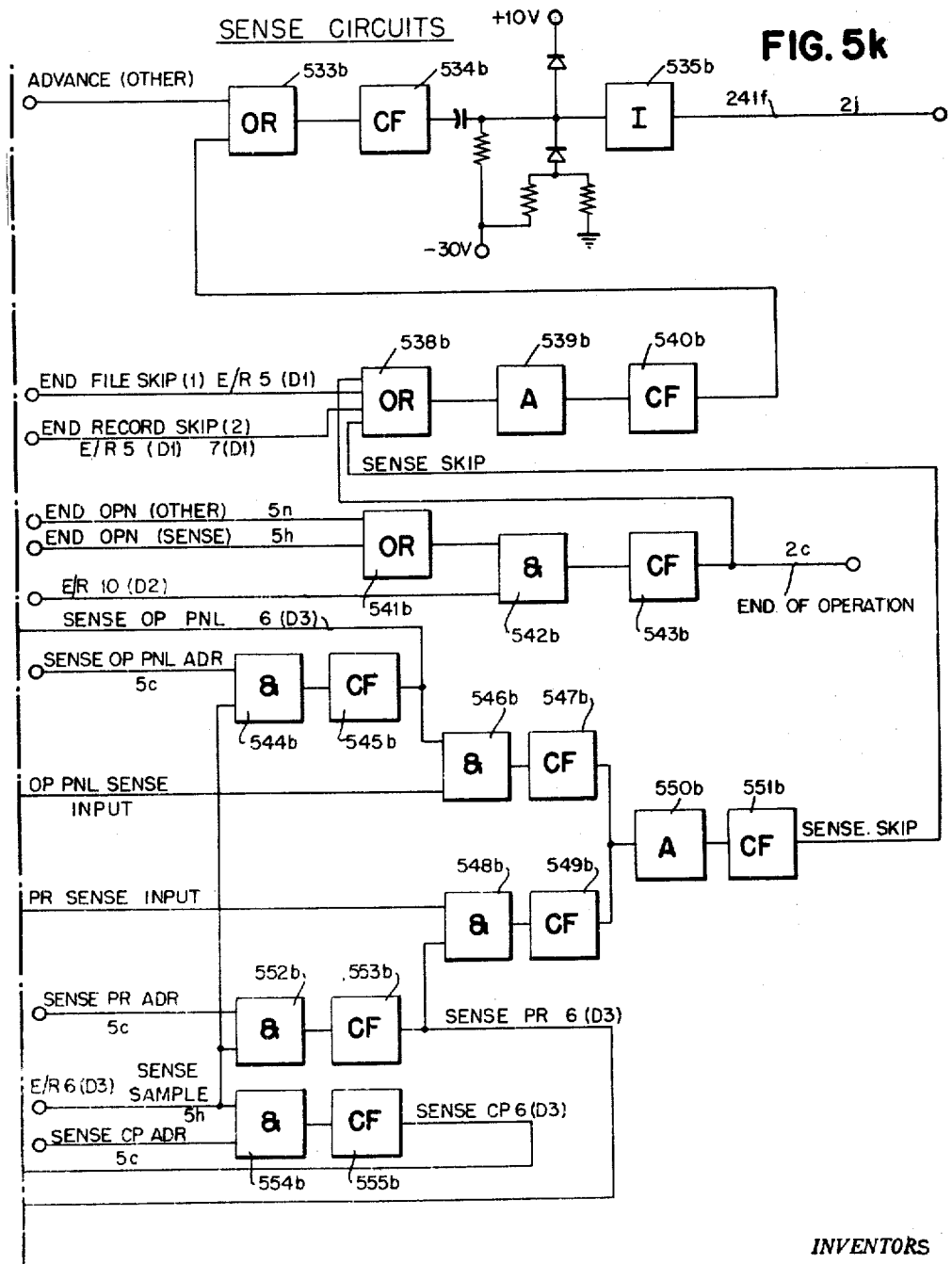

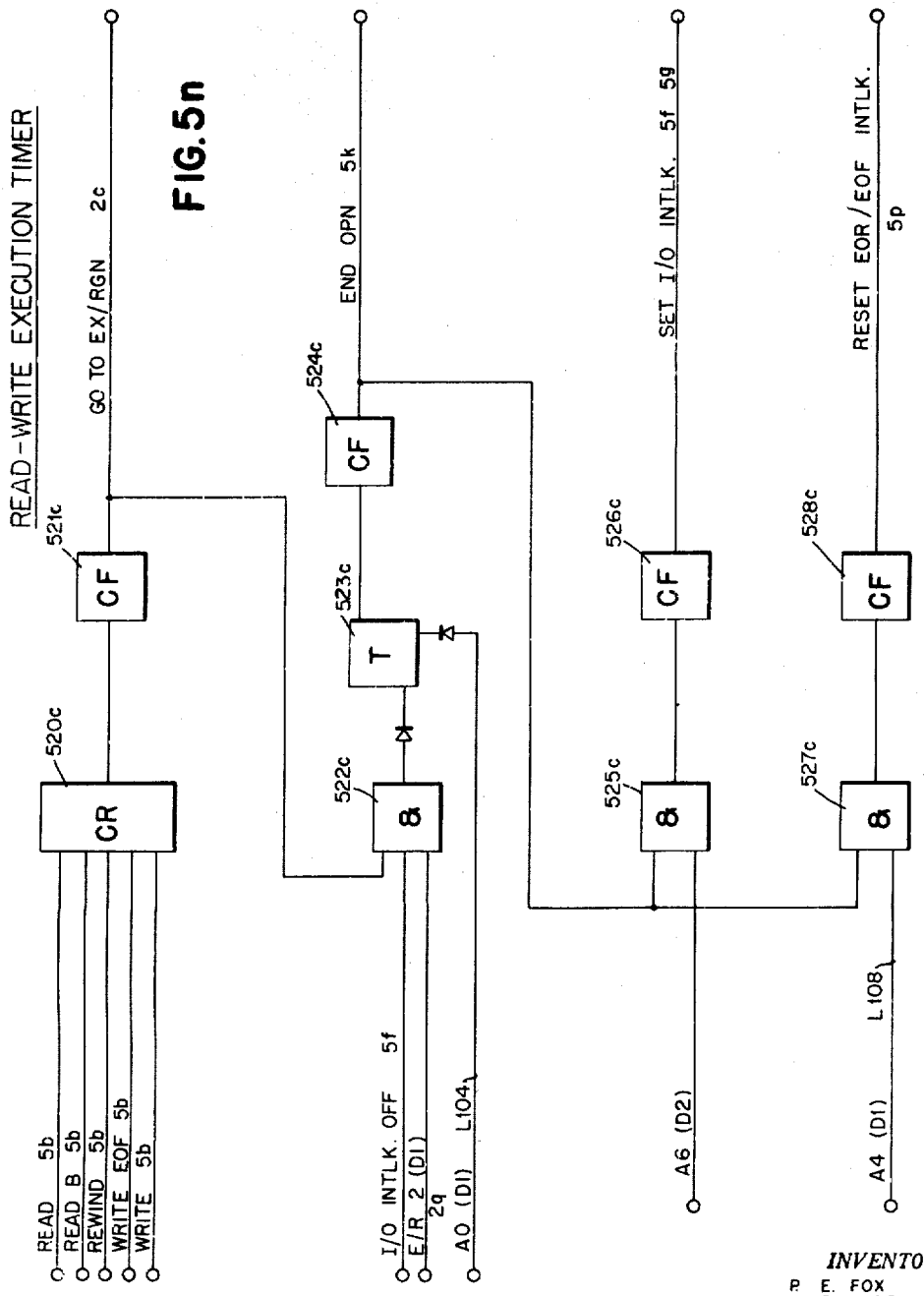

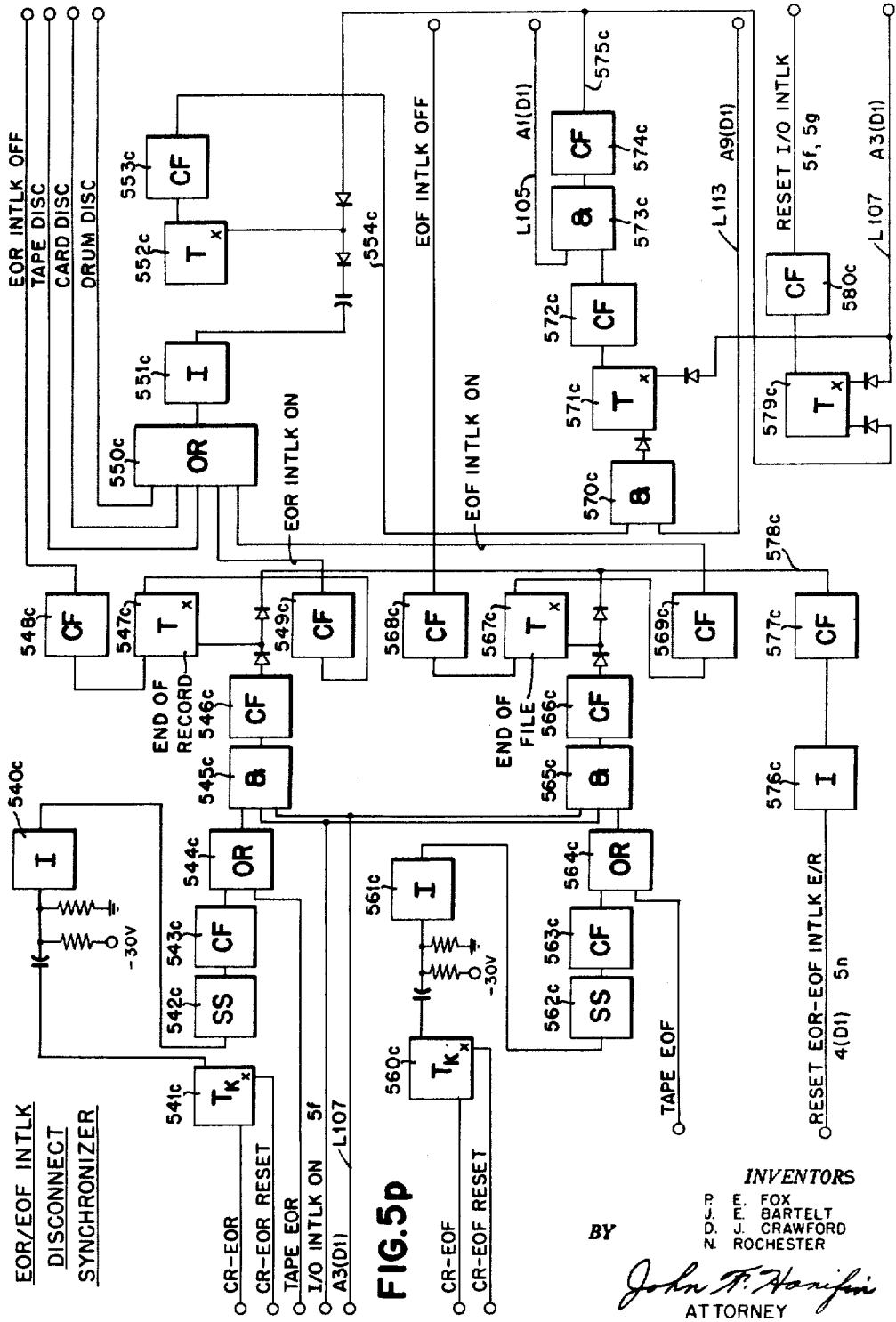

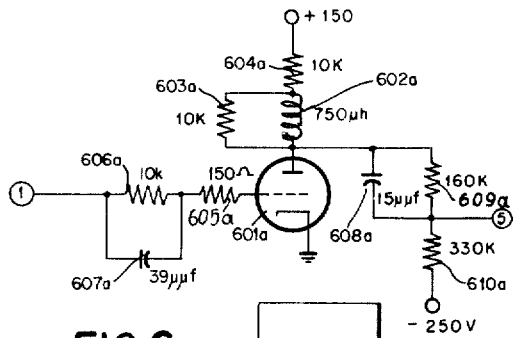
FIG.6a
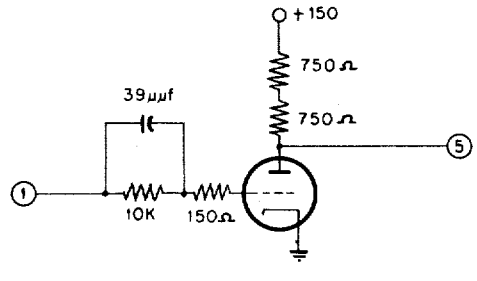
FIG.6d
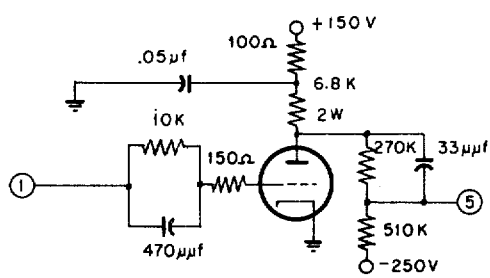
FIG.6b
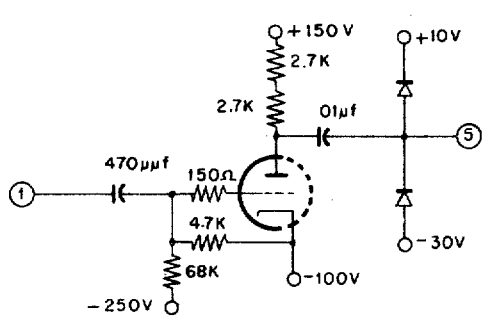
FIG.6e
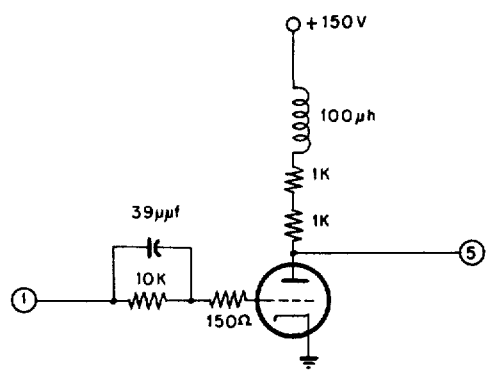
FIG.6c
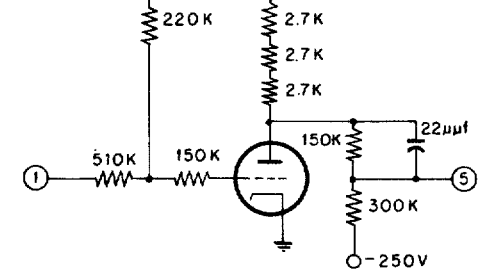
FIG.6f
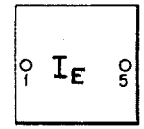

Aug. 23, 1960    P. E. FOX ET AL    2,950,465
ELECTRONIC DATA PROCESSING MACHINE
Filed March 22, 1954    61 Sheets-Sheet 51

*INVENTORS*
P. E. FOX
J. E. BARTELT
D. J. CRAWFORD
N. ROCHESTER

BY John F. Hanifin
ATTORNEY

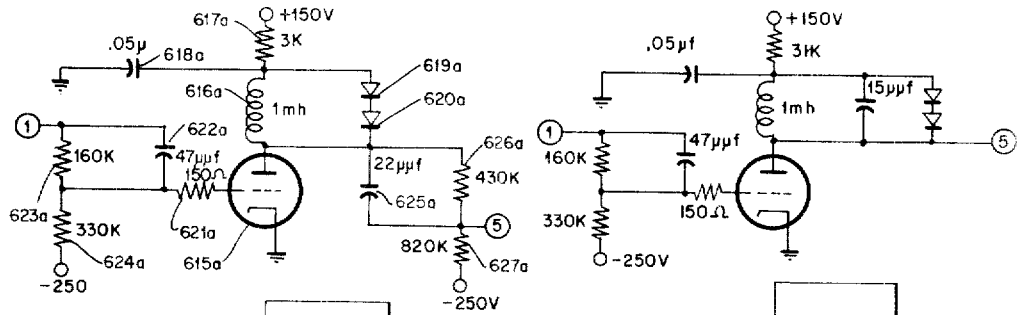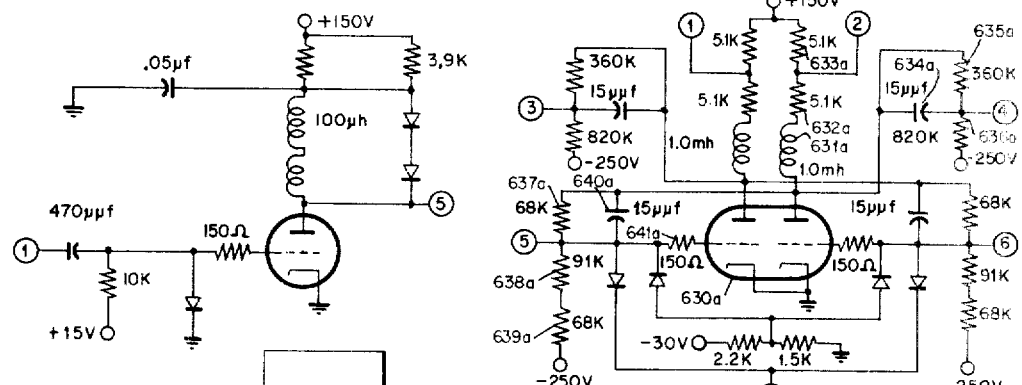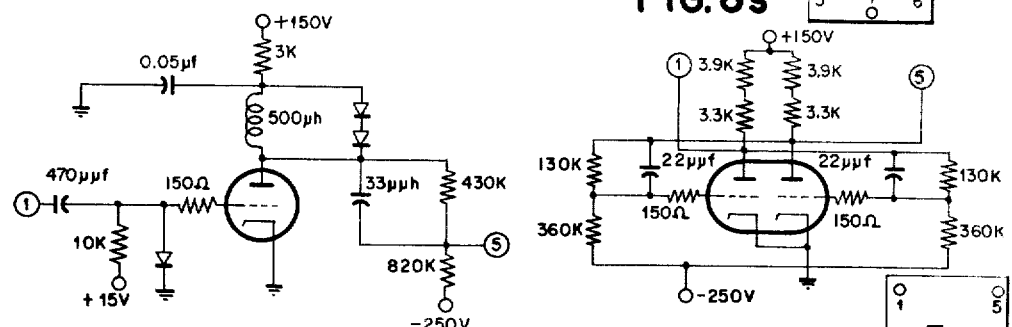

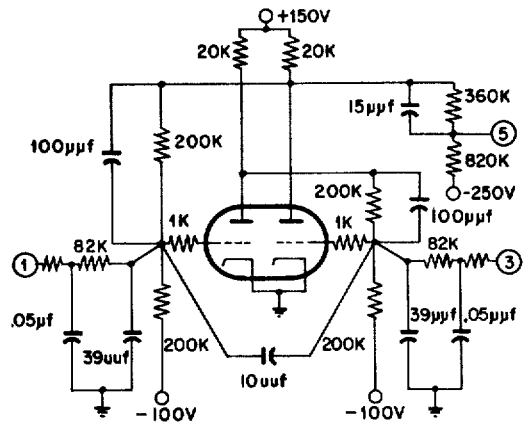
FIG. 6u
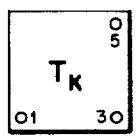
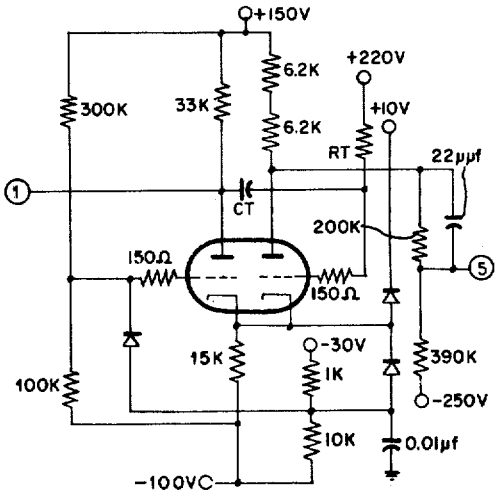
FIG. 6w
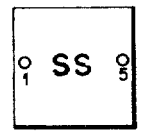
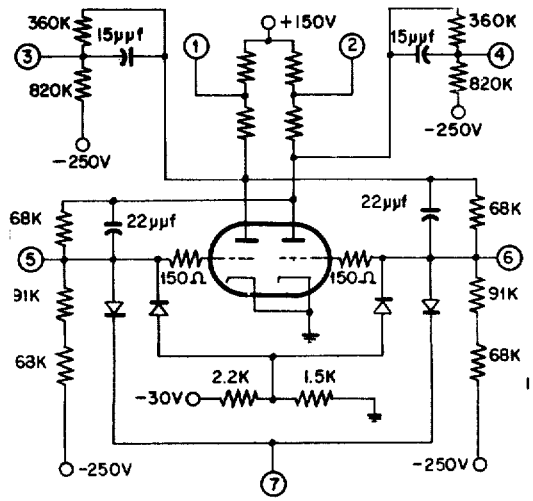
FIG. 6v
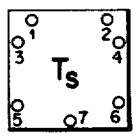
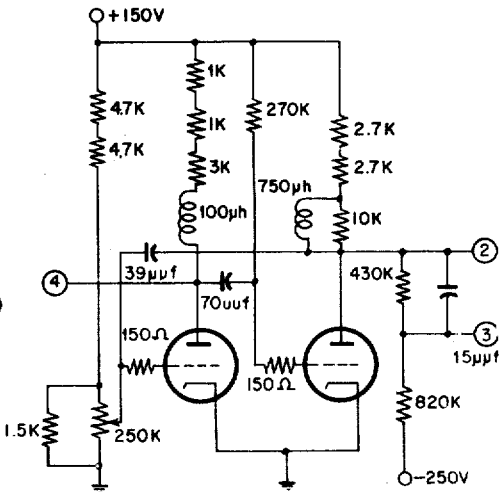
FIG. 6y
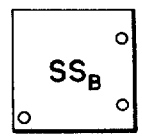
*INVENTORS*
P. E. FOX
J. E. BARTELT
D. J. CRAWFORD
N. ROCHESTER
BY *John F. Hanifin*
ATTORNEY

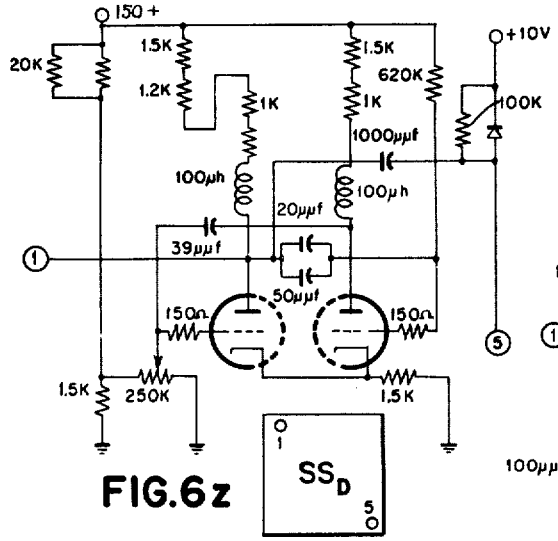
FIG.6z SS_D
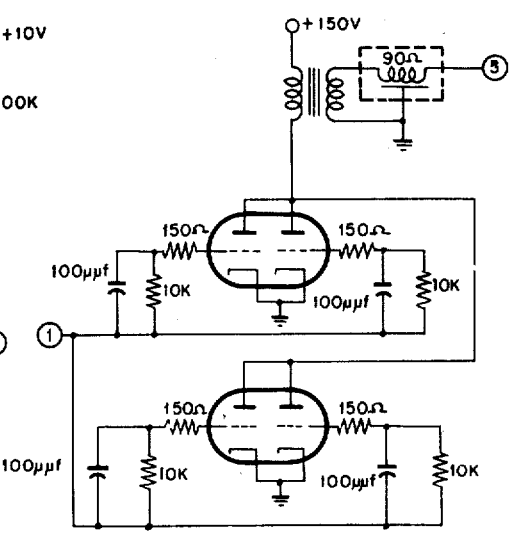
FIG.6ad CPA
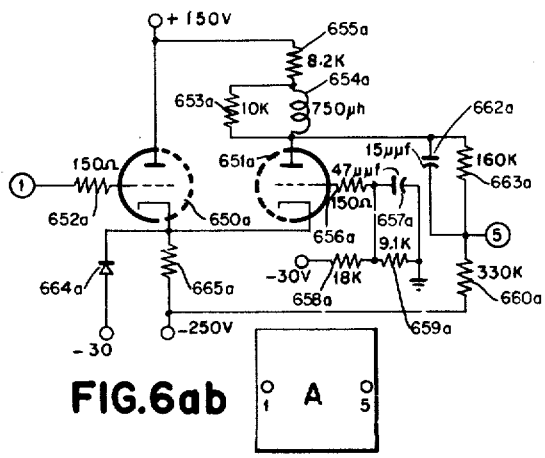
FIG.6ab A
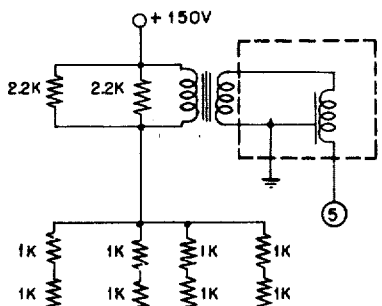
FIG.6ae SPA
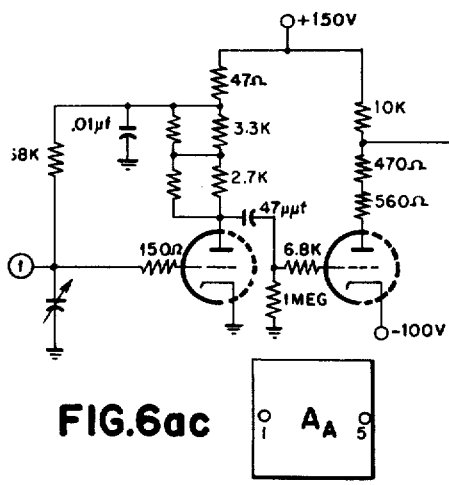
FIG.6ac A_A
*INVENTORS*
P. E. FOX
J. E. BARTELT
D. J. CRAWFORD
N. ROCHESTER
BY John F. Hanifin
ATTORNEY

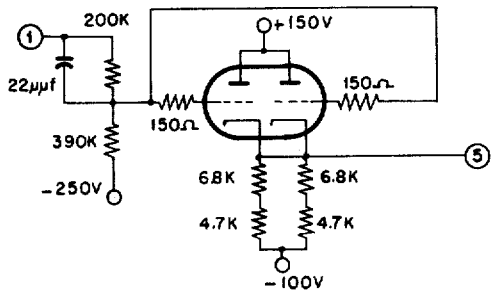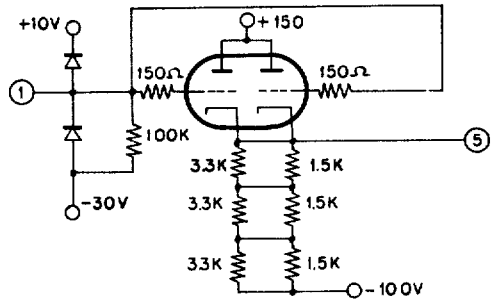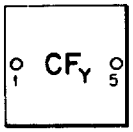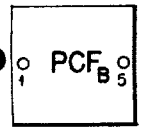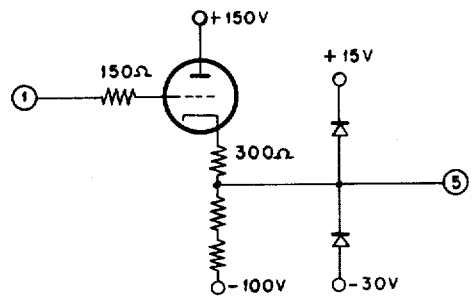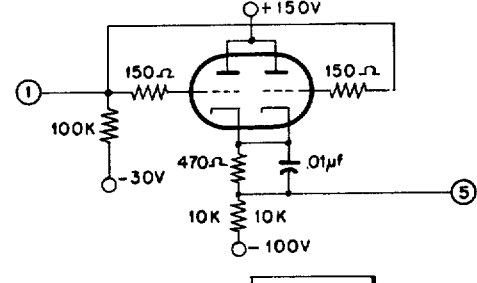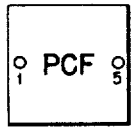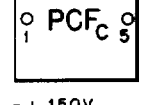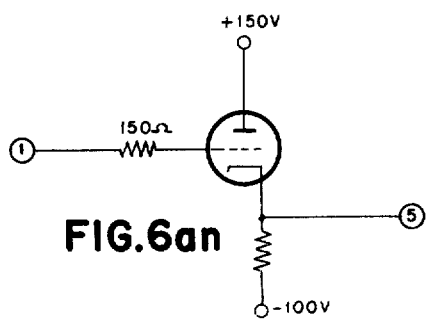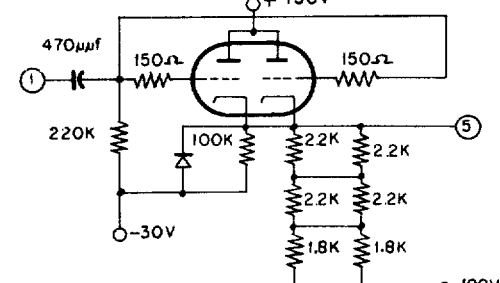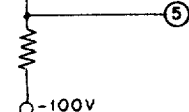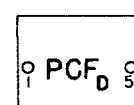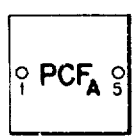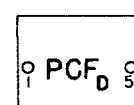

Aug. 23, 1960  P. E. FOX ET AL  2,950,465
ELECTRONIC DATA PROCESSING MACHINE
Filed March 22, 1954  61 Sheets-Sheet 57
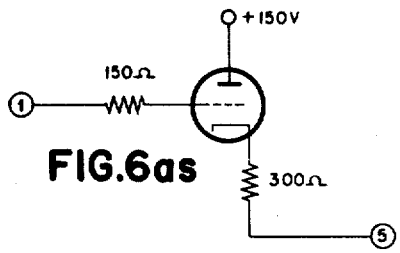
FIG.6as
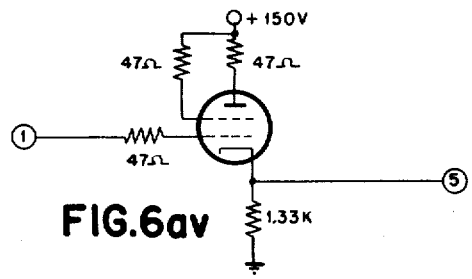
FIG.6av
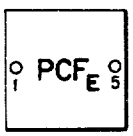
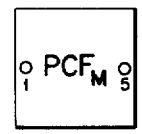
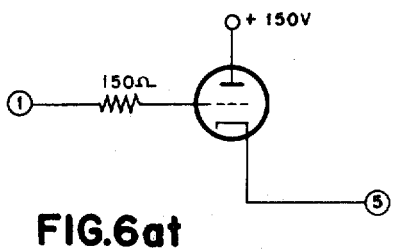
FIG.6at
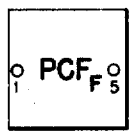
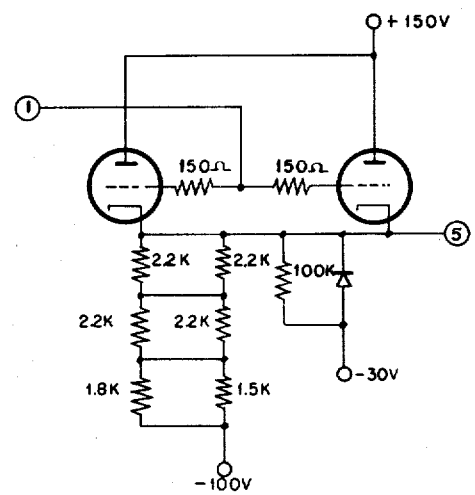
FIG.6aw
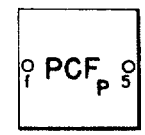
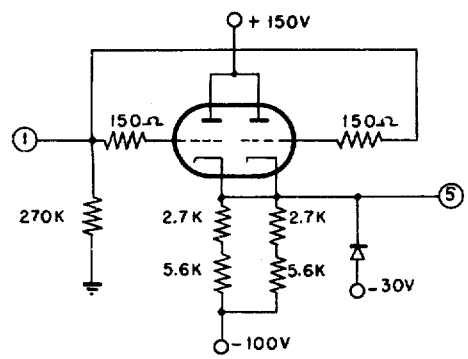

INVENTORS
P. E. FOX
J. E. BARTELT
D. J. CRAWFORD
N. ROCHESTER
BY
John F. Hanifin
ATTORNEY

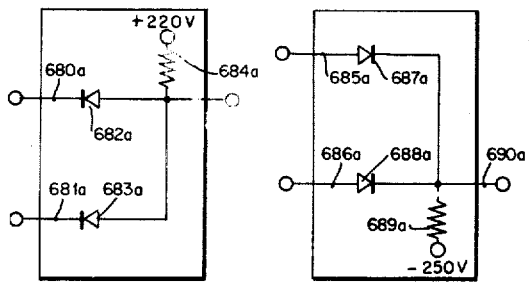
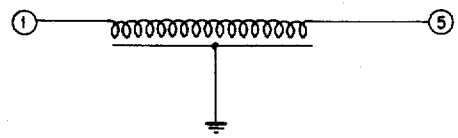
FIG.6ay   FIG.6az   FIG.6bd
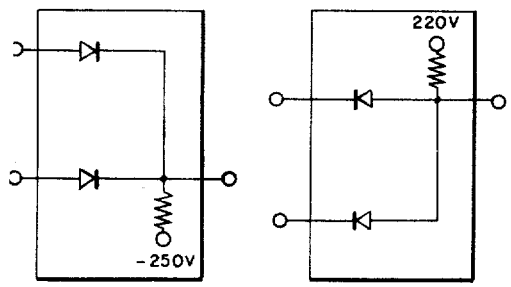
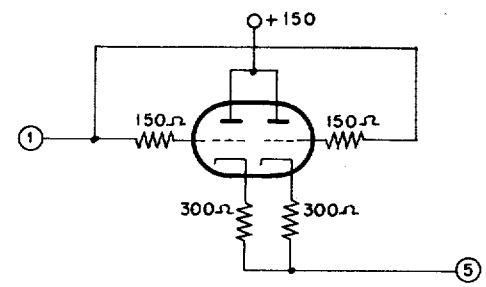
FIG.6ba   FIG.6bb   FIG.6be
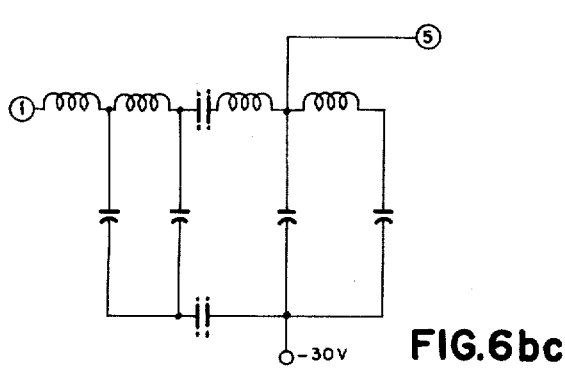
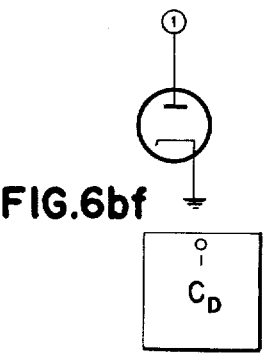
FIG.6bc   FIG.6bf
INVENTORS
P. E. FOX
J. E. BARTELT
D. J. CRAWFORD
N. ROCHESTER
BY
John F. Hanifin
ATTORNEY INVENTORS
P. E. FOX
J. E. BARTELT
D. J. CRAWFORD
N. ROCHESTER
BY
John F. Hanifin
ATTORNEY

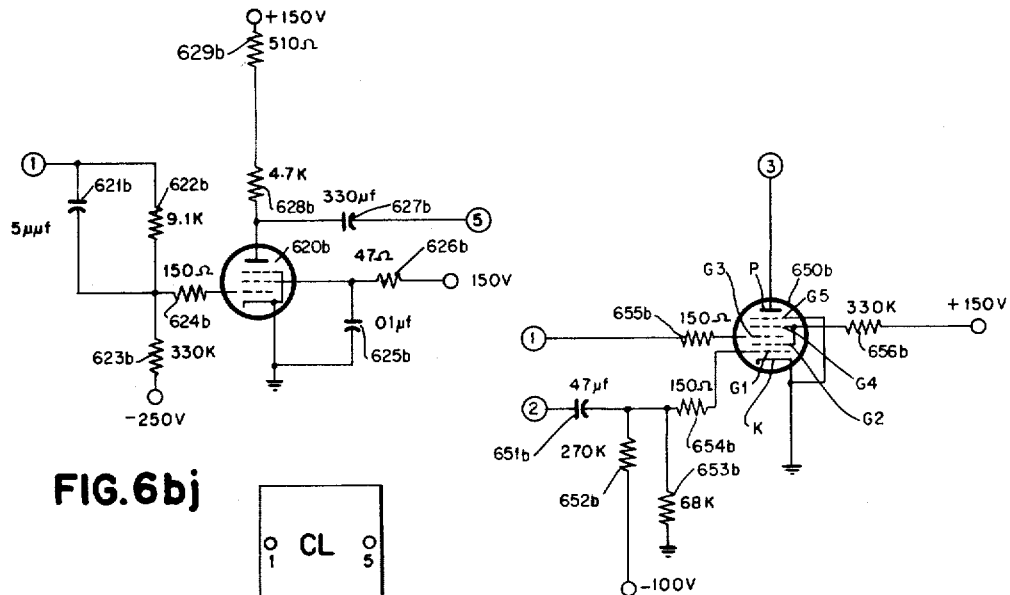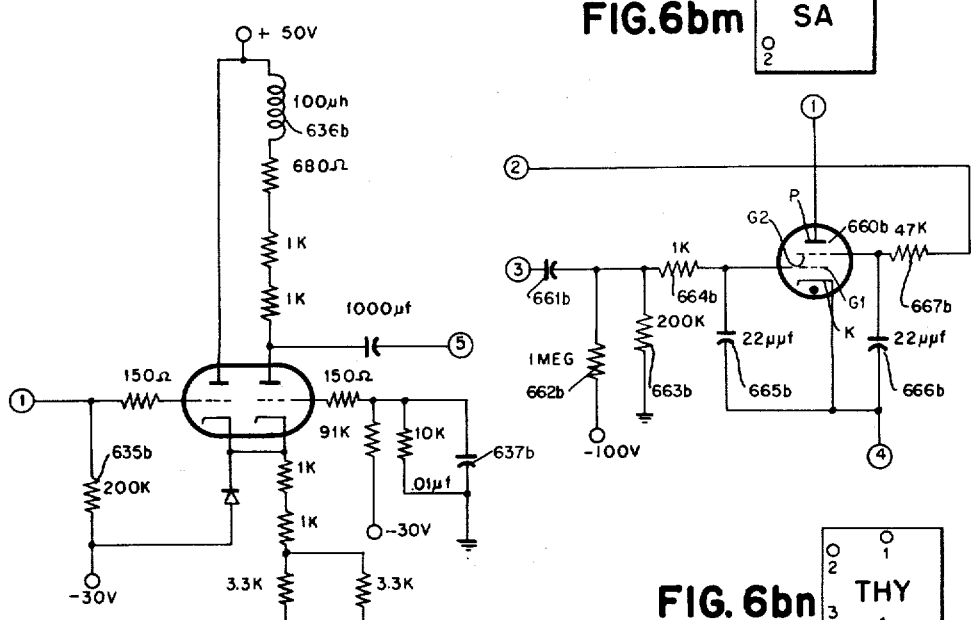

INVENTORS
P. E. FOX
J. E. BARTELT
D. J. CRAWFORD
N. ROCHESTER
BY John F. Hanifin
ATTORNEY

United States Patent Office 2,950,465
Patented Aug. 23, 1960

2,950,465
ELECTRONIC DATA PROCESSING MACHINE

Philip E. Fox, John E. Bartelt, and David J. Crawford, Poughkeepsie, and Nathaniel Rochester, Wappingers Falls, N.Y., assignors to International Business Machines Corporation, New York, N.Y., a corporation of New York Filed Mar. 22, 1954 Ser. No. 417,702

32 Claims. (Cl. 340—173)

The present invention relates to a system of storage including cathode ray tube storage elements comprising the memory of an electronic data processing machine. The data is stored by selectively producing two different states of charge on the target of a cathode ray tube whose beam impinges at high speed on a selected area or address of the target when the beam is UNBLANKED.

The process of producing a charge by an electron beam on the screen of a cathode ray tube depends on the phenomenon of secondary emission. An original (primary) electron striking a spot on the surface of the screen will tend to liberate other electrons and if the velocity of the primary electron is sufficiently great, its impact will liberate several secondary electrons for each such primary electron. When the number of secondary electrons leaving a spot is greater than the number of primary electrons impinging on the spot, a positive charge is thus produced at that spot.

This phenomenon can be utilized as a method of storing data information on the screen of a cathode ray tube such as the one shown, in cross section, for example, in Fig. 1h. As shown therein, a glass tube 100 encloses the structure for producing an electron beam, such structure comprising a cathode 101, control grid 102, focusing anode 103, accelerating anode 104, a pair of vertical deflection plates 105, a pair of horizontal deflection plates 106, a collecting anode 107, comprising a conductive coating on the inside wall of the tube 100, and a phosphor screen 108. The anodes 104 and 107 are usually held, at ground potential, while negative potentials are applied to the cathode 101, grid 102 and the focusing anode 103. A proper selection of potentials permits an electronic beam to pass from the cathode past the grid 102, the focusing anode 103, the accelerating anode 104, the horizontal deflection plates 106 and the vertical deflectioning plates 105 to impinge upon the screen 108. As stated above, this beam of primary electrons may impinge on a spot of the screen with such a velocity, that the number of secondary electrons emitted from the spot, to the collecting anode 107, exceeds the number of primary electrons impinging upon the spot.

This electron beam may be controlled by the application of proper potentials to the deflection plates so that it impinges upon a selected one of the spots on the screen, each of which may be defined as comprising an elemental area of the screen and may be considered as having an individual address on the screen. The amount of electron flow is controlled by the potential difference between the cathode 101 and the control grid 102. A signal pickup electrode 109 is attached to the outside wall of the tube, adjacent the screen, as illustrated diagrammatically in Fig. 1h.

As the electron beam impinges upon a spot of a selected address of the screen, and the number of secondary electrons liberated is greater than the number of primary electrons arriving, then the spot assumes a positive state of electrostatic charge which in the novel storage system described herein, is arbitrarily chosen as manifesting a binary –1– bit of information. If the potential on the deflection plates is varied so as to make the beam strike a spot on the screen, adjacent to the first "addressed" spot, the positive state of charge of the first spot is altered and it becomes more negative. This "modified" state of charge is arbitarily chosen to represent a manifestation of a binary –0– bit of information. Each spot or bit of screen, thus selectively conditioned, for representing either a binary –1– or a binary –0–, is referred to as a bit of storage.

While numerous methods have been used for initially charging the selected spot and for modifying the initial charge on that spot, the method used herein is known as the dot-dash method. A dot is formed by focusing the beam and controlling the deflection potentials so that the focused beam is directed to a spot and because of its focused condition it impinges on a spot only, to initially charge the spot to a positive potential to thus represent a binary –1–. A binary –0–, on the other hand, is written on the screen by applying the focused beam to a spot, as before, and then sweeping or deflecting the beam, a small distance, called a bit sweep, away from this spot, to thus write a dash. This writing of a dash modifies the initial charge of the spot as described presently, so that the charge becomes more negative to thus represent a binary –0–.

In more detail, assuming that the cathode ray tube has been dormant for some time with the electron beam cut off by the control grid, so that all the elemental areas, or spots of the screen have become discharged by leakage action, to a ground potential. As the beam is turned ON by a proper potential applied to the control grid, the beam passes the controls and impinges on a spot of the screen and this spot, upon which the beam impinges begins to rise, in a positive direction, since the velocity of the beam is such that the secondary emission ratio of the target spot is greater than unity. Some of the secondary electrons are collected by the collecting anode 107, others come to rest on the screen 108 in the vicinity of the target spot, while still others do not have sufficient velocity to escape from the retarding field caused by the increased positive potential of the target spot, and therefore, return to that spot.

As the bombardment by the electron beam continues, the potential of the target spot continues to increase, until the retarding field becomes sufficiently large to prevent the escape of secondary electrons in a ratio greater than unity. The charged condition of the spot is then as illustrated by PLOT 1 of Fig. 1i. This illustrates a PLOT of the potential of a cross section of such a target spot. It should be noted that in this illustration, positive potential is plotted downward. The operation, as illustrated is analogous to the digging of a well, that is, an electron beam, having the diameter $d$, digs a well of diameter $d$ to a depth of $E_o$ ($E_o$ being the potential to which the target spot is charged). The negative potential, around the edge of the target spot, is produced by secondary electrons which have landed there. Except for a relatively long bombardment, the screen is substantially unaffected, at distances greater than the target spot diameter $d$, from the center of the bombardment target spot. Therefore, if the beam is turned ON and OFF, at a sufficiently rapid rate, the potential distribution remains, as shown, whether the beam be ON or OFF, because of the high resistivity of the target spot together with the capacitance from the target spot to the pickup electrode 109 and to all other areas of the screen, which keeps leakage to a minimum and prevents the charge potential from changing suddenly.

Now assume that potentials are applied (while the beam is OFF) to the horizontal deflection plates so that when the beam is turned ON, two distinct spots, are successively bombarded. If the deflecting potential increment is great enough, the two target spots are some distance apart, and the potential distribution is as illustrated in PLOT 2 of Fig. 1i. As this increment in the deflection potentials is reduced, the two separate wells of PLOT 2 approach each other, and merge as illustrated in PLOT 3. When the electron beam is in the left hand position, in PLOT 3, it excavates a well, whose bottom is partially represented by a dotted line. The next time the beam is turned ON, it is in the right hand position of PLOT 3 and it excavates a well whose bottom is represented by the solid line. As the latter well is in the process of being excavated, the left hand position is filled in, up to the solid line. Therefore, PLOT 3 represents a situation where one well is being excavated and the other is being filled in. The difference between a one spot area, PLOT 1, and a two spot area, PLOT 3 is now evident. The potential in a one spot case, does not change, as the beam is turned ON again, after digging a well, but in a two spot case, where the spots are next to one another, when the beam is turned ON again, the partially refilled well, at the left, must be excavated, and this excavation produces a change in potential. Each time that the excavation process occurs, it means that a negative charge is being suddenly removed from the screen, hence a positive charge must leave the pickup electrode 109 (Fig. 1h). This positive signal output representative of a binary –0–, is of sufficient amplitude to be distinguished from any other signal which may result from repeated bombardment of a one spot area and thus this dot-dot method may be employed to store a binary bit of information.

This dot-dot type of storage may be defined and classified as follows:

To WRITE a binary –1–, the left hand spot only (PLOT 3) is bombarded by the electron beam (this bombardment refills the right hand well, if one existed). To READ this information, the left hand spot, is again bombarded, by the beam. Since no excavation takes place under these conditions, NO output signal is obtained, and this is interpreted, as a binary –1–. To WRITE a binary –0–, a bombardment of the left hand spot is first performed and next the right hand spot is also bombarded. To READ this binary –0–, the left hand spot only, is bombarded by the beam. The left hand well will now have to be excavated (see PLOT 3, Fig. 1i) since it was partially filled in when the right hand spot was written, and, upon such an excavation, a positive pulse output is obtained from the pickup plate 109 (Fig. 1h). This positive output is interpreted as a binary –0–.

Since the result of a READ operation produces the same potential pattern as is obtained when WRITING a binary –1–, it is evident that in order to leave the information, during a READ operation, stored in its original condition (for example, a binary –0– represented by a dot-dot), it must be determined whether the right hand spot HAD been bombarded during the previous WRITE operation. In other words, since a READ operation always leaves a potential pattern representative of a binary –1–, then a special procedure must be followed when we READ a binary –0–. The special procedure comprises bombarding the RIGHT hand spot, only when a binary –0– was previously WRITTEN, and this selective bombardment is produced under control of the particular potential obtained, when a previously WRITTEN 0, is READ. This will be described presently, under Regeneration.

The one spot and two spot bombardment of a target area, described as a dot-dot system may obviously be extended into a dot-dash system. More specifically, one spot storage is accomplished by recordation of a dot. The equivalent of two spot bombardment is accomplished by recordation of a dash. A dash is that pattern traced on the screen of a cathode ray tube by the beam, when ON, as it is deflected from one spot (the dot) to an adjoining spot. This is represented in Fig. 1j, which shows the dot, the dash and the relative positions of each. Thus, during the WRITING of a dash, the beam is turned ON to bombard the same spot as it would, when WRITING a dot, and while still ON the beam is deflected, horizontally, which is the equivalent of bombarding a left hand spot and subsequently bombarding the right hand spot. Thus, on each elemental area of the screen in the system employed in the present invention, storage of a binary –1– is represented by a dot and storage of a binary –0– is represented by a dash. The slight horizontal deflection of the cathode ray beam to produce a dash is called the "bit sweep."

After a distinctive charge has been established, as described above, there are several destructive effects tending to destroy the distinctive charges established on the screen of a cathode ray tube. These can best be elucidated by reciting the common terminology used to define these several destructive effects. A first such destructive effect is that of "splatter." This very term defines in a simple manner, a complex electronic action. Briefly, a stream of electrons directed against a target, tends to splatter both primary and secondary electrons in all directions in much the same manner that a stream of small pebbles are splattered when poured on to a flat surface. The amount of charge deposited on a given area, from splatter, is greatest immediately adjacent the target area and decreases rapidly as the distance from the target area increases. This phenomenon is also the partial refilling of the well, described above, when a dot is replaced by being extended into a dash. However, it establishes a definite limit on how closely bits of stored information can be placed to one another.

A second destructive effect is called "gentle rain." Unlike "splatter," which has its greatest effect upon an area immediately surrounding the target area, with "rain" there is a more evenly distributed dissemination of electrons covering the entire screen. These are electrons which are knocked out of the screen, far enough, to drift at random, and yet, not far enough to be caught by the collecting anode 107 (Fig. 1h). The combined effect of "splatter" and "gentle rain," which tend to fill any potential wells surrounding the target area, is at times referred to as "spill."

Another destructive effect is that of leakage, which occurs due to the fact that the phosphor screen is not a perfect insulator despite the fact that its resistivity is quite high. Even though the amount of charge stored, at a spot, is very small, the discharge time due to leakage is still very short, and the discharge constant of a stored charge is estimated to be usually in the neighborhood of 0.1 to 0.2 of a second.

Still another destructive effect is that which has been termed "mud-hole." This is a term used to refer to the decrease in resistivity of the phosphor screen after it has been continuously bombarded for an unusual length of time. As the resistivity of the phosphor thus decreases, the likelihood of the charge leaking off increases. Another condition which aids in destruction of the charge is the existence of bad spots. Bad spots are caused by bits of dust or other foreign material which become imbedded in the phosphor, during manufacture, and have the effect of lowering the resistivity or of lowering the amount of secondary emission by the phosphor screen. Such bad spots will cause a quick deterioration of a charge, formed as above to store binary information, or in some instances, if the spot is bad enough, a failure to store any charge ensues.

The foregoing destructive effects and deleterious conditions cause a stored charge to become deteriorated, in a fraction of a second, under normal conditions of operation. One of the fundamental requirements of a high speed storage system of this type is that it must be capable of retaining stored information indefinitely. It is obvious, therefore, that some means of periodic Regeneration of the stored charges of information must be provided. This Regeneration is produced by READING the information stored, in such a manner that the original dot or dash is destroyed by such READING, and then WRITING a dot, unless a dash is READ, in which last event a dash is RE-WRITTEN. The normal pattern of references to the storage tube under control of the calculator, cannot be depended upon for Regeneration, since in this normal pattern of reference, stored bits are READ at random. Therefore, in accordance with the present invention, means are provided so that Regeneration is provided, in such a pattern, that every position of elemental area of storage is Regenerated within a specified period of time. Also, steps have been taken to minimize the effects of "spill." Thus, the bits of information, i.e., the stored charges, are placed on the screen, so as to form a hexagonal pattern, thereby providing a maximum speed between the target spots commensurate with a high density of packing. Also, the areas on a particular cathode ray tube target are addressed, in a unique manner, as described below, to minimize the effects of spill, numbered succeeding addresses, being scattered, so that no two successively numbered addresses will be physically adjacent one another on the screen, which thus produces a reduction in "spill." Another step taken to minimize the effects of "spill" is to control the BIT SWEEP which causes the recordation of a dash, so that the beam is swept IN OPPOSITE DIRECTIONS, in adjacent areas of the tube. Thus, if two adjacent columns of stored information have dashes recorded therein, the tails or direction of sweep, of the dashes, are away from one another.

Some of the objects of the present invention, therefore are to provide means to compensate, to mitigate and to partly eliminate these deficiencies noted above and to provide novel REGENERATE control means for "tailoring" Regeneration to the requirements of Memory.

There is also provided, as the result of an EXTRACT Instruction given to said electronic data processing machine, a novel EXTRACT operation which comprises WRITING binary 0's, on the targets of the cathode ray tubes comprising Memory, PROVIDED a binary 0 is present on the input buss feeding to Memory, but if a binary −1− is present on this input buss, the particular bit position on the cathode ray tube target then addressed, is left undisturbed. In other words, if a binary −0− is on the input and is to be WRITTEN in a particular bit address position (as a dash), a binary −0− is so stored by WRITING a dash, but if a binary −1− is present on the input buss, the holding of the particular bit address position is left undisturbed, REGARDLESS of whether a binary −1− or a particular bit binary zero is already WRITTEN, at the address position. The net result, of the EXTRACT operation, is that binary −1's− are WRITTEN in those bit locations ONLY, which ALREADY contained binary −1's−, prior to the EXTRACT operation and provided a binary −1− WRITE operation is again required, for this particular bit address position. Binary −0's−, however, are selectively WRITTEN, not only in those positions, NOW REQUIRING WRITING of a binary −0− because of binary −0− inputs, but binary −0's− also REMAIN WRITTEN, in any address position, in which such already exist.

A further object of the present invention, therefore, is to provide novel EXTRACT producing means.

Another object is to provide, in combination, a cyclically operable electronic data processing machine operable under control of a stored program and including addressable electrostatic storage means having a plurality of addresses, requiring regeneration, and comprising Memory for said machine, said machine operating, at times, in Instruction cycles, to ascertain which one of a plurality of types of operations called for by said Program Instructions is to be performed, said machine operating, at other times, in Execution cycles, for carrying out the Instruction, so ascertained, and said machine operating, at all other times, in regeneration cycles; address selecting means operative to select certain of said storage addresses, during an Instruction cycle or an Execution cycle, but selecting ALL of said addresses, during a regeneration cycle.

Still another object is to provide, in a machine having an object as set forth above, a minimum requirement counter, means for stepping said counter, subsequent to an instruction cycle, means controlled by said counter producing regeneration of said storage, for a fixed minimum number of regeneration cycles as determined by the capacity of said counter and means for re-initiating a new operation of said counter, for each instruction cycle, whereby a prescribed minimum of regeneration is ensured, for each instruction cycle.

Another object is to provide in a machine, having an object, as set forth above, a second counter, means for resetting said second counter to zero, upon initiation of a certain type of operation requiring a large number of regeneration producing cycles to thereby measure the quantity of surplus regeneration thereby provided, during said certain type of operation, means controlled by said second counter in all its conditions except its capacity filled condition, for rendering said first counter inoperative, to thereby waive the normal minimum requirements of regeneration, means stepping said counter, one step, for each instruction cycle, subsequent to initiation of said certain type of operation and means, controlled by said second counter when filled to capacity, to render said minimum requirement counter again operative.

A further object is to provide, in combination, an electrostatic memory device comprising a plurality of cathode ray tubes, each having a target with allocatable addresses and a beam positionable to any desired address, a deflection circuit for controlling the position of said beam, a deflection register, an instruction counter, address storing means, and a regeneration counter, means grouping said tubes, into selectable groups of tubes, means, controlled by said deflection register, for selecting a desired group of said tubes and for selecting certain addresses from the tubes so selected, means for connecting said instruction counter or said address storing means, to said deflection register, to selectively select certain addresses from certain of said tubes only, comprising a desired group, and means connecting said regeneration counter to said deflection register for selecting certain addresses, from ALL of said tubes.

Still another object is to provide, in combination, a plurality of pairs of cathode ray tubes comprising a memory device, each tube including a target with allocatable addresses and a cathode ray beam positionable to any desired address, means for controlling the deflection of said cathode ray beams, circuits for unblanking said beams, selecting means, address storage means storing values represented by different bits of storage, jointly indicative of an address desired, said address comprising certain ones, of each of said pairs of tubes and a certain allocated address on the targets of said pairs and means, controlled by said address storage means, for controlling said beam deflection means and said unblanking circuits, whereby one address, of said allocatable addresses, is selected, and one tube only, of each of a plurality of selected pairs of tubes, is unblanked.

Another object is to provide in a machine having an object, as set forth above, circuits for selectively controlling the unblanking circuits of said pairs of tubes to unblank said pairs of tubes in selected groups, and means, controlled by the manifestation of a certain bit, stored in said deflection register, to selectively control said unblanking circuits whereby the beams of one selected group only, are unblanked.

A further object is to provide, in a machine having an object as set forth above, circuits for selectively unblanking still smaller groups of said pairs of tubes whereby said tubes are further subdivided into tubes for storing full words, and tubes for storing left half words and right half words of said full words, and means controlled, by certain other bits, stored in said deflection register, to control said circuits for selectively unblanking said smaller groups to thus select, either the group of tubes storing a left half word or the groups of tubes storing a right half word.

Another object is to provide in a machine, having an object as set forth above, means controlled by still another bit manifestation stored in said deflection register, for overcoming said half word selecting means, whereby the full number of tubes, storing a full word, is unblanked.

A further object is to provide an electrostatic storage device comprising a cathode ray tube and a beam, means controlling the movement of said beam, selectively, in one direction or another, to produce a directional bit sweep, a deflection register, selectively storing a plurality of individual representations of binary one bit manifestations and binary zero bit manifestations, and means controlled by the binary zero or binary one bit representation, of a certain one of said stored bits, for controlling said bit sweep control means, to produce a bit sweep in one direction or the other, in accordance with the binary one or binary zero manifestation of said certain bit.

A further object is to provide in an electronic data processing machine operative in instruction cycles, in execution cycles and in regeneration cycles, each cycle comprising a character cycle, storage means comprising a plurality of pairs of cathode ray tubes having cathode ray beams, the number of said plurality of pairs comprising a number, equal to the number of bits, in a full word, unblanking means for each of said tubes, a deflection register storing a plurality of binary zero and binary one bit representations, respectively, means controlled by said manifestations for selectively controlling circuits connected to said unblanking means whereby said unblanking means may be selectively operated, in either one of two groups, each comprising a number equal to the number of bits in a half word, and means selectively controlled by the respective binary one or binary zero representation of a certain bit stored in said deflection register for selectively unblanking, either all of said pairs, or half of said pairs of tubes, and means, controlled during an instruction cycle, for preventing said means from operating which select all of said pairs of tubes.

Another object is to provide in a machine having an object, as set forth above, and including, means for controlling said unblanking means to selectively unblank, one tube only, of each of said pairs of tubes selected, and means, controlled by another one of said bits in said memory register, for selectively operating said last unblanking control means, in accordance with the binary one or binary zero character of said other one bit.

A further object is to provide electrostatic storage means comprising a cathode ray tube having a beam, a target having allocatable addresses, means controlling the deflection of said beam to selectively position the beam in desired ones of said allocatable addresses, and means controlling said deflection means whereby the packing of the bits recorded, assumes a hexagonal pattern.

Another object is to provide electrostatic storage means comprising a cathode ray tube having a beam, a target having allocatable addresses, means controlling the deflection of said beam to selectively sequentially position said beam in the different allocatable positions to thus provide a raster, means storing a value manifestation representative of a desired address, means controlled by different such desired addresses for producing different increments of voltage, means applying said different increments to said deflection controlling means to thereby select a chosen address in said raster representative of said value, said increments being so proportioned that consecutive values, control said deflection, to separated positions in said raster.

A further object is to provide, in combination with a cathode ray tube, including a target having allocatable addresses arranged in rows and columns to form a raster, a beam, deflection means to which increments of potentials are applied, for controlling the position of said beam, to thus select the address of a stored bit on said target, means controlling the respective increments of voltage applied to said controlling means whereby the positions of the raster, addressed in one column, are echeloned alternately one half increment lower and one half increment higher, in alternate columns, to thus produce a hexagonal pattern of the stored bits.

Another object is to provide in a cathode ray tube provided with a target having allocatable addresses, a beam, deflection means for positioning said beam to different ones of said target addresses to thereby trace a raster, means for producing voltage increments for controlling said deflection means, and means, applying additional potential increments to said deflection means, to produce a bit sweep, in one direction or in another direction, in adjacent locations in said raster.

Still another object is to provide a device comprising a cathode ray tube including a target having allocatable addresses, a cathode ray beam, deflecting means, for controlling the positioning of said beam, to select different ones of said target allocatable addresses, means for unblanking said beam to permit said beam to impinge on said target in a selected address position, means controlling said beam and cooperating with bit sweep potential producing means, to write a representative indication, of a binary one or of a binary zero value, selectively, in a chosen address means, selectively controlling said beam, to write a binary one at a selected address to thereby read, a value, previously stored at said address, said reading operation producing a voltage output from said target having an individual characteristic, selectively representative of the reading of a binary one or a binary zero, a gate, means periodically applying conditioning potentials to said gate, said individual voltage outputs also being applied to said gate and selectively permitting said conditioning potential, to pass or not to pass said gate, depending upon the characteristic of said output, means controlled by said gate output to selectively alter or not alter a setting of a bistable device, and means selectively controlled by the altered or unaltered condition of said bistable device cooperating with said beam deflecting means and controlling the operation or non-operation of said unblanking means, whereby said read bit, is selectively regenerated, in accordance with its binary one or binary zero character prior to said reading.

Another object is to provide in a device, having an object as set forth above, a plurality of pairs of said tubes being provided, means controlling said unblanking means, whereby said tubes are unblanked, in pairs, said device being operated, in use cycles, requiring a reference to data stored in said tubes, and in cycles requiring regeneration of said data only, said addressing means, being selectively operative, to unblank one of the tubes of said pairs or the other of said tubes of said pairs, during a use cycle, but operative to unblank, both of the tubes of said pairs, during a regeneration cycle.

A further object is to provide in an addressable electrostatic storage device requiring regeneration comprising memory for an electronic data processing machine, operative in instruction cycles and in regeneration cycles, means for producing a selective reading of data, in selected address positions of said device, means for regenerating said data, systematically and periodically, said means including a minimum requirement counter, means resetting said counter, for each instruction cycle, means stepping said counter, once, for each succeeding regeneration cycle of operation, subsequent to said resetting, and means, controlled by said counter output, for producing regeneration, until said counter capacity is reached, thereby ensuring a fixed minimum amount of regeneration, for each instruction of said machine.

Another object is to provide, in a device having an object as set forth above, said machine being operated in various selected operations, including, for example, a multiply operation, each such operation requiring a plurality of regeneration cycles whereby an excess of regeneration is provided, a second counter, means resetting said counter, upon initiation of said multiply operation, means controlled by said second counter for rendering said minimum requirement counter, inoperative, except when the capacity of said second counter is reached, means stepping said mounter, from its reset position towards its capacity setting one step, for each such instruction cycle, until said capacity is reached, and means, effective under control of said capacity indication, to render said minimum requirement counter operative, whereby said machine, rides free on said excess regeneration, in accordance with said second counter capacity.

A further object is to provide in an electronic data processing machine, electrostatic storage means comprising a plurality of pairs of cathode ray tubes, each pair comprising a right tube and a left tube and each tube having a cathode ray beam and a target having allocatable addresses comprising a raster of columns and rows, circuits for positioning said beam, to a desired address to select, one address, on each of said tubes, circuits for producing a bit sweep of said beams, circuits for unblanking said beams, and addressing means comprising a plurality of bit storage devices storing binary one or binary zero bit manifestations, respectively, means controlled by said stored bit manifestations controlling said unblanking circuits whereby said tubes are unblanked, in a plurality of pairs, said pairs being grouped into two main units, and further circuits, controlling said unblanking circuits of each of said main units whereby said tubes are selectively unblanked, in smaller groups of tubes, each group comprising storage for a full word or two still smaller groups comprising storage, for the left and right half respectively of said full word, and means still further controlling the unblanking circuits, of said half word storage tubes, to unblank certain tubes, storing bits, representative selectively of the operational part and the address part, of an instruction represented by said half word, means selectively controlled by the binary one or binary zero status of one of said bit manifestations in said deflection register, for selectively controlling said unblanking circuits of one unit or the other, means controlled by the binary one or binary zero condition of another one of said addressing means bits, for selectively controlling the unblanking circuits of the tubes comprising the storage location of a left half word or a right half word, respectively, means controlled by the binary one or binary zero condition of still another bit stored in said addressing means for selectively unblanking, either the left tube or the right tube, of each of said pairs, means controlling said bit sweep, to produce sweep in one direction or in the opposite direction and means controlled by the binary one or the binary zero representation respectively, of still another bit stored in said addressing means for controlling said bit sweep control means for determining the direction of bit sweep, means for positioning said beams in alternate columns of the raster, to produce alternate stepped up and stepped down echeloned arrangements of stored bits on the selected addresses of said target, means, controlled by said same bit for determining which one of these two echeloned arrangements will be assumed, and means, controlled by the binary one or binary zero value of the remaining ones of said bits stored in said deflection register, acting in concert, to determine the selected one of the allocatable addresses of said targets.

Another object is to provide a device having an object as set forth above, and means for unblanking, only those tubes, storing the address portion of an instruction.

Another object is to provide in combination, an electrostatic storage device requiring regeneration and comprising Memory of a cyclically operating electronic data processing machine, means controlling said machine to produce a selected type of operation requiring a large number of cycles, including a large number of regeneration cycles, whereby an excess of regeneration of said storage is provided, means providing an indication of said excess, means normally controlling said regeneration to insure a certain minimum of required regeneration, and means controlled by said excess indicating means for overcoming said normally controlling means, to thus eliminate the requirement of any regeneration for a period measured by the indication of said excess indicating means.

A further object is to provide, in combination, an addressable storage device for selectively storing binary zero or binary one manifestations of a bit stored at any selected address, means providing an input of binary ones and binary zeros to said device, means normally storing manifestations, at a selected address, of respective binary one or binary zero inputs to said storage device, regardless of the previous binary one or binary zero nature of a previously stored bit, and means controlling said machine to produce an EXTRACT operation comprising means controlled by binary zero representations of said input, during said EXTRACT operation, for selectively storing binary zeros, in addresses selected, regardless of a previous binary one or binary zero bit stored at this selected address, and means, controlled by binary one representations of said input, during said EXTRACT operation, for leaving unaltered, respectively corresponding, binary one or binary zero bit manifestations, stored in a selected storage address.

Another object is to provide a cathode ray tube including a cathode ray beam, a target having allocatable addresses, and a beam, deflection means for positioning said beam selectively, at desired addresses of said target, means controlling said beam, for selectively writing binary ones or binary zeros, on said target, in accordance with a binary 1 or binary 0 input, and means rendered operative, during an EXTRACT operation, whereby said writing means are normally operative, during the presence of a binary 0 value on said input, but are rendered inoperative, by the presence of a binary 1 value on said input, whereby binary 0's are selectively written over the previous corresponding bit, at the selected address position but the bit at said selected address position, corresponding to respective binary 1 inputs, remaining unaltered.

Still another object is to provide, in combination, a switch, operable to an open or a closed condition, means comprising addressable storage, means controlling the selection of addresses in said storage means in a normal sequence of steps, said storage means comprising memory for an electronic data processing machine operative in cycles and controllable in accordance with a Program to selectively produce desired operations and including means controlled in accordance with said program to produce a SENSE operation, said means comprising means sensing, the open or closed status, of said switch, and means rendered operative upon sensing that said switch is closed, to control said selection controlling means to produce a skipping, of one step, in said Program, but operative, upon sensing that said switch is open, to enable normal progression of said Program.

Another main object is to provide, in combination, a signal light, an electronic data processing machine, operative in cycles, and controllable in accordance with a Program to selectively produce desired operations, including a SENSE operation, controlled by the appearance of a SENSE Instruction, in a particular step, of said program, for selectively energizing said light, to thereby visually indicate that said particular step in said Program has been reached.

A further object is to provide a machine having an object, as set forth above, and including a switch, and means controlled by the appearance of said SENSE Instruction, in a particular step of said Program, for selectively closing said switch.

Still another object is to provide a machine having the main object as above but said SENSE Instruction energizing a circuit.

Another object is to provide a device, having the main object as above, said SENSE Instruction, turning off said signal light, when said particular step of said Program is reached.

A further object is to provide an electronic data processing machine controlled by a stored Program, Input/Output units for supplying data to said machine and for receiving data from said machine, selectively, under control of respective Instructions comprising said program calling for the use of one of said Input/Output units, means controlled, by one of said Instructions, for initiating a series of operations on one such Input/Output unit, Interlock means, permitting operations of said Machine provided no Input/Output unit is required, said Interlock means otherwise locking said Machine, to prevent any operation involving the use of one of said Input/Output units, one of said Instructions of said program comprising a SENSE instruction occurring in said program sequence, just prior to an Instruction involving use of an Input/Output unit, and means, rendered operative when said SENSE Instruction is reached in said Program for checking said Interlock, for an ON or OFF condition, said Machine, remaining locked up, when said SENSE operation ascertains that said Interlock is ON, but said SENSE operation being effective, upon sensing that said Interlock, is OFF, to permit said Program to progress to said next Instruction involving an Input/Output unit.

Another object is to provide, in an electronic data processing machine controlled by a stored Program, and including Input/Output units for supplying data to said Machine and for receiving data from said Machine, one of the Instructions of said Program calling for the use of one of said Input/Output units, one of said Instructions comprising a SENSE Instruction in sequence in said Program just prior to an Instruction calling for the use of an Input/Output unit, Interlock means, means rendering said Interlock means operative while an Input/Output unit is being used, means for stepping along the series of Instructions comprising said Program during the operation of said Input/Output unit, provided no Input/Output unit use is required, for any such Instruction, means controlled by said SENSE Instruction for producing a testing operation to ascertain if said Interlock, is ON or OFF, and means effective if said Interlock is ascertained, as OFF, for progressing to the Instruction, in said Program, subsequent to said SENSE Instruction, involving the use of an Input/Output unit.

Still another object is to provide in combination in an electronic data processing machine controlled by a stored program including an Input/Output device and an Input/Output interlock, means turning said Interlock ON when any Input/Output unit is in use and means checking said Interlock for ON and OFF condition and rendering said Machine inoperative to use an Input/Output unit until said Interlock is OFF.

Another object is to provide in combination, an electronic data processing machine including Memory, a Computer for said machine, Input/Output Units, buffer storage for said Computer and said Input/Output Units, an Interlock, when ON preventing use of said buffer and means producing a sensing operation to check said Interlock to prevent further use of said buffer storage until a first selected Input/Output Unit is disconnected to turn OFF said Interlock.

A further object is to provide, in an electronic data processing machine, including addressable electrostatic storage devices comprising its Memory, means for selectively selecting addresses under control of address selection value manifestations, each selecting a unique address, in Memory, said value manifestations comprising means storing binary one or binary zero bit manifestations, in selected code combinations, each mutually exclusively selecting, one such address, and means, controlled by a chosen one of the binary zero or binary one manifestations, of a particular one of one said bits, for effectively selectively two such unique addresses.

Another object is to provide a device, having an object as set forth above, said particular bit being effective to produce selection, of two such addresses, when it has a binary one value.

A further object is to provide, in combination, an electrostatic storage device comprising a plurality of cathode ray tubes, an Accumulator Register, for storing binary one and binary zero bit representations, respectively, in each of a plurality of bit storage positions, said plurality comprising a full word of data representations, means for selectively storing, in Memory, either a left half word group portion or a right half word group portion of a full word data manifestation, a certain number of said tubes, storing said left half word portion and a certain other number of other of said tubes, storing said right half word portion, said means, for selectively storing said left half word, in Memory, reading the data for said left half word, out of a certain group of bit storage positions, in said Accumulator Register, and said means for selectively storing said right half word, in Memory, reading the data, out of said same certain group, of bit storage positions.

A further object is to provide, in a combination having the object as set forth above, means for reading a full word or a half word, from Memory, to said Memory Register, said full word reading means comprising means reading said full word from each of said tubes comprising Memory to respectively associated bit storage positions, in said Memory Register and said means for reading a left half word, from Memory, comprising means reading said left half word from each of the tubes comprising said left half word storage to respective associated bit storage positions in said Memory Register, and said means for reading out a right half word comprising means reading out said right half word storage tubes, to said respective associated bit storage positions in said Memory Register allocated to said left half word.

Other objects of the invention will be pointed out in the following description and claims and illustrated in the accompanying drawings, which disclose by way of example, the principle of the invention and the best mode which has been contemplated of applying that principle.

In the drawings:

Figs. 1a through 1g, taken together as shown in Fig. 1, comprise an overall block diagram of the machine.

Figs. 2a and 2b, taken together, with 2a located above Fig. 2b, comprise a block diagram of the Clock.

Figs. 2c and 2d, taken together, with Fig. 2d located to the right of Fig. 2c, comprise a block diagram of the Cycle Timer.

Fig. 2e is a block diagram of the Regeneration Control circuits for regenerating data on the tube screen.

Fig. 2f is a block diagram of the Sign order and orders 1 to 35, inclusive, of the Memory Register.

Figs. 2g, 2h and 2i, taken together, with Fig. 2h located at the right of Fig. 2g and Fig. 2i at the right of Fig. 2h, comprise a block diagram of the Instruction Register.

Figure 2J:
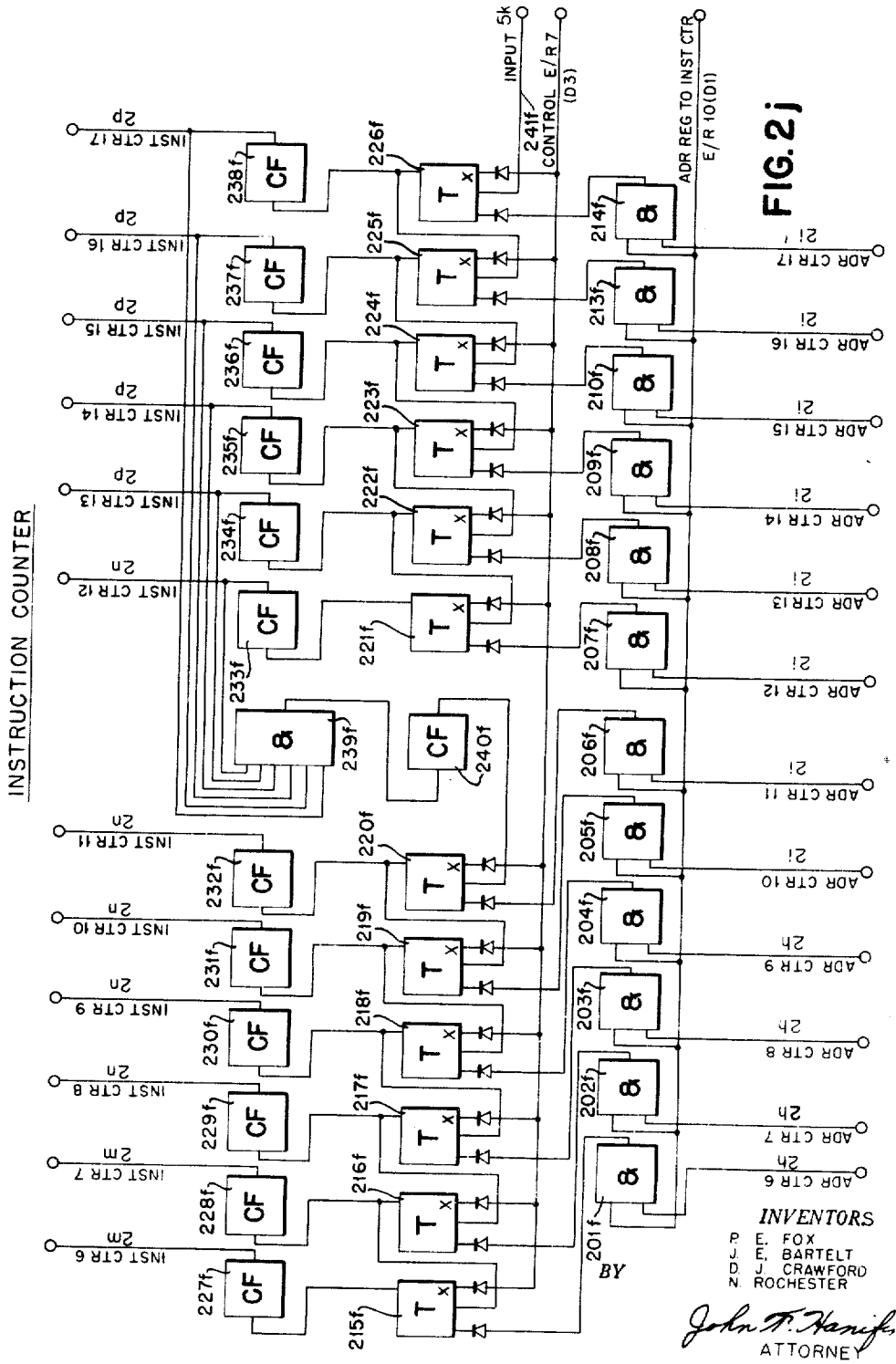

Fig. 2j is a block diagram of the Instruction Counter.

Fig. 2k is a block diagram of the Regeneration Counter.

Figure 2M:
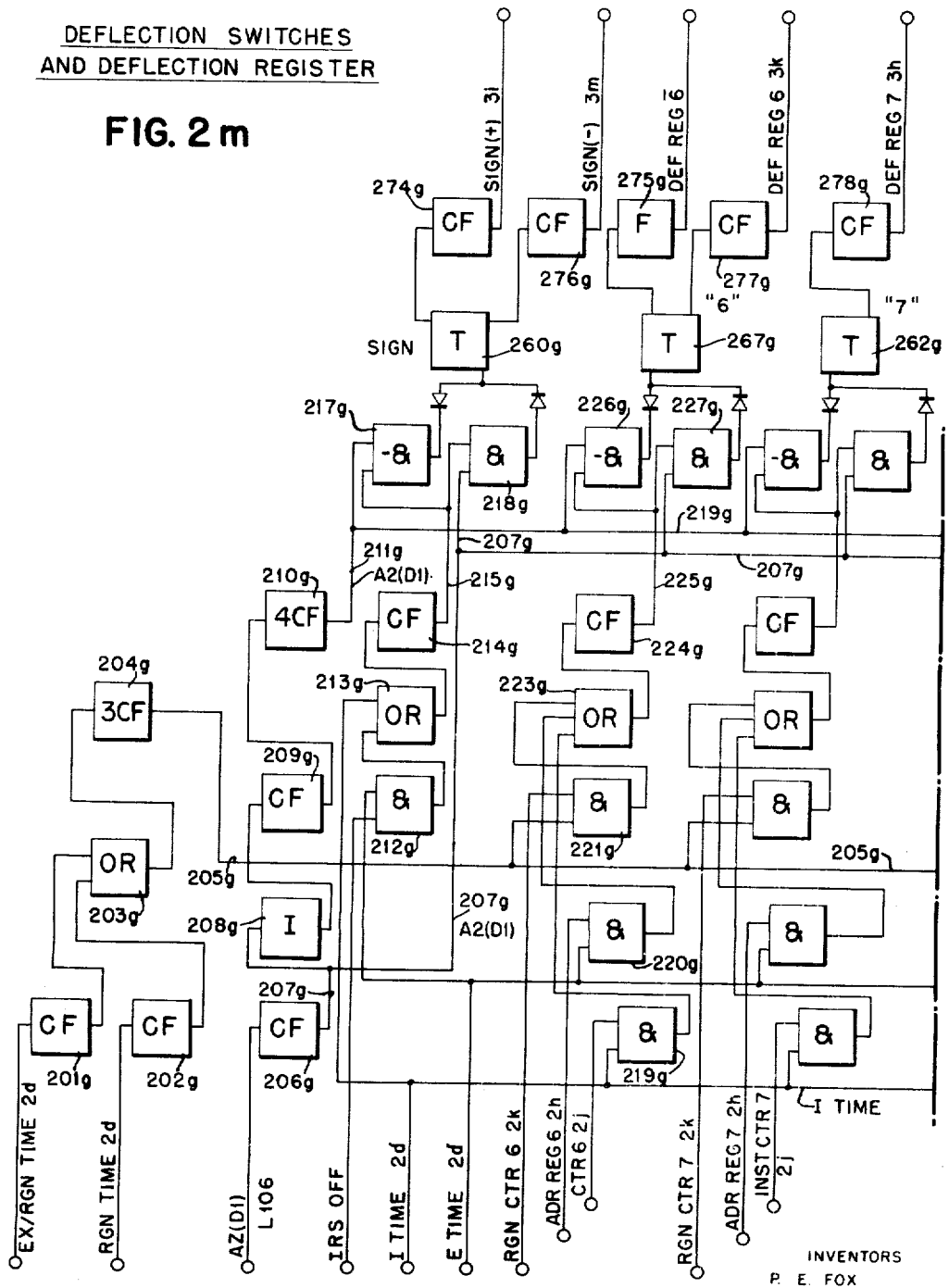
Figure 2N:
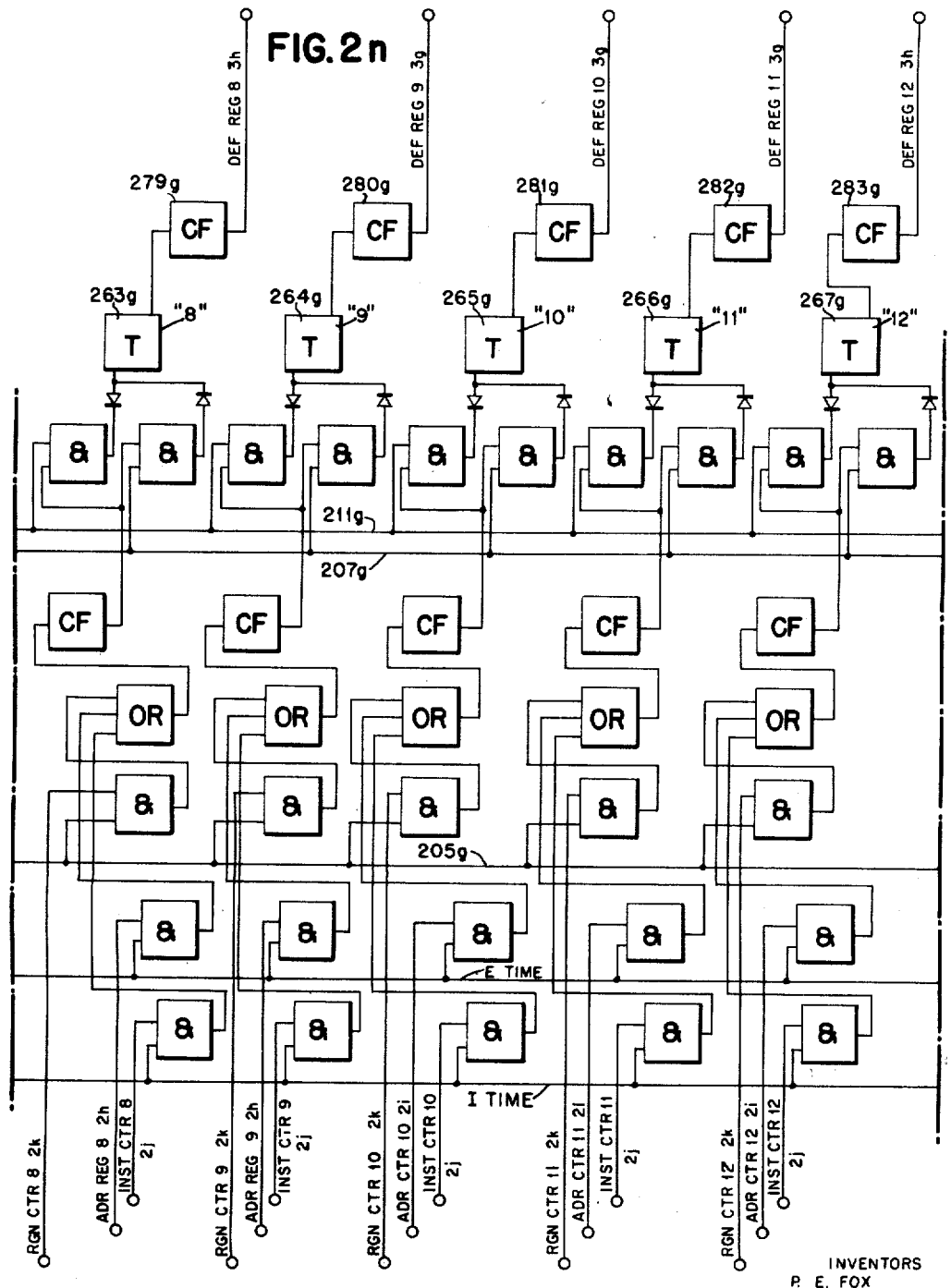
Figure 2P:
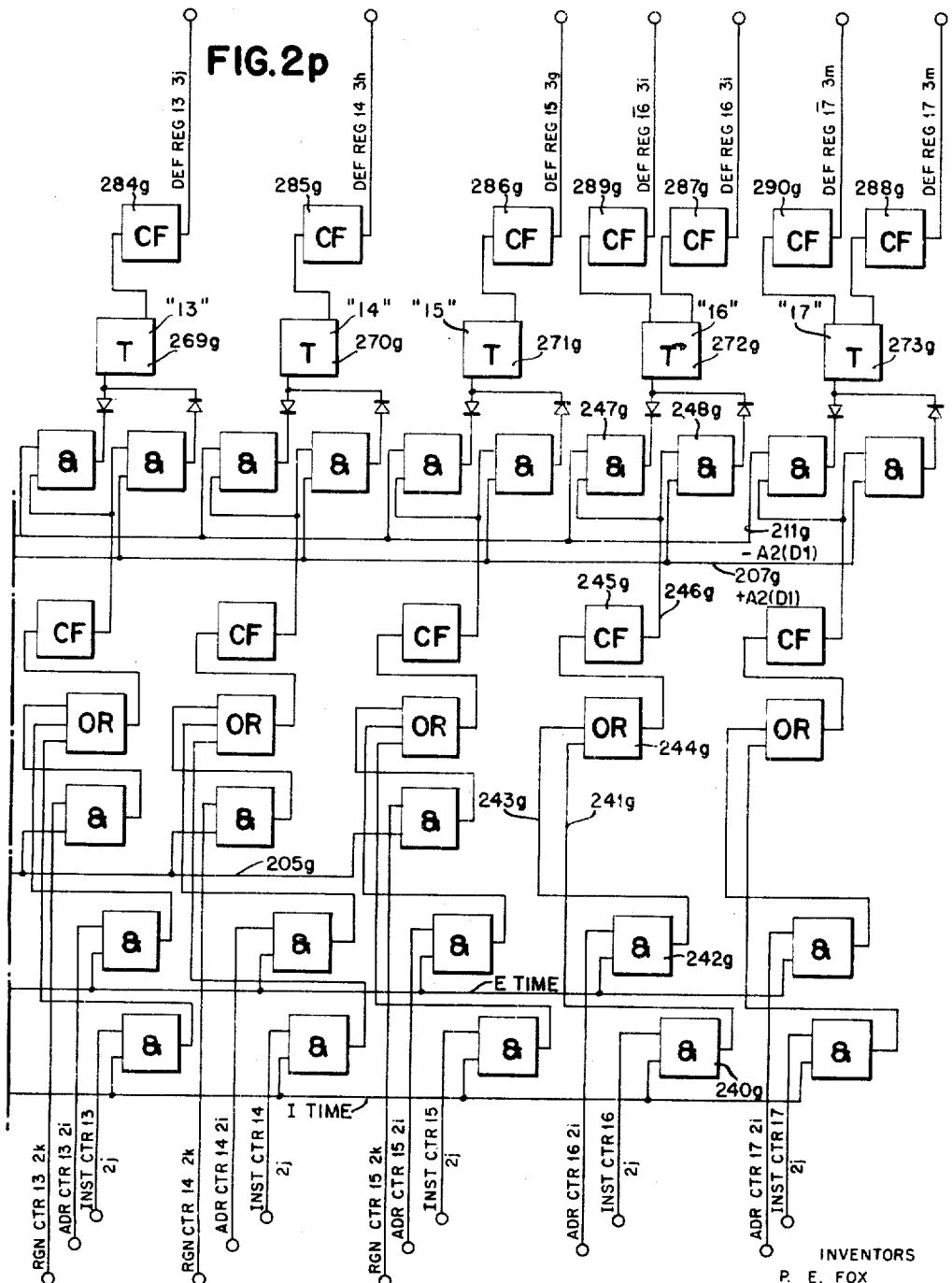

Figs. 2m, 2n and 2p, taken together, with Fig. 2n located at the right of Fig. 2m, and Fig. 2p at the right of Fig. 2n, comprise a block diagram of the Deflection Switches and the Deflection Register.

Fig. 2q is a block diagram of Pulse Mixing Circuits.

Fig. 2r comprises a Timing Diagram for certain operations of the Memory device.

Fig. 2s is a block diagram of the Memory Bus Switches.

Figs. 2t and 2u diagrammatically illustrate the manner in which addresses are employed to control the reading of information from Memory and the storing of information in Memory, respectively.

Figs. 3a, 3b and 3c diagrammatically illustrate the manner of addressing the raster on the screen of the cathode ray tubes.

Fig. 3d is a diagram of a raster layout of a cathode ray tube illustrating hexagonal packing and indicating the direction of individual bit sweeps.

Figure 3F:
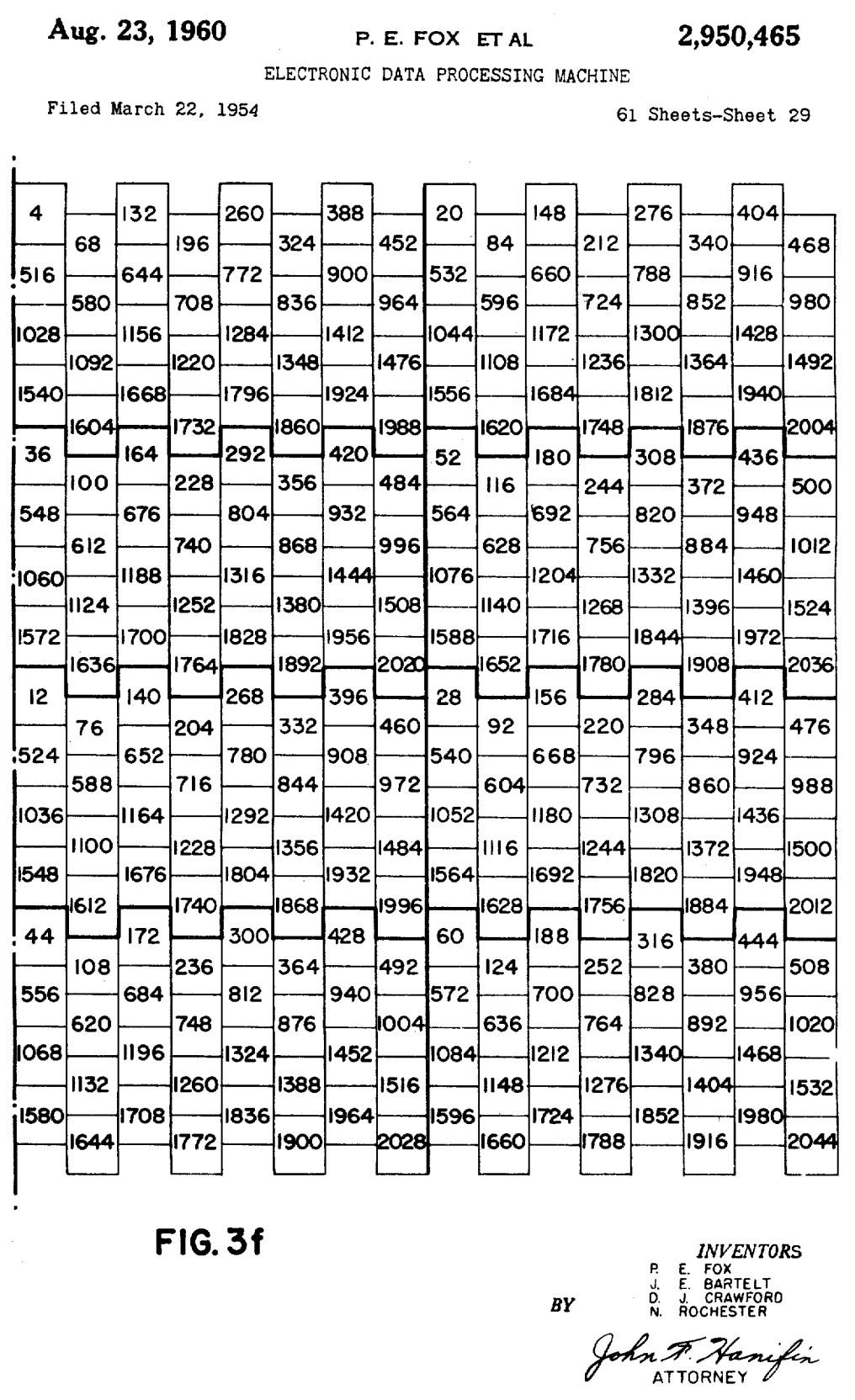

Figs. 3e and 3f, taken together, with Fig. 3f at the right of Fig. 3e, diagrammatically represent the layout of the raster on the screen of a cathode ray tube with the respective, decimally indicated, address locations of all addresses, represented by the permutations of binary bits representing all addresses of the raster.

Figure 3G:
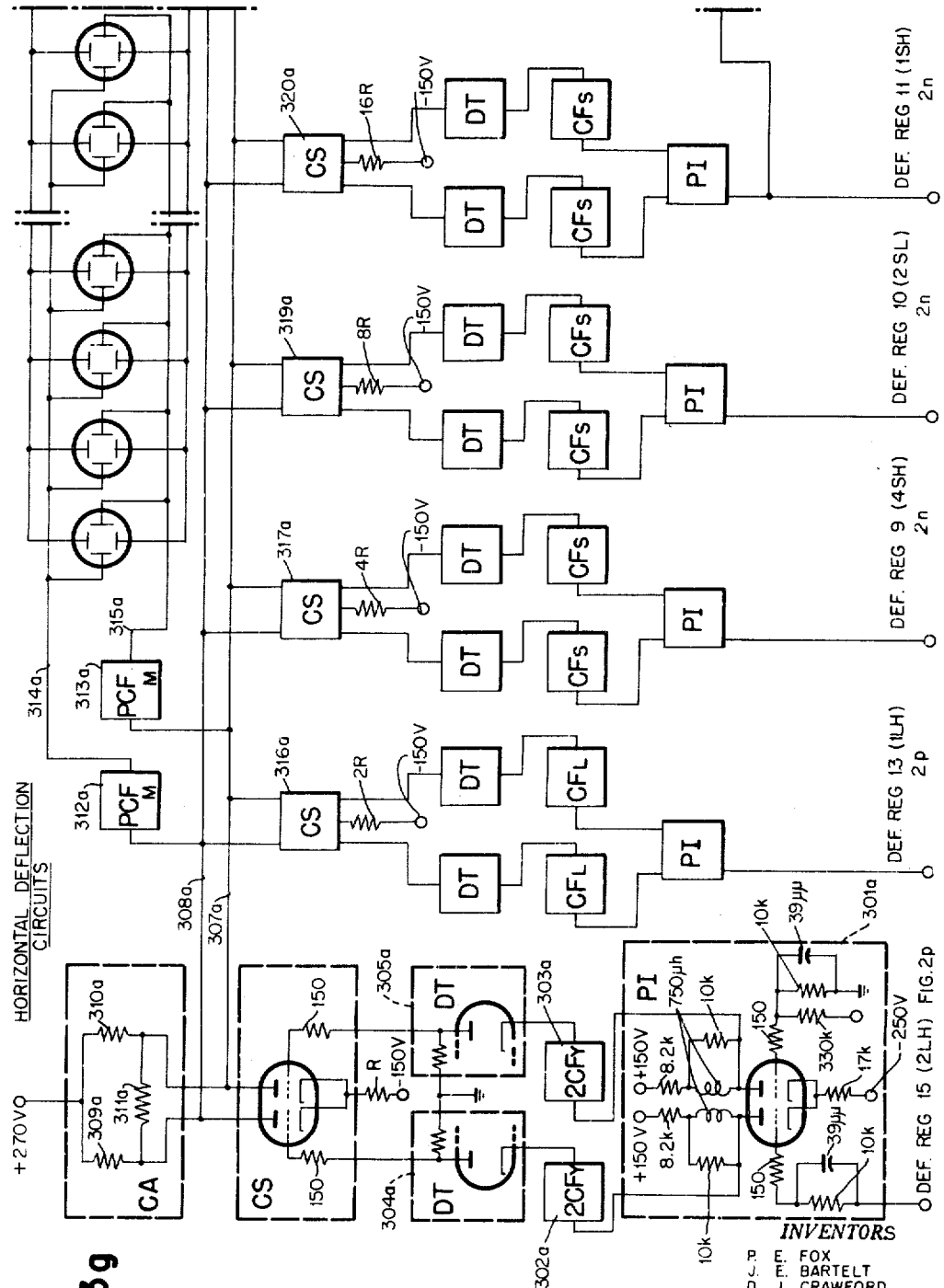

Figs. 3g and 3h taken together with 3h located to the right of Fig. 3g, comprise circuit and block diagrams of the Horizontal Deflection, Vertical Deflection and Bit Sweep circuits.

Figs. 3i, 3j, 3k and 3m, taken together, and arranged as illustrated in Fig. 3n comprise the Memory Control circuits.

Fig. 4 is a combined schematic, diagrammatic and block diagram of a pair of representative Memory Tubes and the UNBLANK, READ-IN, READ-OUT and REGENERATE control circuits.

Figs. 5a and 5b, taken together, with Fig. 5b located below Fig. 5a, comprise a block diagram of the Operation Decoder.

Fig. 5c is a block diagram of the Class Selector Matrix.

Fig. 5d is a block diagram of the Unit Selector Matrix.

Figs. 5e and 5f, taken together, with Fig. 5f located below Fig. 5e, comprise a block diagram of the Class Selector Input/Output Interlock circuits.

Fig. 5g is a block diagram of the Unit Selector Input/Output circuits.

Fig. 5h is a block diagram of the Sense Execution timer.

Figs. 5i, 5j, and 5k, taken together, as illustrated in Fig. 5m, comprise a block diagram of the Sense circuits.

Fig. 5n is a block diagram of the Read/Write Execution timer.

Fig. 5p is a block diagram of the End of Record and End of File circuits.

Figure 6G:
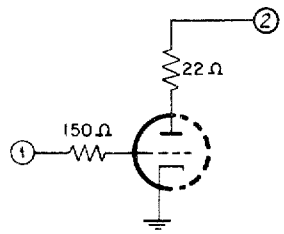
Figure 6J:
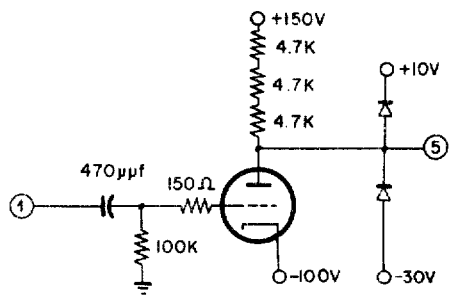
Figure 6H:
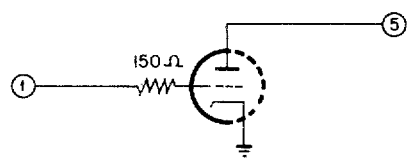
Figure 6K:
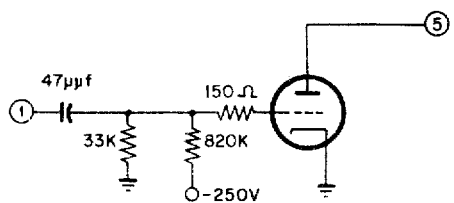
Figure 6I:
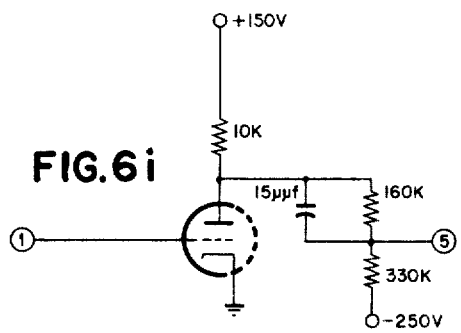
Figure 6M:
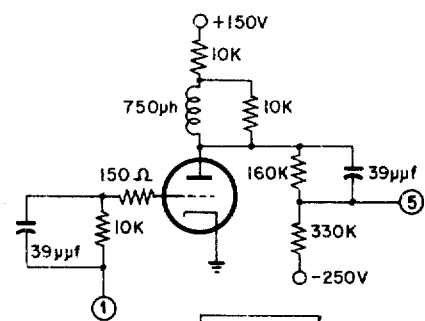
Figure 6A:
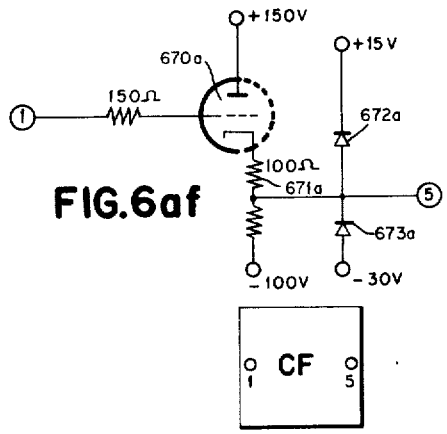
Figure 6A:
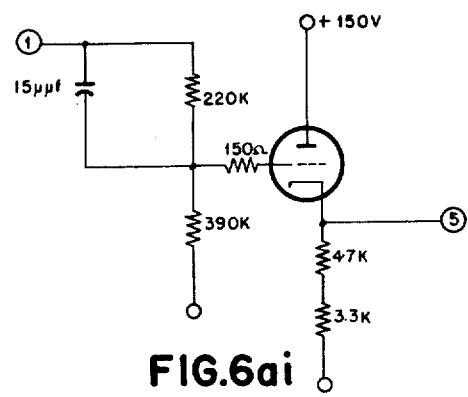
Figure 6A:
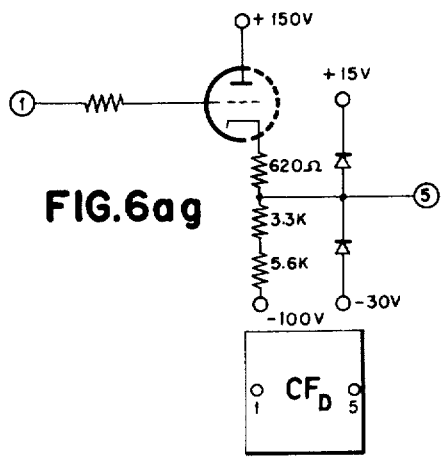
Figure 6A:
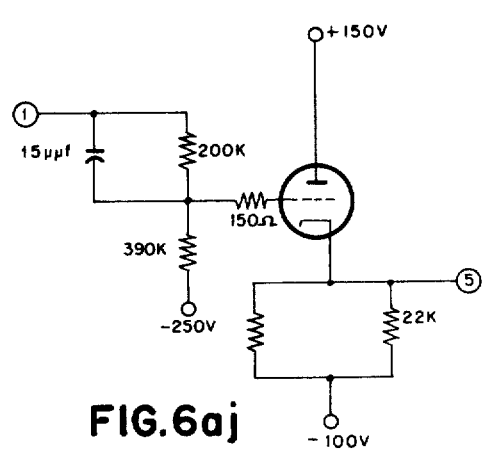
Figure 6A:
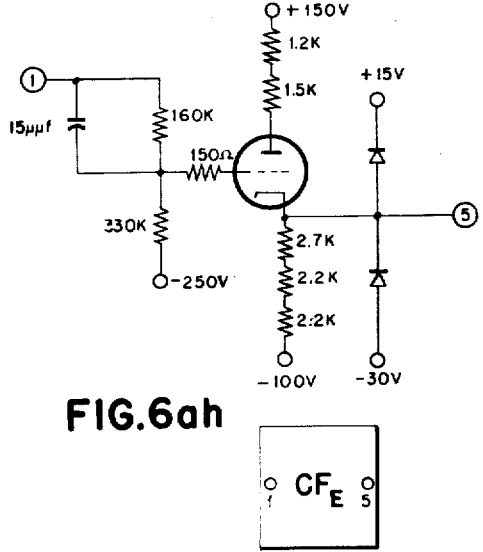
Figure 6A:
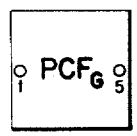

Fig. 6a is a detailed circuit diagram and corresponding block symbol of an inverter employed in the machine.

Figs. 6b to 6k, inclusive, and Fig. 6m comprise respective detailed circuit diagrams and corresponding block symbols of other inverters, basically similar to that of Fig. 6a.

Fig. 6n is a detailed circuit diagram and corresponding block symbol of a peaker.

Figs. 6p to 6r, inclusive, comprise respective detailed circuit diagrams and corresponding block symbols of other peakers, basically similar to that of Fig. 6n.

Fig. 6s is a detailed circuit diagram and corresponding block symbol of a trigger.

Figs. 6t to 6v, inclusive, comprise respective detailed circuit diagrams and corresponding block symbols of other triggers, basically similar to that of Fig. 6s.

Fig. 6w is a detailed circuit diagram and corresponding block symbol of a single-shot multivibrator.

Figs. 6y and 6z comprise respective detailed circuit diagrams and corresponding block symbols of other single-shot multivibrators, basically similar to Fig. 6w.

Fig. 6ab is a detailed circuit diagram and corresponding block symbol of an amplifier.

Fig. 6ac is a detailed circuit diagram and corresponding block symbol of a shaping amplifier.

Fig. 6ad is a detailed circuit diagram and corresponding block symbol of a clamp amplifier.

Fig. 6ae is a detailed circuit diagram and corresponding block symbol of a sync power amplifier.

Fig. 6af is a detailed circuit diagram and corresponding block symbol of a cathode follower.

Figs. 6ag to 6ak, inclusive, comprise respective detailed circuit diagrams and corresponding block symbols of cathode followers, basically similar to Fig. 6af.

Fig. 6am is a detailed circuit diagram and corresponding block symbol of a power cathode follower.

Figs. 6an, and 6ap to 6aw, inclusive, comprise respective power cathode followers and corresponding block symbols basically similar to Fig. 6am.

Fig. 6ay is a detailed circuit diagram and corresponding block symbol of a "plus" diode AND circuit.

Fig. 6az is a detailed circuit diagram and corresponding block symbol of a "minus" diode AND circuit.

Figure 6B:
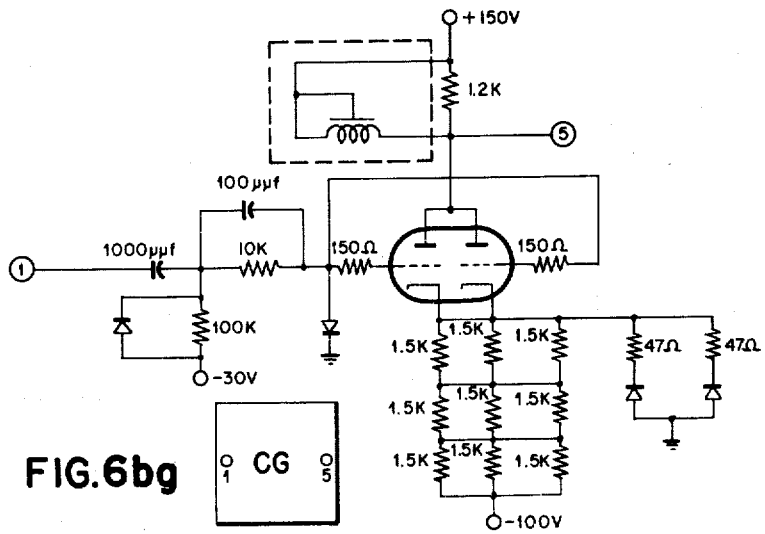
Figure 6B:
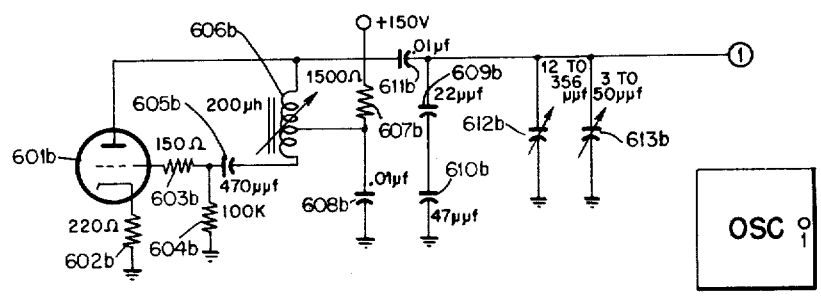
Figure 6B:
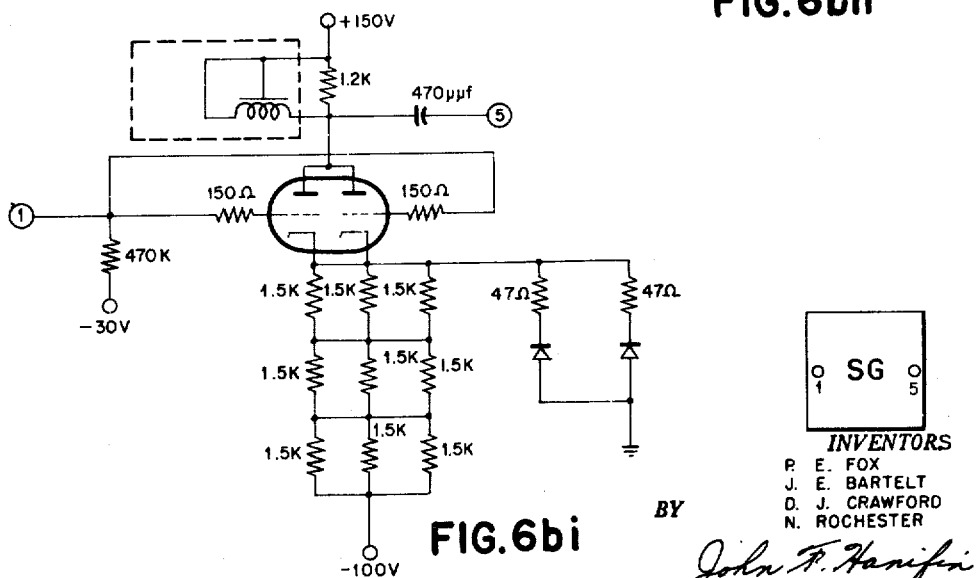
Figure 6B:
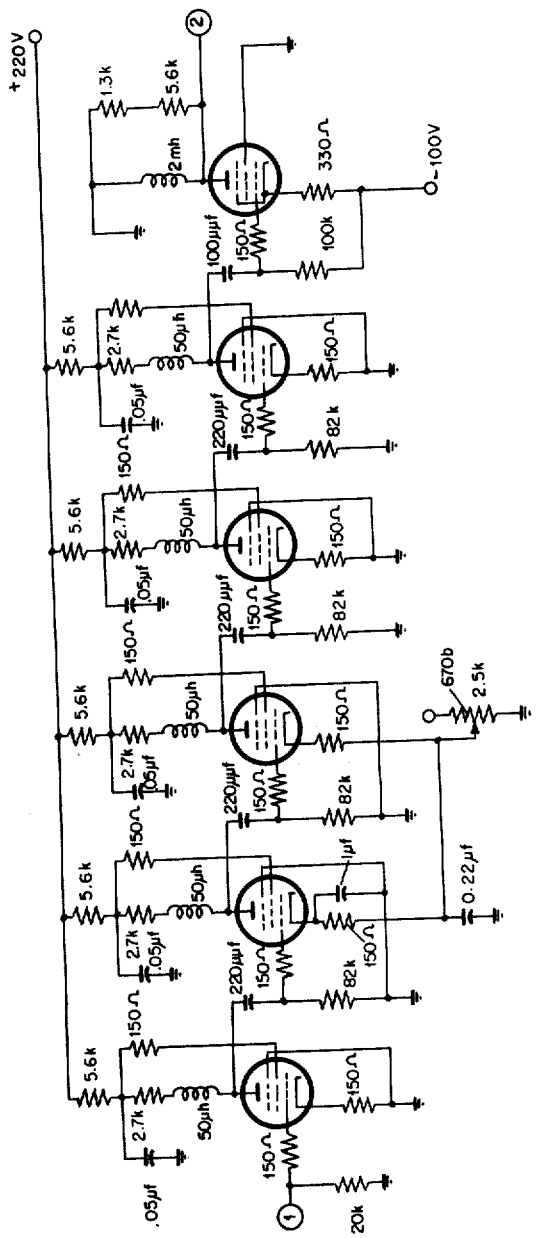
Figure 6B:
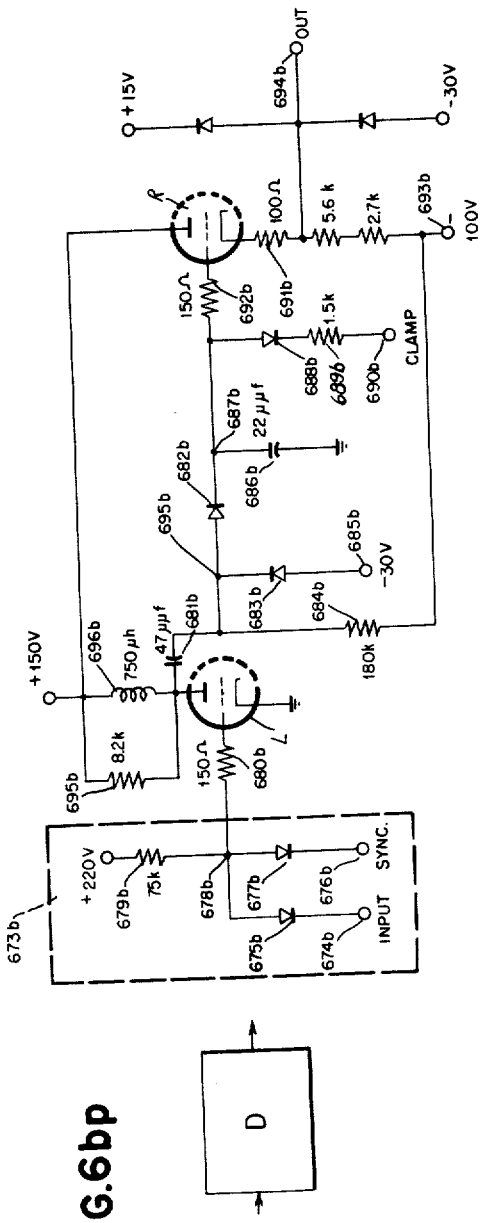

Fig. 6ba is a detailed circuit diagram and corresponding block symbol of a "plus" diode OR circuit.

Fig. 6bb is a detailed circuit diagram and corresponding block symbol of a "minus" diode OR circuit.

Fig. 6bc is a detailed circuit diagram and corresponding block symbol of a lumped constant delay line.

Fig. 6bd is a detailed circuit diagram and corresponding block symbol of a distributed constant delay line.

Fig. 6be is a detailed circuit diagram and corresponding block symbol of a delay line driver, cathode follower.

Fig. 6bf is a detailed circuit diagram and corresponding block symbol of a clamp circuit.

Fig. 6bg is a detailed circuit diagram and corresponding block symbol of a clamp generator.

Fig. 6bh is a detailed circuit diagram and corresponding block symbol of an oscillator.

Fig. 6bi is a detailed circuit diagram and corresponding block symbol of a sync generator.

Fig. 6bj is a detailed circuit diagram and corresponding block symbol of a clipper circuit.

Fig. 6bk is a detailed circuit diagram and corresponding block symbol of a sync clipper circuit.

Fig. 6bm is a detailed circuit diagram and corresponding block symbol of a sample amplifier.

Fig. 6bn is a detailed circuit diagram and corresponding block symbol of a thyratron circuit.

Fig. 6bo is a detailed circuit diagram and corresponding block symbol of a video amplifier, and Fig. 6bp is a detailed circuit diagram and corresponding block symbol of a microsecond delay unit, used as a storage element.

General operation

The novel electrostatic storage system of the present invention is used as Memory for a high speed electronic data processing machine. Memory comprises a total of 144 cathode ray tubes, divided into two units entitled Memory Unit I and Memory Unit II. Each Memory Unit comprises 72 cathode ray tubes divided into 36 pairs of tubes. This particular number of pairs of tubes are provided since the electronic data processing machine, as will be presently described, employs a fixed word size of 36 bits, so that with 36 pairs of tubes, 36 bits may be read out of Memory or 36 bits may be stored in Memory, simultaneously, during one machine cycle of operation. Obviously this is a paralel type of operation.

The timing of the machine cycles is determined by a Clock which comprises a 12 stage electronic trigger ring. The Clock develops 12 master timing pulses of one microsecond duration, each, and a machine cycle, hereinafter also referred to as a character cycle, will be defined as one 12 micro-second period (one complete cycle of the Clock).

In the preferred embodiment of an electronic data processing machine, as described below, there are four general types of character cycles called Instruction, Execute, Execute/Regenerate and Regenerate cycles, respectively abbreviated as I, E, E/R and R cycles.

Figure 1B:
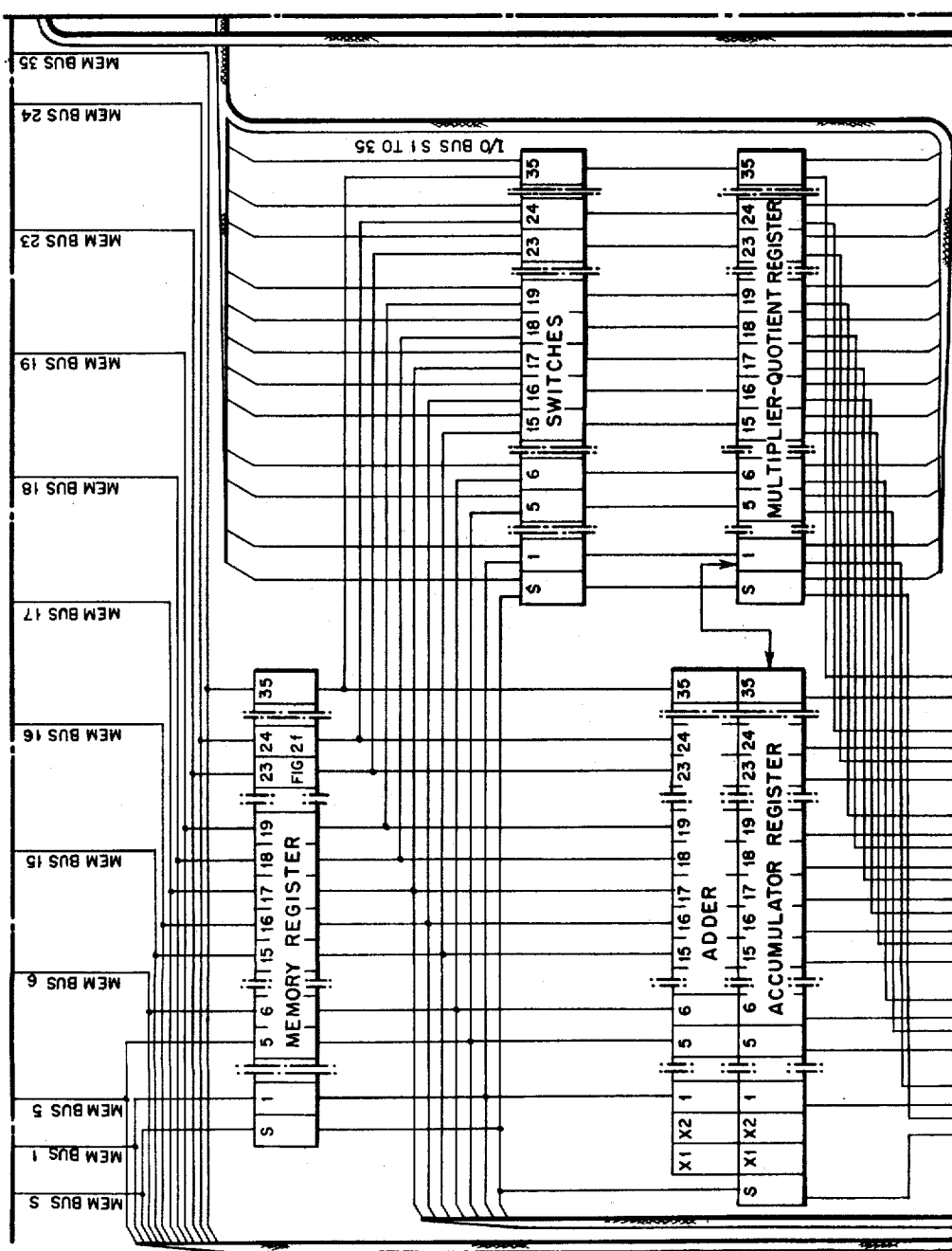
Fig. 1h illustrates the type of cathode ray tube used as an electrostatic storage member.
Fig. 1i illustrates a PLOT of the charge patterns produced on the screen of a cathode ray tube screen of a storage tube, by controlled bombardment of the screen by the electron beam.
Fig. 1j illustrates a dot pattern, a dash pattern and the relative positions of a dot and a dash, as stored on a cathode ray tube screen.

The composite drawing comprising Figs. 1a to 1g, inclusive, joined together as illustrated in Fig. 1, comprises a block diagram of the electronic data processing machine employing as its Memory, the novel electrostatic storage system of this invention. The machine operates on either full words of 36 bits or half words of 18 bits. A full word is defined as a binary number of 35 bits (binary digits) and one Sign bit (Fig. 2t) while a half word which may be a left half word or a right half word as described presently is defined as a binary number of 17 bits and a Sign bit. Each of the respective components comprising the machine is represented by a properly labeled block in the composite drawing whose general operation will be described presently. The Memory Units I and II are illustrated in block form in Figs. 1a and 1e of this composite. These Memory Units in the manner described above, electrostatically store information required by the machine. These Memory Units may be addressed, as described below, and the information stored therein at the respective addresses may be read out to the Memory Register (Fig. 1b).

All information leaving the Memory Units enters this Memory Register which comprises 36 Delay Units S, and 1 to 35, inclusive, each of a type described in detail below, and switching circuits associated with said Delay Units and operative to control entry into and exit from these Delay Units, as described later. This Memory Register designated hereinafter as MR, functions as a buffer storage register, which holds either full or half words, taken from Memory, until they are called for by other elements of the machine or which stores words received from other elements, prior to transfer of this data, into Memory. Information is read, out of Memory, into the Memory Register, in parallel fashion, that is, 36 bits are read, simultaneously, for a full word, or 18 bits, simultaneously, for a half word. Information read into MR may be transferred to several other elements or sections, respectively, of the Machine.

The Adder (Fig. 1b), represented by a subdivided block immediately below the subdivided Memory Register block, comprises 37 columnar orders, two of which are the overflow columns X1 and X2. Each of the columnar orders 1 to 35 of this Adder comprises circuits, each having 3 separate inputs, and 2 separate outputs, as shown and described in the copending application of Haddad et al., Serial No. 419,642, filed March 30, 1954. These three inputs are: (1) An output from a corresponding column of the Memory Register; (2) An output from a corresponding column of the Accumulator Register (described presently); (3) The carry output from an Adder columnar order to the right. The two outputs are: (1) the sum output; and (2) a carry output. The sum output is fed to a corresponding column of the Accumulator Register, while the carry output goes to the Adder column to the left. In conjunction with information flow controls, the Adder circuitry is utilized to perform the functions of addition and subtraction. Multiplication, as described briefly presently, consists of a series of additions and shifts, so that multiplication is also performed, in part, by the Adder circuitry. The Adder is not a register, per se, and therefore does not perform any function of storage but merely operates on the information, as it is passed therethrough.

The Accumulator Register shown below the Adder in Fig. 1b, is used for storing the output of the Adder, and the combination of the Adder and the Accumulator Register may be regarded as an Accumulator. The Accumulator Register, which has the primary function of storing the results of the operation performed by the Adder consists of 38 columns, two of which, X1 and X2, are for the purpose of overflow, the other 36 bits comprising the 35 binary bits of a full word plus the Sign bit. Each of the columns of the Accumulator Register consists of a Delay Unit similar to that used in the Memory Register and the contents of the Accumulator Register may be shifted either to the left or to the right. The contents of the Accumulator Register, not including the contents of the overflow columns, may be stored in the Memory by a "STORE" Instruction which is given with a Memory address. Under this Instruction, the number is not only stored, in Memory, but the same number is left in the Accumulator Register, unaltered.

The Multiplier Quotient Register illustrated in subdivided block form in Fig. 1b, which will be referred to as the MQ Register, has two major functions. (1) As its name implies, it holds the Multiplier (M), for multiplication operations and (2) it holds the quotient (Q) in division operations. The MQ Register comprises 36 columns, one of which stores an indication of the Sign of a multi-digit number, the remaining 35 columns being used for storing manifestations of the multi-digit number itself. Each column contains a Delay Unit of the type used in the MR and suitable switching circuits. The contents of the MQ Register may be stored in Memory by means of a "Store MQ" Instruction which includes a Memory address.

The Instruction Register illustrated in subdivided block form in Fig. 1c, which may receive information from the Memory Register, serves as a storage register for an Instruction (a half word) which is read from Memory into the MR during an (Instruction) cycle. The Instruction Register comprises a series of 18 triggers which hold the representation of a particular Instruction until this Instruction is completely executed, and is then reset during the early part of the next Instruction cycle, before a new Instruction is read into it, from Memory. Thus, since the Instruction Register holds the complete Instruction, the operation part of this Instruction, described below, is available, to the Operation Decoder (Fig. 1d) until the operation is complete, while the address portion of the Instruction, is available to the Deflection Register via the Deflection Switches (Fig. 1c) as described below. This Deflection Register comprises a plurality of electronic triggers storing respectively, a representation of the Sign bit and also of bits 6 to 17, inclusive, as illustrated in Fig. 1c.

The Instruction Counter, Fig. 1c is a 12 stage counter storing the bits 6 to 17, inclusive, each stage of which comprises an electronic trigger, the counter output being fed to the Deflection Register, during each Instruction cycle. The Instruction Counter receives a pulse, at the end of the execution of each operation, so that during the next Instruction cycle a succeeding address, in Memory, will be referred to.

As described below, the Instruction Counter also may be stepped to cause a skipping of Instructions.

The Regeneration Counter (Fig. 1c) comprises 10 stages each comprising an electronic trigger, storing respectively representations of bits 6 to 15, inclusive.

The Regeneration Counter output is fed to the Memory Deflection Register during Execute/Regenerate and Regenerate cycles and is stepped, one count, each Execute/Regenerate and Regenerate Cycle, so that succeeding numbered addresses, in Memory, are addressed and regenerated, during successive Execute/Regenerate and Regenerate Cycles.

The Deflection Register (Fig. 1c) has 12 orders, each comprising an electronic trigger, whose outputs feed to the Memory Control circuits (Fig. 1e) and to the Horizontal and Vertical Deflection circuits. This Register serves as a buffer between the Memory Deflection circuits, on one hand, and the Instruction Register, the Instruction Counter, and the Regeneration Counter on the other hand.

The Operation Decoder (Fig. 1d) decodes the permutations of bits 1 to 5, inclusive, which comprise the operation part of an Instruction (half word) to thus determine which one, of 32 possible Instructions, the machine will perform. The Operation Decoder comprises a matrix of diode AND circuits and has 32 individual outputs respectively signalling the type of operation to be performed. The individual outputs of the Operation Decoder condition various control circuits which in turn produce the respective operation called for.

From the foregoing, it is apparent that Information stored in Memory falls into two general classes, according to the purpose for which it is used. These are (1) Instructions and (2) numerical information to be processed by the machine in accordance with an Instruction. The machine distinguishes between Instructions and numerical information, only by the type of cycle causing the read out of Memory. Information, read out of Memory during an Instruction cycle, is channelled to the Instruction Register, as described above, which stores a representation of the Instruction so read out. Information read out, however, during an Execute cycle, is handled as numerical data. Numerical data is available either in half words, of eighteen bits, or in full words of thirty six bits, but Instructions are always half words.

The remaining circuits represented on the composite of Figs. 1a through 1g, are concerned primarily with the Input/Output devices. The Input/Output devices include Tape Units which are represented by the block labeled TAPE, Fig. 1f, magnetic drums, represented by the block labeled DRUM and various card controlled machines such as card readers, card printers, card punches, etc., all represented by the block labeled CARD MACHINES. The Input/Output circuits are concerned, mainly, with the selection of a particular Input/Output unit to be used, and the determination of the particular type of operation, to be performed on or to be performed by, the selected Input/Output unit. Circuits are also provided for interlocking the operation, of a selected Input/Output unit, with the operation of the other parts of the Machine and means are provided for DISCONNECTING the Input/Output unit, from the control of the machine, after the operation has been completed which the Input/Output unit is to perform.

Certain outputs of the Operation Decoder (Fig. 1d) such as Read, Write Rewind, Sense, etc. are concerned with the Input/Output devices, and when one of these operations is called for, the addressing bits of the Instruction Register, control circuits which select a particular Input/Output unit, instead of controlling the Memory Deflection circuits. The Class Selector Matrix, represented in block form in Fig. 1d, receives the respective output signals from the Operation Decoder calling for such operations as Read, Read Backwards, Write, etc. and also receives signals representing the status of address selecting bits 6 through 11 of the Instruction Register. This Class Selector Matrix mixes these signals and provides an output signal which selects a particular CLASS of operations, such as Read Drum, Read Tape, Write Drum, Sense Printer Address, Sense Operator's Panel Address or Sense Card Punch Address, for example. These latter three SENSE operations, cause the machine to sense a condition in the printer, the condition of a switch on the Operator's Panel or sense a condition in the Card Punch.

Besides this selection of the CLASS of Operations, such as Write Drum, Write Tape, etc., the binary 1 and binary bit representations of the bits 14 through 17 of the Instruction Register are fed to a Unit Selector Matrix (Fig. 1c) which decode the binary 1 and binary 0 permutations of these particular bits, to cause the selection, of one address out of eleven, that is, one address, from Input/Output Addresses 0 through 10. The operation of the Class Selector Matrix and the Unit Selector Matrix must be considered in combination with one another. The Class Selector Matrix may emit a signal entitled, "Sense Operator's Panel Address." Certain elements, on the Operator's Panel, such as switches or neon tubes are provided with addresses, for example, Input/Output Addresses 0 through 10. Thus, if the operation called for is this "Sense Operator's Panel Address," only that particular element, whose address is selected, by the Unit Selector Matrix, is sensed. Likewise, if the operation is Write Tape, only one, of a group of Tape Units, will be selected, the selected Tape Unit being the particular Tape Unit having THE Input/Output address, called for by the Instruction.

The fact, however, that a particular operation is called for, does not mean that the operation is immediately effective. The Input/Output units of this machine are so related to machine operation, that as the selection of an Input/Output unit takes place, the inactive waiting period, normally necessary when using an Input/Output unit, is utilized for other operations by the machine. The machine is allowed to continue with the execution, of its Program, during these relatively inactive periods of selecting an Input/Output unit, and only comes back to or connects with the Input/Output unit, at those times when the Input/Output unit is in a condition to transmit or receive data. Under such operation, then, it is possible that one Input/Output unit will be in use, when an Instruction is reached calling for the use of another Input/Output unit. Novel circuits are provided, whereby the machine effectively locks up, and remains in Execute/Regenerate cycles, until the previously selected Input/Output unit concludes its operation and emits a DISCONNECT signal all as shown and described in the copending application of Bartelt et al. Serial No. 401,648, filed December 31, 1953. At that time, the selection of the desired Input/Output unit can proceed. For example, if an operation such as Write Tape is being carried out, one of the Tape Units would be in a selected status and the machine would be recording information on that particular Tape Unit.

A Tape Write operation, as shown and described in said copending application takes place, briefly, as follows. A Write Tape Instruction causes the selection of a Tape Unit and also causes the tape feed to start up so that the tape is fed past a recording head. Once a Tape Unit is selected and the tape feed is started the machine may proceed to read other Instructions out of Memory and carry them out. By the time that the tape is up to speed, data must be present in the MQ Register for recordation on the tape. A COPY Instruction, subsequent to a Write Tape Instruction, causes a word to be read from Memory to the MQ Register, via the Memory Register and the MQ Switches (Fig. 1b). Bits 30 to 35, inclusive, are read from the MQ Register, via the respective Input/Output busses 30 through 35 (Fig. 1f) for recordation on the tape. A seventh bit, used for checking purposes, is also recorded, through the action of circuits shown and described in said Bartelt et al. application. Before the 30 through 35 bits from the MQ Register are recorded on the tape, the contents of this Register are shifted, so that the original bits, S, and 1 through 5, are transferred to MQ Register positions, 30 through 35, while the original bits, 6 through 35, now appear in MQ Register positions S, and 1 through 29. Thus the first bits recorded on the selected tape, are bits S, and 1 through 5.

After this first recording, the contents of the MQ Register are again shifted, so that the original bits, 6 through 11, are now in positions 30 through 35 and the original bits, 12 through 35, are now in Register positions S, and 1 through 23. After a set time, to allow the tape to proceed, to the second group of six bits, the original bits 6 through 11 are recorded, along with a check bit. After this process has been repeated, six times, the MQ Register is empty and another COPY Instruction must be given, so that, as the tape reaches a position to receive more data to be recorded, this data will be available in the MQ Register. If the data is not available, as the tape reaches a position at which recording should be made, a DISCONNECT signal is emitted, which causes the selected Tape Unit to be Disconnected from the machine. The process of recording six groups of six bits on the tape from the MQ Register is a very slow process, as compared to the speed of operation of the machine. In order to utilize this time, the machine is allowed to complete other Instructions, such as Add, Subtract, etc., between the required COPY Instructions, as well as after the last desired COPY Instruction and before the DISCONNECT signal occurs.

It is possible that the machine would reach an Instruction "WRITE DRUM," for example, before the Tape Unit has actually been disconnected. Under these conditions the machine does not proceed, to succeeding Instructions, but the WRITE DRUM signals are generated in the Operation Decoder and the machine reverts to a stand-by status, as far as the WRITE DRUM operation is concerned, until the Tape Unit emits a DISCONNECT signal. At this time, the WRITE DRUM operation is completed by selecting a particular drum and proceeding to WRITE thereon.

The interlock circuits which cause the above locking, are the Class Selector I/O Interlock circuits (Fig. 1g). Unless this Input/Output Interlock is OFF, an Instruction, calling for the use of an Input/Output unit, effectively halts the operation of the machine until the required Input/Output unit may be selected. A DISCONNECT signal, from one of the Input/Output units, will turn OFF this Input/Output Interlock and thus allow selection of another Input/Output unit. Thus signals, such as Read Tape Address, Write Printer Address, Read Printer Address, etc. are fed to the Class Selector Input/Output Interlock circuits and the outputs, of the latter, appear on the lines Printer Write Select, Printer Read Select, etc., positive signals on these lines signifying that a particular unit has been selected. These outputs feed to the Tape and Drum Units, and to the Card operated machines, to condition controls, so that information can be read to and/or read out of, the particular Input/Output device. Signals from the Class Selector Input/Output Interlock are also fed to the Unit Selector Input/Output Interlock circuits (Fig. 1g) where they are mixed with signals calling for use of those Input/Output units having the I/O addresses of 0 through 3. The Unit Selector Input/Output Interlock output lines are energized, as thyratrons are fired, and as these lines are energized, control circuits in the Input/Output Units connected thereto are energized. These lines are PR Read Write Sel Thy P, PR Write Sel Thy K etc. which cause a selection of the printer for example for a read or a write operation. Other outputs of the Unit Selector I/O Interlock appear on the lines I/O Sel 1 (Fig. 1g), I/O Sel 2, I/O Sel 3 and I/O Sel 4, which select a particular Input/Output Unit, out of the CLASS selected. For example, if the selected Input/Output operation involves Tape, one only, out of four Tape Units, is selected, and the selected unit is the one having the Input/Output address called for, by a positive signal on one of the lines I/O Sel 1 through I/O Sel 4.

The Read Write Execution Timer represented by a labeled block, in Fig. 1d, controls the timing of the machine, during the start of a Read or a Write operation, while the End of Record and End of File circuits, also represented by a labeled block in Fig. 1d, keep track of the fact that an End of Record or an End of File has been reached by a selected Input/Output unit, and also causes the emission of a signal, for resetting the Input/Output Interlocks, as DISCONNECT signals are received, from the various Input/Output Units.

Other circuits, represented by properly labeled blocks, which control Input/Output unit functions are the Sense Circuits, represented by a labeled block in Fig. 1g, and the Sense Execution Timer also represented by a labeled block in Fig. 1g.

The Sense Circuits are used to control a variety of operations. As described below, when certain Input/Output addresses are sensed, a neon tube may be caused to glow or if another I/O address is sensed, a glow in a neon tube, is extinguished. A second type of Sense operation calls for an Operator's Panel address and comprises sensing of the condition of certain switches on the Operator's Panel. If the switches sensed, are in a closed condition, signals may be emitted to the Instruction Counter, to cause a skipping of Program steps, while if the switches, are open, no signal is emitted to the Instruction Counter and the Machine merely proceeds, in its normal sequence of reading successive Instructions from successively numbered addresses. Another Sense operation comprises sensing of certain output lines of the Printer and Card Punch.

There is also provided in conjunction with the electronic data processing machine a Sense Instruction which is called a Sense D Instruction (Sense Delay Instruction). This particular Instruction is unique, in that it calls for the sensing of a particular Operator's Panel switch, namely the switch on the Operator's Panel having Operator's Panel Input/Output Address 5. This Sense D, Instruction is used in the following manner: If an Input/Output Unit, such as a Tape Unit, for example, has been selected, and assuming that the Input/Output Interlocks are in proper condition and a "Read Tape" operation is called for, bits are read from the Tape in groups of 6 bits, 6 groups of 6 bits being read into the MQ to comprise a full word of 36 bits. It takes a certain length of time for the six groups of 6 bits to be thus read into the MQ and during this time the machine may proceed with other operations such as Add, Subtract, etc. As the MQ becomes loaded with a full word read from the Tape, a COPY signal, must be present, in the Operation Decoder so that the word, in the MQ, will be stored, in Memory, at the address specified by this COPY Instruction. Assume, for example, that only four full words are to be read from the tape. As the fourth full word of 36 bits is read into the MQ, and assuming that a COPY signal is waiting, that word is stored in Memory. However, reading of the Tape continues, until a fifth full word is read into the MQ. If a COPY signal is NOT emitted by the Operation Decoder, after this fifth word is read into the MQ a DISCONNECT signal is generated whereby the Tape Unit is disconnected from the machine. It is possible that a Program may, for example, require a MULTIPLY operation, subsequent to the above reading of the four words from Tape into the MQ and then into Memory. With such a Multiply operation, the MQ must be used. Thus, if a Load MQ operation was called for, to load the MQ prior to the MULTIPLY operation during the period that the Tape is reading the fifth full word into the MQ, two separate sources of data vie for entry into the MQ and the result would be scrambled data which is called "hash." To guard against this possibility, the "Sense D" operation is provided. When such a "Sense D" operation is programmed, it produces an interrogation to determine if the Input/Output Interlock is ON or OFF and if this Interlock is ON, the machine can NOT proceed to carry out the other operations involving, possibly, use of the MQ, but the machine latches up, and remains in this latched up condition until the Input/Output Interlock is RESET, signifying that the PRIOR selected Input/Output unit has DISCONNECTED. Thus, the length of the "idle" period is tailored to the conditions prevailing so that a fixed period of idleness is not required, which fixed period might not be required, at all, as would be the case if the Input/Output unit were DISCONNECTED immediately. This "Sense D" Instruction is, therefore, a valuable tool in programming since no "prescribed" time delay must be provided, subsequent to the use of an Input/Output Unit and prior to reaching an Instruction which requires the use of the MQ.

The flow of information during an Add operation proceeds through the various sections of the electronic data processing machine shown as labeled blocks, in Figs. 1a to 1h, inclusive, as follows: It should be assumed that the Instruction Counter triggers (Fig. 1c) are set in a permutation of ON and OFF conditions representing the address, in Memory, which address contains an Instruction; that is, one Instruction of a series of Instructions, and that some data has been previously stored in Memory, at various other addresses. As the machine completes the execution of a previous Instruction, it receives an End of Operation signal, which sends the machine into an Instruction cycle. During the Instruction cycle, the Instruction Counter outputs (Fig. 1c) are switched via the Deflection Switches to the Deflection Register, which, in turn, via the Memory Controls (Fig. 1e) and the Horizontal and Vertical Deflection circuits, controls the selection of an address in Memory, as described in detail later. Assume, for purposes of explanation, that address 0018 is desired, this address 0018 being a decade representation, of a particular permutation of the twelve ON and OFF conditions of the triggers of the Instruction Register storing the address part, of an 18 bit Instruction. Assume further that at this address 0018 in Memory, there has been stored the Instruction, ADD 0010. This particular Instruction requires the following data processing: The multidigit number now in the Accumulator Register, is to be ADDED to the multidigit number, located at address 0010, in Memory. All Instructions, as stated above, comprise a half word only, that is 18 bits, and the 18 coded bits comprising this Instruction, ADD 0010, are read out from Memory, via the Memory Register buffer (Fig. 1b) and the cabling as illustrated (Figs. 1b and 1c) to the Instruction Register. These 18 bits are, respectively, a Sign bit (which by its binary 1 or binary 0 state also identifies a full or a half word, respectively) the Operation part 5 bits (bits 1 through 5), which represent by permutations of binary 1 and binary 0 representations all possible Instructions and the Address part 12 bits (bits 6 through 17) which represent by permutations of binary 1 and binary 0 representations all the various addresses of Memory and of the Input/Output Units. The outputs of those triggers of the Instruction Register which store the 5 bits representing the Operation part of the Instruction feed to the Operation Decoder (Fig. 1d). This Operation Decoder has 32 output lines (one for each type of operation desired) and since, in the example assumed, the particular operation is ADD, the particular output line of the Operation Decoder which represents ADD, goes positive, and causes control circuits to be conditioned, throughout the machine, so that the data from the Accumulator Register and Memory is processed as described below to perform an ADD operation. As the Instruction cycle ends, control circuits of the machine emit a "Go to Execution" signal which causes the machine to go into an Execute, or E cycle. As the machine goes into an E cycle, the outputs of the triggers of the Instruction Register storing the Address portion (bits 6 through 17) and the output of the Sign trigger are gated to the Deflection Register. Under the assumed conditions, this address, now present in Deflection Register is 0010, and the word stored in Memory, at this particular address 0010, will be read, from Memory, and will be stored in the Memory Register. Upon completion of this E cycle, since the ADD operation, called for, has not yet been fully completed, the control circuits emit a "Go to E/R" signal, which sends the machine into an Execute/Regenerate cycle. This occurs whenever the particular operation called for, requires for its completion, one or more cycles during which Memory is not used. Since Memory is not used, these cycles are utilized, not only to fully complete the execution of the operation called for, but also to provide extra Regeneration.

Under the assumed conditions, during this particular E/R cycle, an ADD operation takes place, by switching the contents of both the Accumulator Register and of the Memory Register, into the Adder, and reading the derived sum, from the Adder, back into the Accumulator Register as described in detail in said above identified Haddad et al. application. During THIS cycle, the setting, of the Regeneration Counter, is gated to the Deflection Register, so that its setting controls Regeneration of the particular address, represented by the THEN setting, of the Regeneration Counter. At the end of this E/R cycle, the ADD operation has been completed, and the Machine is free to proceed to the next Instruction cycle, provided that SUFFICIENT Regeneration of Memory has occurred. If SUFFICIENT Regeneration has NOT occurred, the Machine automatically enters further Regenerate cycles during which the respective settings of the Regeneration Counter are gated to the Deflection Register. The Regeneration Counter is stepped, one count, during each E/R or R cycle so that successively numbered addresses in Memory are systematically regenerated and still further, Regeneration is "tailored" to the requirements of the Machine, rather than providing a rigid regime of Regeneration which would of necessity always supply, more than enough, to ensure that there is enough.

At the end of the above E/R cycle, an End of Operation signal is emitted by the control circuits as described in detail in said above identified Haddad et al. application and the Instruction Counter, is stepped, one count, so that the machine will be ready, to READ the NEXT Instruction, which, under the chosen operation described, will be the Instruction, stored at address 0019 in Memory.

Assume that this next Instruction (stored in Memory at address 0019), is a "STORE ADDRESS" Instruction, for example, STORE 0023. The data processing to carry out this particular Instruction requires that the contents of the Accumulator Register be STORED at the Address 0023, in Memory. The machine proceeds through an Instruction cycle, as described above, during which the Instruction stored in Memory at address 0019 is READ, out of Memory (Figs. 1a and 1e) and via the circuits, as shown, into the Memory Register (Fig. 1b) and then via the cabling, as shown, to the Instruction Register (Fig. 1c) which via the cabling, as shown, applies signals representative of the permutations of the bits 1 to 5, inclusive, to the Operation Decoder (Fig. 1d) which decodes this permutation, to selectively energize the line STORE ADDRESS (STORE ADR) which in turn controls the machine circuits to produce this operation, while the Address portion, comprising bits 6 through 17, and the Sign bit, stored in the Instruction Register (Fig. 1c) are effective via the Deflection Switches and the Deflection Register which in turn control the Memory Controls and the Horizontal and Vertical Deflection circuits (Fig. 1e) to cause the cathode ray beams of the respective tubes to select Address 0023, in Memory.

As the machine enters the Execute cycle, the contents, of the Accumulator Register (Fig. 1b) are fed, via the switches and cabling, as shown, to Memory, where these contents are stored in the respective tubes at this selected address 0023. At this time, the operation is effectively completed, since the contents of the Accumulator Register have been stored, in Memory, at the desired Address, so that the machine is free to enter the next Instruction cycle provided SUFFICIENT Regeneration of Memory has taken place. If SUFFICIENT Regeneration has NOT occurred, then, by means of control circuits, described below, the machine enters a Regenerate cycle, and continues to Regenerate, until SUFFICIENT Regeneration has occurred. During these Regenerate cycles, the Regeneration Counter will, as stated above, control the addressing of Memory so that the addresses in Memory are systematically Regenerated to insure that each and every Address is Regenerated.

Another type of Instruction performed by processing of data, is MULTIPLY. During this operation, the processing of data required is as follows: The multidigit number stored, at the address specified by this MULTIPLY Instruction, is multiplied by the multidigit number, in the MQ. Hence, prior to a MULTIPLY Instruction, the number, which is to be the Multiplier, must be stored in the MQ. The MQ Register may be loaded with this Multiplier, either from Memory, via the Memory Register, or the Multiplier may be shifted, from the Accumulator Register into the MQ Register. The procedure of loading the MQ Register, from Memory, involves execution of a "Load MQ" Instruction during which the number, located at the specified address, in Memory, is READ out to the Memory Register and thence, via the MQ switches, to the MQ Register. Assuming that such an operation has already occurred, and that a MULTIPLY Instruction is given, if this Instruction has been READ, out of Memory to the Operation Decoder and the Deflection Register has been properly set, in accordance with the desired Address of the Multiplicand, MULTIPLY will proceed as follows:

During the first character cycle, the machine is in Execute time and reads the word (comprising the Multiplicand) in Memory, at the specified address, into the Memory Register. The machine proceeds into E/R cycles for the purpose of completing the MULTIPLY operation. As the machine enters the first, such E/R cycle, the Memory Register contains 35 bits of the Multiplicand, plus its Sign, while the MQ Register contains 35 bits of the Multiplier, plus its sign. The Accumulator Register will have been reset to zero. During such a MULTIPLY operation, the Accumulator Register and the MQ Register become, in effect, one register, a connection being made between the 35th bit of the Accumulator Register and the 1 bit of the MQ Register, so that data may be shifted, from one Register to the other. The MULTIPLY operation is performed upon the binary multidigit numbers, by repeated addition, of the respective bits of the Multiplicand, as described in detail in said above mentioned Haddad et al. application, each such addition, in a different shifted position, such additions, being performed, in certain shift positions, when the controlling binary bit of the Multiplier, THEN in the 35th bit position of the MQ Register, is a binary –1–, while a shift occurs, but no such addition is made in the respective shift position, when the controlling binary bit of the Multiplier, is a binary 0. Thus successive partial products are built up and the final product is found in the joint Accumulator MQ Register, the Multiplier bits, as they are used up, being shifted out, to thus make room for the accumulating partial product. Circuits are provided to sense the 35th bit position of the MQ Register, containing the Multiplier, to determine whether the particular binary bit contained therein is a binary –1– or a binary –0– to selectively produce or not produce the above mentioned addition. This inspection occurs during an E/R cycle, and if the 35th bit is a binary –1–, the Multiplicand, which is still in the Memory Register, is added to the contents of the Accumulator Register, in a properly aligned shift position, and thereafter the Accumulator Register and the MQ Register jointly, acting as one Register, are shifted, one place to the right. If the 35th bit were a binary –0–, no such addition is effected, as stated above, but the Accumulator Register and the MQ Register are shifted, one place to the right. As the Multiplier in the MQ Register is shifted, one place to the right, the 35th bit position of the MQ thus holds the successive bits of the Multiplier, and, as the partial product is built up, certain bit contents of the Accumulator Register are shifted into positions, in the MQ Register, until the MULTIPLY operation is completed. The product, which will be a 70 bit product, is then held in the joint Accumulator-MQ Register.

This above described procedure, of inspecting the 35th bit position of the MQ Register and either adding or not adding, the Multiplicand, to the partial product in the Accumulator Register, is repeated, several times, in the building up of the final product, so that the execution of a MULTIPLY operation requires thirty-six Execute-Regenerate cycles. While the MULTIPLY operation is proceeding through the thirty-six Execute-Regenerate cycles, Memory (which is not employed in the MULTIPLY process per se) is Regenerated, so that, upon completion of a MULTIPLY operation, there has been an overabundance of Regeneration. This overabundance, is in effect, saved for a rainy day, by the method described below, so that the machine can "ride" on these overabundant Regenerations, and continue Execute operations WITHOUT INTERVENING REGENERATION, for a time measured by this overabundance.

It will be obvious that there will also be required several Execute/Regenerate cycles during a DIVIDE operation since a DIVIDE operation, is essentially, a repeated, over and over subtraction operation, and again, saving for a rainy day, may ensue.

The detailed construction and operation of the Adder, the Accumulator Register, the MQ Register and miscellaneous control circuits is not deemed essential to the operation of the novel Memory of the present application, but reference has been made generally thereto to thus highlight the operation of such a Memory when employed in a complete electronic data processing machine. If further details of operation should be desired reference is again made to said Haddad et al. application, mentioned above which discloses and describes in detail the construction and operation of these units. However, certain details will be described, in connection with the operation of the Memory Register, the Instruction Register, the Instruction Counter, the Regeneration Counter, the Deflection Switches, the Deflection Register and several Input/Output control circuits, whenever such details are deemed helpful in the understanding of the operation of the novel Memory, as a part of a complete electronic data processing machine including these latter and the above mentioned units.

Before proceeding to the description of these latter units and of Memory, in particular, a detailed description of several standard component circuits employed, such as logical "AND" circuits, logical "OR" circuits, triggers, inverters, cathode followers, and delay elements, etc. will be given. The properly labeled block symbol representative of these respective components, as they appear in the various figures of the drawings, will thus be understood to comprise identical or similar detailed circuitry, it being obvious to those skilled in the art that changes in the values of components and in the particular assemblages may be made to provide the most efficient operation under the electrical conditions that are encountered. The values given, as exemplary, are those which have been found most efficient in the preferred embodiment described herein which has been successfully constructed and operated.

*Standard components*

Referring to Fig. 6a, there is illustrated the detailed wiring diagram of an inverter, as employed in the invention, and its corresponding block symbol 1. Wherever this block symbol appears in the figures described below, it represents the detailed circuitry of Fig. 6a.

A triode 601a of Fig. 6a, which may comprise half a 5965 dual triode type tube has its plate connected via a 750 microhenry inductance 602a and a 10K resistor 603a, in parallel, and a 10K resistor 604a in series, to a +150 volt source. The grid of the triode 601a is connected via a 150 ohm resistor 605a, to a 10K resistor 606a connected in parallel with a 39 micromicrofarad condenser 607a, whose farther junction is shown connected to an input terminal 1. The plate of the triode 601a is also conected by means of a 15 micromicrofarad condenser 608a, in parallel with a 160K resistor 609a, to an output terminal 5, while a lower junction of the condenser 608a and the resistor 609a is connected by means of a 330K resistor 610a, to a source of −250 volts. This inverter produces a negative shift, at its plate, and therefore at its output 5, when a positive shift is applied to the input terminal 1, while a positive shift is produced at its output 5, when a negative shift is applied to the input terminal 1. The inverter also amplifies the signal input, and its components and component values are so chosen as to produce outputs, having short rise and fall time. In this respect, the inductance 602a, in the plate circuit, speeds the rise of the plate voltage and when the triode is cut off, this inductance produces a voltage which tends to keep the current flowing. The resistor 603a in parallel with the inductance 602a, serves as a damper and prevents ringing in the plate circuit after the initial peaking has occurred, due to an input signal.

Other types of inverters $I_A$, $I_B$, $I_C$, $I_{CL}$, $I_E$, $I_P$, $I_{PS}$, $I_S$, $I_{SY}$, $I_T$ and $I_Y$, are shown in Figs. 6b through 6k, and 6m, respectively. The operation of these inverters is basically like that of the inverter I, of Fig. 6a and is well understood to those skilled in the art so that no further description is deemed necessary.

Referring to Fig. 6n, there is illustrated the detailed wiring diagram of a peaker, as employed in the invention, and its corresponding block symbol $PKR_A$. A triode 615a which may comprise half of a 5687 dual triode type tube has its plate connected to a +150 volt source by a 1 millihenry inductance 616a, in series with a 3K resistor 617a. The 1 millihenry inductance 616a is shunted, by diodes 619a and 620a in series, while the junction of the inductance 616a and the resistor 617a is coupled to ground, via a .05 microfarad condenser 618a. The grid of the triode 615a is connected via a 150 ohm resistor 621a to a 160K ohm resistor 623a, connected in parallel with a 47 micromicrofarad condenser 622a, whose farther junction is shown as connected to an input terminal 1. The junction of the resistors 621a and 623a is connected, by means of a 330K resistor 624a, to a −250 volt source. The plate of the triode 615a is also connected, by means of a 22 micromicrofarad condenser 625a, in parallel with a 430K resistor 626a, to an output terminal 5, while the lower junction of the condenser 625a and the resistor 626a is connected by means of an 820K resistor 627a, to a source of −250 volts. The operation of this peaker $PKR_A$ is similar to that of the inverter I of Fig. 6a, described above, in that it causes a phase reversal from the input signal to its output signal. The peakers $PKR_B$, $PKR_C$ and $PKR_D$, shown in Figs. 6p, 6q, and 6r, respectively, are basically like that of the peaker $PKR_A$ of Fig. 6n and their operation will be well understood by those skilled in the art.

Fig. 6s illustrates the circuit diagram and corresponding block symbol of a trigger T. This trigger comprises a dual triode 630a which may comprise a type 5965 tube, the plate of the right hand triode being connected to a +150 volt source, by way of an inductance 631a (of a value of 1.0 millihenry as labeled) in series with resistors 632a and 633a, respectively. The resistors 632a and 633a may have values of 5.1K, as indicated in Fig. 6s. The left plate of the dual triode 630a is similarly connected to the +150 volt source. The right plate is also connected via a 15 micromicrofarad condenser 634a in parallel with a 360K resistor 635a, to the output terminal 4. This lower connection of condenser 634a and resistor 635a is connected, by way of an 820K resistor 636a, to a −250 volt source. The left plate is provided with a similar output connection to terminal 3.

The plate of the right hand triode is also coupled to the grid of the left hand triode via a 15 micromicrofarad condenser 640a and a 68K resistor 637a, in parallel, together in series with a 150 ohm resistor 641a. The plate of the left triode is similarly connected to the grid of the right triode, to thus provide, the now well known cross coupling of the triodes of an electronic trigger. The trigger is regarded as being OFF, when the right hand triode is conducting, and is regarded as being ON, when the left triode is conducting. The grid of the left hand triode is also connected via the resistor 641a, in series with a 91K resistor 638a and a 68K resistor 639a, to a source of −250 volts. Similarly the grid of the right hand triode is connected, to a −250 volt source. The flip-flop operation of such an electronic trigger is now well known, the trigger being flipped ON or OFF as desired by the application of a negative voltage to a binary input terminal 7, such a negative voltage being applied, to both grids, but being effective, only on the grid of that triode which is already conducting, to thus block its conduction and render this triode non-conducting. When the trigger is already reset OFF (right triode conducting) a negative pulse, applied to the binary input terminal 7, renders the right hand triode non-conducting and the left hand triode conducting. Other electronic trigger circuits, designated $T_A$, $T_K$ and $T_S$ shown, respectively, in Figs. 6t, 6u and 6v, are all generally of the type just described.

Fig. 6w illustrates the circuit diagram and corresponding block symbol of a single-shot multivibrator SS. This circuit is used to generate gates or pulses of specified time duration, and to provide specified delays. A single-shot multivibrator resembles a trigger circuit, in that it may be shifted from one state to the other state, but differs in that it returns automatically to its one state, after a predetermined time (depending on the values of the circuit constants) without being pulsed from an external source. Its one or normal state may be referred to as its stable state, and its other or abnormal state may be referred to as its quasi-stable state, since it does remain stable, in this latter state, until the predetermined time has elapsed. The single-shot multivibrator illustrated in Fig. 6w is cathode coupled. In its stable state, the left triode is cut off and the right triode is conducting heavily and the cathode and the right grid are at about +10 volts, the left plate voltage is +150 volts and the right plate voltage is at about +60 volts. The most common method of tripping a single-shot multivibrator is by plate pullover. When using plate pullover, the left plate of the single-shot multivibrator is connected to the plate of an inverter, the load resistor of its left plate also acting as the load resistor for the pullover inverter. When a positive input is applied to the grid of the pullover inverter, conduction, through the common plate resistor, drops the voltage of the left plate of the single-shot. This negative shift, is coupled through the capacitor CT, to the right grid, cutting off the right triode, and the cathode voltage starts to fall. The left grid is held to about −38 volts, by a voltage divider as illustrated, and as the cathode voltage falls, the left triode starts to conduct, pulling its plate voltage down. Current starts flowing through the cathode resistor, from the left tube and holds the cathode voltage at −36 volts. A clamp diode, as shown, in the cathode circuit, prevents component variations from causing the voltage, on the cathode, to fall below −36 volts. The clamp diode on the left grid prevents the Miller capacitance effect from dropping the left grid voltage below −36 volts. The left tube at this time is conducting, and it is operating very near zero bias. The input pulse may be removed, any time after the left diode begins to conduct, and the circuit will remain, in the quasi-stable state, since the left plate voltage will be held down by the conduction of the left tube. When the input pulse from the pullover inverter, is removed, the decrease in pullover inverter current, flowing through the left plate load resistor, may appear as a slight positive shift in the left plate waveform.

The duration of the single-shot output pulse is largely dependent on the value of the discharging capacitor CT connected between the left plate and the right grid, and the value of the resistor RT. Upon discharge of the capacitor CT, the discharge path is from the +220 volt source, through the resistor RT, connected to the right grid, the capacitor CT, the discharge path of the left triode and the cathode resistor, to the —100 volt source. This discharging of the capacitor CT causes the voltage of the right grid to rise. When the voltage, at the right grid, has risen to —42 volts, the right tube will begin to conduct, the cathode voltage will rise again to its original value, cutting off the left tube as it does so. The left plate voltage, therefore, rises towards its original +150 volt level. All component values in this circuit, except that of the condenser CT and the resistance RT are fairly constant. RT and CT may be varied, to determine the duration of the pulse, and therefore, they are called the timing resistor and the timing capacitor. The larger RT and CT, the more time is required for the right grid voltage to rise to —42 volts. The duration of the single-shot pulse in microseconds is approximately 0.25 RT CT, where RT and CT are in megohms and micromicrofarads, respectively. The value of cut off, for the right tube, in this circuit, also affects the timing. All these factors, except RT and CT are fairly constant and enter into said 0.25 coefficient. Various values in components and voltages, therefore, may cause the actual value of the pulse width, to deviate from the calculated value, by as much as plus or minus 20%. Although it was mentioned previously, that the voltage values at the various points in the circuit of Fig. 6w return to their stable states, when the single-shot multivibrator timing has ended, such is not rigorously correct. The left plate voltage rises to a new value in about half a microsecond, but this is lower than +150 volts. The voltage is determined by the balance of voltages in the circuit connected to this plate. The positive shift at the left plate is coupled to the right grid, which becomes positive enough to draw heavy grid current in the right tube. The upper level of the right grid voltage is clamped, through the right triode and the +10 clamp diode as shown, connected to the cathode, and this clamping action prevents the voltage on the left plate from rising, to +150 volts, until the coupling capacitor CT again becomes charged, to its original charge. The path for charging current is now from +150 volts, through the 33K left plate load resistor, through the capacitor CT, through the 150 ohm grid resistor and grid to the cathode resistance of the right tube and finally through the 15K cathode resistor connected to —100 volts. The time of recovery, that is, the time required for the left plate voltage to return to +150 volts can be estimated in microseconds at 0.25 CT where CT is in micromicrofarads. It may be noted that the timing resistor has no effect on this time. The recovery time is an important consideration in the single-shot multivibrator operation. If a circuit has not recovered from an operation when a second pulse arrives, the negative shift on the left plate will be smaller and at that time the single-shot multivibrator pulse will be shorter. Therefore, for stable operation, the period of the input pulses must be greater, than the combined time of the output pulse and the recovery time. If the shift in voltage at the left plate at the time of removal of the input pulses is large, it may have a serious effect on the timing of the circuit.

The single shot $SS_B$ shown in Fig. 6y, is a special short time single-shot multivibrator, while the single-shot multivibrator $SS_D$ shown in Fig. 6z is a special single-shot multivibrator which produces a very short pulse of variable duration. The operation of these latter two single-shot multivibrators is similar to that of the single-shot multivibrator SS of Fig. 6w.

In Fig. 6ab, there is illustrated the circuit diagram and the corresponding block symbol of an amplifier labeled A, which is known as a grounded grid amplifier. It comprises a pair of triodes 650a and 651a which together may comprise a type 5965 dual triode. The plate of the triode 650a is directly connected to a source of +150 volts, while its grid is connected, through a 150 ohm resistor 652a, to an input terminal 1. The plate of the triode 651a is connected, to a +150 volt source, through a 10K resistor 653a and a 750 microhenry inductance 654a, in parallel, both in series with an 8.2K resistor 655a. The plate of the triode 651a is also connected, through a 15 micromicrofarad condenser 662a and a 160K resistor 663a, in parallel, to an output terminal 5. The lower junction of condenser 662a and resistor 663a is connected through a 330K resistor 660a to a source of —250 volts, as shown. The grid of the triode 651a is connected to ground through a 150 ohm resistor 656a, and a 47 micromicrofarad condenser 657a, in parallel with a 9.1K resistor 659a. The end of the resistor 656a, remote from the triode 651a, is also connected via an 18K resistor 658a to a source of —30 volts. The cathodes of the two triodes 650a and 651a are connected, as shown, and are also connected to a —250 volt source, via a resistor 665a. The cathodes are also connected, via a diode 664a to a source of —30 volts. Assuming we wish to amplify a potential of +10 volts applied to the input terminal 1, the triode 650a, acting as a cathode follower, will produce approximately +13 volts at the common cathode resistor. The grid voltage of the right triode is determined by the voltage divider comprising resistors 658a and 659a and this voltage is —10 volts, as no grid current is flowing. With +13 volts on the cathode and —10 volts on the grid, the triode 651a will be cut off, producing +144 volts at the plate. The output signal at terminal 5 is divided between the +144 volt potential and the —250 volt source, as shown, to obtain an output of +10 volts at this output terminal 5. If the voltage of the grid of the triode 650a were —20 volts, the cathode would be approximately —18 volts. With —18 volts on the cathode of the triode, 651a, and —10 volts on its grid, the grid will draw current, reducing the grid to cathode voltage to approximately 0, thus allowing full conduction. The plate voltage will drop to about +70 volts, which is divided via the circuit, as shown, producing an output of —36 volts on the output terminal 5.

This circuit is designed for maximum response. The coil 654a in the plate circuit of the triode 651a decreases the rise time of the plate, when the input to this grounded amplifier is going in the opposite direction. The 47 micromicrofarad condenser 657a, in the grid network of the triode 651a, is employed to by-pass the grid to ground and to allow the triode 651a to respond faster as the cathode voltage is dropped. When the grid of the triode 651a begins to conduct, the voltage at the grid does not drop immediately, but is held up by the potential of this grid condenser 657a. This positive grid to cathode voltage provides a surge of plate current to aid the fall of the plate of the triode 651a. A shaping amplifier $A_A$ shown in Fig. 6ac, a clamp power amplifier CPA shown in Fig. 6ad, and a sync power amplifier SPA shown in Fig. 6ae, are other types of amplifiers used in the machine. Their operation is well known to those skilled in the art, and further explanation of these amplifier circuits is deemed unnecessary.

In Fig. 6af, there is shown the detailed circuit diagram and corresponding block symbol of a cathode follower which may be used, either in the form shown in Fig. 6af or in several variants thereof. Wherever a cathode follower is used in the circuitry described below, it will be indicated by a block diagram labeled CF.

Several cathode followers as shown in Figs. 6am, 6an, 6ap to 6aw are power amplifiers, and are, therefore, used to supply a stable voltage level for driving resistive loads, such as diode AND and OR circuits and for capacitive loads such as wiring capacitance. Their high input impedance and relatively low output impedance make them useful for impedance matching and isolation. Cathode followers do not invert a signal but they may attenuate a signal.

The basic cathode follower, shown in Fig. 6af, may be used with two types of loading which should be considered, one, a resistive load and two, a capacitive load. First, a resistive load will be assumed, and an input voltage of +10 volts. The triode 670a will conduct in such a manner as to regulate itself, that is, it will not allow appreciable voltage change from grid to cathode. If the current increases, the triode tends to cut itself off as the cathode voltage tends to rise. This cut off action tends to decrease the current. Conversely, if the current tends to decrease, the cathode voltage will tend to drop, and thus cause the triode to draw more current. This type of self-regulation is called inverse voltage feedback. Current through the cathode circuit causes a voltage drop across a 100 ohm resistor 671a. When the input voltage is +10 volts, this drop should about equal the grid to cathode rise, so that the output voltage is almost +10 volts. Should the input signal drop for instance, to −30 volts, then the output voltage will also drop. If one examines tube characteristics, it will be noticed that the current will be less and that the grid to cathode bias is more, when there is more voltage across the tube. In this case, the drop across the 100 ohm cathode resistor 671a, is less, and, therefore, it will not compensate for the grid to cathode voltage rise, and the output will be more positive than the input. The regulating action still occurs, although at this lower level.

With +10 volts on the grid of an unloaded cathode follower, employing a 8.3K cathode resistor, the output is about +9.5 volts, and each added six milliamperes of load will increase the drop (from +10 volts) by about 1 volt. The maximum rise of 3 volts may be expected from the cathode follower with an 8.3K load resistor and no additional loading. For each milliampere load, this lower level may be expected to rise by about ½ volt. If the cathode resistor is increased, the rise in the lower level is increased also. For example, an increase of 3K in the cathode resistor will cause the lower level to rise about an additional volt. This cathode resistance may vary over a considerable range. The gain of a cathode follower when operating Class A is about 0.9.

For operation of a cathode follower, feeding a capacitive load, assume that there is a capacitance connected from the output to the ground and that the input voltage to be +10 volts. In a steady state condition, the capacitance would be charged +10 volts. If the input voltage were to drop in zero time, to −30 volts, the voltage across the capacitance could not drop immediately, and therefore, the cathode would be held up, by the capacitance, while the grid dropped to −30 volts. This action cuts off the tube momentarily. The output voltage will drop, at a speed determined by the RC path, consisting of a cathode resistor and the capacitance. When the capacitance voltage drops far enough, the tube begins to conduct, the current from the tube will begin to halt and drop, and eventually hold the output, at a steady state voltage. When the input is suddenly shifted again to +10 volts, the capacitance will be charged by current from the grid and plate circuits of the heavily conducting tube. For values of input capacity for the next stage or stages generally employed in this system, these RC time constants are compared to the rise and fall times of the input, and, therefore, the extremes of cut off, and heavy conduction, may not be reached, and the output follows the input. But if a long cable or large capacitive load is attached to the cathode follower output, then the output will not follow the input voltage shift, but will be determined by the RC paths above. The use of several cathode followers, in parallel, helps to minimize the voltage rise of the circuit at the lower level. Parallel connected cathode followers also provide more current for line charging purposes to speed output voltage shifts, and in addition, the paralleling lowers the effective cathode resistance and thus allows faster discharging of line capacitance. When cathode followers are in parallel, the connections are made at the grids and the outputs. The diodes may not be paralleled. The number of half tubes (type 5965) in parallel, proceed to symbol CF on the block diagram; thus a whole tube cathode follower is indicated by the symbol 2CF, throughout circuit diagrams.

The standard cathode follower, as shown, in Fig. 6af, contains two catcher diodes 672a and 673a. The catcher diode 673a, connected to the −30 volt line, protects the other catcher, and diodes following this circiut, by clamping the output voltage, to −30 volts, when the cathode follower input goes negative. This negative voltage catcher also helps set the standard output voltage. The diode 672a, connected to the +15 volt line, clamps the output at +15 volts, when the input goes very high, and thus protects the other diode or any diodes fed by this circuit from other voltages. These two diodes in effect protect each other. When cathode followers are paralleled, only needed diodes are used. In this case, enough +15 volt return diodes are used to carry the 24 milliampere zero bias current for each 5965 half tube. The −30 volt return diodes must handle the clamping current through the equivalent cathode resistance, when all tubes are removed. When crystal diodes are paralleled, a resistor (usually 100 ohms) is placed in series with each, to tend to equalize the current through each diode. Otherwise, a low forward resistance of one, may cause it to pass more than rated current. Other types of cathode followers, specifically the cathode followers $CF_D$, $CF_E$, $CF_L$, $CF_S$ and $CF_Y$ are shown in Figs. 6ag, 6ah, 6ai, 6aj, and 6ak, respectively, and are well know types of cathode followers. Their operations are well understood by those skilled in the art and consequently, no further explanation of cathode followers will be made.

In Fig. 6am, there is illustrated, the detailed circuit diagram and corresponding block symbol of a power cathode follower PCF which operates similarly to the cathode follower of Fig. 6af. This circuit is called a power cathode follower because it uses a 5687 tube which is a heavy duty tube. The usual value of the cathode resistor R is 6 kilohms. The usual value of the bias resistor is 300 ohms. The voltage rise through the power cathode follower is greater than that for a standard cathode follower because of the amplification. Because of the tolerances in a type 5687 tube, the rise from a −30 volt input can be as much as 5 volts, for an unloaded cathode follower, with a 6K cathode resistor. With a +10 volt input, the input should also be +10 volts under the above conditions. The action of the power cathode follower, under capacitance loading, is also similar to that of a standard cathode follower. Power cathode followers may be paralleled and in this case, the +15 volt, return catcher diodes, must be able to carry the 80 milliampere, 0 bias current, of each half tube. As in the case of the standard cathode follower, the number of half tubes, in parallel, precedes the symbol PCF in the block diagram; thus, a whole tube power cathode follower is indicated by 2PCF. Other types of power cathode followers, specifically, $PCF_A$, $PCF_B$, $PCF_C$, $PCF_D$, $PCF_E$, $PCF_F$, $PCF_G$, $PCF_M$, and $PCF_P$ are illustrated in Figs. 6an, 6ap, 6aq, 6ar, 6as, 6at, 6au, 6av, and 6aw, respectively. The operation of these various types of cathode followers is well known to those skilled in the art, and no further explanation will be given.

Fig. 6ay illustrates the detailed circuit diagram and corresponding block symbol of a plus diode AND circuit, while Fig. 6az illustrates similarly a minus AND circuit, employed in the invention. Whenever a block, labeled with the symbol &, appears in a block wiring diagram, the contents of the block will comprise a circuit as illustrated in Fig. 6ay, or one modified simply by the addition of as many input diodes as may be necessary for conditioning the circuit under question while the block labeled with a —& will comprise a circuit as in Fig. 6az. The positive AND circuit of Fig. 6ay requires a coincidence of two +10 volt inputs, for example, applied, respectively, to the lines 680a and 681a. Such inputs are effective through diodes 682a and 683a, respectively, which may comprise germanium diodes of standard make, to produce a +10 volt output; the plates of the diodes being joined and connected by a resistor 684a, to a source of +220 volts. The minus AND circuit of Fig. 6az requires a coincidence of two negative potentials upon its two inputs (or as many inputs as may be employed), to produce a negative output. This minus AND circuit comprises a pair of diodes 687a and 688a connected, as shown, to a resistor 689a, whose lower terminal is connected to a source of −250 volts. Upon application of a negative potential (assume −30 volts), to both the inputs 685a and 686a, a negative output becomes available on the output line 690a. If either of the inputs, is relatively positive, no such negative output will be available.

Referring to Fig. 6ba, the detailed wiring diagram and corresponding block symbol of a positive OR circuit is illustrated while in Fig. 6bb a negative OR circuit is illustrated. By comparison with the circiuts of Figs. 6ay and 6az it is seen that the circuitry, per se, of a negative AND circuit and a positive OR circuit are the same, and the circuitry, per se, of a positive AND circuit and a negative OR circuit are also the same. These circuits are employed in different manners in the processing of data, as described below.

A delay line circuit DL is shown in Fig. 6bc. This delay line circuit is of a lumped constant type, which consists of a series of L sections, each containing a series inductance and a shunt capacitance. If a pulse is applied to the input terminal 1 of this type of line, current flows through the inductance of the first section to charge the capacitance of that section. As the capacitance becomes charged, its voltage then causes current to flow through the next inductance to charge its corresponding capacitance. This process continues successively from one section to the next along the line. Since it takes a finite time to charge the capacitance of each section through the impedance of its corresponding inductance, the pulse is delayed in its propagation along the line. The delay time, in microseconds per section, is the square root of the product LC, where L is the inductance, per section, in henries, and C is the capacitance for the section, in micromicrofarads.

Referring to Fig. 6bd, a distributed constant delay line DL$_B$ is shown. A distributed constant delay line resembles a coaxial transmission line except that it is specially constructed so that its inductance and capacitance are relatively large, per unit length. This is necessary so that the desired delay may be obtained, in shorter lengths of line. This type of line differs from the lumped constant type in that the line, per se, instead of discrete components, forms the inductance and the capacitance. Electrically, it acts as a lumped constant line with a very large number of components with very small value, that is, the capacitance and the inductance are distributed continuously along the line. The delay, per unit length, in microseconds, equals the square root of LC, where L is the inductance, in henries, per unit length, and C is the capacitance in micromicrofarads, per unit length.

Referring to Fig. 6be, there is shown a delay line driver type of cathode follower DLD, which is similar to the cathode followers, shown above, except that no load resistor is provided. Inasmuch as the operation of cathode followers has been discussed above and is apparent to those skilled in the art, no further explanation will be made.

In Fig. 6bf, there is illustrated, the detailed circuit diagram and corresponding block symbol of a clamp circuit C$_D$. This circuit comprises a diode whose plate is connected to a terminal 1. If the potential, at the terminal 1, tends to rise above ground potential, the diode conducts and the potential at terminal 1 is held at approximately ground potential.

Fig. 6bg illustrates the detailed circuit diagram and corresponding block symbol of a clamp generator CG. This circuit uses a shorted delay line to produce a pulse of a predetermined width. The delay line, per se, was described above in Fig. 6bd. When the input to the clamp generator rises, the dual triode conducts, causing a negative shift to appear at the commoned plates. This negative shift, travels along the delay line, is reflected, at the shorted end, and re-appears at the input end, as a positive shift of the same magnitude. Therefore, a rise, in the input of the clamp generator, causes a negative pulse to appear at its plate. If then, the tube is cut off, a positive shift results across the input terminals of the delay line as the current flow, through the impedance of the line, ceases. The positive shift travels along the line, is reflected at the shorted end, and appears at the input end, as a negative shift, of approximately the same amplitude. Therefore, a positive shift, at the input of the clamped generator, produces a negative pulse at the plate. The width of either the positive or the negative pulses is twice the width of the delay or in the particular embodiment shown, is approximately 0.34 microsecond. Since the input of the clamp generator is condenser coupled, the grid circuit contains clamp diodes for D.C. restoration. The cathode circuit also has clamp diodes to cause the tube to cut off, whenever the input signal falls.

The operation of the sync generator of Fig. 6bi operates in the same manner as the clamp generator of Fig. 6bg except that it does not contain clamp diodes, in the grid circuit, for D.C. restoration.

Referring to Fig. 6bh the detailed circuit diagram and corresponding block symbol of an oscillator are illustrated. This oscillator comprises a triode 601b whose cathode is connected to ground through a 220 ohm resistor 602b. The grid is connected through a 150 ohm resistor 603b and a 1000K ohm resistor 604b to ground. The far end of this resistor 603b is connected by way of a 470 micromicrofarad condenser 605b through a portion, of a 200 microhenry inductance 606b, and a 1500 ohm resistor 607b, to a power supply of +150 volts. The plate is connected via another portion, of the same 200 microhenry inductance 606b, and the resistor 607b to +150 volt supply. The bottom portion of the resistor 607b is connected via a .01 microfarad condenser 608b to ground. The plate is connected via a .01 microfarad condenser 611b, in series with a 22 micromicrofarad condenser 609b and a 47 micromicrofarad condenser 610b to ground, the condensers 609b and 610b, in series as shown, being shunted by variable condensers 612b and 613b, as shown. The output is taken from the junction of the condensers 611b and 609b to an output terminal 1. The circuit parameters have been so chosen that with the oscillator tuned the circuit oscillates at a frequency of approximately 1 megacycle.

In Fig. 6bj, there is illustrated the detailed circuit diagram and corresponding block symbol of a clipper circuit, CL. The input to this clipper is RC coupled via a 9.1K resistor 622b and a 5 micromicrofarad condenser 621b, in parallel, and both in series with a 150 ohm resistor 624b, to the grid of a pentode 620b. The junction of the condenser 621b and the resistor 622b, nearest the grid, is connected, by way of a 330K resistor 623b, to a voltage source of −250 volts. The suppressor grid and the cathode are connected together and to ground, while the screen grid is connected, via a 47 ohm resistor 626b, to a +150 volt supply, and via a .01 microfarad condenser 625b, to ground. The plate is connected via a 330 microfarad condenser 627b to an output terminal 5 and via a 4.7K resistor 628b and a 510 ohm resistor 629b, to a +150 volt source. This clipper circuit is used to clip off the lower portion of the input pulses applied thereto. It then amplifies and inverts, the remaining positive peaks of the input pulse, also eliminating, from the plate output, the low level noise signals, which are present at the grid. The static voltage of the grid is about −8 volts, with respect to the cathode (ground), and the cut off voltage for the circuit is about −4 volts. Therefore, it can be seen that this circuit amplifies only the positive peaks of the input signals applied thereto.

Fig. 6bk illustrates the detailed circuit diagram and corresponding block symbol of a sync clipper identified by the symbol SC. This sync clipper amplifies the positive peaks of the sync generator SG (Fig. 6bi) output. This circuit comprises a grounded grid amplifier, whose grounded grid is at approximately −3 volts. The cathode also operates at about −3 volts. A 200K resistor 635b, which is connected to a −30 volt source, comprises part of an RC coupling between this circuit and the sync generator of Fig. 6bi. Low plate and cathode resistances help provide fast rise and fall times while the 100 microhenry inductance 636b, in the plate circuit, provides peaking action for fast positive rise, while the .01 microfarad condenser 637b, on the grounded grid, helps to speed fall time on a negative shift.

Fig. 6bm illustrates the detailed circuit diagram and corresponding block symbol of a sample amplifier identified by the symbol SA. The sample amplifier SA comprises a pentagrid tube 650b whose cathode K and grid G5 are connected together and directly to ground. The grid G1 is connected via a 150 ohm resistor 654b and a 47 microfarad condenser 651b, to an input terminal 2. The junction of the condenser 651b and the resistor 654b is connected via a 270K resistor 652b to a voltage source of −100 volts and also via a 68K resistor 653b to ground. The grid G3 is connected via a 150 ohm resistor 655b to an input terminal 1. The grids G2 and G4 are connected together and via a 330K resistor 656b, to a source of +150 volts. The plate P is connected directly to an output terminal 3. This tube will not conduct unless both input signals are near ground potential. Thus, unless both inputs are at a relatively positive potential the tube does not conduct, but when both inputs are relatively positive, the tube conducts and produces a negative pulse at the plate.

Fig. 6bn illustrates the detailed circuit diagram and corresponding block symbol of a thyratron circuit identified by the symbol THY. This thyratron circuit comprises a thyratron tube 660b whose cathode K is connected directly to a terminal 4. The grid G1 is connected, via a 22 micromicrofarad condenser 665b to the cathode K, and the grid G2 is connected, via a 22 micromicrofarad condenser 666b to the Cathode K. The grid G1 is also connected via a 1K resistor 664b and a condenser 661b to a terminal 3. The junction of the condenser 661b and the resistor 664b is connected, via a 1 megohm resistor 662b to a voltage source of −100 volts, and is also connected, via a 200K resistor 663b, to ground. The grid G2 is connected via a 47K resistor 667b, to a terminal 2. The plate P is connected directly to a terminal 1. This circuit is utilized to complete a circuit between the terminal 1 and the terminal 4. If a positive signal is applied, to the input terminal 2, and a second positive signal is applied, to the input terminal 3 the thyratron fires, that is, tube 660b conducts and completes a circuit between the terminal 1 and the terminal 4 (assuming proper potentials are applied, via the circuit to be completed, to the terminal 1 and to the terminal 4).

Fig. 6bo illustrates the detailed circuit diagram and corresponding block symbol of a video amplifier. This video amplifier, is used to amplify, the low level signal, originating at the pick up plate 400 of one of the cathode ray tubes (Fig. 4) to approximately 25 volts, zero to peak. The video amplifier comprises six RC coupled, Class A stages, of video amplification. This circuit has a very short time constant so that it differentiates the voltage pulse received from the pick up plate. Differentiation of the input signal allows the amplifier to recover more quickly when the pulses are passed through it. The amplifier contains a slight amount of cathode regeneration for stability, peaking in the plate circuit, for increased band width, and coupling of the plate supply voltage, for less interaction between stages. The gain control potentiometer 670b adjusts the bias of the second and third stages.

Fig. 6bp illustrates the detailed circuit diagram and corresponding block symbol of a microsecond delay unit, utilized as a storage element. The circuit of this microsecond delay unit is generally of the type shown and described in Reissue Patent No. 23,699, issued August 18, 1953. The slight differences in design between the device of the patent and the particular device described in detail herein, will be apparent from the following description and the notations on Fig. 6bp. In general, the microsecond delay unit is a device for storing data in which an input pulse may be applied to the input terminal 674b at the same time that the previous input pulse appears at the output terminal 694b, a delay of one full microsecond occurring between the input and the output, with certain timing of the inputs, as described below, but with a complete isolation between the respective output and input pulses, during any given time interval.

The input terminal 674b is connected to one diode of a pair of diodes 675b and 677b, which with the resistor 679b, connected between the junction 678b and a 220 volt source, comprise an AND circuit, generally designated as 673b, the input to a terminal 676b connected to a diode 677b comprising the sync pulse as described below. The junction 678b is connected through a suppressor grid resistor 680b to the control grid of the triode L, which triode may comprise one half of a 5965 type tube, the other half comprising the triode R.

The plate of the triode L is connected via a resistor 695b, and an inductance coil 696b, in parallel, to a +150 volt source, while the output of the plate is coupled to the grid of the triode R, via a circuit described below.

The triode R is operated as a cathode follower and it is always conducting during the operation of the delay unit. Its cathode load resistor 691b is connected to a −100 volt terminal 693b, which is also connected, through a resistor 684b, to the condenser 681b. The output terminal 694b, is connected to a tap of the cathode resistor 691b and is clamped to a +15 volt source, by a diode, as shown. The CLAMP or hold terminal 690b is connected via a resistor 689b and diodes 688b, 682b, and 683b, in series, to a −30 volt terminal 685b. The junction 695b comprises the junction of diodes 682b and 683b, the resistor 684b and the condenser 681b. The junction 687b of diodes 688b and 682b is connected, via a suppressor resistor 692b, to the control grid of the tube R, and through a condenser 686b to ground. The junction 695b can never be appreciably more negative than the −30 volt terminal 685b, because the diode 683b conducts and maintains the voltage, at junction 695b, up to essentially that of terminal 685b. It is the conduction of the diode 683b, during the initial time, that keeps junction 695b at approximately −30 volts. The resistor 684b tends to prevent the voltage at junction 695b from drifting, between the application of successive clamping pulses. The operation of the microsecond delay unit, requires the use of a SYNC pulse at the input and a CLAMP pulse, as shown. The SYNC pulse is a positive pulse, having a duration between 0.3 and 0.4 microseconds and a repetition rate of 1 megacycle. Its two voltage levels are −30 and +10. The CLAMP pulse is a negative pulse having a width of between 0.2 and 0.3 microseconds. The negative excursion of the CLAMP coincides with the negative excursion of the SYNC. The normal level of the clamp line is —10 volts, and the pulse goes down to between —40 and —45 volts.

Assume the input at terminal 674b to be +10 volts. When the SYNC voltage goes to +10, triode L conducts, producing a negative pulse across the inductance 696b of the plate circuit. The resistor 695b, in parallel with the coil 696b, serves to damp the peak pulse. This pulse is coupled, via the condenser 681b, to the junction 695b which is driven to —30 volts. Diode 682 presents a high impedance so that the negative voltage does not discharge the condenser 686b. Next, the SYNC voltage drops to —30 volts. This cuts off triode L and produces a positive pulse in the plate circuit. This pulse is also coupled through the capacitor 681b to the junction 695b. When the pulse exceeds the voltage at the grid of the triode R, it causes diode 682b to conduct. At the same time that the positive pulse is applied to the grid of the triode R, through the diode 682b, the negative CLAMP is applied via resistor 689b and the diode 688b. Thus, there exists the condition of a positive pulse applying charge to the condenser 686b at the same time that the negative CLAMP is removing it. The positive pulse has greater duration than the CLAMP pulse and with the rate of discharge permitted by the resistor 689b, +10 volts will exist at the grid of the triode R. This voltage cannot remain above +10 since this is the level of the CLAMP line except during the interval of the CLAMP pulse. Thus, as long as the input is +10 volts, the output at terminal 694b will remain at +10 volts.

Assume that the output has changed to —30 volts, and that this change takes place during the interval that the SYNC line is at —30 volts. Since there is a + AND circuit 673b at the input, the grid voltage will stay at —30 volts, instead of following the SYNC voltage, and there will be no positive or negative voltages produced in the plate circuit of the triode L. The output at terminal 694b will remain at +10 until the CLAMP pulse discharges the condenser 686b, changing the input of the triode R from +10 volts to —30 volts. If the voltage attempts to go below —30 volts, the diodes 683b and 682b will conduct, clamping it. As long as the input remains at —30 volts, there will be no positive pulses produced and each CLAMP pulse will keep the triode R grid at —30 volts.

As will now be obvious, the reading in of a 0 to be stored in the microsecond delay unit is much simpler than the reading in of a 1. Since the information line is at —30 volts for a binary 0, no SYNC pulse can be gated through to produce any pulses at the plate of the peaking tube L. Therefore, when the CLAMP pulse tends to discharge the storage capacitor 686b, no opposing pulse will be present to interfere with the discharging action. The discharge path has so large a time constant that the CLAMP pulse can discharge the capacitor to only —25 volts before it disappears. The amplitude of the CLAMP pulse and the value of the resistor 689b were chosen to allow a quick discharge of the capacitor when the unit is reading in a zero over a 1, without giving excessively large sharp pulses.

The microsecond delay unit does not delay a pulse in the sense that a delay line does. When given the proper input, the delay unit produces an artificial pulse which is timed accurately, with respect to the timing pulse of the machine. The information input pulse, in effect, gates the SYNC pulse, so that the fast fall of the SYNC pulse can cut off the peaking triode to obtain the peaking action. To fulfill these qualifications, the input pulse must be present both before and while the SYNC pulse falls; therefore, the input pulse may be very poorly shaped or entirely absent during the first 0.6 of a microsecond and still be sufficient. On the other hand, the delay unit produces a uniform output pulse which is up to +10 volts, by 0.2 time. If an input pulse should arrive at 0.8 time, the delay is then only 0.4 microsecond. The only time that a delay unit will produce a delay, of one full microsecond, is when it is fed a pulse that comes up at 0.2 time. Such pulse may be from another or even the same delay unit, as in the instant case. The fact that the pulse may be from the same delay unit, i.e. the output may be fed back to the input, is utilized in conjunction with a holding line to retain information in the delay unit so that it acts as a storage device. It is thus seen that the delay unit has two operative states, one state representing –0– and the other state a –1–. To read an information bit of –1– into the delay unit, the input at terminal 674b is made plus. At the same time the HOLD line, which permits feedback of the output to the input, is rendered negative, as will be described in detail below, so that the data originally in the delay unit cannot be fed back to its own input at the time new data is being applied. If the delay unit contains a –1–, the SYNC pulse will be gated in, to produce another –1–, which will appear during the next microsecond, to gate through the following SYNC pulse, since by this time the HOLD line will be plus again, provided a second bit is not being immediately entered. Storing of a zero is merely the suppression of the SYNC pulses by the —25 volt output of delay unit. The process of storage will continue until the HOLD line is made negative, when new information is read in. It should be noted that at the time new information is read in, it has no effect on the information appearing at its output.

*The clock*

Referring to Figs. 2a and 2b, the Clock circuit is illustrated in block diagram form as well as the primary drive circuits, for the Clock and for the delay units above described. These comprise an oscillator 201 (Fig. 2b) operating at a frequency of one megacycle, whose output feeds via power cathode followers 202 and 203 to a signal generator 204, each of these components, represented in block form only, in Fig. 2b, being constructed as described in detail above and as illustrated in the respective joint detailed circuit diagrams and corresponding block symbols. This will be true throughout the further descriptions. A signal generator 204 receives the output of power cathode follower 203 and feeds to a sync clipper circuit 205, feeding via a power follower 206 to three branch circuits. One of these passes via an inverter 207, a power cathode follower 208, a sync power amplifier 209 and an inverter 214 to the SYNC line L101. The output of the power cathode follower 206 also feeds to a clamp generator 210 whose output passes via a power cathode follower 211 and a clamp amplifier 212 to an inverter 215 feeding to the negative CLAMP line L102. The output of the power cathode follower 206 also passes via a power cathode follower 213 to the Clock Drive Line L103. Signals on the SYNC line L101 and the CLAMP line L102 control the operation of the Delay Units D (Fig. 6bp), described in detail above. The SYNC pulse on line L101 is a positive pulse, having a duration of about 3/10 of a microsecond, and the CLAMP pulse is a negative pulse, having a duration of about 0.2 microsecond. Both pulses occur at the one megacycle rate of oscillator 201. These two pulses are in phase with one another, as required in the operation of the Delay Unit, all as described above.

The signals on the Clock Drive Line L103 are passed through the delay line driver cathode follower 220 and the lumped constant delay line whereby adjustments can be made, as described above, whereby the various registers whose storage elements, per se, comprise Delay Units D are operated in absolute synchronism with the Clock. The output of the delay line feeds via an inverter 222 to the binary input, of a trigger 223 which is shifted, alternately, ON and OFF, by successive signals on the Clock Drive Line L103. The output from the left plate of trigger 223 passes via a cathode follower 225 to a line 226, while the output from the right plate passes via a cathode follower 224 to a line 227.

The Clock comprises a series of cascaded electronic triggers 236 through 247 (Figs. 2b and 2a) of the type as described above. It should be noted that the left grid, of each of the even numbered triggers, receives pulses from the line 227 while the left grids, of the odd numbered triggers, receive their signals from the line 226.

The Clock may be reset, by shifting a switch 228 (Fig. 2b) to its downward position, whereby a positive potential, as indicated, is applied via a resistor 229, a diode 230 and one side of a condenser 231, whose other side is grounded, as shown, to turn ON the trigger 236. Trigger 236 remains ON, as long as the switch 228 is in its downward position. With trigger 236 thus held ON, the signals on lines 226 and 227 will turn OFF any of the remaining triggers which may be ON. Thus the Clock is reset, with trigger 236 only, ON.

Assume that trigger 236 is reset ON, as described above, and that switch 228 is then shifted upward, to the negative potential. As the next signal occurs on line 227, it is passed via a condenser 232 and a diode 233, to turn OFF trigger 236 which emits a negative signal via a cathode follower 250, a condenser 251 and a diode 252, to the next trigger 237 to shift this trigger 237 ON. Thus the signal, on line 227, has been effective to shift the ON condition of trigger 236, to trigger 237. Trigger 237 remains ON, until a negative signal occurs on line 226. This negative signal is passed, via a condenser 253 and a diode 254, to turn the trigger 237 OFF which emits a negative signal, via a cathode follower 255, a condenser and a diode, as shown, to turn ON the trigger 238. Thus, as Clock drive pulses occur alternately on lines 227 and 226, the ON condition of the first trigger of the Clock is stepped rapidly to succeeding triggers of the chain until the last trigger 247 is turned ON. Upon subsequent occurrence of a negative signal on line 226 this last trigger 247 of the chain is turned OFF, and emits a negative signal from its right hand plate which is effective, via a cathode follower 248, line 248a, a condenser 234, and a diode 235, to close the chain by applying this negative signal to the right hand input of the first trigger 236, to turn it ON. This entire cycle of operation may then be repeated. Thus, a closed chain or ring, comprised of cascaded triggers 236 through 247, has one stage only, ON, at any one time, and this ON condition is stepped along, at a one megacycle rate, the entire cycle being repeated, every 12 microseconds. The first trigger 236 is regarded as the zero or HOME stage of the Clock, trigger 237 as the "1" stage, trigger 238 as the "2" stage, etc., and trigger 247 as the "11" stage. The outputs of these triggers are fed via circuits identical to that of the HOME trigger 236, which will now be described.

Referring to this HOME stage trigger 236, its output, as set forth above, passes through the cathode follower 250, to turn ON the next trigger 237. The output of this cathode follower 250, however, is also passed via an amplifier 260, a cathode follower 261 and a plurality of power cathode followers 262 to line L104. In a similar manner, the outputs of triggers 237 through 247, respectively, are passed through identical circuits, to the respective lines L104 through L115. A Timing Diagram illustrating the respective timing of the signals occurring on these lines L104 through L115 is shown in Fig. 2r. These signals occur during all character cycles, regardless of whether the machine is in Execute time, Execute/Regenerate time or Regenerate time. The signals on these lines, occurring during all cycles, may be referred to as follows: The signal on line L106, for example, may be referred to as a negative A2 (D1.0) pulse (Fig. 2r), "A" signifying that the pulse occurs during ALL cycles, "2" signifying it occurs during the "2" time of the particular Clock cycle, as illustrated in Fig. 2r, and (D1.0) signifying that the pulse has a duration of one microsecond, as also illustrated in Fig. 2r.

*Cycle timer*

Referring now to Figs. 2c and 2d which illustrate the circuits of the Cycle Timer, this Timer determines the TYPE of character cycle that the machine is to perform, that is, whether it shall be an Instruction (I) Cycle, an Execute (E) Cycle, an Execute-Regenerate (E/R) Cycle or a Regenerate (R) Cycle. This Cycle Timer has four output lines (Fig. 2d), labeled INST TIME, EX TIME, EX/RGN TIME and RGN TIME. One, and only one, of these outputs is positive, at any one time, and each stays positive for a minimum duration of one Clock cycle or 12 microseconds. The circuits shown may also be regarded as having sub-outputs, labeled I', E' and E'/R'. The latter outputs do not actually affect the machine operation, except that, the Cycle Timer outputs are primed or cocked, so that, as a required Regeneration cycle ends, the machine will then immediately proceed to an I, an E, or an E/R type of cycle, depending upon which one of these three sub-output lines is positive.

The respective control circuits in Fig. 2c labeled Go to Execute, Go to Execute/Regenerate and End of Operation, respectively provide pulses as follows, these being produced as described in detail in said above identified Haddad et al. application or as described below. A Go to Execution signal is a pulse, of one microsecond duration, which occurs at approximately 11 time of the Clock cycle, and causes the line GO TO EX (Fig. 2c), to go positive. This pulse passes via a cathode follower 230b, line 231b, a condenser 231c, and a line 231d to an inverter 232b. This pulse is shaped so that the output of the inverter 232b is a negative pulse, which trips the single-shot multivibrator 233b, which emits a 3 microsecond, positive signal (positive from 11 time of the Clock cycle to 2 time, of the following Clock cycle). This signal passes through a cathode follower 234b via line 235b (Figs. 2c and 2d) to AND circuits 262b and 263b, and also (Fig. 2c) to an OR circuit 248b and via a cathode follower 247b to condition an AND circuit 246b so that a positive A0 (D1) signal, occurring on line L104 passes via power cathode followers 245b, through this conditioned AND circuit 246b and via an inverter 249b and a cathode follower 250b to a line 252b entitled RESET, while the output of the power cathode followers 245b is also fed to a line 251b entitled SET. Thus, under the assumed conditions, the line SET has a positive pulse, of one microsecond duration, occurring at "0" time of the Clock cycle, and the line RESET has a negative pulse at the same time. This negative signal on the line RESET is fed to "minus" AND circuits 260b, 262b and 264b, while the positive signal on the line SET is fed to the plus AND circuits 261b, 263b, 265b and 267b. Under the conditions assumed above, the AND circuits 262b and 263b have positive signals applied thereto, via line 235b, so that the "minus" AND circuit 262b is not properly conditioned and thus the negative signal on line RESET is blocked from passing through this "minus" AND circuit 262b. The plus AND circuit 263b, however, is properly conditioned by the positive signal on line 235b, so that the positive signal on the line SET passes therethrough, and via an inverter 274b, a condenser 291b and a diode 292b acts to turn ON, the trigger 293b, which emits a positive signal via a cathode follower 294b to the line E' (a positive signal on the line E' signifying that the machine is in an E' condition, this being an "internal" priming or cocking condition as stated above). This positive signal on line E' conditions one input of an AND circuit 295b, the other input to this AND circuit 295b being positive, unless, as described below, the machine is in Regeneration. Assuming that the machine is NOT in Regeneration, then the output of the AND circuit 295b is positive, and feeds via an amplifier 296b, a cathode follower 297b and power cathode followers 298b, to drive the line EX TIME, positive, which feeds to various other figures as indicated by the labeling in Fig. 2d. Such a positive signal, on this line EX TIME signifies that the machine is in an Execute type of character cycle.

Assume for purposes of explanation that the machine WAS, in Instruction time, when the GO To Execute signal was received. During Instruction time, a trigger 283b (Fig. 2d) would have been ON and the signal, on a line 216b would be negative. This negative signal is applied to the negative AND circuit 260b and also to the plus AND circuit 261b. The negative signal produced on the RESET line 252b, as described above, then passes through this conditioned negative AND circuit 260b, a cathode follower 271b and a diode 280b, to turn OFF this trigger 283b. Thus, at the same time that the Execute time trigger 293b, is turned ON, by the positive signal on the line SET, as described above, the Instruction time trigger 283b is turned OFF, by the negative signal on the line RESET.

If, on the other hand, the Machine had been in an Execute/Regenerate type of cycle, then a trigger 203c (Fig. 2d) would have been ON, and it would have been reset by the coincidence of negative signals feeding to the negative AND circuit 264b, via the lines 225b and RESET, the output of this negative AND circuit 264b passing via a cathode follower 275b and a diode 200c, to turn the Execute/Regenerate time trigger 203c OFF.

If, instead of a Go To Execution signal, the control circuits had emitted a Go To Execute/Regenerate signal, then a positive signal would occur on line GO TO EX/RGN (Fig. 2c) at 11 time of the Clock cycle, and would pass, via a cathode follower 220b, line 221b, the condenser 221c, line 221d and the inverter 222b to trip the single-shot multivibrator 223b, which, when tripped, emits a 3 microsecond positive signal via a cathode follower 224b and line 225b to the negative AND circuit 264b (Fig. 2d), the AND circuit 265b, and the OR circuit 248b (Fig. 2c). Since this signal is fed to this OR circuit 248b, positive and negative signals occur on lines SET and RESET, respectively, at A0 (D1) as described above. Therefore, as the positive signal on the line 225b conditions the AND circuit 265b, the positive signal occurring on the line SET passes through this conditioned AND circuit 265b, an inverter 276b, a condenser 201c and a diode 202c, to turn the Execute/Regenerate time trigger 203c ON which emits a positive signal, via a cathode follower 204c, to the line E'/R', this line being positive when the "internal" condition of the cycle timer is an Execute/Regenerate cycle. At the same time, if Instruction time trigger 283b or Execute time trigger 293b is ON, each is turned OFF; trigger 283b being turned OFF as described above, and trigger 293b being turned OFF by the coincidence of negative signals on lines 235b and RESET, feeding to the negative AND circuit 262b, whose output passes through a cathode follower 273b and a diode 290b, to turn OFF the trigger 293b.

A positive signal on the line E'/R' conditions one input of an AND circuit 205c, the other input being also positive, provided the machine is NOT in Regeneration time. Therefore, assuming that the machine is NOT in Regeneration time, the output of the AND circuit 205c is positive and passes via an amplifier 208c, a cathode follower 209 and power cathode followers 210c, to drive the line EX/RGN TIME positive, which feeds to other figures as indicated by the labeling. When this line is positive, the machine is in an Execute/Regenerate type of cycle.

Now assume that the control circuits emit an End of Operation signal. This signal drives the line END OF OPN (Fig. 2c) positive for two microseconds, at 10 time of the Clock cycle. This 2 microsecond signal passes through a cathode follower 206b to turn ON a trigger 207b, and also via a cathode follower 209b conditions one input of an AND circuit 210b which, when conditioned, passes the A11 (D1) signal, on line L115, the output of this AND circuit being fed via a cathode follower 211b to a line 212b, and thence via a condenser 222b, line 222c, and an inverter 213b, to trip the single-shot multivibrator 214b, whose 3 microsecond positive output passes through a cathode follower 215b and line 216b to the negative AND circuit 260b (Fig. 2d), the AND circuit 261b and to the OR circuit 248b (Fig. 2c). As this signal is fed to this OR circuit 248b, a positive signal occurs on the line SET and a negative signal occurs on the line RESET, at "0" time of the Clock cycle, as described above. The positive signal on the line SET, passes through the now conditioned AND circuit 261b, and via an inverter 272b, a condenser 231b and a diode 282b, turns ON the Instruction time trigger 283b. At the same time, the negative signal on line RESET passes via the negative AND circuit 262b to turn OFF the Execute time trigger 293b or via the negative AND circuit 264b to turn OFF the Execute/Regenerate time trigger 203c. The output of the trigger 283b, positive when ON, passes through a cathode follower 284b to drive the line I' positive. This positive signal on the line I' conditions an AND circuit 285b, and assuming that the machine is NOT in Regeneration, the output of the AND circuit 285b is then positive, and passes through an amplifier 286b, a cathode follower 287b and power cathode followers 288b to drive the line INST TIME positive, which feeds to other figures as indicated by the labeling in Fig. 2d, this line thus being positive, when the machine is in Instruction time. Thus, it is seen that the machine may be sent to Instruction time, Execution time or Execute/Regenerate time, respectively, by appropriate signals, provided that the machine is NOT in Regeneration. In the event that the machine IS in Regeneration, as the Cycle Timer is set to one of the above mentioned operations, then the machine is regarded as having an "internal" operation, which is represented by the positive signals on line I', E' or E'/R'. It should be noted that when the End of Operation is signalled, the machine enters an Instruction time, provided it is NOT in Regeneration or else enters the Cycle Timer "internal" operation Instruction time, signified by a positive signal on line I'. It should also be noted that the triggers 283b, 293b and 203c are turned ON or OFF, as the case may be, at "2" time of the Clock cycle.

As described above, the trigger 207b (Fig. 2c) is turned ON, at 11 time of the Clock cycle, when an End of Operation is signalled. The output of this trigger 207b passes through a cathode follower 208b to condition one input of an AND circuit 203b. Assuming for the present that Regeneration IS required at the time the End of Operation is signalled, then the second input to this AND circuit 203b, specifically the line RGN REQ, is positive, and, as the A11 (D1) signal, occurs on line L115, it is passed, via this conditioned AND circuit 203b, an OR circuit 204b, a cathode follower 205b, line 240b and a condenser 217b to an inverter 241b. The output of this inverter trips a single-shot multivibrator 242b, which emits a positive signal, via a cathode follower 243b and line 244b, to the negative AND circuit 266b (Fig. 2d) and to the AND circuit 267b. Thus, if Regeneration IS required as an End of Operation is signalled, a 3 microsecond positive signal occurs on the line 244b and conditions the AND circuit 267b, so that the positive signal, occurring on the line SET, passes through this AND circuit 267b, an inverter 278b, a condenser 212c and a diode 213c, to turn ON a Regenerate time trigger 214c which emits a positive signal from its right plate, via an amplifier 218c and power cathode followers 219c, to drive the line RGN TIME positive, which feeds to other figures as indicated by the labeling in Fig. 2d. This line, when positive, signifies that the machine is in Regeneration. Trigger 214c, when ON, also emits a negative signal, via cathode followers 215c and 216c to a line 217c which, when negative, BLOCKS passage, of ANY signals, through the AND circuits 285b, 295b or 205c. Thus, although the Cycle Timer may have an internal operation of I' time, E' time or E'/R' time, as signified by positive signals on the lines I', E', or E'/R', respectively, the external cycle is a Regenerate cycle, due to the fact that the outputs of the AND circuits 285b, 295b and 205c, remain negative, as long as Regeneration is required. The machine is also sent into Regeneration if, for any reason, the machine is stopped, since a positive signal occurs at 11 time, of EVERY character cycle, on the line STOP (Fig. 2c) PROVIDED the machine IS stopped. This signal on the line STOP feeds to the OR circuit 204b, described above, and the output of this OR circuit 204b going positive causes the Regenerate time trigger 214c (Fig. 2d) to be turned ON, as just described above.

Thus it is seen that, as long as Regeneration is required, positive signals occur on line 244b, from 11 time of a Clock cycle to 2 time, of the following Clock cycle, for every character cycle, until such time as Regeneration is no longer required. Circuits, which determine how much Regeneration is required and "tailor" the amount of Regeneration to such requirements, are described below.

Assuming that Regeneration is no longer required, as long as the machine is not in a Stop condition, a one microsecond positive signal occurs, at 0 time, on the line NO STOP (Fig. 2d) and passes through an inverter 269b and a cathode follower 270b to one input of the negative AND circuit 266b. The negative AND circuit 266b is conditioned, at that time, since the line 244b is negative, this line being negative except when the single-shot multivibrator 242b is fired. Upon coincidence of the negative inputs, the output of the negative AND circuit 266b is negative, and therefore passes via a cathode follower 277b and a diode 211c to turn OFF the Regenerate time trigger 214c. Trigger 214c, going OFF, through the circuits described above, causes the line REGN TIME, to go NEGATIVE, which signifies that the machine is NOT in Regeneration time, and also via the cathode followers 215c and 216c causes line 217c, to go positive, so that the internal cycle of I', E' or E'/R', will, as the case may require, cause the machine to go into an Instruction time, an Execute Time or an Execute/Regenerate time. As Regeneration is completed, the line RGN COMPLETED (Fig. 2c) conditions one input of an AND circuit 201b so that, as one microsecond signals occur on line L104, at 0 time of the Clock cycle, they pass through this AND circuit 201b and a cathode follower 202b, to turn OFF the trigger 207b. Trigger 207b, going OFF, acts via the cathode follower 208b to remove a conditioning potential from the AND circuit 203b, so that thereafter, as Regeneration is required, it does NOT take effect UNTIL an End of Operation occurs, to turn ON trigger 207b.

Refer now to Fig. 2q which illustrates representative pulse mixing circuits for mixing Clock pulses and Cycle Timer signals to obtain desired waveforms. These circuits are representative only and it should be understood that they may be duplicated and provided with other inputs to make available signals other than those specifically mentioned.

An AND circuit 202h is conditioned by a coincidence of positive signals on line EX/RGN TIME, via the cathode follower 201h, and on line L106. Therefore if the machine is in an Execute/Regenerate cycle, the A2 (D1) Clock pulse on line L106 is gated through this conditioned AND circuit 202h and applies a signal via a cathode follower 203h to line E/R 2 (D1); the signal on this line thus being a pulse occurring during E/R time at 2 time of each cycle and having a duration of one microsecond.

A trigger 204h is turned ON, at 6 time of the Clock cycle by an A6 (D1) pulse on line L110, and is turned OFF at 8 time of every Clock cycle by an A8 (D1) pulse on line L112. Thus trigger 204h is ON, from 6 time to 8 time, of every Clock cycle, and emits a positive signal via a cathode follower 205h to line A6 (D2); the signal on this line thus being positive for two microseconds at 6 time of every Clock cycle.

AND circuits 206h and 209h are conditioned during every Execute/Regenerate cycle by a positive signal on the line EX/RGN TIME. While these AND circuits are thus conditioned, an A6 (D1) pulse on line L110 passes through the AND circuit 209h and via line 213h turns trigger 210h ON. Three microseconds later, an A9 (D1) pulse, on line L113, passes via the AND circuit 206h, an amplifier 207h, and a cathode follower 208h to a line 212h, to turn this trigger 210h OFF. The trigger 210h, while ON, emits a positive output via a cathode follower 211h to line E/R 6 (D3); the signal on this line thus being positive for three microseconds starting at 6 time of each Execute/Regenerate cycle.

*Selective regeneration control*

The Regeneration Control circuits, which emit signals to the Cycle Timer via lines RGN COMPLETED and RGN REQUIRED (each line signifying, respectively, when positive, that Regeneration is Completed, or Regeneration is Required), are shown in Figure 2e. The Regeneration Control circuits have two functions: 1st, to INSURE that there are, AT LEAST THREE cycles of Regeneration per Instruction, and 2nd, SUBSEQUENT to CERTAIN Instructions (such as MULTIPLY or DIVIDE), the FIRST TWELVE INSTRUCTIONS, following such operations, DO NOT REQUIRE Regeneration, that is, the REQUIREMENT of AT LEAST THREE Regeneration cycles per Instruction, IS WAIVED. In the case of a MULTIPLY or a DIVIDE operation, as stated above, a large number of Execute/Regenerate cycles take place during the carrying out of such Instructions, so that a SURPLUS of Regeneration ensues. In order to more efficiently employ the machine, it has been determined that for the first twelve Instructions, following the operations of MULTIPLY and DIVIDE, the requirement of three Regeneration Cycles, per Instruction, is waived. Of course, if the particular Instructions following a MULTIPLY or a DIVIDE operation include Execute/Regenerate cycles, as part of their operation, a certain amount of Regeneration DOES take place, but otherwise the surplus Regeneration is eaten up, so to speak, and the machine "rides" on the accumulated SURPLUS. Thus the machine can be pushed nearer to optimum operation with minimum required Regeneration.

To INSURE that THREE Regeneration cycles DO take place during each operation, and TO DISPENSE with such a requirement, for the FIRST TWELVE operations FOLLOWING a MULTIPLY or a DIVIDE operation, two counters are provided. One of these comprises a scale-of-three counter which insures that three Regeneration cycles will occur, per operation, while the other counter comprises a scale-of-13 counter to insure that for the twelve operations, following a MULTIPLY or a DIVIDE operation, the usual requirement of three Regeneration cycles, per operation, is dispensed with. The output of either counter may indicate that Regeneration is Completed.

The scale-of-three counter is a two stage counter comprising triggers 265c and 267c (Fig. 2e) which is reset, to a count of zero (both triggers OFF) during every Instruction time, by a positive signal produced on the line INST TIME (Figs. 2d and 2e) as described above. This positive signal on line INST TIME conditions one input of an AND circuit 240c whose other input is an A2 (D1) signal on line L106. The output of this AND circuit 240c, which is one microsecond pulse occurring during 2 time, of each Instruction cycle, passes through a cathode follower 241c and via line 242c, to turn OFF the two triggers 265c and 267c of the scale-of-three counter. Thus these triggers 265c and 267c are reset OFF, as the machine enters Instruction time. As stated above, REGENERATION of Memory occurs during both Execute/Regenerate cycles and Regenerate Cycles and consequently, if a positive signal occurs on line EX RGN TIME (Fig. 2e) or line RGN TIME, it passes through an OR circuit 260c and a cathode follower 261c to drive line 262c positive to thus condition one input of an AND circuit 263c. A second input to this AND circuit 263c, is via the line L106 (an A2 (D1) signal). The third input is via a line 274c, which line is positive, as described below, until both triggers 265c and 267c of the scale-of-three counter are ON. Thus, the A2 (D1) passes through the AND circuit 263c and an inverter 264c to the trigger 265c, shifting the latter ON. The next A2 (D1) signal occurring while the AND circuit 263c is so conditioned, passes through and turns OFF this trigger 265c which emits a negative signal, to thus turn ON the trigger 267c. The third A2 (D1) signal passed through this conditioned AND circuit 263c turns ON trigger 265c. Therefore, after three Regenerate and/or Execute/Regenerate cycles, BOTH triggers 265c and 267c are ON to indicate a count of THREE. (It should be noted that these cycles may be either Regenerate or Execute/Regenerate cycles.) The output from the right plate of trigger 265c is applied via a cathode follower 266c and line 269c as one input to an AND circuit 271c while the right plate output of the trigger 267c passes via a cathode follower 268c and line 270c to provide the remaining input to this same AND circuit 271c. If either trigger 265c or 267c is OFF, the output of this AND circuit 271c is negative, and via an inverter 272c and a cathode follower 273c, drives line 274c positive, to thus help maintain the AND circuit 263c conditioned, as stated above.

However, when BOTH triggers 265c and 267c go ON to indicate a count of THREE, both inputs to the AND circuit 271c are positive, and the line 274c goes negative to thus REMOVE a conditioning potential, from this AND circuit 263c. Therefore, after THREE Regeneration cycles have taken place, between Instructions, whether they are Regenerate cycles or Execute/Regenerate cycles, the triggers 265c and 267c are ON, and remain ON, until they are reset OFF, during the following Instruction time.

The signal on line 274c also feeds to an AND circuit 284c whose other input line 280c is, as described below, normally positive. Thus, assuming that the signal on line 280c is positive, it is the output of the cathode follower 273c, via line 274c, which controls the output of the AND circuit 284c. As stated above, this line 274c is positive until THREE Regeneration cycles have occurred, whereupon it goes negative. This negative signal, feeding to the AND circuit 284c, causes its output to go negative. Therefore the output of this AND circuit 284c is positive, only as long as line 274c is positive (assuming line 280c is positive). The output of this AND circuit 284c, when positive, is passed via a cathode follower 285c to drive the line REGN REQ positive. When the count of THREE is reached, and the signal on line 274c goes negative, the output of this AND circuit 284c goes negative, and the line REGN REQUIRED goes negative, which signifies that Regeneration is no longer required. This negative signal is passed via an inverter 286c and a cathode follower 287c to drive the line RGN COMPLETED positive (which signifies that Regeneration has been completed).

The other input to the AND circuit 284c, via line 280c, is the output from the scale-of-thirteen counter, which during the twelve Instructions, following a MULTIPLY or a DIVIDE operation, waives the usual requirement of three Regeneration cycles per Instruction. Input signals on lines MPY and DIV, feeding to an OR circuit 245c, are positive, when the operation is MULTIPLY or DIVIDE, respectively. Thus, if the operation is MULTIPLY or DIVIDE, a positive signal is passed through this OR circuit 245c and via line 246c conditions one input of an AND circuit 247c. The other input to this AND circuit 247c is via the line EX TIME, which, when positive, signifies that the machine is in an Execute time.

As mentioned above, the machine is in Execute time, for only one character cycle, during a MULTIPLY or DIVIDE operation, this being the single character cycle when the Multiplicand is read, out of Memory, into the Memory Register. Thus, during the Execute cycle of a MULTIPLY or DIVIDE operation, the output of the AND circuit 247c is positive, and is fed via a cathode follower 248c and line 249c, to RESET the triggers 251c through 254c, to OFF condition to thus reset the scale-of-thirteen counter to zero. (The triggers 251c through 254c are normally reset to ON condition, when the Machine is first started, as signified by the small "x," at the left in each block symbol, this "x" indicating that the left side is conducting.) These triggers 251c, 252c, 253c, and 254c, when ON, represent, respectively, the weighted values "1," "2," "4," "8." The right plate outputs of triggers 251c, 253c and 254c are fed via cathode followers 255c, 256c and 257c and lines 275c, 276c, and 277c, respectively, to the AND circuit 278c. Until all three triggers 251c, 253c and 254c are ON, at least one of the three inputs to the AND circuit 278c is negative and its output is thus negative.

The output of the AND circuit 278c, when negative, is passed via a cathode follower 279c, line 280c, an inverter 281c, and a cathode follower 282c to drive line 283c positive, which conditions one input of the AND circuit 243c, so that as the one microsecond pulse occurs on line 242c during each Instruction cycle (produced by the A2 (D1) pulses on line L106), they are passed through this AND circuit 243c and an inverter 244c, to the trigger 251c. Thus the scale-of-thirteen counter comprising the four triggers 251c through 254c is stepped, one count, for each Instruction cycle, subsequent to a MULTIPLY or a DIVIDE operation (which resets the counter as described above), until the particular triggers 251c, 253c and 254c are simultaneously ON, thus representing a count of 13, at which time the plus output from the thus conditioned AND circuit 278c is inverted to negative by inverter 281c to thus remove the conditioning from the AND circuit 243c, so that no more pulses pass to step the counter. Thus, after 13 Instruction cycles have occurred, subsequent to a MULTIPLY or a DIVIDE operation, the three triggers 251c, 253c and 254c are all ON, to thus condition all three inputs to the AND circuit 278c, and its output goes positive which, via cathode follower 279c, drives line 280c positive, which in addition to removing the conditioning from the AND circuit 243c, as just described, also conditions the AND circuit 284c so that it will once more pass a positive potential on line 274c to thus render line RGN REQUIRED positive. It is to be particularly noted that for 13 Instruction cycles, subsequent to a MULTIPLY or a DIVIDE operation, while the scale-of-thirteen counter is counting these 13 Instruction cycles, the output of AND circuit 284c is negative, so that via the inverter 286c line RGN COMPLETED is positive (signifying that Regeneration is Completed). It is only after 13 Instruction cycles have been counted that the triggers 251c, 253c and 254c reach ON conditions, line 280c goes positive, and control of Regeneration, that is, whether or not Regeneration is required, is again turned over to the control of the scale-of-three counter. It is only during the thirteenth Instruction, following a MULTIPLY or a DIVIDE operation, that the line 280c, goes positive and remains positive, until a MULTIPLY or a DIVIDE operation again occurs, to thus reset the triggers 251c through 254c OFF. Thus it is seen that twelve Instructions are completed, before the scale-of-three counter is again allowed to take control. The scale-of-three counter takes over, to ensure that three Regeneration cycles will occur (may be Regenerate or Execute/Regenerate cycles) during each Instruction, UNLESS a MULTIPLY or a DIVIDE operation occurs. As stated above, during MULTIPLY or DIVIDE operations there is a SURPLUS of Regeneration, and by "riding" on this accumulated surplus in the manner just described, the usual requirement of three Regeneration cycles per operation IS WAIVED for TWELVE Instructions.

Signals on the lines RGN REQUIRED and RGN COMPLETED feed to the Cycle Timer (Fig. 2c) as described above, and cause the machine to go into Regenerate cycles only if Regeneration is required, at the completion of each operation, that is, as an End of Operation signal is emitted.

*Memory register*

Refer now to Fig. 2f which is a block diagram of the Memory Register. The circuitry for positions 1 through 17 is identical to the circuits, shown in block form, for position S, while the circuitry for positions 18 through 35 is identical to the circuits shown, for position 18. Information is read from the Memory Units I and II, and applied to the Memory busses, as described fully below, in full or half words. A full word is thirty-six bits, comprising a Sign bit and the binary bits 1 through 35. A half word is eighteen bits and may comprise bits S, and 1 through 17, read from Memory positions S, and 1 through 17, or may comprise bits 18 through 35, the 18th bit serving as the Sign bit, these again being read from Memory, but from bit positions 18 through 35, thereof as indicated schematically in Fig. 2t. Whenever a full word is read, from Memory, the full word is read into the full Memory Register, that is, positions S, and 1 through 35 thereof. A half word, however, on being read from Memory, regardless of which half is being read, is read into the Memory Register positions S, and 1 through 17, as illustrated schematically in Fig. 2t.

The Memory busses MEM BUS S, and MEM BUS 1 through MEM BUS 35, go positive, when binary 1's are read from the corresponding respective Memory positions but remain, relatively negative, when binary 0's are read. The Delay Unit 295c (Fig. 2f) of the Memory Register position S, emits a positive output signal, when a binary 1 is stored therein, but a negative output signal, when a binary 0 is stored therein. As stated above, the output of any Delay Unit is fed back to its input, the Delay Unit 295c, for example, feeding back from its output to its input via an AND circuit 292c, provided that the line HOLD MEM REG (S–17) is positive to thus condition this AND circuit and permit this feed back. Assuming this AND circuit is so conditioned and that the Delay Unit 295c contains a binary 1, its output is positive and passes through this AND circuit 292c to an OR circuit 293c and a cathode follower 294c to thus feed back a positive signal into the input of Delay Unit 295c. If this Delay Unit 295c contains a binary 0, its output is negative and therefore the fed back input thereto is also negative, even though the line HOLD MEM REG (S–17) is positive.

If Read-In to the Memory Register S position is to be made from the Memory position S, via the line MEM BUS (S), control circuits as shown and described in said above identified Haddad et al. application cause the line MEM BUS (S–17) TO MEM REG (S–17) to go positive and line HOLD MEM REG (S–17) to go negative which latter BREAKS the recirculating circuit of the Delay Unit 295c to effectively erase the previous registration of a binary 1 or a binary 0, recirculating in this Delay Unit. If the input via the line MEM BUS (S) is negative, the new input to this Delay Unit 295c is negative and a binary –0– is READ INTO this Delay Unit from the corresponding Sign order in Memory, thus representing a plus Sign. However, if the line MEM BUS (S) leading to the AND circuit 291c is positive, thus representing a binary –1–, since the other input to this AND circuit 291c is positive, its positive output passes via the OR circuit 293c and the cathode follower 294c to the Delay Unit 295c so that a positive signal is fed to this Delay Unit to store a binary –1– in the Sign order, which binary –1– represents a minus sign. The line MEM BUS (S–17) TO MEM REG (S–17) then goes negative and removes conditioning from the AND circuit 291c while at the same time the line HOLD MEM REG (S–17) goes positive so that the recirculating circuit is again established, to HOLD the stored binary –0– or binary –1–.

Information is also read from Memory position 18 to this Memory Register S position, when the control circuits cause line MEM BUS (18–35) TO MEM REG (S–17) to go positive and line HOLD MEM REG (S–17) goes negative. Thus the recirculating circuit is again broken, as described above, to erase the previous storage, but this time an AND circuit 290c is conditioned by the line MEM BUS (18–35) TO MEM REG (S–17) being positive. While this AND circuit 290c is thus conditioned, a positive signal, on line MEM BUS (18) passes through this AND circuit and via the OR circuit 293c and the cathode follower 294c feeds into the Delay Unit 295c. Therefore, if line MEM BUS (18) is positive, signifying a binary –1–, a positive signal input to the Delay Unit 295c causes a binary –1– to be stored therein. If the signal on line MEM BUS (18) is negative, the input to the Delay Unit is negative and a binary –0– is stored. After gating the holding of line MEM BUS (18) to the Delay Unit, line MEM BUS (18–35) TO MEM REG (S–17) goes negative, to remove conditioning from the AND circuit 290c and line HOLD MEM REG (S–17) goes positive to again activate the recirculating circuit. Thus it is seen that the Memory Register S position can be READ INTO from either Memory position S or Memory position 18.

The Memory Register positions S, and 1 through 17, receive common control signals and respective inputs, from either corresponding Memory positions or Memory positions, eighteen positions higher. For example, Memory Register position 1 receives inputs either from Memory position 1 or 19, via the respective lines MEM BUS (1) and MEM BUS (19) while Memory Register position 17 receives inputs either from Memory position 17 or 35, via the respective lines MEM BUS (17) and MEM BUS (35). The lines MEM BUS (S–17) TO MEM REG (S–17), MEM BUS (8–35) TO MEM REG (S–17) and HOLD MEM REG (S–17) feed to all Memory Register positions S through 17. Thus, if line HOLD MEM REG (S–17) goes negative, while line BUS (S–17) to MEM REG (S–17) goes positive, information may be read, from Memory positions S through 17, to Memory Register positions S through 17, respectively. If, however, the line HOLD MEM REG (S–17) goes negative, while line MEM BUS (18–35) TO MEM REG (S–17) goes positive, information may be read from Memory positions, 18 through 35, to Memory Register positions, S through 17, respectively. Thus it is seen (as shown clearly in Fig. 2t) a half word may be read FROM Memory positions, S through 17, or FROM Memory positions, 18 through 35, TO Memory Register positions S through 17.

The Memory Register positions 18 through 35, as represented by the block circuit illustrated for Memory Register position 18, may receive information ONLY from a corresponding Memory position. The AND circuit 297c of position 18, corresponds in operation to the AND circuit 292c of S position while the AND circuit 296c corresponds, in operation, to the AND circuit 291c. Positive outputs from the AND circuits 296c and 297c of this 18th position pass via an OR circuit 298c and a cathode follower 299c to a Delay Unit 201c. Hence information may be read, from Memory position 18, via the line MEM BUS (18), into the Memory Register 18 position, when the line HOLD MEM REG (18–35) goes negative, and line MEM BUS (18–35) TO MEM REG (18–35) goes positive. Since the Memory Register positions 19 through 35 receive inputs via lines MEM BUS (19) through MEM BUS (35), respectively, and from lines HOLD MEM REG (18–35) and MEM BUS (18–35) TO MEM REG (18–35), information may be read into these Memory Register positions 18 through 35 from Memory positions 18 through 35. Information is read into the Memory Register positions 18 through 35 ONLY when a full word is read from Memory. A full word may be read from Memory when lines HOLD MEM REG (S–17) and HOLD MEM REG (18–35) go negative, while lines MEM BUS (S–17) TO MEM REG (S–17) and MEM BUS (18–35) TO MEM REG (18–35) go positive, to thus gate the holding of Memory busses S, and 1 through 35, to Memory Register positions S, and 1 through 35, respectively.

As indicated by the labeling in Fig. 2f, the outputs from the Memory Register positions S, and 1 through 35, feed to corresponding positions, in the Adder, and in the MQ Register, while positions S and 1 through 17 also feed to corresponding positions, in the Instruction Register.

The manner in which data is read FROM Memory under control of numbered addresses is illustrated schematically in Fig. 2t. Fig. 2t (1) illustrates read out of a full word, that is a Sign and 35 bits, from Memory positions, to "corresponding" positions in the Memory Register. Full word address numbers have a negative Sign and are EVEN numbered. Fig. 2t (2a) illustrates read out of half words, the addresses of such half words having positive Signs and being EVEN numbered if information is read from the left half word positions S, and 1 through 17, of the Memory location (as indicated by the shaded portion) into "corresponding" Memory Register positions. If the half word address has a positive Sign and is ODD numbered then, as shown in Fig. 2t (2b), information is read from the right half word positions 18 through 35 of Memory (as indicated by the shaded portion) into the positions S, and 1 to 17 inclusive of the Memory Register.

*Memory buss switches*

Refer now to Fig. 2s, which is a block diagram of the Memory Buss Switches. The circuitry for positions 1 through 17 is identical to the circuits, shown in block form, for position S, while the circuitry for positions 18 through 35 is identical to the circuits shown in block form for position 18. Information may be WRITTEN in Memory in either full or half words, from the Accumulator Register, as illustrated schematically in Fig. 2u (1) or from the MQ Register (Figs. 1b and 1a) in full or half words. A full word comprises the Sign bit and bits one through 35 (the overflow positions of the Accumulator Register are not permitted to be stored in Memory as is seen from Fig. 2u (1). A half word is 18 bits in length and may be WRITTEN in Memory from the Accumulator Register bits S, and 1 through 17, as illustrated schematically in Fig. 2u (2a) or from the MQ Register bits S, and 1 through 17, to either the Memory busses S, and 1 through 17, or to the Memory busses 18 through 35. Whenever the Instruction STORE is given, with a full word address, a full word, from positions S, and 1 through 35, of the Accumulator Register (see also Fig. 2u (1)) are gated through the Memory Buss Switches (Fig. 2s) to Memory busses S, and 1 through 35, respectively.

Whenever, a STORE MQ Instruction is given, with a full word address, positions, and 1 through 35, of the MQ register, are gated via the Memory Buss Switches to the Memory busses S, and 1 through 35.

However, if an Instruction STORE is given with a half word address, the half word is taken from positions S, and 1 through 17, of the Accumulator Register and this half word is gated through the Memory Buss Switches, positions S, and 1 through 17, for an EVEN half word address, or through Memory Buss Switches, positions 18 through 35, for an ODD half word address. Likewise, if a STORE MQ Instruction is given, with a half word address, bits S, and 1 through 17, of the MQ Register are gated, through Memory Buss Switches, positions S, and 1 through 17, to the Memory busses S, and 1 through 17, for an EVEN half word address but are gated through the Memory Buss Switches, positions 18 through 35, to the Memory busses 18 through 35, respectively, for an ODD half word address.

Lines ACC REG (S) through ACC REG (35) of Fig. 2s are positive, when binary 1's are stored in the respective corresponding Accumulator Register positions, but are relatively negative, when binary 0's are stored. Likewise, lines MQ REG (S) through MQ REG (35) are positive, when binary 1's are stored in their respective corresponding MQ Register positions, but are relatively negative, when binary 0's are stored. If WRITING in Memory is from the Accumulator Register, as a result of a STORE Instruction, with either a full or even half word address, the line ACC REG (S–35) TO MEM BUS (S–35) of Fig. 2s, goes positive, and conditions the AND circuit 215h and corresponding AND circuits, in positions 1 through 17, and also, the AND circuit 219h in position 18 and corresponding AND circuits in positions 19 through 35. When the AND circuit 215h is thus conditioned, a positive signal, on the line ACC REG (S) is gated through this AND circuit, and its output passes via an OR circuit 217h and a power cathode follower 218h, to the line MEM BUS (S). The outputs of the Accumulator Register positions, 1 through 17, are similarly gated through the respective Memory buss positions, 1 through 17, as the respective AND circuits are conditioned. When the AND circuit 219h of the Memory Buss Switch position 18 is conditioned, a positive signal, on the line ACC REG (18) passes via this AND circuit, an OR circuit 223h and a power cathode follower 224h, to the line MEM BUS (18). The Accumulator Register positions 19 through 35 are similarly gated through corresponding Memory Buss Switch positions, to the respective Memory busses. Thus, it is seen that if a STORE Instruction is given, with a full word address, the holding of the Accumulator Register positions S, and 1 through 35, are gated to the Memory Busses S, and 1 through 35, respectively. If an EVEN half word address is given, the same operation takes place, that is, Accumulator Register positions S, and 1 through 35, are gated through to the Memory Busses S, and 1 through 35, respectively. HOWEVER, even though with an EVEN half word address, information in the form of binary 1's and binary 0's IS PRESENT on the Memory Busses S, and 1 through 35, as described below, ONLY the portions of Memory which store the information from Memory Busses S, and 1 through 17, ARE UNBLANKED. The portions of Memory for storing bits, 18 through 35, are NOT UNBLANKED. Therefore, even though information appears on Memory Busses 18 through 35, this information is NOT stored in Memory.

As illustrated schematically in Fig. 2u (2b), if an ODD half word address is given, with the STORE Instruction, the line ACC REG (S–17) TO MEM BUS (18–35) goes positive, to condition the AND circuit 220h (Fig. 2s) of the 18 position of the Memory Buss Switches and corresponding AND circuits in the Memory Buss Switches positions 19 through 35. The other input to this AND circuit 220h is from the Accumulator Register Sign position appearing on line ACC REG (S), and if a binary –1– is stored in that position, both inputs to the AND circuit 220h are positive and its output passes via the OR circuit 223h and the cathode follower 224h, to the line MEM BUS (18). In a similar manner, the information in Accumulator Register positions, 1 through 17, inclusive, are gated through the Memory Buss Switches positions 19 through 35 to Memory Busses 19 through 35 respectively, while the line ACC REG (S–17) TO MEM BUS (18–35) is positive.

Thus, it is seen that if an ODD half word address is given with a STORE Instruction, information from the Accumulator Register positions S, and 1 through 17, are gated through the Memory Buss Switch positions 18 through 35 to the Memory Busses 18 through 35. No information is gated to the Memory Buss positions S through 17. The information on the Memory Busses 18 through 35, for an ODD half word address, are stored, as described below, in Memory positions 18 through 35, inclusive.

Identical circuits are used for gating the holding of the MQ register positions S, and 1 through 35, to the Memory Busses S and 1 through 35, respectively. For example, the line MQ REG (S), as shown in Fig. 2s, feeding to an AND circuit 216h is gated through this AND circuit provided the line MQ REG (S–35) TO MEM BUS (S–35) is positive; the latter line being positive to gate either a full or an EVEN half word from the MQ Register to Memory. Likewise, the line MQ REG (S–17) TO MEM REG (18–35) is effective to condition an AND circuit 222h of the Memory Buss Switches 18 position, and corresponding AND circuits in positions 19 through 35, to gate a half word to an ODD half word address, the half word being gated from the MQ Register positions S, and 1 through 17, to the Memory Busses 18 through 35, inclusive.

The manner in which numbered addresses are used to WRITE information in Memory is illustrated in Fig. 2u. Fig. 2u (1) illustrates the storing of a full word comprising a Sign and bits 1 to 35, inclusive, from the Accumulator Register to corresponding positions in Memory. The overflow positions are not stored. Fig. 2u (2a) illustrates WRITING a half word in an EVEN address in Memory and Fig. 2u (2b) in an ODD address. If the half word address is an EVEN number, information from positions S, and 1 through 17 of the Accumulator Register is WRITTEN into "corresponding" positions in Memory. If the address is an ODD number, information from the Accumulator Register positions S, and 1 through 17 is WRITTEN into positions 18 through 35 in Memory. Information is gated from the MQ Register to Memory in a similar manner.

*Instruction Register*

The Instruction Register (Figs. 2g, 2h, 2i) comprises 18 trigger circuits which normally receive information from the Memory Register during Instruction cycles, as indicated by the cabling between the Memory Register and the Instruction Register (Figs. 1b and 1c). The Instruction Register is functionally sub-divided as follows: One trigger 262d (Fig. 2g) is provided for storing the manifestation of the Sign bit. Triggers 263d through 267d (Fig. 2g) comprise the Operation portion of the Instruction Register comprising bits 1 through 5, and store representations of these bits, 1 through 5; the permutations of ON and OFF conditions of these triggers indicating the respective operations desired. Triggers 293d through 296d (Fig. 2h) comprise the Address Register part of the Address portion of the Instruction Register. This Address portion is further functionally sub-divided, and in addition to this Address Register which stores representations of bits 6 through 9, it includes the Address Counter portion comprising triggers 240e through 247e (Fig. 2i) for storing the representations of the bits "10" through "17."

The outputs of the Instruction Register control the operation of the machine, during Execution time. It is during Execution time that the contents of the Operation portion of the Instruction Register, that is, the ON and OFF permutations of the triggers storing the respective indications of bits 1 through 5, control the Operation Decoder (Figs. 1d, 5a and 5b) selectively, so that its respective outputs indicate the respective operations, called for by the particular ON and OFF permutation, these operations being for example, ADD, SUBTRACT, MULTIPLY, DIVIDE, etc. The remainder of the Instruction Register, that is, the Sign bit trigger 262d (Fig. 2g) and the triggers for bits 6 through 17, pick the Address, in Memory, from which the data is to be obtained which is employed in the operation as determined by the Operation part of the Instruction Counter manifestations.

The Address Counter, per se, of the Address portion of the Instruction Register is used, not only to control the deflection of the cathode ray beams to select the desired Address, in Memory, but is also used, during such operations as MULTIPLY and DIVIDE, to insure that a correct number of character cycles have occurred.

Referring specifically to Figs. 2g, 2h and 2i and assuming that the Machine enters Instruction time, and referring further to the right hand section of Fig. 2h, signals on lines L108, L109 and L110 are fed to an OR circuit 289d whose output passes via a cathode follower 290d, to condition one input of an AND circuit 291d. The other input to this AND circuit 291d is positive, during Instruction time via the line INST TIME, rendered positive during Instruction time, as described above, by the circuits of the Cycle Timer (Fig. 2d). The output of this AND circuit 291d passes via a cathode follower 292d to the line I4 (D3) which feeds to the triggers 262d through 267d (Fig. 2g) and 293d through 296d (Fig. 2h) and to an inverter 205e (Fig. 2i). As will now be understood from the explanation of the signal labeling, given above, the signal on line I4 (D3) is a signal occurring every Instruction cycle, at 4 time, with a duration of three microseconds, and is effective during each Instruction time to turn OFF the triggers 262d through 267d (Fig. 2g) which comprise the Operation part of the Instruction Register and to turn OFF the triggers 293d through 296d (Fig. 2h), which comprise the Address Register portion of the Instruction Register. This I4 (D3) signal passes through the inverter 205e (Fig. 2i) to the line —I4 (D3), this latter line going negative at I4 time for a period of three microseconds and feeding to the triggers 240e through 247e (Fig. 2i) which comprise the Address Counter, this negative I4 (D3) signal turning these triggers ON. Thus, shortly after I4 time, of each Instruction cycle, the triggers 262d through 267d of the Operation part of the Instruction Register and 293d through 296d of the Address Register are reset OFF, while triggers 240e through 247e of the Address Counter are reset ON. Thus the Operation portion triggers and the Address Register triggers store binary 0's while the Address Counter triggers store binary 1's at this time. The signals on lines MEM REG S (bottom of Fig. 2g) and MEM REG 1 through MEM REG 17 (bottom of Figs. 2h and 2i) represent the outputs of the Memory Register bits S, and 1 through 17, respectively (see Figs. 1b, 1c and 2f), and these lines are respectively positive, if the respective bit representations stored in the Memory Register represent binary 1's. Conversely, if the respective bit representations stored in the Memory Register represent binary 0's these lines are relatively negative. The line MEM REG S (Fig. 2g), if positive, conditions one input of an AND circuit 256d, that is, it conditions this AND circuit provided the Delay Unit for the Sign bit of the Memory Register is storing a manifestation of a binary 1, which binary 1 has been selected to indicate a negative Sign. The lines, MEM REG 1 through MEM REG 5, when positive and thus representative of binary 1's, condition one input of respective AND circuits 250d through 254d, while the lines MEM REG 6 through MEM REG 9 (Fig. 2h) condition one input of respective AND circuits 280d through 283d. The lines MEM REG 10 through MEM REG 17 (Fig. 2i) when NEGATIVE, condition one input of respective "NEGATIVE" AND circuits 206e through 213e. It should be noted that these negative AND circuits 206e through 213e are conditioned when the manifestations of the bits 10 through 17 stored in the Memory Register represent binary 0's.

During Instruction time, a positive signal on the line INST TIME (lower right portion of Fig. 2i) conditions one input of an AND circuit 230e so that a positive A10 (D1) signal on line L114 is gated through this AND circuit and a cathode follower 231e, to provide an I10 (D1) signal (a one microsecond duration signal, occurring at 10 time, of an Instruction cycle) on the line MEM REG TO INST REG. This I10 (D1) signal is fed to the Operation portion AND circuits 250d through 254d (Fig. 2g) and to the Address Register portion AND circuits 280d through 283d (Fig. 2h) and will pass through the particular AND circuits which are selectively conditioned, by positive outputs on the lines MEM REG 1 through MEM REG 9, and the outputs, of these selectively conditioned AND circuits, pass via cathode followers 257d through 261d, and 284d through 287d, respectively, to selectively turn ON corresponding ones only, of the triggers 263d through 267d, and 293d through 296d. Thus the Memory Register Delay Units manifestations of binary –1– or binary –0–, respectively, of bits 1 through 9 are transferred, bodily, to the Operation triggers (bits 1 through 5) of the Instruction Register and to the triggers of the Address Register (bits 6 through 9) of the Instruction Register. Simultaneously, the signal I10 (D1) feeds to the Sign AND circuit 256d (Fig. 2g) and provided that the Sign of the word stored in the Memory Register is negative, under which conditions the line MEM REG S is positive, this signal I10 (D1) passes through the thus conditioned AND circuit 256d, and via a cathode follower 255d turns ON the Sign trigger 262d.

The negative CLAMP signal on line L102 (see Fig. 2b), which feeds to the various Delay Units D throughout the machine, for example to the Delay Units comprising the storage elements, per se, of the Memory Register, is also passed through an inverter 232e (Fig. 2i), a delay line 233e and a cathode follower 234e, to a line DELAYED CLAMP, which conditions one input of an AND circuit 235e. The other input to this AND circuit 235e is the positive I10 (D1) signal on the line MEM REG TO INST REG. The output of this AND circuit 235e passes via an inverter 236e and cathode followers 237e and 238e to the line MEM REG TO INST REG, which goes negative when the Memory Register is to be gated to the Instruction Register. This negative signal on line —MEM REG TO INST REG feeds to the negative AND circuits 206e through 213e, and passes through those particular negative AND circuits which are selectively conditioned, by negative signals, signifying that a binary 0 representation exists in selected ones of the lines MEM REG 10 through MEM REG 17. Thus, these signals pass selectively through the negative AND circuits 206e through 213e and via cathode followers 216e through 223e, to turn OFF, selected ones of the triggers 240e through 247e, respectively. Thus, if a binary 0 is stored in a particular bit storage element of the Memory Register (that is in certain ones of the storage elements for bits 10 through 17) the respective trigger of the Address Counter (bits 10 through 17) is pulled OFF. For example, if the Memory Register 10 bit is a binary 0, then the line MEM REG 10 feeding to the negative AND circuit 206e, is negative. Since there is a negative signal on line —MEM REG TO INST REG, a signal passes through the conditioned negative AND circuit 206e and the cathode follower 216e, to turn OFF the trigger 240e, indicative of the "10" bit stored in the 10 bit storage element of the Memory Register.

Thus during an Instruction cycle, the Instruction Register is SET to the holding of the Memory Register or in other words the Memory Register is "dumped" into the Instruction Register. The triggers of the Address Counter subportion of the Instruction Register comprising triggers 240e through 247e (Fig. 2i) are connected to count "DOWNWARD," which is the reason that each trigger of this counter is RESET ON, with each trigger thus signifying that a binary 1 is stored. As each trigger is so reset ON in the manner as described above, those triggers which change, from an OFF to an ON condition, emit negative, short duration carry pulses, from their left plate to the binary input of the succeeding order.

Therefore, when these triggers 240e through 247e are reset ON, as described above, by the negative I4 (D3) signal, this signal of three microseconds duration endures long enough, so that the short duration carry pulses from one order trigger to a succeeding order trigger, are dissipated, the triggers being thus clamped ON by the longer duration three microsecond signal. Subsequently, when the Memory Register is "dumped" into the Instruction Register, certain stages are selectively flipped OFF, to indicate binary 0's, but no carry pulse is generated when a trigger is flipped OFF, since the left plate goes from a negative to a positive potential and such a positive signal from one trigger to the binary input of a succeeding trigger, has no effect. There is no connection from the right plates of these triggers to succeeding triggers of the Address Counter.

The Address Counter is "stepped" by inputs to trigger 247e of the Counter, as the line STEP ADR CTR (at the right in Fig. 2i) is driven positive by the control circuits to condition one input of an AND circuit 251e. As Clock pulses occur on a line L103, these pulses are passed via a cathode follower 250e to the other input of the AND circuit 251e whose output is fed, via a cathode follower 252e and an inverter 254e to the binary input of the trigger 247e of the COUNT DOWN Address Counter. This trigger 247e, when pulsed, shifts alternately to ON and OFF conditions as successive Clock pulses occur on the line L103. As it shifts from an OFF to an ON condition, a negative signal is emitted from the left plate and passes via a cathode follower 266e to the binary input of the adjacent trigger 246e, which thus assumes ON and OFF conditions, alternately, as it receives these negative signals from trigger 247e. Trigger 246e, in turn, emits a negative signal to the binary input of its adjacent trigger 245e, when it goes from an OFF to an ON condition. In like manner, the trigger 245e, on going from OFF to ON, emits negative signals via a cathode follower 249e to its adjacent trigger 244e; trigger 244e similarly emits negative signals directly, to the binary input of its adjacent trigger 243e; trigger 243e emits negative signals via a cathode follower 248e to the binary input of its adjacent trigger 242e; trigger 242e emits negative signals directly, to the binary input of its adjacent trigger 241e and the trigger 241e similarly emits negative signals directly, to the binary input of the trigger 240e. Thus this counter counts down, as Clock pulses are applied to its input. The operation of this counter as it counts down to zero from the original setting "dumped" into it from the Memory Register will be described presently.

It should be noted that the left plate output of the Sign trigger 262d (Fig. 2g) is fed via a cathode follower 268g to a line IRS OFF (Instruction Register Sign OFF) which is positive, when the trigger 262d is OFF. The left and right plates of triggers 263d through 267d (Fig. 2g) emit signals via cathode followers 269d through 278d, respectively, and the outputs of these cathode followers feed, via lines OPN REG $\bar{1}$, OPN REG 1, OPN REG $\bar{2}$, OPN REG 2, OPN REG $\bar{3}$, OPN REG 3, OPN REG $\bar{4}$, OPN REG 4, OPN REG $\bar{5}$ and OPN REG 5, respectively, to the Operation Decoder (Fig. 1d). The notation of OPN REG $\bar{5}$, for example, signifies that the line is positive, when the 5 bit of the Operation section of the Instruction Register, contains a binary 0, the short horizontal line, above the 5 ($\bar{5}$) indicating that when this line is positive, NO binary 1 is contained in that bit of storage. A positive signal on line OPN REG 5, however, indicates that there IS a binary 1, stored in that particular bit of storage. The Operation Decoder (described below) decodes the permutations, represented by the combined ON and OFF conditions of those triggers, storing bits 1 through 5, to determine which type of operation the machine is to perform.

The outputs of triggers 293d through 296d (Fig. 2h) pass via cathode followers 297d, 299d, 202d and 204d, respectively, to the lines ADR REG 6 through ADR REG 9, respectively, the latter lines being positive, when the trigger conditions indicate the presence of binary 1's.

The outputs, from the right plates, of the triggers 240e to 247e (Fig. 2i) of the Address Counter are passed via cathode followers 255e through 258e, respectively, and 260e through 263e, respectively, to lines ADR CTR 10 through ADR CTR 17, respectively, while the output, from the left plate, of the trigger 244e is passed via a cathode follower 259e to line ADR CTR $\overline{14}$, the output from the left plate of the trigger 245e is passed via a cathode follower 264e to line ADR CTR $\overline{15}$, the output from the left plate of trigger 246e is passed via a cathode follower 265e to line ADR CTR $\overline{16}$ and the output from the left plate of trigger 247e is passed via a cathode follower 266e to line ADR CTR $\overline{17}$.

The outputs on the lines ADR REG 6 and through ADR REG 9 (Fig. 2h) and on the lines ADR CTR 10 through ADR CTR 17 (Fig. 2i) are fed via the Deflection Switches (see Fig. 1c) to the Deflection Register (Figs. 2m, 2n and 2p), described below, and to the Instruction Counter (Figs. 1c and 2j). This Instruction Counter (Fig. 2j) controls the selection of Addresses, in Memory, DURING Instruction time.

*Instruction counter*

Referring specifically to Fig. 2j, this Instruction Counter comprises trigger circuits 215f through 226f, operable to ON and OFF conditions. Each of the triggers 215f through 226f is connected, respectively, to one of the group of cathode followers 227f through 238f, feeding, respectively, to the lines INST CTR 6 through INST CTR 17. The cathode followers, 233f through 238f, have the respective output lines, INST CTR 12 through INST CTR 17, which are all connected to inputs of an AND circuit 239f. The outputs of the triggers 222f through 226f feed, not only to the cathode followers 234f through 238f, but also feed to the binary input of the next trigger. Likewise, triggers 216f through 220f, feed to the binary inputs of their respective next triggers. These latter connections are rendered operative, only when a particular trigger shifts, from an ON to an OFF condition, to thereby emit a negative signal from its right plate to the binary input of a next trigger, to shift the latter from one condition to the other. For example, as trigger 226f, goes from ON to OFF, a negative output is emitted from its right plate and fed to the binary input of the next trigger 225f. The trigger 225f is thereby shifted to an ON condition, if it happened to be OFF, or to an OFF condition if it happened to be ON. Thus it is seen that triggers 215f through 220f and triggers 221f through 226f are connected in cascade. This Instruction Counter is stepped, one count, as a negative signal occurs on the counter input line 241f, feeding to the binary input of trigger 226f. A negative signal, appearing on this line 241f, is effective to step the Instruction Counter, one count, so that, as the NEXT Instruction is read, from Memory, it will be read from the next, SUCCESSIVELY NUMBERED Address, in Memory. Exceptions to this sequential number reading out of Instructions, from Memory, are described below and are designated by the nomenclature SKIP, implying, as is obvious, that a succeeding Instruction or Instructions are skipped.

Successive counter input pulses, applied to trigger 226f, cause the triggers 221f through 226f to shift and assume different permutations of ON and OFF conditions, each permutation selectively and exclusively representative, of the number of pulses applied to the input trigger 226f of this Instruction Counter. When all the triggers 221f through 226f, are ON, all the outputs from their right hand plates are relatively positive, and these positive signals are fed, via the cathode followers 233f through 238f, to the lines INST CTR 12 and INST CTR 17, respectively, and these positive signals are also ALL fed to the AND circuit 239f. Since now, ALL the inputs of the AND circuit 239f are relatively positive, its output is positive, and is applied, via a cathode follower 240f, to the binary input of the trigger 220f. Since this output signal is positive, it can NOT flip the trigger 220f, which is of the type which is responsive to negative pulses only, as described above. However, as the NEXT pulse arrives, on the Instruction Counter input line 241f, and is applied to its input trigger 226f, the latter shifts OFF, and thus removes one relatively positive potential, from the inputs of the AND circuit 239f, so that its output goes relatively negative, which negative signal is fed, via the cathode follower 240f, to flip trigger 220f. Thus, it is seen, that with the triggers 221f through 226f, all ON, a SUBSEQUENT pulse, applied to the Instruction Counter input trigger 226f, does not have to ripple, through each of the triggers 225f through 221f, in order to flip the trigger 220f, but instead, IMMEDIATELY upon the shifting of the Instruction Counter input trigger 226f, a negative pulse is effective, at the output of the AND circuit 239f and the cathode follower 240f, to flip the trigger 220f.

Triggers 220f through 215f are cascade-connected in a manner similar to triggers 226f through 221f. Thus, various permutations of ON or OFF conditions are indicated by the signals, on the lines INST CTR 6 through INST CTR 17. Normally, the Instruction Counter is stepped, as explained below, one step, at the END of each OPERATION, so that succeeding Instructions, are read, from succeedingly numbered Address positions, in Memory. However, it is, at times, desired to break out of the normal sequence of a program and to transfer to another part of the program. Under these conditions, the line CONTROL is driven positive, for three microseconds, specifically, at "7" time, of an Execute/Regenerate cycle. This positive signal on the line CONTROL is applied to the right grids of all the triggers 215f through 226f, to shift them all OFF. At the same time, signals on the lines ADR REG 6 through ADR REG 9 (Fig. 2h) and ADR CTR 10 through ADR CTR 17 (Fig. 2i) are representative of the holding of the Address Register and the Address Counter, respectively, and these inputs are fed (Figs. 1c and 2j) to one input of AND circuits 201f through 214f, respectively (Fig. 2j). The particular bit representation of the Address Register or of the Address Counter, representing a binary –1–, will, as explained above, cause the respective lines, representative of these binary 1's only, to be positive. Thus, with one input of the AND circuits 201f through 214f selectively conditioned positive, the occurrence of a positive E/R10 (D1) pulse on the line ADR REG TO INST. CTR permits signals to be passed through the respective AND circuits, 201f through 214f, which are conditioned positive, by binary –1– representations, to the respective triggers 215f through 226f, pulling the triggers, respectively and selectively, to an ON condition. Thus, it is seen that the holding of the Address Register and of the Address Counter, may be shifted or "dumped" into the Instruction Counter. After such a "dumping" operation, the next Instruction will, of course, be read, from THE particular addressed, DUMPED into the Instruction Counter, and succeeding Instructions will be read, from succeeding Addresses, beginning at this now "dumped-in" Address, as the stepping signals are applied to the Instruction Counter input line 241f.

*Regeneration counter*

The Regeneration Counter as illustrated in Fig. 2k comprises triggers 253f through 262f. This Regeneration Counter is never reset to any particular number, that is to any prechosen permutations of ON or OFF conditions. It may assume any happenstance permutation but thereafter it IS stepped, sequentially, through all successive ON and OFF permutations, to thus assume, in one complete series of operations, Address indications, representative of each and every Address, in Memory, and repeated operation merely repeats the methodical, sequential selection, of each and every Address, in Memory, so that a systematic interrogation of the complete raster (described below) on the cathode ray tubes, is provided for Regeneration purposes. As described below, the Deflection Register (see Fig. 1c) is controlled, by the Regeneration Counter, during all Regenerate cycles and during all Execute/Regenerate cycles The Regeneration Counter (Fig. 2k) is stepped, one step during each and every Execute/Regenerate OR Regenerate cycle, so that successively numbered Addresses are systematically Regenerated. The Regeneration Counter is thus stepped, one step, under control of a positive signal on the line EX/RGN TIME (during Execute/Regenerate) or under control of a positive signal on the line RGN TIME (during Regenerate time) feeding to an OR circuit 248f. The output of this OR circuit passes via a cathode follower 249f, to condition one input of an AND circuit 250f. The other input to this AND circuit is an A4 (D1) Clock pulse, on line L108 which is gated through this conditioned AND circuit, during every Regenerate or Execute/Regenerate cycle and via an inverter 251f and a cathode follower 252f, is applied to the binary input of the Regeneration Counter input trigger 262f, thereby stepping the counter one step, as will now be described. The triggers 262f through 253f are cascade-connected, in the order of descending reference numbers, so that, as one trigger goes, from ON to OFF, it emits a negative signal to the succeeding lower numbered trigger, to shift it from one condition to the other. The outputs of the triggers 253f through 262f are passed, via respective cathode followers, 263f through 272f, to respective lines RGN CTR 6 through RGN CTR 15.

It should be noted that the Regeneration Counter contains ten triggers to thereby store manifestations of 10 different bits, in different permutations. However, in the Deflection circuits described below, only the manifestations of nine bits, specifically bits 7 through 15, are utilized. The manifestation of the "6" bit is chosen, to produce a selection between the Memory I and Memory II Units, as described presently.

*Deflection switches and deflection register*

The Deflection Switches and the Deflection Register (Fig. 1c) are illustrated in more detail, in block form, in Figs. 2m, 2n and 2p, taken collectively, side by side in that order. The Deflection Register is SET to the HOLDING of the ADDRESS PORTION of the Instruction Register, DURING Execute time, but is SET to the HOLDING of the Instruction COUNTER, DURING Instruction time; and alternatively, is set, to the HOLDING of the REGENERATION COUNTER DURING EITHER Execute/Regenerate or Regenerate time.

The Deflection Register (Figs. 2m, 2n and 2p) comprises triggers 260g through 273g, which represent, respectively, the Sign bit, and bits 6 through 17, of the particular word, ADDRESSING Memory. Manifestations of bits, 6 through 15, are received by the Deflection Switches from the Regeneration counter (see also Fig. 1c) also from the Address portion, of the Instruction Register, and also from the Instruction Counter. The circuits for storing a representation of any one bit, are all similar to each other, so that the description of one, given below, will suffice.

The circuits, for the respective bits, 16 and 17, of the Deflection Switches, receive inputs only from the Address portion of the Instruction Register and from the Instruction Counter, and one such circuit will be described, in detail, presently, as well as the Sign bit representing circuit.

As described below, the ADDRESSING of a full or of a half word, in Memory, depends upon whether the Sign, of a particular Address, is positive or negative. The Sign is NOT used for addressing during Regeneration cycles of any type, but only during Instruction and Execution cycles.

DURING Instruction time, the information, stored in the Instruction Counter, is dumped into the Deflection Register and since EACH INSTRUCTION comprises a half word, only, circuits are provided and are so operative that the Sign bit representation, during Instruction Time, is ALWAYS that of a positive Sign, or in other words, the Sign trigger is set OFF.

During Execute time, the Sign may be positive or negative, to respectively cause operation, on a full or on a half word. Thus the holding of the Sign bit storage element, of the Instruction Register, is "dumped," into the Sign trigger of the Deflection Register DURING Execute time.

Referring specifically to Figure 2m, an AND circuit 212g is conditioned, during Execute time, by a positive signal on the line E TIME, so that a signal, on the line IRS OFF, which is the output line of the Instruction Register Sign trigger (see Figs. 1c and 2g) and is positive, when the Sign trigger is OFF, to thus indicate a positive Sign, is also applied to this AND circuit 212g and is passed through to an OR circuit 213g and a cathode follower 214g to a line 215g, which feeds to both a negative AND circuit 217g and to a plus AND circuit 218g. Thus the signal, on line 215g, is positive, during Execute time, provided that the Sign trigger of the Instruction Register is OFF, (to represent a positive sign) or is negative when the Sign trigger of the Instruction Register is ON (to represent a negative Sign). Thus, if the Sign is positive, the plus AND circuit 218g is conditioned, while if the Sign is negative, the negative AND circuit 217g is conditioned. An A2 (D1) signal, on line L106 (lower left portion Fig. 2m) is passed via a cathode follower 206g to a line 207g connected to the plus AND circuit 218g, so that a positive, one microsecond signal, occurring at 2 time, of all character cycles, is thus applied to this AND circuit, to several other AND circuits, and also, via an inverter 208g (Fig. 2m) a cathode follower 209g and a group of cathode followers 210g, to a line 211g, feeding to the negative AND circuit 217g. Thus the signals on this line 211g are negative, at the same time that the signals are positive on line 207g. This negative signal on line 211g is fed to the negative AND circuit 217g and passes therethrough, provided the latter is conditioned by a negative signal on the line 215g, and turns ON, the trigger 260g. This trigger is the Sign trigger of the Deflection Register and when ON, indicates a negative Sign. If, however, the signal on line 215g is positive, which is an indication that the Instruction Register Sign trigger is OFF, then this line conditions one input of the plus AND circuit 218g, so that the positive, one microsecond A2 (D1) signal, on line 207g, is passed through the AND circuit 218g, to turn OFF the Sign trigger 260g. Thus, it is seen that during Execution time, the holding of the instruction Register Sign trigger is "dumped" into the Sign trigger 260g of the Deflection Register.

DURING Instruction time, since only half words are ADDRESSED, in Memory, the Sign trigger 260g MUST BE turned OFF. This is produced by a positive signal on the line I TIME, which feeds via the OR circuit 213g and the cathode follower 214g, to cause the line 215g, to go positive, to thus condition the plus AND circuit 218g, whereby the one microsecond A2 (D1) positive signal on line 207g passes through this AND circuit, to turn OFF the Sign trigger 260g. Thus, the Sign trigger 260g is turned OFF, DURING EVERY Instruction cycle. During Execute/Regenerate or Regenerate cycles, the holding of the Sign trigger 260g is immaterial.

As stated above, the circuitry for bits "6" through

"15" is identical, so a description of the "6" bit circuits will suffice.

During Execute/Regenerate time, a positive signal on the line EX/RGN TIME is fed (extreme lower left corner Fig. 2m) to a cathode follower 201g, but during a Regenerate time, a positive signal, on the line RGN TIME, is fed to a cathode follower 202g. The outputs of both these cathode followers 201g and 202g, which are positive when their input lines are positive, pass via an OR circuit 203g and cathode followers 204g to line 205g. Thus this line 205g is positive, during ALL Regenerate or Execute/Regenerate cycles. This line 205g conditions one input of several AND circuits, for example the AND circuit 221g (Fig. 2m) which is part of the "6" bit circuitry. It should also be noted that the AND circuit 220g, is conditioned during Execute time, by a positive signal on the line E TIME, and that the AND circuit 219g, is conditioned during Instruction time, by a positive signal on the line I TIME. The AND circuits 219g, 220g and 221g receive inputs, respectively, from the "6" bit of the Instruction Counter, the "6" bit of the Address portion of the Instruction Register and the "6" bit of the Regeneration Counter. Thus, during Instruction time, while the AND circuit 219g is conditioned, the holding of the "6" bit of the Instruction Counter, via line INST CTR 6, is passed through this AND circuit 219g, an OR circuit 223g and a cathode follower 224g, to line 225g. During Instruction time this line 225g is positive, provided a binary 1 is contained in the Instruction Counter "6" bit, but is negative, if a binary 0 is contained in that particular bit. If the signal on line 225g is negative, signifying a binary 0, then the negative AND circuit 226g, is conditioned, but if the signal on 225g is positive, the plus AND circuit 227g, is conditioned. If the negative AND circuit 226g is conditioned, the one microsecond negative A2 (D1) signal on line 211g, passes through, to turn OFF the "6" bit trigger 261g, and thereby represent a binary 0 stored therein. If, however, the AND circuit 227g is conditioned, the positive, one microsecond A2 (D1) signal on line 207g, passes through this AND circuit 227g, to turn ON, this "6" bit trigger 261g to thereby represent a binary 1 stored therein. Thus, the holding of the Instruction COUNTER "6" bit, is dumped into the Deflection Register "6" bit trigger 261g, during all Instruction cycles.

In a similar manner, the holding of the Address portion of the Instruction Register "6" bit, feeding via line ADR REG 6 to the AND circuit 220g, which is conditioned during Execute time, is passed through to the OR circuit 223g and via the circuitry described above, to cause the "6" bit trigger 261g of the Deflection Register to be set, ON or OFF as the conditions require. Thus, during Execute time, the holding of the Instruction Register "6" bit, is "dumped" into the Deflection Register "6" bit trigger 261g.

The holding of the Regeneration Counter "6" bit is fed via line RGN CTR 6 to the AND circuit 221g, which is conditioned, during all Regenerate or all Execute/Regenerate cycles, by a positive signal on line 205g. The output of this AND circuit 221g is passed via the OR circuit 223g, as just described, to gate signals, to set the Deflection Register "6" bit trigger 261g, to an ON or OFF condition as required.

Thus, it is seen that the holding of the Regeneration Counter "6" bit, of the Instruction Register "6" bit, or of the Instruction Counter "6" bit, respectively, is "dumped" into the Deflection Register "6" bit trigger 261g during a Regenerate cycle, an Execute cycle or an Instruction cycle, respectively. Identical circuitry serves to "dump" the holding of the bits "7" through "15" respectively, of the Regeneration Counter, the Instruction Register, and the Instruction Counter into "corresponding" bit storing triggers, of the Deflection Register.

Referring now to Figure 2p, it will be noted that the triggers 272g and 273g for bits "16" and "17," respectively, of the Deflection Register, do NOT receive inputs, from the Regeneration Counter, since, as explained above, the Regeneration Counter stores only representations of bits 6 through 15. During Instruction time, a positive signal on the line I TIME conditions an AND circuit 240g (lower right portion Fig. 2p) and the holding of the Instruction Counter "16" bit is passed, via line INST CTR 16, through this AND circuit 240g, to line 241g, while during Execute time, a positive signal on the line E TIME conditions one input to an AND circuit 242g so that the holding, of the Address portion, of the Instruction Register "16" bit, applied via line ADR CTR 16 is passed through this AND circuit 242g, to a line 243g. Signals on these lines 241g and 243g are passed through an OR circuit 244g and a cathode follower 245g to a line 246g. A negative signal, on line 246g, conditions a negative AND circuit 247g while a positive signal on the same line conditions a plus AND circuit 248g. The negative AND circuit 247g, when conditioned, passes the negative, one microsecond A2 (D1) signal, on the line 211g, to turn OFF, the "16" bit storing trigger 272g to thereby represent a binary 0, while the plus AND circuit 248g, when conditioned, passes the positive, one microsecond A2 (D1) signal, on line 207g, to turn ON, the "16" bit storing trigger 272g. Thus, it is seen that the Deflection Register "16" bit trigger 272g is turned ON or OFF, according to the holding of the "16" bit storage element, of the Address part of the Instruction Register, or according to the holding of the "16" bit storage element of the Instruction Counter, during Execution time and during Instruction time, respectively. During Regeneration time, the line 246g (Fig. 2p) is negative, since there is no coincidence of positive signals either to the AND circuit 240g or to the AND circuit 242g. Thus the negative AND circuit 247g is conditioned, DURING ALL Regeneration cycles, to pass the negative A2 (D1) signal, on line 211g, to turn OFF, the "16" bit trigger 272g, and thereby represent only a binary 0. The circuitry for the Deflection Register "17" bit storage element is identical to that just described for the "16" bit.

The output, from the right plates, of all the triggers, 260g through 273g, of the Deflection Register, representing the Sign, and bits 6 through 17, respectively, are passed through respective cathode followers, 276g through 288g, to the respective lines SIGN (—) and DEF REG 6 through DEF REG 17. Other outputs, of the Deflection Register, are from the left plate of the Sign trigger 260g (Fig. 2m), via a cathode follower 274g, to the line SIGN (+); from the left plate of the "6" bit trigger 261g (Fig. 2m), via a cathode follower 275g to a line DEF REG $\overline{6}$ (positive when the Deflection Register "6" bit contains a binary 0), from the left plate of the "16" bit trigger 272g (Fig. 2p) via a cathode follower 289g to a line DEF REG $\overline{16}$, and from the "17" bit trigger 273g via a cathode follower 290g to a line DEF REG $\overline{17}$. The use of the potentials from the Deflection Register bit storage triggers, in selecting a particular Address in Memory, will be presently described.

*Raster layout and addressing generally*

Before proceeding to a detailed description of the Memory circuits, a brief explanation of the particular ADDRESSING system employed will be given which it is believed will greatly aid in clarifying the subsequent detailed description.

The cathode ray tube raster, which is the systematic pattern of dots and dashes on the screen of the cathode ray tubes, is rectangular. An example of one of four such layouts of such a raster with the corresponding decimal numeric Address numbers is shown in Figs. 3e and 3f, taken together, with 3f at the right of 3e. As will be clear from the discussion below, these Address numbers comprise one fourth only of the entire number of addresses. When a full word is selected, in effect, two sequential addresses are selected at one time. As is seen from the numeric Addresses assigned to Figs. 3e and 3f, the numeric Addresses occupy "randomized" positions so that in the normal sequential numerical Address selection, the actual locations on the tube target are not adjacent so that difficulties, due to spill, are greatly minimized. As will be clear from the description below, the same tube is referred to only once in four sequential numeric Addresses so that "randomizing" is thereby increased.

As stated above, the 13 outputs of the Deflection Register represent the Sign bit and bits 6 through 17. In general, the method used to locate a given Address, on the raster of a cathode ray tube, is to produce two sets of accurately determined increments of deflection voltage, one set, for a horizontal deflection, and one set, for a vertical deflection. The values of the increments, in a binary notation, progress by powers of 2, and each increment is assigned to a position in the binary Address number. The horizontal and vertical deflection components of a given address are the sums of the appropriate horizontal and vertical voltage increments, called for by the bits of the binary Address number. The deflection plates, both horizontal and vertical, of all cathode ray tubes, are simultaneously energized, and there are 512 different possible Addresses "PER TUBE," which means that there are 512 "DEFLECTION" Addresses. As will be obvious there are OTHER kinds of Addresses such as selection of CERTAIN TUBES ONLY. For the "DEFLECTION" Addresses, 9 bits only are needed to cover all "DEFLECTION" Addresses, since 2, to the 9th power, equals 512.

TWO OF THE BITS (other than these 9 bits) AND THE SIGN BIT determine WHICH tubes will be UNBLANKED.

The remaining bit (which is the "6" bit) determines which one, of the two Memory Units is to be used, that is, Memory I or Memory II which is merely a FURTHER SELECTION OF TUBES.

Inspection of the over-all wiring diagram comprising Figs. 1a through 1g shows (Fig. 1e) that the deflection lines 314a, 315a, 369a and 370a are energized by the Horizontal and the Vertical Deflection circuits. The Vertical and Horizontal Deflection circuits, in combination, translate the permutations of the above-mentioned 9 binary bits, into proper deflection voltages. These Deflection circuits are energized by respective binary-1- and binary-0-representing signals, on lines DEF REG 7 through DEF REG 15 (Figs. 1e, 2m, 2n and 2p).

The Memory tubes are allocated in PAIRS (see Fig. 4) to store the respective bits and the tube PAIRS for bits S, and 1 through 18 (see Figs. 1a and 4) are used to store those half words having EVEN numbered Addresses, while the tube PAIRS for bits 18 through 35 (Figs. 1a and 1e) are used to store those half words having ODD numbered Addresses. Full words which are stored in the tube pairs for bits S and 1 through 35 have EVEN numbered addresses (see also Fig. 2t (1)) and in effect select TWO sequentially numbered Addresses. If the Sign bit S of an Address, contains a binary zero, it is an indication of a positive Sign which calls for a half word Address. In such an event, the "17" bit, is inspected, to determine whether the half word shall be taken from the Memory tube pairs S, and 1 through 17, comprising the left half (Fig. 2t(2a)) or the Memory tube pairs 18 through 35 comprising the right half (Fig. 2t(2b)). If the 17 bit contains a binary 0, the Address is an EVEN numbered Address, and the Address, called for, is located in the left half of the Memory tube pairs, namely, S, and 1 through 17 (Fig. 2t(2a)). If the 17 bit contains a binary 1 (with a POSITIVE sign bit), the Address desired is located in the right half of the Memory tube pairs, namely, 18 through 35 (Fig. 2t(2b)). If, however, the Sign bit contains a binary 1, it is an indication of a negative Sign and a full word Address is indicated thereby. In this case, the 17 bit is assumed to be zero, and is, in effect, ignored, since all full word addresses are regarded as having even numbered addresses.

The 16 bit determines whether the Address lies, in the LEFT cathode ray tubes (one of the two tubes respectively of ALL selected bits, Fig. 4) or the RIGHT cathode ray tubes. If the 16 bit, contains a binary 0, the Address lies, in the LEFT tubes, but if the 16 bit contains a binary 1, the Address lies, in the RIGHT tubes.

As stated above, the bits 7 through 15 stored in the Deflection Register determine the actual deflection potentials and thus control ADDRESSING OF THE RASTER, of the SELECTED tubes. Fig. 3a illustrates how a raster is laid out, for any one tube. This raster is considered as being divided into a number of sections, one of which is shown cross-hatched in Fig. 3a. The particular section to which the cathode ray beam will be deflected is determined by the presence or absence of voltage increments, on the deflection plates, of the cathode ray tubes. Point A, of Fig. 3a, may be considered as a reference or starting point. Assume that this point A, is THE Address, to which a cathode ray beam would deflect, if each of the bits 7 through 15, stored in the Deflection Register and controlling the Deflection circuits, represents a binary 0. To cause the beam to deflect horizontally, from point A to point B, requires one horizontal increment, of deflection voltage. This increment of voltage moves the beam, across an entire section, that is, from A to B, and is designated as ONE LARGE horizontal deflection increment (1Lh). Similarly, to deflect the beam horizontally from A to C would require TWO such LARGE horizontal increments. To deflect the beam from A, downwardly to E, would require ONE LARGE vertical increment. The reference point, for each section shown in Fig. 3a, is the upper left hand corner of the particular section. Each of these sections is considered as being sub-divided, INTO 32 ADDRESSES, for example, the cross-hatched section G of Fig. 3a, is shown, on an enlarged scale, in Fig. 3b. The incremental steps of voltage, required for deflection within a section, such as this section G, are designated as SMALL deflection increments, for example, as ONE SMALL horizontal (1Sh), TWO SMALL horizontal (2Sh), deflection increments, etc., or ONE SMALL vertical (1Sv), TWO SMALL vertical deflection increments, etc.

The AMOUNT of deflection OR the TUBE SELECTION, as determined by each of the bits S, and 6 through 17, are as follows: The Sign bit determines whether a full or a half word is called for, the "6" bit is used to select Memory I or Memory II, depending upon whether it contains a binary 0 or a binary 1.

With regard to bits "7" to "15" inclusive, which determine the SELECTION OF A SPOT IN THE RASTER, the 7 bit causes a deflection, of TWO SMALL vertical increments, the "8" bit causes a deflection of ONE SMALL vertical increment, the "9" bit causes a deflection of FOUR SMALL horizontal increments, the "10" bit causes a deflection of TWO SMALL horizontal increments, the "11" bit causes a deflection of ONE SMALL horizontal increment, the "12" bit causes a deflection of ONE LARGE vertical increment (one large "horizontal" increment being equal to eight small "horizontal" increments and one large "vertical" increment being equal to FOUR small "vertical" increments), the "13" bit causes a deflection of ONE LARGE horizontal increment, the "14" bit causes a deflection of TWO LARGE vertical increments, and the "15" bit causes a deflection of TWO LARGE horizontal increments.

The "16" bit causes a selection OF THE LEFT OR THE RIGHT tube of the pairs of tubes.

The "17" bit will cause a selection OF THE PAIRS OF TUBES S, AND 1 THROUGH 17, on one hand, OR THE PAIRS 18 THROUGH 35, on the other hand, OF A SELECTED Memory Unit (selected as stated above by the "6" bit).

In Fig. 3c, the Addressing of two different Memory tube pairs is illustrated for example, Memory tube pair 1 or Memory tube pair 18, under control of selectively numbered Addresses. Since all tubes are selected IN PARALLEL, it may be assumed that Memory tube pair 1, is representative of Memory tube pairs S, and 1 through 17, while Memory tube pair 18 is representative of Memory tube pairs, 18 through 35. Assuming half word addresses, the "16" bit determines whether the LEFT or or RIGHT tube, of each pair, is called for, while the "17" bit, determines whether the EVEN half word pairs is called for, that is pairs S, and 1 through 17, or the ODD half word pairs is called for, that is pairs 18 through 35. For numerically sequential, half word addresses, it can be seen that EACH TUBE is referred to, ONCE FOR EACH FOUR sequential addresses. For example, assuming that the Addresses 20, 21, 22, 23 and 24 are called for, in sequence, the Address 20, selects Memory tube pairs S, and 1 through 17, the LEFT tubes thereof, and an Address, ONE LARGE horizontal step removed, from the Address 0 reference point, at the upper left corner of the raster in Fig. 3c, for PAIR 1. Address 21 selects the tubes 18 through 35, the LEFT tubes thereof, and an Address, at the same relative position, that is, ONE LARGE horizontal step removed, from the Address 1 reference point, at the upper left corner of the raster in Fig. 3c, for PAIR 18. The Address 22 will again select Memory tube pairs S, and 1 through 17, but the RIGHT tubes thereof, and an Address ONE LARGE horizontal increment removed, from the Address 2 reference point, at the upper left corner of the raster in Fig. 3c for PAIR 1. The Address 23 selects the same relative Address, in the right tubes, of the Memory tube pairs 18 through 35, Fig. 3c for PAIR 18. The Address 24 is TWO LARGE horizontal increments from the Address 20 as shown in Fig. 3c for PAIR 1. Thus, it is seen that sequential numeric Addresses are actually physically separated considerably from one another. Such a sequencing system minimizes some of the difficulty due to spill.

Fig. 3d illustrates, in detail, a small section of the raster of a cathode ray tube. For purposes of simplification and to highlight the particular layout, all bits have been recorded as dashes. The tail of the bit, that is, the part extending from the small circle, indicates the direction of BIT SWEEP. The circle associated with each bit represents the dot location, and is the actual Address of the raster, which is sampled for information. It should be noted that alternate columns, have a BIT SWEEP in opposite directions. It should also be noted that alternate columns are displaced, downward, by ONE HALF SMALL vertical deflection. Since this pattern gives the impression of each bit being on either the corner or the center of a hexagon, this type of bit packing in a raster is referred to as "hexagonal packing." The combination of BIT SWEEP, in opposite directions in alternate columns, and the DISPLACING, of the bits, ONE HALF SMALL vertical deflection, in alternate columns, provides the most efficient storage arrangements per unit area. The BIT SWEEP, as described below is a Deflection voltage and this increment, of Deflection voltage, is added to the other Horizontal Deflection voltages. The voltage increment producing the displacement, of one-half a small vertical step, to provide hexagonal packing, is generated, in the Vertical Deflection circuits, and this increment of voltage is equal to ONE HALF of a SMALL vertical deflection.

The numbered addresses, for a raster layout of one cathode ray tube, are shown on Figs. 3e and 3f. The particular layout is for EVEN addresses comprising the LEFT tubes of the Memory Unit I pairs of tubes. The numbers, shown in each of the respective rectangles, are the decimal equivalent of the 9 binary bit values, which go to make up the Address. There are 512 such rectangles shown in Figs. 3e and 3f. It should be noted, as described above in detail, that the numbered Addresses, appear in this raster, in sequence four numeric addresses apart, that is, 0, 4, 8, 12, 16, etc. It should further be noted that "such successive" numeric addresses, appearing on this tube, ARE SEPARATED by TWO LARGE horizontal increments, namely, from the reference point of Address 0 (Fig. 3e) to a point, half-way across the screen of the tube, namely, Address 4 (Fig. 3f).

*Horizontal and vertical deflection circuits*

The Horizontal and Vertical Deflection circuits are illustrated in the composite comprising Figures 3g and 3h, with 3h to the right of 3g. Except for the BIT SWEEP, which is applied to the Horizontal Deflection system, the Horizontal and Vertical Deflection systems are quite similar so that an explanation of the Horizontal Deflection circuits will suffice for the Vertical Deflection circuits as well. Inspection of Fig. 3g, illustrating the Horizontal Deflection circuits, shows that the horizontal deflection voltage increments are generated under control of the outputs of the Deflection Register (indicated by the labeling) which are fed, to a group of voltage increment amplifiers, whose outputs are tied together by a common pair of lines 307a and 308a. Each line, of this pair of lines, in turn drives power cathode follower circuits, the outputs of which apply potentials to the two horizontal deflection plates of the respective tubes. As represented, the same deflection potentials are applied to corresponding deflection plates of ALL cathode ray tubes in BOTH memory Units I and II. A line, labeled DEF REG 15, when positive, represents a binary 1 in the Deflection Register "15" bit position, and when negative represents a binary 0. With such a binary 1, a deflection, of two large horizontal steps is produced. The signal on this line DEF REG 15 feeds to a Phase Inverter PI enclosed in a box labeled 301a, this inverter producing two oppositely phased signals. These signals, as described below, cause signals, opposite in phase, to be applied to the Deflection plates of ALL the cathode ray tubes, so that the AVERAGE of the potential, on a pair, of such Deflection plates, in any one tube, is practically constant. When the input to this Phase Inverter 301a, via the line DEF REG 15, is negative, the left half of its dual triode is cut off and the common cathode potential decreases so that the right hand triode conducts, and the output from the right plate, feeding to a cathode follower 303a, is relatively negative, while the output from the left plate, feeding to a cathode follower 302a, is relatively positive. When the signal on this line DEF REG 15, goes positive, to represent a binary 1, the input to the left grid of the Phase Inverter, goes positive, and causes the left half of the dual triode to conduct, which causes the cathode potential to rise, whereby the right half of the dual triode is cut off, the output from the left plate to the cathode follower 302a, being relatively negative to that from the right plate to the cathode follower 303a, being relatively positive. Thus, the outputs from the two plates of the dual triode produce signals, which are in opposite phase. The outputs from the Phase Inverter 301a pass via these cathode followers 302a and 303a, to Diode Tube (DT) circuits 304a and 305a, respectively, and to a Current Switch (CS) 306a. The Diode Tube circuits 304a and 305a contain, tube diodes, whose plates are connected to grounded resistors so that these diodes prevent the output signals, from the cathode followers 302a and 303a, driving the inputs to the Current Switch 306a, above ground. The Current Switches CS comprise those circuits which add or subtract, increments of current, to or from the current summing lines 307a and 308a. These switches operate in conjunction with a Current Adder (CA). This Current Adder comprises a pair of resistors 309a and 310a, through which increments of current, flow as described below, to produce the required, Deflection Voltage increments. A bridging resistor 311a between the resistors 309a and 310a, fixes the raster size, by controlling the effective resistance of the resistors 309a and 310a. Each of the Current Switches 306a and 316a through 320a and Current Switch 306a specifically, for example, adds or subtracts predetermined increments of current, to or from, one of the current summing lines 307a or 308a, the line to which the current is added, being determined, by the condition of the outputs of the Deflection Register, in the example chosen, the line DEF REG 15. One, of the two inputs to the Current Switch 306a, is held at approximately ground potential by one of the Diode Tube circuits 304a or 305a so that one triode of the Current Switch 306a conducts, a certain amount, while the other triode, of that switch, is cut off. For example, if the input to the cathode of the Diode Tube circuit 304a is positive, the diode tube in that circuit, is cut off, and the input to the left grid of the Current Switch 306a is relatively positive. At that instant, the input to the cathode of the Diode Tube circuit 305a is negative so that its diode tube conducts, drawing current from ground through a 10K resistor. The plate of the circuit 305a then is below ground potential and the input to the right grid of the Current Switch 306a is relatively negative, thereby cutting off the right triode.

The amount of conduction by the Current Switch 306a, either in its left or right triode, is independent of the plate voltage applied thereto, but is, for practical purposes, directly dependent upon the VALUE of the common cathode resistance R. As the left triode of the Current Switch conducts, it draws current through the resistor 309a, of the Current Adder, and thereby causes a potential drop across that resistor, proportional, to the amount of current drawn. At the same time, the right triode is cut off so that it does not draw current, through the resistor 310a. Under such conditions, the line 308a is dropped in potential, while the line 307a is increased in potential. Assuming that the conduction in the Current Switch 306a is reversed, conduction is then through the right triode, the left triode being cut off. Under this condition, current is drawn through the resistor 310a by the action of Current Switch 306a, but no current is drawn through the resistor 309a. Thus the potential, of line 307a goes relatively negative, due to the drop across resistor 310a, while the potential, on line 308a, increases. The amount, of change in potential, is directly proportion, to the amount of current which is drawn, and the amount of current drawn, under either condition, as determined by a binary 1 or a binary 0, in the Deflection Register "15" bit position, is dependent upon the VALUE of the cathode resistor R, in the Current Switch circuit 306a.

Thus, if the Deflection Register "15" bit position contains a binary 0, the line labeled, DEF REG 15, is relatively negative, and the input to the Phase Inverter 301a is relatively negative. Under such conditions, the output from the left plate of the Phase Inverter 301a is relatively positive and feeds through the cathode follower 302a and the diode 304a, to cause conduction in the left triode of the Current Switch 306a. At the same time, the output from the right plate of the Phase Inverter 301a is relatively negative, and passes through the cathode follower 303a to the diode circuit 305a and thereby causes the right triode of the Current Switch 306a to cut off. Thus, it is seen that if the Deflection Register "15" bit position contains a binary 0, the left triode of the Current Switch 306a conducts, and causes an increment, of current, to flow through the resistor 309a, and causes a corresponding drop, in potential, on line 308a. Conversely, if the Deflection Register "15" bit position contains a binary one, as the right triode of the Current Switch 306a is cut off, no current flows through the resistor 310a and the line 307a, increases, in potential.

Briefly, in summary, if the Deflection Register "15" bit position contains a binary 0, the right triode of the Current Switch 306a is cut off and does not draw an increment of current through the resistor 310a, so that a potential rise, is produced, on line 307a. If, however, the Deflection Register "15" bit position contains a binary 1, the right triode of the Current Switch 306a conducts, draws current through the resistor 310a and the potential, of line 307a, drops. The VALUE of the resistance of the cathode resistor R, of the Current Switch 306a, is such, that the difference in potential, on line 308a, between a condition of current flow and a condition of no current flow through the left triode of the Current Switch 306a, is ONE LARGE horizontal step. The SAME AMOUNT of deflection, IN OPPOSITE PHASE, is produced by the potential of line 307a. Thus, the Deflection Register "15" bit, which controls conduction in the Current Switch 306a having a cathode resistance R will cause a DEFLECTION of TWO LARGE horizontal steps. The current switches 316a, 317a, 319a and 320a are controlled, respectively, by the Deflection Register "13" bit, the Deflection Register "9" bit, the Deflection Register "10" bit, and the Deflection Register "11" bit. It should be noted that the VALUES of the cathode resistors R, for these respective Current Switches, ARE IN A CERTAIN RATIO, TO THAT OF THE VALUE OF the cathode resistor FOR CURRENT SWITCH 306a. Thus, the Deflection Register 15 bit controls the Current Switch, having the cathode resistor R, which produces a deflection of TWO LARGE horizontal steps. The Deflection Register "13" bit is required to produce a deflection, of ONE LARGE horizontal step, and therefore, the current switch 316a, which is controlled by the Deflection Register "13" bit, has a cathode resistor whose value is 2R, that is, double the value of R, for Current Switch 306a. The cathode resistor of the current switch 316a, being equal to 2R, therefore allows only half the amount of current flow, as a resistor of value R, and thus produces only half the amount of change in potential on the lines 307a and 308a, as is caused by the current switch 306a. It follows then that the Deflection Register "13" bit causes a deflection, equal to one half the amount of deflection caused by the Deflection Register "15" bit, or in other words, one large horizontal step. The resistances of 4R, 8R, and 16R are used, in the respective cathode circuits of the Current Switches 317a, 319a and 320a, to cause respective Deflections of FOUR SMALL (one half large) horizontal steps, TWO SMALL (one fourth large) horizontal steps, and ONE SMALL (one eighth large) horizontal step, respectively. The signals, thus produced on the lines 308a and 307a, feed through respective cathode followers 312a and 313a, to lines 314a and 315a, respectively. Line 314a, applies a deflection potential, to the left horizontal plates of all cathode ray tubes, in Memory while line 315a applies a deflection potential, to the right horizontal deflection plates of all cathode ray tubes in Memory.

*Bit sweep*

Besides the increments of currents, and consequently increments of voltage, which are added, to cause deflections of small horizontal steps and large horizontal steps, THE POTENTIAL OF THE HORIZONTAL PLATES MUST ALSO BE MODIFIED to produce the above-mentioned BIT SWEEP, that is, an increment of horizontal deflection, sufficient to cause, the recording of a dash, provided the cathode ray beam is ON at the time of the sweep. As stated above, the BIT SWEEP is produced, in opposite directions, in alternate columns, of the raster of the cathode ray tubes. In the Addresses, as assigned, alternate columns of the raster, are addressed, depending on whether the Deflection Register "11" bit, contains a binary 0 or a binary 1. Thus, IT IS the Deflection Register "11" bit, which determines the DIRECTION of BIT SWEEP, and ALSO controls PRODUCTION OF A HALF SMALL vertical step deflection, to provide "hexagonal" packing. The circuits controlled by this "11" bit, for producing half a small vertical deflection, are described below.

The polarity of the increments of voltage, added to the lines 307a and 308a, for providing a BIT SWEEP, is determined by the potential on the line DEF REG 11 (Fig. 3g) and the timing, of the BIT SWEEP increment, is determined by a trigger 341a (Fig. 3h). This trigger 341a is turned ON, at "3" time, of every character cycle, by a one microsecond A3(D1) signal occurring on line L107 and applied via an inverter 334a and a peaker 335a to a line 336a connected to an inverter 339a whose output turns ON, the BIT SWEEP trigger 341a. Trigger 341a is turned OFF, at "11" time of each character cycle, through a delayed one microsecond A10(D1) positive signal, on line L114, which passes via an inverter 330a, a delay line 331a, and a peaker 332a, to the line 333a and thence via an inverter 340a, to turn OFF the BIT SWEEP trigger 341a. The output of this trigger 341a, when OFF (it is OFF from "11" time of one character cycle to "3" time of the following character cycle) passes through a cathode follower 335a to a line 346a, to condition one input of each of the negative AND circuits 347a and 348a. The other input to the negative AND circuit 348a receives a signal from the line DEF REG 11, which passes, via an inverter 337a and a cathode follower 343a, to a line 344a. Thus, if the Deflection Register "11" bit contains a binary 0, the line DEF REG 11 is negative, and a coincidence of negative signals may occur, at the negative AND circuit 348a. On the other hand, if the "11" bit of the Deflection Register contains a binary 1, the line DEF REG 11 is positive, line 344a is thereby driven negative, and a coincidence of negative signals may occur, at the AND circuit 347a. Thus, the output of the negative AND circuit 347a is a 4 microsecond negative signal, enduring from "11" time of one character cycle to "3" time of the following character cycle, provided a binary 1 is contained in the Deflection Register "11" bit, while if a binary 0 is contained, in that particular bit, the output of the negative AND circuit 348a is negative, from "11" time of one character cycle to "3" time of the next character cycle.

Assuming that the Deflection Register "11" bit, contains a binary 1, and that the negative four microsecond signal is emitted by the negative AND circuit 347a, this signal is fed to a cathode follower 349a. Prior to the arrival of this negative signal, the triode of this cathode follower 349a is conducting, and thus the potential of the cathode is relatively positive. As the four microsecond negative signal is applied to its grid, the triode is driven to cut off, and the potential, of its cathode, tends to go negative, but the condenser C, in the cathode circuit, which is charged positively, that is to the potential of the cathode when the triode was conducting, starts discharging through the cathode resistor, to the negative power supply. It is the discharging, of this capacitor, through the cathode resistor, that forms a saw-tooth voltage waveform. The saw-tooth voltage output, from this cathode follower 349a, is fed to the grid of the left triode, of a differential amplifier 351a. Thus the input to the left grid of this differential amplifier is a negative saw-tooth voltage, while the right grid is held, at approximately ground potential, that is, at the potential of the cathode follower 350a. The negative saw-tooth voltage causes the left triode to conduct less so that the output, from the left plate, is a positive saw-tooth voltage, which is fed via a 33K resistor, to the line 307a. As the left triode of the differential amplifier 351a conducts less, the potential of the common cathode, goes relatively negative, and thus conduction in the right triode, whose grid is at ground potential, increases, so that the output, from the right plate of the differential amplifier 351a, is a negative saw-tooth voltage. This negative sawtooth voltage is fed, via a 33K ohm resistor, to the line 308a. Thus, PUSH-PULL saw-tooth waveforms are emitted, by the differential amplifier 351a, to the lines 307a and 308a. The purpose of the 33K resistors is to prevent the deflection voltages, produced by the Current Switches, from interfering with the saw-tooth circuit.

Thus, when the Deflection Register "11" bit contains a binary 1, a positive saw-tooth voltage is developed on line 307a, and a negative saw-tooth voltage is developed on line 308a, and these saw-tooth voltage increments are added, to the Deflection potentials produced by the Current Switches 306a, and 316a through 320a. A positive saw-tooth increment, on line 307a, is passed through the cathode follower 313a and via line 315a, to the right deflection plates of the cathode ray tubes. A negative saw-tooth voltage on line 308a is passed through the cathode follower 312a, and via line 314a, to the left deflection plates of the cathode ray tubes. THESE INCREMENTS OF SAW-TOOTH VOLTAGE PRODUCE A deflection or BIT SWEEP, of the cathode ray beam, TO THE RIGHT. If the Deflection Register "11" bit had contained a binary 0, the negative AND circuit 348a would have emitted the 4 microsecond negative signal and the increments, of saw-tooth voltage, produced on lines 307a and 308a, would have been opposite in phase, to those described for the condition with the Deflection Register "11" bit containing a binary 1. THUS WHEN THE DEFLECTION REGISTER "11" BIT CONTAINS A BINARY 0, the BIT SWEEP or deflection IS TO THE LEFT.

The Vertical Deflection circuits, as shown in Fig. 3h, are identical in operation to those described for the Horizontal Deflection circuits. It should be noted that the Deflection Register "14" bit, which causes a deflection of two large vertical steps, controls the current switch 360a (Fig. 3h) the latter being provided with a cathode resistor R. Likewise, the Deflection Register "12" bit, the Deflection Register "7" bit and the Deflection Register "8" bit, respectively control the operation of the Current Switches 361a through 363a, which have cathode resistors of 2R, 4R and 8R, respectively. The Deflection Register "8" bit, when it contains a binary 1, causes a deflection of ONE SMALL vertical step.

Inspection of Fig. 3d shows that alternate columns of the raster, as explained above, are deflected ½ the SMALL vertical step. IT SHOULD BE NOTED THAT ½ A SMALL VERTICAL STEP IS EQUAL, ON THE RASTER, to ONE "FULL" SMALL HORIZONTAL STEP. As in the case of a BIT SWEEP, it is the Deflection Register "11" bit, which determines, whether or not, the Deflection Circuits will cause a deflection of ½ a SMALL vertical step. If the Deflection Register "11" bit contains a binary 1, then addresswise, the Vertical Deflection circuits should cause a deflection, of ½ a SMALL vertical step. It should be noted that the signal, on the line DEF REG 11 (Figs. 3g and 3h) controls the operation of the Current Switch 364a (Fig. 3h) which has a cathode resistor 16R. Thus, IF A BINARY 1, IS STORED, IN THE DEFLECTION REGISTER "11" bit, increments of current and corresponding potentials, are added to CAUSE A DEFLECTION of ½ A SMALL VERTICAL STEP.

The current switches 360a through 364a cause a variation in the potential, on lines 365a and 366a. The signals, on line 365a, are passed through a power cathode follower 367a and via line 369a, to the bottom deflection plates of ALL cathode ray tubes. The signals on line 366a are passed through a power cathode follower 368a and via line 370a to the upper deflection plates of all cathode ray tubes.

Thus, there is provided circuitry for ADDRESSING cathode ray tubes, by positioning the beams under control of deflection potentials. The bits, utilized for this ADDRESSING operation, are Address bits, 7 through 15. There has also been provided, a novel BIT SWEEP circuit, which causes the BIT SWEEP to occur selectively, in opposite directions, in alternate columns, thereby causing dashes, written in alternate columns, to sweep in opposite directions on the screen of the cathode ray tubes. The voltage waveforms causing the BIT SWEEP, are shown in the Timing Diagram (Fig. 2r), and are labeled BIT SWEEP. Further, there is provided novel circuitry to deflect the cathode ray beam, ½ a SMALL vertical step, in alternate columns of storage, to thus provide "hexagonal" packing.

Memory controls

The Memory Control circuits illustrated in the composite formed of the drawings of Figs. 3i, 3j, 3k and 3m, develop signals which are utilized for the SELECTION and UNBLANKING of the cathode ray tubes comprising Memory. The signals developed in these circuits are the LEFT TUBE DOT-DASH, the RIGHT TUBE DOT-DASH, the LEFT SAMPLE, the RIGHT SAMPLE, the RESET signal and the READ-IN SAMPLE signals. The manner in which these signals are employed is described fully below, in the detailed description of the UNBLANK circuits of a Memory Unit. Referring to Fig. 3i, outputs from the Cycle Timer (Fig. 2d), described above, cause lines EX TIME and INST TIME to go positive during Execution time and Instruction time, respectively. The signals on these lines EX TIME and INST TIME, respectively, feed to cathode followers 302b and 303b. The output of these cathode followers feed via an OR circuit 308b and a cathode follower 314b to a line 315b. Thus the signal on line 315b is positive, during all Execute and Instruction cycles and conditions one input of an AND circuit 331b, so that a positive A2 (D1) signal on line L106 is passed via a cathode follower 301b, and line 300b to the other input of this AND circuit 331b whose output on line 332b is employed to turn OFF a trigger 326b. Thus, this trigger 326b is OFF, during all Instruction and Execute times. Conversely, the signal on line 315b is negative, when the machine is NOT in Execute time or Instruction time, and this negative signal is passed via an inverter 316b and a cathode follower 317b to a line 318b, which conditions one input to an AND circuit 329b. Under this latter condition, the A2(D1) signal occurring on line 300b, is passed through this AND circuit 329b and via a line 330b is applied, to turn ON the trigger 326b. If the machine is NOT in Execute time or Instruction time, it is in either an Execute/Regenerate or a Regenerate type of cycle. Thus, the trigger 326b is ON, during all times that Memory is Regenerated, and is OFF during periods that Memory is used for reading in or reading out information.

The output from the right plate of the trigger 326b, positive when the trigger is ON, passes through a cathode follower 328b to a line RGN CNTL. In the operation of the machine, the leading edge, of a dash signal which causes an UNBLANKING of the cathode ray tubes, occurs at "10.5" time (Fig. 2r, LT TUBE DOT DASH) of a 12 microsecond character cycle, the dash signal terminating at the "2" time of the following cycle, as is seen from the second or "dash" pulse of LT TUBE DOT DASH in Fig. 2r. During the time that the dash signal is UNBLANKING the cathode ray tubes, as described below no changes may be made to the deflection circuits, except for the BIT SWEEP. In other words, the transfer, from one address to another, in MEMORY, must be made, after "2" time in any particular character cycle. Assuming that the machine is in an Instruction cycle and that dash time is reached, and also assuming that the next cycle, called for by the control circuits, is an Execute/Regenerate cycle, the line INST TIME, feeding to the cathode follower 303b (Fig. 3i), goes negative at "0" or index time of the character cycle, since that is the time, as stated above, that the Cycle Timer changes. However, since the dash signal, if there is one, is still effective, the deflection circuits must not be transferred to a new address while the dash signal continues, which is until the "2" time of a following character cycle. Therefore, at the assumed "9" time, the signals on line EX TIME and INST TIME, feeding to the cathode followers 302b and 303b, respectively, go or are negative, and through the circuits, described above, the line 318b, feeding to the AND circuit 329b, is positive. While this AND CIRCUIT 329b is so conditioned, an A2(D1) signal, on line L106, passes through the cathode follower 301b and this AND circuit 329b, to turn ON the trigger 326b. As stated above, when this trigger 326b is ON, it drives the line RGN CNTL positive. A positive signal on this line RGN CNTL is utilized, as described below, to develop the DOT-DASH signals used during a REGENERATE type of cycle, that is, any cycle during which Memory is Regenerated. It should be noted, however, that the shifting of the trigger 326b takes place at "2" time of the character cycle, by the A2(D1) signal.

As stated above, both Instructions and the data to be processed, are stored in MEMORY. At times it is desirable to CHANGE the Address of a particular Instruction and this is accomplished by an Instruction entitled STORE ADDRESS. When a STORE ADDRESS Instruction is given, it operates upon a selected Instruction, to change its Address portion, i.e., the bits 6 through 17, so that a new Address is stored to replace the Address portion of the selected Instruction, the operation part remaining undisturbed. When such a STORE ADDRESS Instruction is given, the line STORE ADR (Fig. 3i) which is an output of the Operation Decoder, is positive, and conditions one input of the AND circuit 306b. The signal on line EX TIME is postive, during the EXECUTE TIME of this STORE ADDRESS Instruction, and this positive EX TIME signal feeds via the cathode follower 302b to condition the second input of the AND circuit 306b. The third input of this AND circuit 306b is an A2(D1) signal applied via line L106 and the cathode follower 301b so that during the Execute time of a STORE ADDRESS Instruction, this A2(D1) signal passes through this AND circuit 306b. This output is thus a signal of 1 microsecond duration occurring at "2" time of the EXECUTE cycle, during a STORE ADDRESS operation. This output signal from the AND circuit 306b passes via line 312b, to turn ON the trigger 309b, which emits a positive signal via a cathode follower 311b to a line ADR CNTL (STORE ADR). This trigger 309b, remains ON, until the next Instruction cycle, at which time a positive signal on the line INST TIME feeds via the cathode follower 303b, to condition one input of the AND circuit 307b. While this AND circuit 307b is so conditioned, an A2(D1) signal on line L106 passes via the cathode follower 301b to this conditioned AND circuit 307b, whose output on line 313b, turns OFF, the trigger 309b. Trigger 309b, when OFF, emits a positive signal via a cathode follower 310b to the line NOT STORE ADR, so that this line is positive during all operations which are "NOT" STORE ADDRESS.

As stated above, if the Deflection Register 16 bit storage trigger is storing a binary 1, it is ON (Fig. 2p), and the line DEF REG 16 (Fig. 3i) is positive, but if the Deflection Register 16 bit storage trigger is storing a binary 0, it is OFF, and thus the line DEF REG $\overline{16}$ (Fig. 3i) is positive. Thus, if the Deflection Register 16 bit storage trigger contains a binary 0, the LEFT tubes, of the pairs of MEMORY tubes, are selected. A positive signal on the line DEF REG $\overline{16}$ (Fig. 3i) conditions one input of an AND circuit 338b (Fig. 3i) and also one input of the AND circuit 369b (Fig. 3j). A second input to the AND circuit 338b is obtained from the output of an OR circuit 335b (Fig. 3i) via a cathode follower 336b and line 337b.

The output of the OR circuit 335b, is positive, when any one of the inputs thereto is positive, these inputs comprising, one via a line 318b which is positive when Regeneration is to take place, i.e., when the Machine is NOT in an Execute or Instruction time, another via a line SIGN (+) which is positive when half word addresses are selected, and a third via a line NOT STORE ADR which is positive, when the operation is NOT Store Address. Hence the output of the OR circuit 335b, is positive, by virtue of the signal on line 318b, during all cycles, when the machine is NOT in an Execute or Instruction time during all Instruction times and during all Execute times, that half words are addressed, by virtue of the signal on line SIGN (+) and during all Execute cycles (except when the operation is Store Address) by virtue of the signal on the line NOT STORE ADDRESS. In a normal STORE ADDRESS Instruction, the Sign is positive, since a STORE ADDRESS is executed on half words only. Therefore during the normal STORE ADDRESS operation, the output of the OR circuit 335b is driven positive, by a positive signal on line SIGN (+). An Instruction, STORE ADDRESS, given with a negative Sign, is an anomoly, since it calls for an operation normally associated with half words, but would select a full word, by virtue of the negative Sign. Such an Instruction is used to produce an EXTRACT operation. Details of such an EXTRACT operation are described below, but it is important to note that the output of the OR circuit 335b is negative, during such an EXTRACT operation. The line 318b is negative because the Machine is in Execute time, the line SIGN (+) is negative because the Sign is negative and the line NOT STORE ADR is negative because the Instruction in the Operation Decoder is STORE ADDRESS. Thus line 337b, is positive, at all times, EXCEPT during EXTRACT operations thus conditioning one input to the AND circuit 338b (Fig. 3i). Assuming that the operation is other than EXTRACT and that the line DEF REG 16 is positive to thus condition another input to this AND circuit 338b an A6(D1) signal on line L110 (Fig. 3h) passes via a cathode follower 304b, line 320b, this now fully conditioned AND circuit 338b and a cathode follower 339b to the line LT TUBE DOT GEN. The line DEF REG 16 is positive during Regeneration cycles, since the Deflection Register 16 bit trigger 272g (Fig. 2p) is turned OFF at that time. Hence this line LT TUBE DOT GEN, goes positive, at 6 time of every cycle (due to this A6(D1) signal) for one microsecond, except during an EXTRACT operation.

An OR circuit 322b (Fig. 3i) receives signals, via lines RGN CNTL and DEF REG 16, and its output passes via a cathode follower 323b to a line USE RT TUBE. Hence the line USE RT TUBE is positive, during all Regeneration cycles, and during other cycles when the line DEF REG 16 is positive, to select the RIGHT tubes of the pairs of cathode ray tubes.

An AND circuit 341b (Fig. 3i) receives inputs via lines 337b and DEF REG 16. Thus this AND circuit is conditioned at all times, except during EXTRACT operations, as explained above, and also except during Regeneration time, since the line DEF REG 16 is then negative. While this AND circuit 341b is thus conditioned, an A6(D1) signal on line L110 passes via a cathode follower 304b, line 320b, the now conditioned AND circuit 341b and a cathode follower 342b, to line RT TUBE DOT GEN. Hence a one microsecond signal occurs at 6 time on this line RT TUBE DOT GEN, during character cycles in which RIGHT tubes are selected, for read into or read out of, that is during USE cycles, except during EXTRACT operations.

When the machine is in REGENERATION time, the line 318b (Fig. 3i) as stated above is positive, and it conditions an AND circuit 344b. This AND circuit 344b, when so conditioned, allows an A8(D1) signal on line L112 to pass via a cathode follower 305b to this conditioned AND circuit 344b, whose output passes via a delay line driver cathode follower 345b, a delay circuit 346b and a cathode follower 347b, to the line RT TUBE DOT GEN. This signal occurs on this line RT TUBE DOT GEN, at approximately 8.5 time of the character cycle, the 8 time signal of the A8(D1) signal on line L112 being delayed, by the delay circuit 346b.

It should be noted that the line LT TUBE DOT GEN described above goes positive at 6 time, of all Regeneration cycles and of all Instruction cycles, in which the LEFT tubes, of the pairs of cathode ray tubes, have been selected and of all Execute cycles, except EXTRACT. The line RT TUBE DOT GEN goes positive, at 6 time of Instruction and Execute cycles in which the RIGHT tubes of the pairs of cathode ray tubes have been selected, except EXTRACT, and at 8.5 time of all Regeneration cycles.

Referring now to Fig. 3j, which illustrates the circuits for generating the DOT-DASH and SAMPLE CONTROL signals, per se, the signal on line LT TUBE DOT GEN occurs, as stated, at 6 time, of all USE cycles (Instruction and Execute cycles) except EXTRACT and Regenerate cycles, and this signal passes through an inverter 360b (Fig. 3j) to trip a peaker 361b, the SLIGHTLY DELAYED output of which passes via an inverter 362b to trip the single-shot multivibrator 363b, which emits a positive signal, slightly in excess of one microsecond, via a line 366b to a power cathode follower 367b whose output passes, via a power cathode follower 368b, to the line LT TUBE DOT DASH. Hence these circuits produce a signal, slightly in excess of one microsecond duration, and having a leading edge, at approximately 6.5 time of the character cycle, to be emitted to the line LT TUBE DOT DASH. These signals at 6.5 time of the cycle which are the DOT signals of the DOT DASH signals, appear on the line labeled LT TUBE DOT DASH (Fig. 2r) under both the REGENERATE and USE portions of the Timing Diagram. This DOT signal is NOT generated, during EXTRACT operations (as is seen under EXTRACT of Fig. 2r) so that this line LT TUBE DOT DASH, in the EXTRACT portion of the Timing Diagram, has NO pulse, at 6.5 time of the cycle. The DASH signal, which is the long signal following the DOT signal on line LT TUBE DOT DASH, Fig. 2r, for example, is generated and emitted to this line LT TUBE DOT DASH (Fig. 3j) by the following circuits. The line DEF REG 16 (Fig. 3i) which is positive when the LEFT tubes are to be selected, conditions one input of the AND circuit 369b (Fig. 3j). An A9(D1) signal on line L113 (Figs. 3k and 3j) is passed via an inverter 374b, a peaker 375b, a delay line driver cathode follower 376b and a delay line 377b, which, in combination with the peaker delay, produce an output delayed about 1 or 1½ microseconds, from A9 time, which passes via an inverter 378b to trip the single-shot multivibrator 379b. This single-shot multivibrator 379b has a period of 3½ microseconds and emits a positive signal via a power cathode follower 380b, line 381b, the now conditioned AND circuit 369b, an amplifier 371b (the output of which is clamped by clamp circuit 372b), a power cathode follower 373b, and the power cathode follower 368b, to the line LT TUBE DOT DASH. Thus a 3½ microsecond DASH signal, having a leading edge at approximately 10.5 time of the character cycle (Fig. 2r) is generated on the line LT TUBE DOT DASH. Thus as is seen from Fig. 2r, this line LT TUBE DOT DASH is provided with two pulses, one having a leading edge, occurring at 6.5 time, and having a duration of slightly in excess of 1 microsecond, and another pulse, occurring at 10.5 time, and having a duration of approximately 3½ microseconds. These signals occur on this line LT TUBE DOT DASH, during both USE and REGENERATE cycles, (Fig. 2r). The 3½ microsecond signal only, occurs during EXTRACT operations (Fig. 2r).

The single-shot multivibrator 363b described above, in addition to emitting a signal, via line 366b, to generate the DOT signal, also emits a signal, via a line 364b and a power cathode follower 365*b*, to a line LT TUBE SAMPLE GEN, which conditions one input of an AND circuit 322*c* (Fig. 3*k*) of the pulse generator described below. It should be noted however that this signal on line LT TUBE SAMPLE GEN is a positive signal, slightly greater than 1 microsecond in duration and having a leading edge, at approximately 6.5 time, of the character cycle.

Circuits, similar to those just described, are utilized for generating the DOT and DASH signals for the RIGHT tubes of Memory. As stated above, when the ADDRESSING is such that the RIGHT tubes, of selected pairs of Memory tubes, are to be read into or out of, the line RT TUBE DOT GEN (Figs. 3*i* and 3*j*) has a signal thereon, at 6 time of the character cycle, if Memory is to be used, except on EXTRACT operations, or at 8.5 time of the character cycle, if Memory is to be Regenerated. Assuming that the Machine is in a USE cycle and the signal, on the line RT TUBE DOT GEN, is at 6 time of the character cycle, this signal passes via an inverter 388*b* (Fig. 3*j*) a peaker 389*b* and an inverter 390*b*, to trip a single-shot multivibrator 391*b*. This single-shot multivibrator is tripped by the trailing edge of the peaker output and therefore is tripped, at approximately 6.5 time, and emits a positive signal, slightly in excess of one microsecond duration, via a line 392*b* and power cathode followers 394*b* and 395*b*, to a line RT TUBE DOT DASH. Thus a one microsecond DOT signal occurs on this line, at 6.5 time, of the character cycle during a USE cycle; the RIGHT tubes, having been selected, by the Address Controls. This DOT signal on line RT TUBE DOT DASH, is illustrated in the USE portion of the Timing Diagram (Fig. 2*r*). If the machine is to REGENERATE Memory, then the signal on the line RT TUBE DOT GEN feeding to the inverter 388*b* (Fig. 3*j*) is at 8.5 of the character cycle, so that the slightly delayed signal developed on the line RT TUBE DOT DASH, occurs at 9 time, of the character cycle and has a duration of slightly more than 1 microsecond. This DOT signal is shown on the line labeled RT TUBE DOT DASH (Fig. 2*r*) in the REGENERATE portion of the Timing Diagram. No such DOT signal is generated, during EXTRACT operations, and thus no such pulse, is shown, on line RT TUBE DOT DASH of the EXTRACT portion of the Timing Diagram (Fig. 2*r*). The single-shot multivibrator 391*b* (Fig. 3*j*) also emits a positive signal, at either 6.5 time or 9 time of the character cycle, as the case may be, via a line 393*b* and a power cathode follower 395*b*, to a line RT TUBE SAMPLE GEN. The signals on this line are used to develop SAMPLE pulses, as described below.

If the RIGHT tubes of the pairs of tubes are selected, the signal on the line USE RT TUBE (Figs. 3*i* and 3*j*) is positive, and conditions one input of an AND circuit 382*b* (Fig. 3*j*). While this AND circuit 382*b* is thus conditioned, the 3½ microsecond positive signal occurring as stated above on line 381*b* at about 10.5 time of the character cycle, is passed through this AND circuit 382*b* and via an amplifier 384*b* (the output of which is clamped by a clamp circuit 385*b*), a power cathode follower 386*b*, line 387*b* and the cathode follower 395*b*, to this line, RT TUBE DOT DASH. Thus, a DASH signal occurs on this line RT TUBE DOT DASH, at 10.5 time, of every character cycle during which the RIGHT tube is to be USED or REGENERATED. These DASH signals, on line RT TUBE DOT DASH, are illustrated in the USE, EXTRACT, and REGENERATE portions of the Timing Diagram (Fig. 2*r*).

Referring to Fig. 3*k*, circuits are illustrated for generating the SAMPLE signals, which sample READ-OUT from the cathode ray tubes of Memory, as well as circuits for developing a SAMPLE signal for sampling READ-IN to the cathode ray tubes of Memory. The signal on the line DEF REG 6 (Fig. 3*k*) feeding to an amplifier 301*c* and also to an inverter 305*c*, is positive, if the Deflection Register 6 bit storage trigger, contains a binary 1. Assuming that the signal is positive, it passes through the amplifier 301*c* and a cathode follower 302*c* to one input of an OR circuit 303*c*. Another input to this OR circuit 303*c* is positive, when the line RGN CNTL is positive. Thus this OR circuit 303*c* has a positive output when the Machine is in REGENERATION TIME, that is, when the line RGN CNTL is positive, or, during certain USE periods, that is, during Instruction or Execute periods provided the Deflection Register 6 bit is a binary 1. The output of this OR circuit 303*c* passes via a power cathode follower 304*c* to a line SEL MEM II, this line, being positive, when the Memory Unit II is to be USED or regenerated. If the signal on line DEF REG 6 were negative, thus signifying a binary 0, this negative signal passes via the inverter 305*c* and a cathode follower 306*c* to an OR circuit 307*c*. Another input to this OR circuit is via the line RGN CNTL, so that the output of this OR circuit 307*c* is positive, when the Deflection Register 6 bit, is a binary 0, or during REGENERATION TIME, when the line RGN CNTL is positive. The output of this OR circuit 307*c* passes via a cathode follower 308*c* to drive a line SEL MEM I positive. Thus, the respective lines SEL MEM I and SEL MEM II are selectively positive, during USE periods, depending upon whether the Deflection Register 6 bit is a binary 0 or a binary 1, respectively, and BOTH are positive during REGENERATION TIME. A positive signal on the line SEL MEM I, conditions one input of each of AND circuits 365*c* and 345*c* (Fig. 3*k*) while a positive signal on the line SEL MEM II conditions one input of AND circuits 335*c* and 355*c* (Fig. 3*k*). An AND circuit 328*c* (Fig. 3*k*) is conditioned, by a coincidence of positive signals on lines PREP RI MEM and EX TIME, which are positive, respectively, when MEMORY is prepared for Read-In and during EXECUTE TIME. The signal on line PREP MEM RI is generated by control circuits as described in said above-identified Haddad et al. application, which determine when Memory is to be read into. When both inputs to the AND circuit 328*c* are positive, its output is positive and feeds via an inverter 329*c* and a cathode follower 330*c* to render line 331*c* negative. Thus, if READ-IN to Memory, is to take place, the line 331*c* is negative, but if Read-In to Memory is NOT to take place, then line 331*c* is positive. Signals on line 331*c*, when positive, condition one input of each of the AND circuits 325*c* and 332*c*, so that these AND circuits are conditioned, when Memory is NOT to be READ INTO. Assuming that the AND circuit 325*c* is so conditioned, a positive signal, on the line RT TUBE SAMPLE GEN which is generated by the same single-shot multivibrator 391*b* (Fig. 3*j*) producing the DOT signal for the line RT TUBE DOT DASH, is fed, via this conditioned AND circuit 325*c* (Fig. 3*k*) a cathode follower 326*c* and line 327*c* to the AND circuits 335*c* and 345*c*. Assume also that the line SEL MEM II is positive, as described above, so that the AND circuit 335*c* is conditioned, either for the purpose of REGENERATION or for USE. With this AND circuit 335*c*, so conditioned by the signal on the line SEL MEM II being positive, the RIGHT TUBE SAMPLE GENERATOR pulse appearing on line 327*c*, passes via this AND circuit 335*c* to a delay line driver cathode follower 336*c* and a delay line 337*c* to an inverter 338*c*, a cathode follower 339*c*, a peaker 340*c* and power cathode followers 341*c* and 342*c*, to a line RT SAMPLE MEM II. Thus a SAMPLE pulse is generated which goes to the RIGHT tubes of the pairs of cathode ray tubes, in MEMORY UNIT II. Due to the fact that the signals on line RT TUBE SAMPLE GEN occur at different times, that is at 6.5 time or at 9 time, depending upon whether the machine is in a USE or a REGENERATE type of cycle, this signal, on the line RT SAMPLE MEM II, occurs near the trailing portion of the DOT signals. Referring to the USE portion of the Timing Diagram (Fig. 2*r*) it is seen that the signal on the line RT SAMPLE MEM II of Fig. 3*k*, occurs at the time, as shown by the signal labeled RT SAMPLE, which is a positive signal having a duration of approximately one half to one third microseconds, occurring during the trailing portion, of the DOT signal on the line RT TUBE DOT DASH. No RIGHT SAMPLE signal is shown, on the EXTRACT portion of the Timing Diagram, since none is generated, due to the fact that no DOT signal is generated, during EXTRACT operations. However, during REGENERATION, the RIGHT SAMPLE signal, as illustrated in the Timing Diagrams, occurs at approximately "10" time of the cycle, again during the trailing portion of the DOT signal. This signal, thus represented, occurs of course on the line RT SAMPLE MEM II (Fig. 3k).

The various circuits identified by the reference characters 345c through 352c in Fig. 3k, are identical to those circuits having reference characters 335c through 342c, just described, except that the AND circuit 345c, is conditioned, by the line SEL MEM I, when positive, whereas the AND circuit 335c, as discussed above, is conditioned when the line SEL MEM II is positive. Thus, the signals on the line RT SAMPLE MEM I are as represented on the line RT SAMPLE of the Timing Diagram (Fig. 2r) these signals, occurring on line RT SAMPLE MEM I, during the time or times that MEMORY UNIT I is to be USED or REGENERATED. Similar circuits identified by reference characters 355c through 362c (Fig. 3k) are used for generating the LEFT SAMPLE signals which are emitted to the LEFT tubes of the pairs of MEMORY Unit II, while the circuits identified by reference characters 365c through 372c (Fig. 3k) are utilized for generating the LEFT SAMPLE signals for MEMORY Unit I. This LEFT SAMPLE signal always occurs, slightly after 7.5 time, of the character cycle. Thus, the LEFT SAMPLE signal always occurs, between 7 and 8 time of the character cycle (Fig. 2r) whether the machine is in a REGENERATE or a USE cycle. Timing of the signals which cause a SAMPLE of the LEFT tubes, of either MEMORY Unit I or MEMORY Unit II, are illustrated on lines LT SAMPLE, under both the USE and REGENERATE portions of the Timing Diagram (Fig. 2r).

Assuming, as stated above, that the signal, on the line PREP MEM RI goes positive, which signal prepares Memory for Read-In, no LEFT or RIGHT SAMPLE signals are generated, since line 331, is negative, thereby removing conditioning from AND circuits 325c or 332c, and although certain cathode ray tubes of Memory, may be READ-OUT of, the information output signals are "NOT" SAMPLED and, therefore, the information previously stored by the particular bits, being interrogated, is destroyed.

At the same time, if this line PREP MEM RI is positive, it conditions one input, of the AND circuit 311c, a second input of the same AND circuit being conditioned when the line EX TIME goes positive. Therefore when lines PREP MEM RI and EX TIME are positive, an A9(D1) positive signal on line L113 passes via a cathode follower 309c to the 3rd input of this AND circuit 311c, and out via the delay line driver cathode follower 312c and the delay line 313c, an inverter 314c, a peaker 315c, and power cathode followers 316c and 317c, to the line RI SAMPLE. Thus, with Memory prepared for READ-IN, a positive pulse, approximately one half microsecond in duration, occurring at approximately 9.5 time, of the character cycle, occurs on the line RI SAMPLE (Fig. 2r). This signal, as described below, is used to SAMPLE the information pulses, if any, occurring on the Memory busses, and is indicated in the line RI SAMPLE, of the USE PORTION of the Timing Diagram (Fig. 2r).

As stated above, a STORE ADDRESS operation, is provided, so that the Address part of an Instruction may be changed, while the Operation part, of the Instruction, remains undisturbed. It was also stated above, that both Memory Unit I and Memory Unit II comprise PAIRS of cathode ray tubes. In Address selection, there is a selection of the LEFT tubes or of the RIGHT tubes, of the pairs and there is a further selection, of full (36 bits) or half (18 bits) words, the half words being either the left 18 bits (S, and 1 to 17) or the right 18 bits (18 to 35) of a full word.

Therefore, to provide selection of Memory Unit I or Memory Unit II, to further select the Address portion, of a half word, of both right 18 and left 18 half words, and also, to further select the Operation portion, of the same half words, as required, then eight control lines are necessary. These comprise four lines, respectively, to Memory Unit I and four lines to Memory Unit II. The four lines feeding to Memory Unit II as shown in Fig. 3m (there are corresponding lines feeding to Memory Unit I) are as follows: The line LT 18 OPN CNTL MEM II which, when positive, allows the UNBLANKING of the Operation portion, of a left 18 bit half word, that is, UNBLANKING of those tubes storing bits S and 1 through 5; the line RT 18 OPN CNTL MEM II, which, when positive, allows the UNBLANKING of the Operation portion, of a right 18 bit half word, that is, UNBLANKING of those tubes storing bits 18 through 23; the line LT 18 ADR CNTL MEM II, which, when positive, allows the UNBLANKING of the Address portion, of a left 18 bit half word, that is UNBLANKING of those tubes storing bits 6 through 17; the line RT 18 ADR CNTL MEM II, which, when positive, allows the UNBLANKING of the Address portion, of a right 18 bit half word, that is, UNBLANKING of those tubes storing bits 24 through 35.

When the lines LT 18 OPN CNTL MEM II and LT 18 ADR CNTL MEM II are simultaneously positive, then a half word may be READ IN or READ OUT of the left 18 tube pairs of Memory Unit II. If lines RT 18 OPN CNTL MEM II and RT 18 ADR CNTL MEM II are simultaneously positive, then a half word may be READ IN or READ OUT of the right 18 tube pairs of Memory Unit II. If all four lines are positive, then a full word is processed, by READ IN or READ OUT of all 36 tube pairs. As stated above, line SEL MEM I or line SEL MEM II (Fig. 3k) goes positive, to cause a selection of Memory Unit I or Memory Unit II, during a USE cycle, depending upon the holding of the Deflection Register 6 bit, but BOTH lines are positive, during a REGENERATION operation. Assuming that line SEL MEM II is positive, it conditions one input of each AND circuit 304d and 321d (Fig. 3m). Assume further that the operation is other than STORE ADDRESS and that the Deflection Register 17 bit (Fig. 3m) contains a binary 1, which calls for an ODD half word address, that is the right 18 half word. Since the Instruction is other than STORE ADDRESS, the line ADR CNTL (STORE ADR) feeding to an AND circuit 301d (Fig. 3m) is negative and therefore this AND circuit is NOT conditioned. However, under the assumed conditions, BOTH inputs to the AND circuit 316d, are positive, since the line NOT STORE ADR is positive and the Deflection Register 17 contains a binary 1 so that the line DEF REG 17 (ODD) is positive, indicating an ODD half word. The output of this AND circuit 316d, passes via a line 317d, an OR circuit 318d, a cathode follower 319d and a line 320d, to AND circuits 321d and 326d. Assuming, as above, that Memory Unit II is selected, AND circuit 321d is conditioned, by the positive signal on line SEL MEM II, so that the positive output of this AND circuit 321d passes via an amplifier 322d and a cathode follower 323d, line 324d, and a power cathode follower 325d, to drive the line RT 18 OPN CNTL MEM II, positive. The right 18, Operation portion, is as stated above, stored in the cathode ray tubes which would hold bits 18 through 23 for a full word Address but bits S and 1 through 5 are actually stored therein if a right half word is addressed. The signal on this line 324d also passes via a cathode follower 332d, an OR circuit 308d and a cathode follower 309d to the line RT 18 ADR CNTL MEM II, this line, when positive, allowing the UNBLANKING of the right 18 Address portion, more specifically the tubes holding bits 24 through 35 of full word address or bits 6 through 17 of a right half word. Thus it is seen that if the Instruction is other than STORE ADDRESS and an ODD half word is selected, then the cathode ray tubes, holding bits 18 through 35, may be UNBLANKED. As the holding of these tubes is READ INTO the Memory Register, the information is registered, in Memory Register positions S, and 1 through 17.

The OR circuit 318d (Fig. 3m) also receives an input, via the line SIGN (—), comprising an output of the Deflection Register, which is positive when the Sign of an Address is negative. A positive input to this OR circuit 318d will, of course, through the circuits just described, allow the UNBLANKING of the right 18, Operation portion, and the right 18, Address portion. This is necessary since, when a full word address is given, as indicated by a negative Sign, 36 tubes, including the right 18, should be UNBLANKED.

If the operation called for was STORE ADDRESS, the word Addressed, would be a half word, and therefore the Sign, of the Address, would be positive. Under these conditions, neither input to the OR circuit 318d is positive. However, if the half word address is an ODD half word, as signified by the Deflection Register 17 bit containing a binary 1, and the line DEF REG 17 (ODD) conditions one input, to the AND circuit 301d, the other input to this AND circuit 301d, via line ADR CNTL (STORE ADR) is also positive (during a STORE ADDRESS) and therefore, the output of the AND circuit 301d, is positive, and passes via a cathode follower 302b and line 303d, to provide positive inputs to both AND circuits 304d and 310d. Under the assumed condition, that MEMORY Unit II is selected, the line SEL MEM II is positive and therefore, both inputs, to the AND circuit 304d are positive, and its positive output passes via an amplifier 305d, a cathode follower 306d, line 307d, an OR circuit 308d and a power cathode follower 309d, to drive the line RT 18 ADR CNTL MEM II, positive. Thus, if the operation is STORE ADDRESS, and MEMORY Unit II has been selected by the holding of the Deflection Register 6 bit, and an ODD Address is called for, by the Sign being positive, and the Deflection Register 17 bit is a binary 1, then the Address portion only, of the right 18 tubes of MEMORY Unit II may be UNBLANKED. This corresponds to bits 24 through 35 of a full word Address in Memory Unit II. Since bits 24 through 35, "correspond" to bits 6 through 17, of an ODD or right half word, the Address part of an Instruction stored in a right half word Address, may be changed. It has also been seen that if the operation called for is not STORE ADDRESS, if the Deflection Register 17 contains a binary 1, and the Deflection Register 6 bit contains a binary 1, or if the Sign of the selecting address is negative, then line RT 18 OPN CNTL MEM II and line RT 18 ADR CNTL MEM II go positive, to cause a possible UNBLANKING of the right 18 tube pairs of MEMORY Unit II.

If the Deflection Register 6 bit is a binary 0, then line SEL MEM I, rather than the line SEL MEM II, is positive, and this positive signal conditions one input of the AND circuits 310d and 326d. While these particular AND circuits are conditioned, and the output of the OR circuit 318b is positive, due to the fact that a full word address is called for, by a positive signal on line SIGN (—) or when the Instruction is not STORE ADDRESS and the Deflection Register 17 bit is a binary 1 (which calls for an ODD half word or the right half word), the output of the OR circuit feeds via a cathode follower 319d, line 320d, this conditioned AND circuit 326d, an amplifier 327d, a cathode follower 328d, and line 329d to power cathode follower 331d and also to cathode follower 330d. The output signal of power cathode follower 331d feeds to line RT 18 OPN CNTL MEM I which, when positioned, allows UNBLANKING of the right 18, Operation bits, in MEMORY Unit I.

The output of the cathode follower 330d, now positive, passes through OR circuit 314d and a cathode follower 315d to drive the line RT 18 ADR CNTL MEM I, positive, and thereby allows UNBLANKING of the Address bits of the right half word positions of MEMORY Unit I.

Thus, it is seen, that the right half word, Operation and Address bits, of MEMORY Unit I, may be UNBLANKED, when Memory Unit I is selected, and either a full word is called for, an Address having a negative Sign or the Deflection Register 17 bit is a binary 1, which calls for an ODD half word address and the operation is "NOT" STORE ADDRESS.

If, however, the operation called for is STORE ADDRESS, and the Deflection Register 17 bit is a binary 1, calling for an ODD address, both inputs to AND circuit 301d, are positive and its positive output passes via the cathode 302d, line 303d, AND circuit 310d (conditioned when Memory Unit I is selected) an amplifier 311d and a cathode follower 312d, to line 313d. The signal on line 313d passes through an OR circuit 314d and a power cathode follower 315d, to the line RT 18 ADR CNTL MEM I. Thus, the line RT 18 ADR CNTL MEM I, goes positive, and allows UNBLANKING of the tube pairs 24 through 35, of MEMORY Unit I.

Identical circuits to those just described, are illustrated in the upper half of Fig. 3m, and energize the lines LT 18 OPN CNTL MEM I, LT 18 OPN CNTL MEM II, LT 18 ADR CNTL MEM I and LT 18 ADR CNTL MEM II. These lines are energized, under the same conditions or combination of conditions, which caused lines RT 18 OPN CNT MEM I, RT 18 OPN CNTL MEM II, RT 18 ADR CNTL MEM I and RT 18 ADR CNTL MEM II, to be energized, except that the Deflection Register 17 bit is a binary 0 and causes the line DEF REG $\overline{17}$ (EVEN) to go positive, rather than line DEF REG 17 (ODD). The left 18 half words, are regarded as being stored, at EVEN addresses. When the Sign of the Deflection Register is negative, the line SIGN (—) causes all four lines feeding to MEMORY Unit I or all four lines feeding to MEMORY Unit II, to go positive, dependent upon whether the line SEL MEM I or the line SEL MEM II is positive.

*Memory tubes, unblank, read-in, read-out and regenerate control circuits*

Referring to Fig. 4 there is illustrated the UNBLANKING READ-IN (WRITE) READ-OUT, and REGENERATE Control circuits for a representative pair of cathode ray Memory tubes 423 and 430. As stated above, there are 36 such pairs of tubes (a total of 72 tubes) in Memory Unit I and a similar number in Memory Unit II. These circuits receive information, FROM the MEMORY BUSS and control the cathode ray tubes so that this information is WRITTEN on the screens of these cathode tubes 423 and 430 and these circuits also are used to READ-OUT information, by way of the pick up plates 400 and 401 and to transmit this information TO the MEMORY BUSS. Provision is also made for REGENERATING the information stored on the screen of these cathode ray tubes. Reference to the Timing Diagrams (Fig. 2r) shows that a positive signal occurs, on the line labeled 336a (Fig. 2r) and shown in Fig. 4, having a duration of approximately ½ microsecond and having a leading edge approximately at "3" time of the Character Cycle. The signal on this line 336a (Fig. 4) is fed via inverters 407 and 416 to turn OFF the respective triggers 406 and 415. If, an Address, is to be changed, it is changed at "2" time of the cycle and several microseconds are then allowed, for the Deflection circuits, to apply deflection potentials to the deflection plates of the cathode ray tubes and to become stabilized, before the beam is UNBLANKED, at 6.5 time as described presently. These triggers 406 and 415 are thus reset OFF, at "3" time of the cycle so that the output, of the left plate of trigger 406, is positive, and via a cathode follower 408 and line LEFT DASH WRITE CNTL, conditions one input of an AND circuit 420. At the same time, since trigger 415 is OFF, it emits a positive signal via a cathode follower 417 and the line RIGHT DASH WRITE CNTL, to an AND circuit 425. The second input to both these AND circuits 420 and 425 is via a line CNTL which "corresponds," to one of the eight output lines RT 18 OPN CNTL MEM I, etc. of Fig. 3m, described above. Assuming that the pair of cathode ray tubes shown in Fig. 4 is one selected by the ADDRESSING control circuits, then the line CNTL is positive and the AND circuit 420 will pass signals, which may occur on the line LEFT TUBE DOT DASH, while the AND circuit 425 is conditioned to pass signals which may occur on the line RIGHT TUBE DOT DASH. Assuming for purpose of explanation that the machine is in a USE cycle and that the DOT signal, occurs on the line LT TUBE DOT DASH, at 6.5 time, this positive signal, slightly in excess of 1 microsecond in duration, is passed through the AND circuit 420, amplifier 421 and line 422, to the control grid of the cathode ray tube 423 (the cathode ray tube 423 being regarded as the LEFT TUBE) which is thus UNBLANKED so that its cathode ray beam impinges on the screen, at the particular area which is THEN selected, by the Address selecting potentials on the deflection plates. The particular spot, so selected on the screen, is thus bombarded, and a DOT IS WRITTEN. If a dash was previously stored at this selected spot, a signal is picked up, by the pick up plate 401 (similar to pick up plate 109) of Fig. 1 and is passed through a video amplifier 402 and a clipper 403, to a SAMPLE AMPLIFIER 404. The polarity of the signal to this Sample Amplifier 404, as a result of READING a dash, is a negative signal, delayed slightly from the leading edge of the dot UNBLANK positive signal so that the NORMAL "conditioning" of the Sample Amplifier 404 is destroyed, and the SAMPLE signal on the line LT SAMPLE, which is a positive ½ microsecond signal occurring between "7" and "8" time of the character cycle (Fig. 2r) is BLOCKED from passing through the Sample Amplifier 404.

Since the SAMPLE pulse on line LT SAMPLE is thus BLOCKED from passing through the Sample Amplifier 404, when a dash is READ, the trigger 406, remains OFF, and continues to emit a positive signal to condition the AND circuit 420, as described above. Thus the three and one half microsecond DASH signal occurring on the line LT TUBE DOT DASH (Fig. 2r) at "10.5" time of the character cycle, passes through this conditioned AND circuit 420, to again UNBLANK the LEFT cathode ray tube 423. "COINCIDENT" with this UNBLANKING, the BIT SWEEP signal (see Timing Diagram (Fig. 2r) line BIT SWEEP) is also applied, to the Deflection Circuits so that the cathode ray beam is swept, either to the left or to the right, as described above, and the dash, READ from the tube, is thus RE-RECORDED. Thus, it is seen that when a dash is READ out of the cathode ray tube 423, a DOT IS FIRST WRITTEN to replace the dash and then later the dash is RE-RECORDED, during the same character cycle. If a dot, had been READ out of the cathode ray tube 423 at 6.5 time, then the output of the pickup plate 401 to the video amplifier 402 is a plug signal, so that the Sample Amplifier 404 would have REMAINED conditioned, to thus pass, the LEFT SAMPLE signal on the line LT SAMPLE, to thus turn ON, the trigger 406, which when ON, emits a negative signal via the cathode follower 408 and the line LEFT DASH WRITE CNTL to REMOVE conditioning from the AND circuit 420, so that, as the three and one half microsecond DASH signal occurs, at "10.5" time (Fig. 2r) on the line LT TUBE DOT DASH, it is BLOCKED from passing through this AND circuit 420 so that the cathode ray tube 423 would NOT be UNBLANKED at that time (the BIT SWEEP would still be applied, to no avail, to the Deflection Circuits). The result of this is, that the dot WHICH WAS WRITTEN on the target, during READ OUT, per se, of the cathode ray tube 423, REMAINS UNCHANGED, so that, if a dot had been READ, a dot REMAINS stored, at the particular Address selected.

On a READ-IN (WRITE) operation, although an UNBLANKING of the cathode ray tube occurs, during the dot time, as described, and the output signal passes through the video amplifier 402 and the clipper 403, to the Sample Amplifier 404, since MEMORY is to be READ INTO there is "NO" LEFT SAMPLE pulse produced on the line LT SAMPLE as described above and the output of the Sample Amplifier 404 therefore remains positive, and the trigger 406, remains OFF. UP TO THIS POINT, if there had been a dash stored in MEMORY, it has been replaced by a dot. Thereafter, specifically at 9.5 time of a character cycle, a READ IN SAMPLE pulse occurs (Fig. 2r) on the line RI SAMPLE, feeding to an AND circuit 418. This RI SAMPLE pulse will or will not pass this AND circuit, depending upon whether the MEMORY BUSS has a binary 1 signal thereon. If a binary 1 signal does exist, the MEMORY BUSS is positive, starting slightly after "8" time of the character cycle (see Fig. 2r) and remains positive until approximately "3" time, of the next character cycle as illustrated in the Timing Diagrams (Fig. 2r) by the line labeled MEMORY BUSS. If a binary 0 is to be stored, then the MEMORY BUSS line remains relatively negative, as shown on the Timing Diagram (Fig. 2r) by the dotted portion of the line MEMORY BUSS. Assuming, however, that a binary 1 IS to be stored in Memory so that the AND circuit 418 IS conditioned, the READ IN SAMPLE pulse is passed through this conditioned AND circuit 418 and, via an inverter 405, pulls over the trigger 406, to an ON condition. Trigger 406, now ON, emits a negative signal via the cathode follower 408 and the line LEFT DASH WRITE CNTL to REMOVE conditioning from the AND circuit 420. Therefore, at 10.5 time of the cycle as the DASH part of the DOT-DASH signal arrives on the line LEFT TUBE DOT DASH, the AND circuit 420 is NOT conditioned and the cathode ray tube 423 is "NOT" UNBLANKED. Thus, the dot, which is WRITTEN on the cathode ray tube 423, by the dot READ pulse, REMAINS UNCHANGED, this storage, of a dot, being representative of a binary −1−. If, however, a binary −0− is to be WRITTEN, the line MEMORY BUSS is negative so that "NO" READ IN SAMPLE PULSE is passed, through the AND circuit 418 (since its other input is NOT plus) to turn ON the trigger 406 and the AND circuit 420 would REMAIN "conditioned". The DASH part of the DOT-DASH signal on line LT TUBE DOT DASH then passes through this conditioned AND circuit to UNBLANK the cathode ray tube 423, and, in combination with the BIT SWEEP, cause the recording of a dash, to thus represent a binary −0−, as is required by the binary −0− signal on the MEMORY BUSS.

The RIGHT tube 430 has associated with it, circuits corresponding to those described for the LEFT tube. These include a Sample Amplifier 413, an inverter 414, a trigger 415, an inverter 416 and a cathode follower 417. The output of the latter may condition or not condition, as the case may be, the AND circuit 425 to gate or block passage of pulses on the line RT TUBE DOT DASH to cause or not cause an UNBLANKING of the RIGHT cathode ray tube 430. It should be recalled, however, that, during a USE cycle, pulses occur on EITHER line LT TUBE DOT DASH and line LT SAMPLE or line RT TUBE DOT DASH and line RT SAMPLE, depending on the particular Address selected by the Deflection Register. Thus, during a USE cycle it is possible to select EITHER the LEFT or RIGHT tube, for UNBLANKING, according to the desired Address. However, on REGENERATION, an Address, on BOTH the LEFT and RIGHT tubes is REGENERATED during ONE character cycle.

Refer to the REGENERATE portion of the Timing Diagram (Fig. 2r) and note that signals occur on lines LT TUBE DOT DASH, RT TUBE DOT DASH, RT SAMPLE and LT SAMPLE. Further, it is to be noted that the line CNTL (Fig. 4) feeding to the AND circuits 420 and 425, is positive, since BOTH Memory Unit I and Memory Unit II are selected, during REGENERATION. Both triggers 406 and 415 are reset OFF, as described above, by the signal on line 336a. Thus, when a positive signal occurs, on the line LT TUBE DOT DASH (Fig. 2r) at 6.5 time, of a REGENERATE cycle, the AND circuit 420 is conditioned and this signal passes therethrough, to produce UNBLANKING of the LEFT cathode ray tube 423. If a dash is READ, from the cathode ray tube 423, a negative signal is applied to the sample amplifier 404, as described above, so that the positive signal on the line LT SAMPLE, occurring at 7.5 time (Fig. 2r) can NOT pass, and thus trigger 406, remains OFF; partly conditioning the AND circuit 420. At the same time, the AND circuit 420 is further conditioned, by a positive signal on the line CNTL, so that the dash can be RE-RECORDED. At the same time, the trigger 415, which was reset OFF, at the same time as trigger 406, conditions AND circuit 425, which is controlled by the signal on the line RT TUBE DOT-DASH to thus control the RIGHT tube. If a dot has been READ from the LEFT tube, the trigger 406 is shifted ON, to REMOVE conditioning from AND circuit 420, and similarly, if a dot is READ from the RIGHT tube, conditioning is removed from AND circuit 425.

Thus, in recapitulation, it is seen that the triggers 406 and 415, are respectively turned ON, to represent a dot or binary 1, in the LEFT or RIGHT tubes, respectively, but remain OFF, to represent a dash or binary –0–. The trigger 406, if it remains OFF, conditions the AND circuit 420 so that the three and one half microsecond DASH signal, occurring at 10.5 time (Fig. 2r) of the cycle, on the line LT TUBE DOT DASH passes through this AND circuit 420 and the amplifier 421, to UNBLANK the LEFT cathode ray tube 423, while the trigger 415, if it remains OFF, conditions the AND circuit 425, so that the DASH signal, occurring at 10.5 time on the line RT TUBE DOT-DASH, passes through the AND circuit 425 and the amplifier 428, to UNBLANK the RIGHT cathode ray tube 430. Simultaneous with this UNBLANKING of the cathode ray tubes 423 and 430, the BIT SWEEP signal is applied to the deflection plates, of BOTH cathode ray tubes, as described above, so that dashes are RE-RECORDED on the cathode ray screens at the Addresses to which the beam is being deflected. Thus, it is seen that one Address bit, in BOTH tubes, is REGENERATED, during the same REGENERATE cycle.

The information READ OUT of the cathode ray tubes, during a USE cycle, as well as during a REGENERATE cycle, determines the condition of the respective triggers 406 and 415. Assuming that a READ OUT was from the LEFT tube 423, the trigger 406 will be set ON or remain OFF, depending upon whether a dot (binary 1) or dash (binary 0) was stored. The output of the trigger 406, negative when the trigger is ON to indicate a binary –1–, passes through the cathode follower 408 and then via a negative OR circuit 410, an inverter 411 and a power cathode follower 412, is applied to the MEMORY BUSS. Thus, if a binary –1–, is READ, OUT of cathode ray tube 423, the MEMORY BUSS goes positive. Conversely, if a binary –0–, is READ, OUT of cathode ray tube 423, the MEMORY BUSS is negative, to indicate a binary –0–. If READ OUT, is from the RIGHT cathode ray tube 430, then the trigger 415 will, as described above, be set to an ON or OFF condition, to represent, respectively, a binary –1– or binary –0–, as the case may be. The output of the trigger 415 passes via the cathode follower 417, and then via the negative OR circuit 410, the inverter 411, and the cathode follower 412, to the MEMORY BUSS. Thus, it is seen that READ-OUT, may be from EITHER the LEFT or the RIGHT tube, of a particular pair, to the MEMORY BUSS and the information, thus READ, whether a binary –1– or a binary –0–, is gated, from the MEMORY BUSS, as described above, to the MEMORY REGISTER.

*Extract*

Refer now to the EXTRACT portion of the Timing Diagram (Fig. 2r). The EXTRACT operation, as described above, involves the WRITING of a dash, that is a binary –0–, into bit positions of a selected Address in the cathode ray tube storage, if a binary –0– is present on the MEMORY BUSS feeding to the cathode ray tubes. HOWEVER, IF A binary –1–, IS PRESENT on the MEMORY BUSS, THE PARTICULAR BIT POSITION OF THE SELECTED ADDRESS, BE IT A BINARY –1– or a BINARY –0–, IS LEFT UNDISTURBED, so that if a binary –1– was stored, IT REMAINS stored, and if a binary –0– was stored, IT REMAINS stored. The result is that binary –1's–, are finally stored, only in those bits ALREADY having binary –1's– stored PRIOR TO the EXTRACT operation, and also having binary –0's– WRITTEN during the EXTRACT operation.

This EXTRACT operation is performed by blocking the generation of the DOT pulse on the DOT-DASH lines during an EXTRACT operation, as described above, whereby for binary –1's– on the MEMORY BUSS the binary –1– or binary –0–, stored at a particular bit position, REMAINS AS IS.

This operation is as follows: The signal on the MEMORY BUSS is sampled by the READ IN SAMPLE pulse as described above and if a binary –0– is present, the storage trigger, remains OFF, and the DASH pulse, as one occurs, is gated, to UNBLANK the cathode ray tube and thereby store a binary –0–, as described in detail above. However, if a binary –1– is present on the MEMORY BUSS, the storage trigger, is turned ON, and passage of the DASH pulse, to UNBLANK the cathode ray tube, is BLOCKED.

In more detail, assume for purposes of explanation that the LEFT tubes are selected, during an EXTRACT operation, which means that the three and one half microsecond DASH pulse and ("NO" DOT pulse) occurs on the line LT TUBE DOT DASH, at "10.5" time of the cycle. At "3" time of the cycle, the pulse on line 336a, via inverters 407 and 416, respectively, resets storage triggers 406 and 415. Potentials are applied to the deflection plates but since "NO" DOT signal is produced during an EXTRACT operation, the dot or dash (binary –1– or binary –0–) remains stored at the selected spot. At "9.5" time of the cycle, the pulse on the line RI SAMPLE, feeds to the AND circuit 418, but does NOT pass through this AND circuit, if a binary –0– (negative signal) is present on the line MEMORY BUSS. Thus trigger 406, remains OFF, and via the cathode follower 408 and the line LEFT DASH WRITE CNTL conditions the AND circuit 420. Assuming the line CNTL is positive, as explained above, as the DASH signal occurs, at "10.5" time, on the line LT TUBE DOT DASH, it passes via this AND circuit 420, the amplifier 421 and line 422, to UNBLANK the cathode ray tube 423. The BIT SWEEP is applied to the deflection plates, at the same time, and thus a dash (binary –0–) is stored. However, if the MEMORY BUSS were positive, to thus represent a binary –1–, then the READ IN SAMPLE pulse would pass via the AND circuit 418 and inverters 405 and 414, respectively, to turn ON storage triggers 406 and 415. Trigger 406, when ON, causes the line LEFT DASH WRITE CNTL, to go negative, and thus BLOCK passage of the DASH signal, through the AND circuit 420 so that the cathode ray tube is "NOT" UNBLANKED, by a DASH pulse and the information, in the same condition, as formerly stored, at the particular spot selected, remains as is, whether it be a binary –1– or a binary –0–. Thus if a binary –1– or binary –0– is already stored, at a particular position, and a binary –1– is present, on the MEMORY BUSS during an EXTRACT operation, the binary –1– or binary –0–, already stored, as the case may be, remains undisturbed. However, if a binary –0– is present on the MEMORY BUSS, a binary –0– is stored, at that bit position, regardless of what was formerly stored in that position.

*Operation decoder*

Details of the Operation Decoder (Fig. 1d) are shown in Figs. 5a and 5b. The operation Decoder receives ten outputs from the stored manifestations in the Instruction Register of the bits 1 to 5 bits inclusive which comprise the Operation portion of the Instruction Register (see also Fig. 1c) and converts the permutations of the binary –1– and binary –0– holdings of these five bits, into thirty-two separate outputs, only one of which is positive at any one time. The inputs to the Operation Decoder (Fig. 5a) are lines OPN REG 1 through OPN REG 5 and OPN REG $\bar{1}$ through OPN REG $\bar{5}$. These lines are positive, as stated above, when the respective bits contain binary –1's–, in the case of lines OPN REG 1 through OPN REG 5, or binary –0's–, in the case of the lines OPN REG $\bar{1}$ through OPN REG $\bar{5}$. Different combinations of these lines feed to 32 AND circuits as illustrated in Figs. 5a and 5b each AND circuit having five inputs so that when all five inputs to a particular AND circuit, are positive, its output is positive and thereby energizes the single thus selected line only connected to said AND circuit to thus produce a particular operation of the machine by rendering certain control circuits effective. For example, the AND circuit 501a (Fig. 5b) receives inputs from lines OPN REG 1, OPN REG 2, OPN REG $\bar{3}$, OPN REG $\bar{4}$ and OPN REG $\bar{5}$. Thus, if the particular permutation of bit values of the 1 through 5 bits of storage in the Instruction Register are 1100, all five inputs to this AND circuit 501a are positive, and its positive output feeds via a cathode follower 502a to drive line READ positive. Thus, if the permutation of bits 1 through 5 of the Instruction Register is 1100, the operation called for by the machine is READ. All thirty-two outputs of the Operation Decoder are shown, and they are selectively driven positive by identical AND circuits and cathode followers. It will be apparent that the inputs to the various AND circuits comprise different combinations of lines so that thirty-two outputs are available each of which calls for a particular operation. These outputs, on the left side of Figs. 5a and 5b, reading from top to bottom, are STOP, TR OV (Transfer on Overflow), TR 0 (Transfer on Zero), R SUB (Reset and Subtract), NO OP (No Operation), R ADD (Reset and Add), STORE, STORE MQ (Store Multiplier-Quotient), MPY (Multiply), DIV (Divide), L LEFT (Long Shift Left), ACC LEFT (Accumulator Shift Left), READ, WRITE, REWIND and SENSE. The outputs of the right, side of the Operation Decoder, proceeding from top to bottom in Figs. 5a and 5b are: TR (Transfer), TR + (Transfer on Plus), SUB (Subtract), SUB AB (Subtract Absolute Value), ADD, ADD AB (Add Absolute value), STORE ADR (Store Address), LOAD MQ (Load MQ meaning to Read Out of Memory into the MQ Register), MPY R (Multiply and Round), ROUND, L RIGHT (Long Shift Right pertaining to the joint shifting of the MQ and Accumulator units), A RIGHT (Shift Accumulator Right, pertaining to the shifting of the accumulator, alone, to the right), READ B (Read Backwards), WRITE EOF (Write End of File), SET DR (Set Drum), COPY.

Most of these Instructions pertain to arithmetic operations which include manipulation of information through the Adder, Accumulator, and Multiplier Quotient Register which are described in said above identified Haddad et al. application. Certain of these operations pertain to Input/Output units, for example, such Instructions as Read, Write, Rewind, Sense, Read Backwards, Write End of File, Set Drum, and Copy which are described in said above identified application of Bartelt et al.

The Class Selector Matrix, illustrated in Fig. 5c, is utilized to mix, 6 outputs from the Operation Decoder such as Read, Read Backwards, Write, Write End of File, Rewind and Sense, with outputs from stages, 6 through 11, of the Address portion of the Instruction Register.

These outputs from this Address portion are labeled ADR REG 6 through ADR REG 11 in Fig. 5c, these lines being positive, when their respective bits contain binary –1's–. The above mentioned outputs from the Operation Decoder and the outputs from these storage bits of the Address portion are mixed, in fourteen AND circuits as illustrated in Fig. 5c, to determine which CLASS, of Input/Output Unit, is to be selected. Since these particular inputs from the Operation Decoder all deal with operations that involve Input/Output units, consequently, the Address, then held by the Instruction Register, is utilized to assist in the selection of a particular Input/Output unit, INSTEAD of selecting an Address in Memory.

If the output line READ (Fig. 5c) from the Operation Decoder, is positive, and the signal on line ADR REG 9 is positive, then both inputs, to an AND circuit 510a, are positive, and its positive output passes via a cathode follower 511a to drive the line READ TAPE ADR positive, whereby a READ TAPE operation will be initiated on the Class of Input/Output devices entitled TAPE.

In a similar manner, a coincidence of positive signals on lines ADR REG 7 and SENSE, feeding to an AND circuit 508a cause its output to go positive and via a cathode follower 509a drive the line SENSE CP ADR positive to thus select the CARD PUNCH. Likewise, a coincidence of positive signals on lines ADR CTR 11 and SENSE feeding to an AND circuit 506a, cause its output to go positive and via a cathode follower 507a drive the line SENSE OP PNL ADR positive, to thus select the OPERATOR'S PANEL. If the PRINTER is selected, for Reading or Writing, then either the line PR READ SEL or PR WRITE SEL is positive and via an OR circuit 503a conditions one input of an AND circuit 504a. At the same time, if positive signals occur on lines ADR REG 8 and SENSE, which also feed to this AND circuit 504a, then its output goes positive and via a cathode follower 505a causes the line SENSE PR ADR to go positive, to thus select the PRINTER. The lines SENSE PR ADR, SENSE OP PNL ADR and SENSE CP ADR are involved in SENSE Instructions, as described below. These three lines, positive for SENSE Instruction involving a PRINTER ADDRESS, an OPERATOR'S PANEL ADDRESS or a CARD PUNCH ADDRESS, as described below, cause one of the different types of SENSING operations to take place. It should also be noted that other outputs of the Class Selector Matrix such as WRITE PR ADR, WRITE DRUM ADR, WRITE TAPE ADR, READ CR ADR, READ DRUM ADR, READ TAPE ADR., etc. select such operations as Write with the Printer, Write on Drum, Write on Tape, Read with the Card Reader, Read from Drum, Read from Tape, etc.

Refer now to Fig. 5d, which shows the Unit Selector Matrix circuits. These circuits are quite similar in operation to those described above for the Operation Decoder, the inputs to the circuits coming from both outputs, of the Address Counter 14, 15, 16 and 17 bits. The lines ADR CTR $\overline{14}$ through ADR CTR $\overline{17}$ are positive, when binary –0's– are stored in bit positions 14 through 17 respectively, while lines ADR CTR 14 through ADR CTR 17 are positive when binary −1's− are stored in these bit positions 14 through 17, respectively. The signals on these input lines, are mixed, in various AND circuits as illustrated in Fig. 5d so that upon a coincidence of our positive input lines to a particular AND circuit, its output will go positive, and cause one of the eleven output lines I/O ADR 0 through I/O ADR 10, to go positive. For example, an AND circuit 512a receives inputs from lines ADR CTR $\overline{14}$, ADR CTR $\overline{15}$, ADR CTR $\overline{16}$ and ADR CTR $\overline{17}$, and when the signals on those lines are all positive, its output is positive, and via a cathode follower 513a, drives the line I/O ADR 0, positive. The holding of each of the Address Counter bits 14 through 17 under such a condition, is a binary −0−. It is believed that it will now be clear just how permutations of the inputs to the other ten AND circuits, illustrated in Fig. 5d, apply, so that the various permutations of binary −1− and binary −0− values, of the bits 14 through 17 of the Address Counter, render positive, one and only one, of the eleven output lines.

The Class Selector Input/Output Interlock circuits are shown in Figs. 5e and 5f and comprise eleven trigger circuits Ts, with related AND circuits, as inputs, and cathode followers, as outputs, which trigger circuits are turned ON, selectively, to indicate the TYPE of Input/Output Unit selected and to indicate, that a particular unit is selected. The outputs from the various triggers, are mixed, as described below, by OR circuits, so that an indication is provided that an Input/Output Interlock, is ON, when any one of the Input/Output Interlock triggers is ON, and conversely, if none of these triggers, is ON, this is an indication that the Input/Output Interlock, is OFF. When an Instruction is READ, from Memory, which Instruction requires the use of an Input/Output Unit, one of the outputs of the Class Selector Matrix (Fig. 5c), as described above, goes positive. For example, if the particular Instruction called for WRITE on tape, the line (Fig. 5c) WRITE TAPE ADR, is positive, and, as shown in Fig. 5f, the positive signal on this line conditions an AND circuit 530a. While the AND circuit 530a, is so conditioned, a positive signal occurring on the line SET I/O INTLK, passes through this AND circuit to turn ON trigger 531a which emits a positive output via a cathode follower 532a, to drive the line TAPE WRITE SEL, positive, thus signifying that a TAPE WRITE operation has been selected. The "particular" Tape Unit, selected for this WRITE operation, is determined by the particular I/O Address called for by the Address of the Instruction, which particular I/O Unit is selected, by the Unit Selector Matrix (Fig. 5d), as described above. Once a particular Input/Output unit is selected, it starts operation, and as long as the Unit remains in operation the Input/Output Interlock, remains ON. For example, if the line TAPE WRITE SEL (Fig. 5f) goes positive, and the particular Address selects Tape Unit 1, as described later, then the tape feed starts and information is recorded, on the tape of the selected Tape Unit 1. The process of WRITING on Tape, may continue, as long as other Instructions, such as COPY, is repeated, to cause information to be steadily recorded on the tape. As stated above, recording of information on tape is accomplished under control of a COPY Instruction, causing READ OUT of Memory, thirty-six bits at a time, to the MQ Register, and then reading these bits, out of the MQ, and recording them on the tape, 6 bits at a time all as shown and described in the above identified application of Bartelt et al. Movement of the tape is continuous and COPY Instructions must occur, in the Program of Instructions, so that information is present, in the MQ, for periodic recording on tape. If a condition is reached wherein all the information in the MQ register, has been WRITTEN on the tape and no COPY signal, is present, before the next period for recording arrives, a DISCONNECT signal is emitted, by the selected Tape Unit, as described in detail in said Bartelt et al. application. This DISCONNECT signal is effective, as described below, to cause a Reset Input/Output Interlock signal, to be generated.

Assuming, as above, that the trigger 531a (Fig. 5f) is turned ON and that the line TAPE WRITE SEL is thus rendered positive, this positive signal also feeds via an OR circuit 533a, an amplifier 534a, and a cathode follower 535a, to drive the line I/O INTLK ON, positive, signifying that the Input/Output Interlock, is ON. As long as this Input/Output Interlock, is ON, if an Instruction should occur, whose operation entails the use of any Input/Output Unit, this operation can NOT START, until this Input/Output Interlock, is RESET. This Input/Output Interlock is RESET, by a positive signal on the line RESET I/O INTLK (left bottom corner of Fig. 5f) which feeds to all triggers of the Input/Output Interlock including, for example, trigger 531a, which is thus RESET OFF. As trigger 531a goes OFF, the line I/O INTLK ON, goes negative, and this negative signal feeds, via an inverter 536a and a cathode follower 537a, to drive line I/O INTLK OFF, positive. Thus, it is seen that if any one of the triggers of this Input/Output Interlock, is ON, a positive signal is produced on the line I/O INTLK ON, but if all the triggers, are OFF, a positive signal occurs on the line I/O INTLK OFF.

Thus, if an Instruction comprising READ, from Memory and involving an Input/Output Unit occurs, the output from the Class Selector Matrix (Fig. 5c) conditions an AND circuit (Figs. 5e and 5f) in the Class Selector Input/Output Interlock. If this Input/Output Interlock, is OFF, a signal occurring on the line SET I/O INTLK passes through the conditioned one, of these AND circuits, to turn ON, a selected trigger, and thereby starts the desired operation. However, if this Input/Output Interlock, is ON, no signal can occur, on this line, SET I/O INTLK, as described below, until THE trigger, then ON, is Reset OFF, by a signal on the line RESET I/O INTLK. Therefore, if an Instruction comprising READ, from Memory, is an operation, involving an Input/Output Unit, while this Input/Output Interlock, is ON, an AND circuit, is "conditioned," but the selected trigger is NOT turned ON until a previously selected trigger, is turned OFF. After the previously selected trigger is turned OFF, a signal can occur, on line SET I/O INTLK, and pass through, this conditioned AND circuit, to turn ON the latter selected trigger. It should also be noted that other outputs of this Class Selector Matrix and Class Selector Input/Output Interlock, call for the selection of the following operations: PRINTER WRITE SELECT (PR WRITE SEL), PRINTER READ SELECT (PR READ SEL), CARD PUNCH WRITE SELECT (CP WRITE SEL), DRUM WRITE SELECT (DRUM WRITE SEL), CARD READER READ SELECT (CR READ SEL), TAPE WRITE SELECT (TAPE WRITE SEL), DRUM READ SELECT (DRUM READ SEL), TAPE REWIND SELECT (TAPE REWIND SEL), TAPE READ SELECT (TAPE READ SEL), TAPE WRITE END OF FILE SELECT (TAPE WRITE EOF SEL) and TAPE READ BACKWARD SELECT (TAPE READ BKWD SEL).

Refer now to the Unit Selector Input/Output Interlock shown in Fig. 5g. This Unit Selector Input/Output Interlock includes four trigger circuits 550a through 553a, one of which is turned ON, by a coincidence of an Input/Output Address signal and a Set Input/Output Interlock signal. For example, if the particular Input/Output Address selected is Input/Output Address 1, the line I/O ADR 1 (Fig. 5g) is positive, to thus condition the AND circuit 560a. This AND circuit 560a, being thus conditioned, passes the signal on the line SET I/O INTLK, and the output from this AND circuit 560a turns On the trigger 551a, which emits a positive output via a cathode follower 561a to cause the line I/O SEL 2, to go positive. Reset signals, are fed to all four triggers 550a through 553a, by a signal on the line RESET I/O INTLK, so that, if any one, of the triggers 550a through 553a, is ON, it is turned OFF. Thus, it is seen, that if the selected Input/Output Address, is one of the addresses 0 through 3, then one of the respective lines I/O ADR 0 through I/O ADR 3, goes positive, and gates a signal on the line SET I/O INTLK, to turn ON, one of the triggers 550a through 553a. The outputs of these triggers 550a through 553a are emitted, via respective cathode followers, to lines I/O SEL 1 through I/O SEL 4, respectively. These four output lines feed to Drum and Tape control circuits (not shown) to select, one of four units, that is, one Drum Unit out of four, one Tape Unit, out of four, etc. The other types of Input/Output Units involve the use of cards and there is only one such Unit, of each type, such as a CARD READER, a CARD PUNCH and a PRINTER. Therefore, the signal, on line I/O SEL 1, is used to insure that the sole CARD READER is selected, this line I/O SEL 1 feeding via inverters 562a and 563a, and a cathode follower 564a, to condition each of the thyratrons 571a through 573a. With these thyratrons so conditioned, they may then, be fired, by the application of a chosen SELECT signal such as CR READ SEL. If CARD READER READ SELECT is the selected operation, then a positive signal occurs, on the line CR READ SEL (Fig. 5g) and passes via a cathode follower 574a, to fire the conditioned thyratron 572a, which thus completes a circuit via the lines CR READ SEL THY and CR READ SEL THY K. These two lines are connected to CARD READER circuits (not shown) which, as the current flows through the thyratron, are energized, to produce in any well known manner, the operation of the CARD READER, thus selected. If the line PR WRITE SEL is the line which goes positive, then the thyratron 571a is fired, while if the line CP WRITE SEL is positive, the thyratron 573a is fired.

*Sense circuits*

Referring to the composite of Figs. 5i, 5j, and 5k, these, taken together, illustrate the SENSE circuits. As stated above, the SENSE Instruction includes the selection of a CLASS of Input/Output units and the selection of one single unit from among several, performing one CLASS of operation.

The SENSE Instruction may be used, to sense a condition, of an Address in the PRINTER or in the CARD PUNCH, or the condition, of a device on the OPERATOR'S PANEL may be sensed, as described below, such as the ON or OFF condition of a switch, or a neon light on the OPERATOR'S PANEL, may be turned ON.

Referring specifically, to Fig. 5k, if the particular SENSE Instruction, calls for the sensing of a PRINTER Address, the line SENSE PR ADR, is positive, and conditions one input, of an AND circuit 552b, so that it can pass an E/R 6 (D3) pulse, which occurs on the line SENSE SAMPLE under control of a SENSE Instruction as described in detail later. This pulse is available, all as described below, from the SENSE EXECUTION TIMER (Fig. 5h) during the first cycle following an Instruction Time, provided that the SENSE Instruction does NOT contain, the Address OPERATOR'S Panel I/O Address 5. The output of this AND circuit 552b passes via a cathode follower 553b to the line SENSE PR6 (D3). In a similar manner, a CARD PUNCH SENSE pulse, is developed, by a coincidence of inputs on lines SENSE CP ADR and SENSE SAMPLE, both feeding to an AND circuit 554b, the output of which passes via a cathode follower 555b, to a line SENSE CP 6 (D3). An OPERATOR'S PANEL Address SENSE signal, may be developed, by a coincidence of positive inputs, on lines SENSE OP PNL ADR and SENSE SAMPLE, produced by the SENSE Instruction, as described below, both feeding to an AND circuit 544b, the output of this AND circuit passing via a cathode follower 545b to the line SENSE OP PNL 6 (D3); feeding to the several AND circuits (Fig. 5i) 509b, 511b, 513b, 515b and 517b, and also to an AND circuit 546 (Fig. 5k).

The AND circuits 509b, 511b, 513b, 515b and 517b are conditioned, respectively, when a positive signal occurs on lines I/O ADR 0 through I/O ADR 4. Assume that the line I/O ADR 1, is positive, thus conditioning the AND circuit 511b (Fig. 5i) so that the positive signal on the line SENSE OP PNL 6 (D3) produced as described above, passes through this AND circuit, to turn ON the trigger 512b. This trigger 512b, going ON, turns ON the neon light 529b.

Thus if an Instruction, SENSE OPERATOR'S PANEL I/O Address 1, is given, the neon light 529b is turned ON, to provide a visual indication, that this PARTICULAR Instruction, of the Program, has been reached and executed. BY INSERTING SUCH AN INSTRUCTION IN THE PROGRAM, the Machine operator can, under control of this Instruction, produce a visual indication, that he has reached this PARTICULAR Instruction, among the group of Instructions comprising the complete Program. This is an extremely useful function in operating Electronic Data Processing Machines under control of stored Programs.

It is apparent that the neon tubes 530b, 531b and 532b respectively, will glow, when their respective associated triggers 514b, 516b and 518b, are ON. These triggers 514b, 516b and 518b are turned ON, in the manner as just described for trigger 512, by the SENSE Instructions containing the respective OPERATOR'S PANEL Addresses, I/O Address 2, 3 or 4, respectively. All triggers 512b, 514b, 516b and 518b are RESET OFF, if the SENSE Instructions selects the OPERATOR'S PANEL Address, I/O Address 0. During this Instruction, the line I/O ADR 0 conditions the AND circuit 509b and the 3 microsecond signal, on line SENSE OP PNL 6 (D3) passes through this conditioned AND circuit and a cathode follower 510b, to RESET all the triggers 512b, 514b, 516b and 518b OFF, which will thus extinguish the neon tubes 529b, 530b, 531b and 532b.

A second type of SENSE Instruction, which also involves an OPERATOR'S PANEL Address is that SENSE Instruction which senses the condition of switches, on the OPERATOR'S PANEL, having certain I/O Addresses. As stated above, the positive signal, on the line SENSE OP PNL 6 (D3) produced as described above, feeds to the AND circuit 546b( Fig. 5k) and its passage therethrough is dependent upon the second input, namely, line OP PNL SENSE INPUT. This line may be positive, under the following conditions:

SENSE switches, SS1 through SS6 (Fig. 5i) control, one input, to AND circuits 519b through 524b, respectively. The second respective inputs to these AND circuits are conditioned, by positive signals, on lines I/O ADR 5 through I/O ADR 10. Assume that the line I/O ADR 5 is positive, to thus condition the AND circuit 519b. If the SENSE switch SS1 is closed, the line SENSE (1) is positive and the output of the AND circuit 519b, going positive, acts via an OR circuit 526b and a cathode follower 527b to drive the line OPR PNL SENSE INPUT (Figs. 5i and 5k) positive. If, however, at the time that the line I/O ADR 5, is positive, the SENSE switch SS1, is open, then the line SENSE (1), is negative, and the signal on the line OPR PNL SENSE INPUT, is negative. This line is also driven positive, by a coincidence of positive signals, to both inputs of the respective AND circuits 520b through 524b. The SENSE switches, SS1 through SS6, thus represents OPERATOR'S PANEL I/O Addresses, 5 through 10, respectively. When the line OP PNL SENSE INPUT (Fig. 5k) is thus rendered positive under control of one of the switches SS1 to SS6, inclusive, the AND circuit 546b, is conditioned, and the 3 microsecond signal, on the line SENSE OP PNL (D3) produced as described above is passed through this conditioned AND circuit and a cathode follower 547b, an amplifier 550b and the cathode follower 551b, to drive the line SENSE SKIP, positive. A positive signal, on this line, passes via an OR circuit 538b, an amplifier 539b, a cathode follower 540b, an OR circuit 533b, a cathode follower 534b, and an inverter 535b, to the line 241f. A positive signal, on this line 241f, as described above in connection with the Instruction Counter (Fig. 2j) causes this counter to be stepped up, one count. Thus, it is seen that if a SENSE Instruction is given, which selects any of the OPERATOR'S PANEL ADDRESSES 5 through 10, the CLOSED or OPEN CONDITION, of the SENSE switches SS1 through SS6, is sensed by the chosen Address.

If the particular one, of the SENSE switches SS1 through SS6, being sensed, is OPEN, then the Machine merely proceeds to an End of Operation, which at "10" time of the cycle steps the Instruction Counter so that the Machine proceeds to the NEXT Instruction all as described in detail above. If, however, the particular switch, being sensed, is CLOSED, the Instruction Counter is stepped up, one count, as just described above, at approximately 7 time of the character cycle, so that, since the Counter will again be stepped by the End of Operation signal at "10" time, the next succeeding Instruction in the Program IS SKIPPED, the Instruction Counter having been advanced two steps. The provision of such an operation in the Machine thus enables an operator to change the sequence of a program, at will, while the machine is running through the Program. Thus, if a SENSE Instruction selecting an OPERATOR'S PANEL I/O Address 5 through 10 is provided in the Program, the opening or closing, of the particular SENSE switch involved, under the control of the operator, provides a simple tool, whereby by simply opening or closing that switch, before that Instruction is reached, the machine can be made, to selectively skip or not skip, that Instruction.

Another SENSE Instruction having an Input/Output Address 10 (Fig. 5j) is initiated by the application of appropriate signals on the line PR SENSE ENTRY (Fig. 5i) which feeds to an AND circuit 525b (Fig. 5i). The signal on this line PR SENSE ENTRY is emitted by the PRINTER and can be controlled, either by a switch, similar to the SENSE switches SS1 through SS6, or by closing of contacts, etc.

Assuming that a positive signal exists on this line PR SENSE ENTRY and the Instruction is SENSE PRINTER, with the Input/Output Address 10 as the selected address, then both lines PR SENSE ENTRY and I/O ADR 10, are positive, which feed to AND circuit 525b whose output goes positive and via a cathode follower 528b, drives the line PR SENSE INPUT, positive, which conditions one input of an AND circuit 548b (Fig. 5k). While this AND circuit is thus conditioned, the three microsecond signal, occurring on line SENSE PR 6 (D3), passes via this conditioned AND circuit, a cathode follower 549b, the amplifier 550b and the cathode follower 551b, to the line SENSE SKIP and thus to the OR circuit 538b, amplifier 539b, the cathode follower 540b, the OR circuit 533b, the cathode follower 534b and the inverter 535b, to the line 241f (see also Fig. 2j) to thereby cause an extra stepping, of the Instruction Counter, and a skipping of the next Instruction, in the Program sequence.

Thus it is seen that the Instruction Counter is stepped, one additional count, provided a SENSE Instruction is given, whose Address, picks a switch which is closed to be sensed, or to sense the condition of a line, that is the line PR SENSE ENTRY. The program proceeds, either to the next Instruction, or skips the next Instruction, depending on the condition of the switch or line, thus sensed. The Instruction Counter is also stepped additional counts, during a few other operations. For example, if an End of File occurs as described presently, on Reading Tape, a positive signal is generated on the line END FILE SKIP (1) Fig. 5k at approximately "5" time of a character cycle and passes via an OR circuit 538b and the circuitry, described above, to the line 241f. If an End of Record is reached, on Tape, or another Input/Output Unit, the Instruction Counter is made to step, two additional counts, and thereby skip, two succeeding Instructions, since signals of one microsecond duration occur on the line END RECORD SKIP (2) at "5" and also at "7" time, of a character cycle, this line also feeding to the OR circuit 538b. Whenever an End of Operation occurs, a positive signal is fed to an OR circuit 541b, via the line END OPN (SENSE) or END OPN (OTHER), the former signalling an End of Operation, of a SENSE operation, and the latter line signifying an END of Operation for all other operations. The output of this OR circuit, going positive, conditions an AND circuit 542b, so that signals, occurring on the line E/R 10 (D2), pass through this AND circuit 542b and a cathode follower 543b, to the OR circuit 538b and thus through the circuits, as described above, to cause positive signals to occur, on the line 241f. It should be noted, that the NORMAL stepping of the Instruction Counter, due to an End of Operation, occurs approximately at "10" time of a character cycle, while the other signals, which produce SKIPPING of Instructions, occur at earlier portions of the character cycle, such as at "5," "6," and "7" time of the character cycle.

Referring now to Fig. 5j, this circuitry provides PRINTER SENSE and CARD PUNCH SENSE outputs. Upon coincidence of a SENSE CARD PUNCH (line Sense CP6 (D3)) or a SENSE PRINTER signal (line Sense PR6 (D3)) with a proper Input/Output Address, the thyratrons 580b through 591b may be fired. The output lines from the thyratrons may be used to energize circuits, in the CARD PUNCH or CARD PRINTER and have been provided with reference characters such as CP SENSE THY K (1) or PR SENSE THY K (1) which signify, respectively, an output from the Card Punch Sense Thyratron cathode 1 and Printer Sense Thyratron cathode 1. The circuits in the PUNCH or PRINTER which are energized, as the thyratrons are fired, may be operative to complete circuits therein to cause a CHANGE in the operation of these units.

The thyratrons 580b and 581b, are conditioned, by a positive signal on the line I/O ADR 0 feeding via a cathode follower 570b, while the thyratrons 582b and 583b are conditioned, by a positive signal on the line I/O ADR 1, feeding via a cathode follower 571b. Thyratrons 584b through 591b are conditioned, by positive signals on lines, I/O ADR 2 through I/O ADR 9, feeding via respective cathode followers 572b through 579b.

Naturally, only one, of the Input/Output Addresses, is positive at a particular time, so that only one thyratron is conditioned, except that two thyratrons are conditioned whenever the line I/O ADR 0 or the line I/O ADR 1 is positive. The signal, occurring on the line SENSE PR 6 (D3) feeds via inverters 564b and 565b and via a cathode follower 566b to the thyratrons 581b and 583b through 591b. Therefore, if one of those thyratrons is conditioned by an Input/Output Address Signal and the selected operation is SENSE PRINTER, as the 3 microsecond signal occurs, on the line SENSE PR 6 (D3), the particular thyratron, then Addressed, is fired, and a circuit is completed, via its cathode, to a certain PRINTER circuit.

As stated above, the circuit thus energized in the PRINTER, may operate to turn ON the PRINTER, to turn OFF the PRINTER, or to energize Selector relays which may vary the operation of the Printer, in any manner now well known in the art.

In a similar manner, if the selected operation is SENSE CARD PUNCH, a positive signal on the line SENSE CP 6 (D3) is fed, via inverters 561b and 562b and a cathode follower 563b, to the thyratrons 580b and 582b, and fires the particular thyratron, then being conditioned by an Input/Output Address. Thus, two separate circuit connections are provided, to the PUNCH and these circuits may also be used to turn the PUNCH ON or OFF or to energize Selector relays, to thus vary the operation of the PUNCH, in any well known manner.

Thus, it is seen that three different types of SENSE operartions can occur. A SENSE Instruction may be used to cause a neon tube to glow, or to extinguish, the glow, in a neon tube already ON. A SENSE Instruction, which, as described presently, produces the SENSE SAMPLE signal (Figs. 5h and 5k) can be used to sense the condition of a switch (conditioning or NOT conditioning AND circuit 546b, Fig. 5K) and to thus SELECTIVELY SKIP or NOT SKIP succeeding Instructions in the Program, depending upon the condition of the switch. A SENSE Instruction may also be given to fire a particular thyratron, which can energize a circuit, to change the operation, of a particular Input/Output Unit, such as a PUNCH or a PRINTER.

Referring now to the SENSE EXECUTION TIME illustrated in Fig. 5h, as stated above, if the Instruction is SENSE, the Operation Decoder (Fig. 5b) drives the line SENSE, positive (Fig. 5h) prior to the Machine proceeding to an Execute/Regenerate cycle. In the execution of a SENSE Instruction, two different situations must be noted. In one, the SENSE Instruction selects, the OPERATOR'S PANEL I/O Address 5. The other situation, the SENSE Instruction selects an Address, OTHER THAN an OPERATOR'S PANEL I/O Address 5. When the SENSE Instruction selects an OPERATOR'S PANEL I/O Address 5, the operation is as follows:

As stated above, in one operation of the machine, information is READ, from Tape, into the MQ Register. As described in detail in said above identified application of Bartelt et al., an information group of seven bits is read simultaneously from the Tape, and six of the seven bits are stored in the MQ Register. The bits are read into positions S and 1 through 5 of the MQ Register and are shifted to other positions of that Register so that bit storage portions S, and 1 through 5 are available, to store the next group of 7 bits. The seventh bit is used as a check bit and is not read into the MQ. This process, of reading into the MQ, in certain bit positions, and shifting the information, to other positions of the MQ Register, continues, until six groups of 6 bits each, have been read from the Tape, at which time, the MQ Register contains a full word of thirty-six bits. The full word, then held in the MQ Register, is gated, via the Memory Switches, and stored in Memory at a selected Address. There is an elapse of 133 microseconds between the time that one group of seven bits is READ from the Tape and the time that the next succeeding group is READ. It is during these 133 microseconds, that the shifting of the bits in the MQ Register takes place. Due to the fact that the Machine operates at a very high speed, other Instructions may be executed, during this 133 microsecond period, but it should be noted that the MQ Register, per se, cannot be used, IN THESE OTHER operations. READ-IN, from a Tape, to the MQ Register, is produced by a READ TAPE Instruction, while the storing of the information in Memory by a transfer of data from the MQ Register into Memory, is produced, by a COPY Instruction. A COPY Instruction, MUST BE PRESENT, in the Operation Decoder, AT THE TIME the MQ Register, becomes filled with a total of 36 bits, OR a DISCONNECT signal is generated.

If a READ TAPE Instruction is given, followed by, a specific number, of COPY Instructions, let us say five, for example, other Instructions, such as ADD, SUBTRACT, MULTIPLY, DIVIDE, etc., may be interspersed, in the Program, BETWEEN these 5 COPY Instructions, as long as these interspersed Instructions do NOT utilize, the MQ Register, and, as long as a COPY Instruction IS in the Operation Decoder, by the time the MQ Register becomes full. At the time that the fifth full word, has been stored, in Memory, the Machine proceeds, according to the Program, to the next Instruction. The Tape Unit, however, may be in the process and probably is, of READING, a sixth word, into the MQ Register. If, at this point, the next Instruction, or an Instruction shortly thereafter (following the fifth Instruction) is an Instruction LOAD MQ, information WOULD, under these circumstances, be entering the MQ Register, BOTH from the Tape, and Memory. The result, of course, would be erroneous. This difficulty may be studiously avoided, by providing a sufficient number of Instructions, following the fifth COPY Instruction, that do NOT use, the MQ Register, so that sufficient time will elapse, for the sixth full word, to be stored in the MQ Register and for the Tape to disconnect (by lack of another COPY Instruction) before such an Instruction occurs which WILL utilize the MQ Register. This, however, places a terrific burden on the programmer, to calculate the amount of time, that will elapse, before the Tape disconnects and to provide a sufficient number of Instructions, NOT requiring use of the MQ Register, that will use up this calculated available time. To avoid such a burden, a particular SENSE Instruction, is available to the operator or to the programmer, which is called a SENSE (d) Instruction, namely, a SENSE delay Instruction. The Address, of this Instruction, is OPERATOR'S PANEL I/O Address 5.

If the Input/Output Interlock is ON, when the SENSE (d) Instruction is given, an END of OPERATION signal can NOT be produced to send the Machine into Instruction Time and the Machine remains in Execute/Regenerate cycles until the Input/Output Interlock goes OFF, to produce an END of Operation signal. The Input/Output Interlock goes OFF, as described below, as a DISCONNECT signal occurs. This DISCONNECT signal, is, under the assumed conditions, caused by the fact that the MQ Register is filled with the sixth full word, READ from the Tape, but no COPY Instruction is in the Operation Decoder. As the Input/Output Interlock goes OFF, the SENSE SAMPLE pulse (Figs. 5h and 5k) is developed as described in detail presently, the switch SS1 (Fig. 5i) is sensed by the I/O ADR 5, and an End of Operation (Sense) signal (Fig. 5h) is also generated to in turn produce an END of OPERATION signal (Fig. 5k). The Program will skip or not skip the succeeding Instruction, depending upon the closed or open condition of the SENSE switch SS1, as described above. In other SENSE operations, that is, other than sensing of the OPERATOR'S PANEL I/O Address 5, the Address, to be sensed, is sensed during the first Execute/Regenerate cycle and an End of Operation signal is given.

Assuming that the Instruction is SENSE, a positive signal, on the line SENSE (Fig. 5h) conditions one input of an AND circuit 509c. The second input to this AND circuit is via line 508c, which line, as described below, is positive, unless the Instruction is a SENSE (d) Instruction. Upon coincidence of two positive inputs, the output of this AND circuit 509c is positive and passes via a cathode follower 510c, line 511c, an OR circuit 512c, an amplifier 513c, and a cathode follower 514c to drive the line END OPN (SENSE) positive. A positive signal, on this line (Figs. 5h and 5k), causes an End of Operation signal to be generated (see Fig. 5k). This signal on the line END OPN (SENSE) (Fig. 5h) also conditions one input to an AND circuit 515c (Fig. 5h). The other input to this AND circuit is an E/R 6 (D3) pulse. Thus, a three microsecond pulse, occurring at "6" time of the character cycle is gated through this AND circuit 515c and a cathode follower 516c, to the line SENSE SAMPLE, which thus has a signal pulse E/R 6 (D3). This SENSE SAMPLE pulse, is used, as described above, to sense the condition of SENSE switches (selectively conditioning or NOT conditioning the AND circuit 646b, Fig. 5k) to cause neon tubes to glow or to be extinguished, or to fire a thyratron. An End of Operation signal will, as described above, cause the Instruction Counter to be stepped, one count, while the SENSE SAMPLE pulse may, depending upon the condition of the SENSE switches, cause the Instruction Counter to be stepped, ADDITIONAL counts, and thereby SKIP the succeeding Instruction.

If the Instruction was SENSE($d$), then lines SENSE/OP PNL ADR (Fig. 5h) and I/O ADR 5, BOTH feeding to an AND circuit 504c (Fig. 5h) are positive and the output of this AND circuit, goes positive, so that line 505c is positive and a positive signal is thus passed via an inverter 506a and a cathode follower 507c, to drive the line 508c negative. Thus, if the Instruction is SENSE($d$), the line 508c, is negative so that the AND circuit 509c is NOT conditioned, and the End of Operation and SENSE SAMPLE pulses, are NOT developed. However, the positive signal on line 505c, conditions one input to an AND circuit 501c, so that its output, IS DEPENDENT UPON the condition of the line I/O INTLK OFF, which line is positive, when the Input/Output Interlock is OFF. Thus, assuming that the line 505c, goes positive, due to a SENSE($d$) Instruction, the SENSE SAMPLE and End of Operation pulses can NOT be developed. Assuming that the Input/Output Interlock, is ON, line 505c with a SENSE($d$) Instruction, remains positive, until the I/O Interlock goes OFF, causing the line I/O INTLK OFF (Fig. 5h) to go positive. As this line goes positive, the output of the AND circuit 501c goes positive and via a cathode follower 502c, line 503c, the OR circuit 512c, the amplifier 513c and the cathode follower 514c, drives the line END OPN (SENSE) positive. A positive signal on line END OPN (SENSE) (Figs. 5h and 5k) causes an End of Operation signal to be given and a SENSE SAMPLE pulse to be emitted as just described above.

Hence, if a SENSE($d$) Instruction is given, and the Input/Output Interlock, is ON, the operation of the machine, is HELD UP, since an End of Operation signal does NOT occur, to send the machine, into another Instruction Time. The machine remains, in Execute/Regenerate cycles, until the Input/Output Interlock goes OFF. As the Input/Output Interlock goes OFF, the End of Operation signal is given to send the machine into Instruction Time and the SENSE SAMPLE pulse is emitted as just described above. This SENSE SAMPLE pulse may, of course, cause the Program to SKIP an Instruction as described above in connection with the SENSE switches or merely to proceed to the next Instruction.

Refer now to Fig. 5n which shows circuits of the READ-WRITE EXECUTION TIMER. If the Instruction is READ, READ BACKWARDS, REWIND, WRITE END OF FILE, or WRITE, then either the line READ, READ B, REWIND, WRITE EOF or WRITE, is positive. When one of these lines, is positive, the signal passes via an OR circuit 520c and a cathode follower 521c, to drive the line GO TO EX/RGN positive. A positive signal on this line causes the machine to enter an Execute/Regenerate type of character cycle, as described above. If at the time that READ, READ BACKWARD, REWIND, WRITE END OF FILE or WRITE operation is entered, the Input/Output Interlock is ON, the machine will remain in Execute/Regenerate cycles as stated above, until this Input/Output Interlock goes OFF. The Input/Output Interlock, being ON, is an indication that AN Input/Output Unit, is connected to the machine, and is currently being used. As the Input/Output Interlock goes OFF the AND circuit 522c (Fig. 5n) conditioned, by positive signals on the lines GO TO EX/RGN, and with I/O INTLK OFF, now positive, a one microsecond signal, occurring at "2" time, of the character cycle on line E/R 2 (D1) is gated through this now conditioned AND circuit 522c, to turn ON trigger 533c, which remains ON until reset OFF, by an A0 (D1) Clock pulse, occurring on the line L104. The Output of this trigger 533c is positive from "2" time until "0" time, of the next character cycle. The output of this trigger 533c is fed through a cathode follower 524c, to drive the line END OPN, positive, and produce an End of Operation signal (Fig. 5k).

The signal on this line END OPN, going positive, also conditions one input, of each of two AND circuits 525c and 527c. The AND circuits 527c, being thus conditioned, will pass an A4 (D1) signal on line L108, through a cathode follower 528c, to the line RESET EOR/EOF INTLK which causes a resetting of the End of Record and End of File Interlocks, as described below. Shortly, thereafter, that is two microseconds later, an A6 (D2) signal is passed via the conditioned AND circuit 525c and a cathode follower 526c, to the line SET I/O INTLK. A positive signal, on the latter line, will SET the Input/Output Interlock, that is, it turns on a trigger, corresponding to THE Address, of THE Input/Output Unit SELECTED (see Figs. 5e, 5f and 5g). Thus, it is seen, that if an Instruction, requiring the use of an Input/Output Unit is given, such as READ, READ BACKWARDS, REWIND, WRITE END OF FILE or WRITE and AN Input/Output Unit, is being used, the Machine is HELD UP UNTIL the Input/Output Interlock goes OFF. As the Input/Output Interlock, goes OFF, an End of Operation is signalled as described just above and the End of Record and End of File Interlocks, are Reset as described presently and the Input/Output Interlock is SET, as described above.

Circuits, for resetting the End of Record and End of File Interlocks, are provided, since it will be apparent that if THE Input/Output Unit, previously in use, had reached an End of Record or an End of File, the End of Record Interlock or the End of File Interlock, would be turned ON. While these interlocks, are ON, no READING or WRITING may take place. Inasmuch as the succeeding Instruction, is selecting another Input/Output Unit, the resetting of the End of Record and End of File Interlocks is effected so that the Machine can promptly proceed to READ or WRITE.

*End of record, end of file, disconnected synchronizer and end of record/end of file interlock circuits*

Referring specifically to the End of Record, End of File and Disconnect Synchronizer circuits shown in Fig. 5p, when the Input/Output Interlock is ON, the line I/O Interlock ON (Figs. 5f and 5p) is plus, thus indicating that AN Input/Output Unit is in use. This Interlock, should be reset, whenever a Drum Unit, Tape Unit or Card controlled device, emits a DISCONNECT signal, or whenever an End of Record or End of File is reached. Consequently, the Tape Card and Drum DISCONNECT signals, occurring on the respective lines TAPE DISC, CARD DISC and DRUM DISC (upper right corner Fig. 5p) feed to an OR circuit 550c. Other inputs to this OR circuit are via lines EOR INTLK ON and EOF INTLK ON, which signify, respectively, that the End of Record Interlock is ON and the EOF Interlock is ON. As these positive signals feed to this OR circuit 550c, its output goes positive and via an inverter 551c turns ON trigger 552c, which emits a positive signal, via a cathode follower 553c and line 554c, to condition one input of an AND circuit 570c. The next A9 (D1) signal occurring on line L113 passes through this conditioned AND circuit 570c, to turn ON a trigger 571c, which is reset, by the next A3 (D1) pulse occurring on line L107. This trigger, therefore, when ON, emits a six microsecond positive signal, whose leading edge, occurs at "9" time of a character cycle. This signal passes via a cathode follower 572c to condition one input of an AND circuit 573c, which, while conditioned, passes the A1 (D1) signal occuring on line L105 via a cathode follower 574c and line 575c to turn OFF the triggers 552c and 579c. The trigger 579c was previously turned ON, by the A3 (D1) signal, occuring on line L107, which turned OFF the trigger 571c. As trigger 579c, goes OFF, its output goes negative and is fed via a cathode follower 580c, to the line RESET I/O INTLK. The signal on line RESET I/O INTLK resets the triggers, of the Input/Output Interlocks, and it should be noted that this resetting occurs, at approximately "1" time, of a character cycle. This allows time, for the trigger circuits to stabilize, before the Input/Output Interlock (Fig. 5f for example) may be set again, by the positive signal on the line SET I/O INTLK (Fig. 5n) which signal occurs, at "6" time of the character cycle.

The remaining circuits, illustrated in Fig. 5p, deal with the End of Record and End of File Interlocks. If the Card Reader reaches an end of record, the line CR EOR (Fig. 5p) goes positive and turns ON the key (Tk) trigger 541c. The output of this trigger, now positive, feeds via an inverter 540c to trip a single-shot multivibrator 542c, which emits a positive signal, via a cathode follower 543c to an OR circuit 544c. Another input to this OR circuit is a signal on line TAPE EOR signifying that the Tape has reached an end of record. When either input to this OR circuit 544c, goes positive, its output goes positive and conditions one input of an AND circuit 545c. The other inputs to this AND circuit are I/O INTLK ON and an A3 (D1) signal on line L107. Thus, if the output of the OR circuit 544c, is positive, signifying either that the CARD READER has reached an end of record or that a Tape has reached an end of record and if the Input/Output Interlock is ON, then the A3 (D1) signal, on line L107, is passed through this conditioned AND circuit 545c and a cathode follower 546c to turn ON a trigger 547c, which emits a positive signal from its right plate, via a cathode follower 549c to the line EOR INTLK ON. This line, then, is positive, to signify that the End of Record Intelock is ON. The key trigger 541c may be turned OFF, by a signal on the line CR EOR RESET, feeding to its right grid.

Similar circuits are used for determining the End of File. Another key trigger 560c may be turned ON as the CARD READER reaches an end of file, by a positive signal on line CR EOF, which trigger, emits a positive signal via an inverter 561c, to trip a single-shot multivibrator 562c, which emits a positive signal, via a cathode follower 563c to an OR circuit 564c. Another input, to this OR circuit 564c, is a signal on line TAPE EOF signifying that the Tape has reached an end of file. When either input to this OR circuit 564c is positive, its output will go positive and condition one input of an AND circuit 565c. The other inputs to this AND circuit 565c are via line I/O INTLK ON and L107. Thus, if an end of file is reached by the CARD READER or the TAPE, and the Input/Output Interlock is ON, an A3 (D1) signal is passed through the AND circuit 565c and cathode follower 566c to turn ON a trigger 567c, which emits a positive signal, from its right plate, via a cathode follower 569c, to drive the line EOF INTLK ON, positive, signifying that the End of File Interlock is ON. As stated above, as the End of Record or the End of File Interlock goes ON, the Input/Output Interlock, is reset. This is caused, as stated above, by positive signals, feeding via line EOR INTLK ON (Fig. 5p) or line EOF INTLK ON, feeding to the OR circuit 550c. The End of Record trigger 547c and the End of File trigger 567c, are reset, by a positive signal on the line RESET EOR EOF INTLK, this being a one microsecond signal, occurring at "4" time of an Execute/Regenerate cycle (see Fig. 5n). This signal feeds via an inverter 576c, a cathode follower 577c and line 578c, to both triggers 567c and 547c, resetting both triggers OFF. Trigger 547c, when OFF, emits a positive signal via a cathode follower 548c, to the line EOR INTLK OFF, signifying that the End of Record Interlock is OFF, while the trigger 567c, when OFF, emits a positive signal via a cathode follower 568c, to the line EOF INTLK OFF, signifying that the End of File Interlock is OFF. Thus, it is seen that provision is made for the resetting of the Input/Output Interlock whenever a DISCONNECT signal is emitted from a TAPE UNIT, a DRUM UNIT, or from one of the card controlled devices. The Input/Output Interlock is also reset, whenever either the TAPE UNIT or the CARD READER reached an End of Record of an End of File.

There has thus been provided novel means for producing hexagonal packing, reversed bit sweep to reduce the effects of spill, random reference to target addresses to reduce the effects of spill, rapid regeneration and storage of excess regeneration and borrowing from said excess thereafter, thereby "tailoring" the regeneration to the Machine needs. Also a novel EXTRACT operation has been provided and various novel Sense operations and a Sense (d) operation as well as a novel system of full and half words with respective identification thereof and novel and highly efficient circuitry for providing a Memory of electrostatic type which has immense storage facilities, great speed of operation and diverse varied operations applicable thereto.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Electrostatic storage means comprising a cathode ray tube having a beam, a target having allocatable addresses, means controlling the deflection of said beam to selectively sequentially position said beam in different ones of said allocatable addresses to thus provide a raster, means storing value manifestations representative of respective desired addresses, means controlled by said manifestations of different desired addresses for producing different increments of voltage, means selectively applying different such increments of different desired addresses to said deflection controlling means to thereby select respective chosen addresses in said raster, representative of said respective values, said increments being so proportioned in relation to consecutive values, that said deflection control means position said beams to positions in said raster, consecutively, remote from one another.

2. In an electrostatic storage device comprising a cathode ray tube and means for generating a beam, means controlling the movement of said beam, selectively, in one direction or another to produce a directional bit sweep, including a deflection register for selectively storing a plurality of individual representations of binary one bit manifestations and binary zero bit manifestations, and means connected to said deflection register and controlled by the binary zero or binary one bit representation of a certain one of said stored bits of said deflection register, for controlling said bit sweep control means, to produce a bit sweep, selectively in one direction or the other, in accordance with the binary one or binary zero manifestation of said certain bit.

3. In a device comprising a cathode ray tube including a target having allocatable addresses, means for generating a cathode ray beam, deflecting means for controlling the positioning of said beam to select different ones of said allocatable addresses, bit sweep potential producing means, means for unblanking said beam to permit said beam to impinge on said target in a selected address position, means controlling said beam and cooperating with said bit sweep potential producing means to write a representative indication of a binary one or a binary zero value, respectively, in a selected address, means selectively controlling said beam to write a binary one at a selected address to thereby read a value, previously written at said address, said reading operation producing a voltage output from said target having an individual characteristic selectively representative of the reading of a binary one or a binary zero, a gate, means periodically applying conditioning potentials to said gate, said individual voltage outputs also being applied to said gate and selectively permitting said conditioning potential to pass or not to pass said gate, depending upon the characteristic of said output, means controlled by said gate output to selectively alter or not alter a setting of a bistable device and means selectively controlled by the altered or unaltered condition of said bistable device cooperating with said beam deflecting means and controlling the operation or non-operation of said unblanking means, whereby said read bit, is selectively regenerated, in accordance with its binary one or binary zero character, prior to said reading.

4. In a device as in claim 3, a plurality of pairs of said tubes being provided, means controlling said unblanking means whereby said tubes are unblanked, in pairs, said device being operated in use cycles, requiring a reference to data stored in said tubes, and in regeneration cycles for regenerating said data only, said addressing means being selectively operative to unblank, one of the tubes of said pairs or the other of the tubes of said pairs during a use cycle, but operative to unblank, both of the tubes of said pairs, during a regeneration cycle.

5. In an addressable electrostatic storage device requiring regeneration comprising memory for an electronic data processing machine operative in instruction cycles and regeneration cycles, means for producing a selective reading of data in selected address positions of said device, means for regenerating said data, systematically and periodically, said means including a minimum requirement counter, means resetting said counter, for each instruction cycle, means stepping said counter, once, for each succeeding regeneration cycle of operation subsequent to said resetting and means, controlled by said counter output for producing regeneration until said counter capacity is reached thereby ensuring a fixed minimum amount of regeneration for each instruction of said machine.

6. In a device as in claim 5 said machine being operated in various selected operations, including, for example, a multiply operation, each such operation requiring a plurality of regeneration cycles whereby an excess of regeneration is provided, a second counter, means resetting said counter upon initiation of said multiply operation, means controlled by said second counter for rendering said minimum requirement counter inoperative, except when the capacity of said second counter is reached, means stepping said second counter from its reset position towards its capacity setting, one step, for each such instruction cycle until said second counter produces an indication that said capacity has been reached, and means, effective under control of said capacity indication to render said minimum requirement counter again operative, whereby said machine, rides free, on said excess regeneration, in accordance with said second counter capacity.

7. In combination, an electrostatic storage device requiring regeneration and comprising memory for a cyclically operating electronic data processing machine, means controlling said machine to produce a selected type of operation requiring a large number of cycles including a large number of regeneration cycles whereby an excess of regeneration of said storage is provided, means connected to said controlling means and adapted to provide an indication of said excess, means normally controlling said regeneration to insure a certain minimum of required regeneration, and means controlled by said excess indicating means for overcoming said normally controlling means to thus eliminate the requirement of regeneration, for a period, measured by the indication of said excess indicating means.

8. In combination, an electrostatic memory device comprising a plurality of cathode ray tubes, each having a target with allocatable addresses and a beam positionable to any desired address, unblanking means for said tubes, a deflection circuit for controlling the position of said beam, a deflection register, an instruction counter, address storing means, a regeneration counter, means selectively unblanking the beams of certain of said tubes to thereby group said tubes into selectable groups, means, controlled by said deflection register and controlling said unblanking means to thereby unblank the beams of a desired group of said tubes and means controlled by said deflection register and controlling said deflection circuits to thereby position said beams to select certain addresses from said unblanked tubes, means for connecting said instruction counter or said address storing means, to said deflection register, to thereby selectively select, certain addresses, from certain of said tubes only, and means connecting said regeneration counter to said deflection register and operative during regeneration cycles to unblank all of said tubes to thereby regenerate all of said tubes at the addresses designated by said regeneration counter.

9. In combination, a cyclically operable electronic data processing machine operable under control of a stored program of instructions and including addressable electrostatic storage means having a plurality of addresses requiring regeneration and comprising memory for said machine, cycle timer means controlling said machine to operate at times in instruction cycles wherein one of a plurality of types of operations called for respectively by said program instructions to be performed is ascertained and controlling said machine to operate at other times in execution cycles for carrying out the ascertained instructions and means controlling said machine to operate, at all other times, in regeneration cycles; address selecting means operative to select certain storage addresses, during an instruction cycle or an execution cycle, but selecting a greater number of said addresses, during a regeneration cycle.

10. A machine as set forth in claim 9 and including a minimum requirement counter, means for stepping said counter, subsequent to an instruction cycle, means controlled by said counter producing regeneration of said storage means for a fixed minimum number of regeneration cycles determined by the capacity of said counter, and means for re-initiating a new operation of said counter, for each instruction cycle, whereby a prescribed minimum of regeneration is ensured, for each instruction cycle.

11. A machine as in claim 10 and including a second counter, means for resetting said second counter to zero upon initiation of a certain type of operation, requiring a large number of regeneration producing cycles, to thereby measure the quantity of surplus regeneration thereby provided, during said certain type of operation, means controlled by said second counter in all its conditions except its capacity filled condition, for rendering said first counter inoperative, to thereby waive the normal minimum requirements of regeneration, means stepping said second counter, one step, for each instruction cycle, subsequent to initiation of said certain type of operation, and means, controlled by said second counter when filled to capacity, to render said minimum requirement counter again operative.

12. In an electronic data processing machine including addressable electrostatic storage devices comprising its memory, means for selectively selecting addresses under control of address selection value manifestations, each selecting a unique address, in memory, said value manifestations comprising means storing a binary one or binary zero bit manifestations, in selected code combinations, each mutually exclusively selecting, one such address, and means, controlled by a chosen one of the binary zero or binary one manifestations, of a particular one of said bits, for effectively selecting two such unique addresses.

13. A device as in claim 12, said particular bit being effective to produce selection, of two such addresses, when it has a binary one value.

14. In combination, an electrostatic storage device comprising a plurality of cathode ray tubes, an accumulator register, for storing binary one and binary zero bit representations, respectively, in each of a plurality of bit storage positions, said plurality comprising a full word of data representations, means for selectively storing, in memory, either a left half word group portion or a right half word group portion of a full word data manifestation, a certain number of said tubes, storing said left half word portion and a certain number of other of said tubes, storing said right half word portion, said means, for selectively storing said left half word, in memory, reading the data for said left half word, out of a certain group of bit storage positions, in said accumulator register, and said means for selectively storing said right half word, in memory, reading the data, out of said same certain group, of bit storage positions.

15. In combination cathode ray tubes comprising memory, a memory register, means for reading a full word or a half word, from memory, to said memory register, said full word reading means comprising means reading said full word from each of said tubes comprising memory to respectively associated bit storage positions, in said memory register, and said means for reading a left half word, from memory, comprising means reading said left half word from each of the tubes comprising said left half word storage to respective associated bit storage positions, in said memory register, and said means for reading out a right half word comprising means reading out said right half word storage tubes, to said respective associated bit storage positions in said memory register, allocated to said left half word.

16. In combination, a plurality of pairs of cathode ray beam tubes comprising a memory device, each tube including a target with allocatable addresses and a cathode ray beam positionable to any desired address, means for controlling the deflection of said cathode ray beams, circuits for unblanking said beams, selecting means, address storage means storing values represented by different bits of storage, jointly indicative of an address desired, said address comprising certain ones, of each of said pairs of tubes and a certain allocated address on the targets of said pairs, and means, controlled by said address storage means, for controlling said selecting means, said beam deflection means and said unblanking circuits, whereby one address, of said allocatable addresses, is selected, and one tube only of each, of a plurality of selected pairs of tubes is unblanked.

17. In a machine as in claim 16, circuits for selectively controlling the unblanking circuits of said pairs of tubes to unblank said pairs of tubes in selected groups, and means, controlled by the manifestation of a certain bit, stored in said deflection register, to selectively control said unblanking circuits, whereby the beams of one selected group only, are unblanked.

18. In a device as in claim 17, circuits for selectively unblanking still smaller groups of said pairs of tubes whereby said tubes are further subdivided into tubes for storing full words, and tubes for storing left half words and right half words of said full words, and means controlled by certain other bits, stored in said deflection register, to control said circuits for selectively unblanking said smaller groups to thus select, either the group of tubes storing a left half word or the group of tubes storing a right half word.

19. In a device as in claim 18 and including means, controlled by still another bit manifestation stored in said deflection register, for overcoming said half word selecting means, whereby the full number of tubes, storing a full word, is unblanked.

20. In an electronic data processing machine operative in instruction cycles, in execution cycles and in regeneration cycles, each cycle comprising a character cycle, storage means comprising a plurality of pairs of cathode ray tubes having cathode ray beams, the number of said plurality of pairs comprising a number, equal to the number of bits in a full word, unblanking means, for each of said tubes, a deflection register storing a plurality of binary zero and binary one bit representations, respectively, means controlled by said manifestations for selectively controlling circuits connected to said unblanking means whereby said unblanking means may be selectively operated in either one of two groups, each comprising a number equal to the number of bits in a half word, and means selectively controlled by the respective binary one or binary zero representation of a certain bit stored in said deflection register for selectively unblanking, either all of said pairs, or half of said pairs of tubes, and means, controlled during an instruction cycle, for preventing said means from operating which select all of said pairs of tubes.

21. In a machine as in claim 20 and including means for controlling said unblanking means to selectively unblank, one tube only, of each of said pairs of tubes selected, and means, controlled by another one of said bits in said memory register, for selectively operating said last unblanking control means, in accordance with the binary one or binary zero character of said other one bit.

22. In an electronic data processing machine, electrostatic storage means comprising a plurality of pairs of cathode ray tubes, each pair comprising a right tube and a left tube and each tube having a cathode ray beam, and a target having allocatable addresses comprising a raster of columns and rows, circuits for positioning said beam, to a desired address, to select, one address, on each of said tubes, circuits for producing a bit sweep of said beams, circuits for unblanking said beams, and addressing means comprising a plurality of bit storage devices storing binary one or binary zero bit manifestations, respectively, means controlled by said stored bit manifestations controlling said unblanking circuits whereby said tubes are unblanked, in a plurality of pairs, said pairs being grouped into two main units, and further circuits, controlling said unblanking circuits of each of said main units whereby said tubes are selectively unblanked, in smaller groups of tubes, each group comprising storage for a full word or two still smaller groups comprising storage for the left and right half respectively of said full word, and means also controlling the unblanking circuits of said half word storage tubes, and operable to unblank selectively those tubes storing bits representative of the address part only of an instruction, represented by said half word, means selectively controlled by the binary one or binary zero status, of one of said bit manifestations in said deflection register for selectively controlling said unblanking circuits, of one unit or the other, means controlled by the binary one or binary zero condition, of another one of said addressing means bits, for selectively controlling the unblanking circuits of the tubes comprising the storage location of a left half word or a right half word, respectively; means controlled by the binary one or binary zero condition, of still another bit, stored in said addressing means, for selectively unblanking, either the left tube or the right tube, of each of said pairs, means controlling said bit sweep, to produce sweep in one direction or in the opposite direction, and means controlled by the binary one or the binary zero representation respectively, of still another bit, stored in said addressing means, for controlling said bit sweep control means for determining the direction of bit sweep, means for positioning said beams in alternate columns of the raster, to produce alternate stepped up and stepped down echeloned arrangements of stored bits, on the selected addresses of said target means, controlled by said last-named bit for determining which one of these two echeloned arrangements will be assumed, and means, controlled by the binary one or binary zero value of the remaining ones of said bits stored in said deflection register, acting in concert, to determine the selected one of the allocatable addresses of said targets.

23. A device as in claim 22 and including means for unblanking, only those tubes, storing the address portion of an instruction.

24. In an electronic data processing machine, electrostatic storage means comprising a plurality of pairs of cathode ray tubes, each pair comprising a right tube and a left tube and each tube having a cathode ray beam, and a target having allocatable addresses comprising a raster of columns and rows, circuits for positioning said beam, to a desired address, to select, one address, on each of said tubes, circuits for producing a bit sweep of said beams, circuits for unblanking said beams, and addressing means comprising a plurality of bit storage devices storing binary one or binary zero bit manifestations, respectively, means controlled by said stored bit manifestations controlling said unblanking circuits whereby said tubes are unblanked, in a plurality of pairs, said pairs being grouped into two main units, and further circuits controlling said unblanking circuits of each of said main units, whereby said tubes are selectively unblanked, in smaller groups of tubes, each group comprising storage for a full word or two still smaller groups comprising storage for the left and right half respectively of said full word, means selectively controlled by the binary one or binary zero status, of one of said bit manifestations in said deflection register for selectively controlling said unblanking circuits, of one unit or the other, means controlled by the binary one or binary zero condition, of another one of said addressing means bits, for selectively controlling the unblanking circuits of the tubes comprising the storage location of a left half word or a right half word, respectively, means controlled by the binary one or binary zero condition, of still another bit, stored in said addressing means, for selectively unblanking, either the left tube or the right tube, of each of said pairs, means controlling said bit sweep, to produce sweep in one direction or in the opposite direction, and means, controlled by the binary one or the binary zero representation respectively, of still another bit stored in said addressing means, for controlling said bit sweep control means for determining the direction of bit sweep.

25. In an electronic data processing machine, electrostatic storage means comprising a plurality of pairs of cathode ray tubes, each pair comprising a right tube and a left tube and each tube having a cathode ray beam, and a target having allocatable addresses comprising a raster of columns and rows, circuits for positioning said beam, to a desired address to select, one address, on each of said tubes, circuits for producing a bit sweep of said beams, circuits for unblanking said beams, and addressing means comprising a plurality of bit storage devices storing binary one or binary zero bit manifestations, respectively, means controlled by said stored bit manifestations controlling said unblanking circuits whereby said tubes are unblanked, in a plurality of pairs, said pairs being grouped into two main units, and further circuits controlling said unblanking circuits of each of said main units, whereby said tubes are selectively unblanked, in smaller groups of tubes, each group comprising storage for a full word or two still smaller groups comprising storage for the left and right half selectively of said full word, means selectively controlled by the binary one or binary zero status, of one of said bit manifestations in said deflection register for selectively controlling said unblanking circuits, of one unit or the other, means controlled by the binary one or binary zero condition, of another one of said addressing means bits, for selectively controlling the unblanking circuits of the tubes comprising the storage location of a left half word or a right half word, respectively, means controlled by the binary one or binary zero condition, of still another bit, stored in said addressing means, for selectively unblanking, either the left tube or the right tube, of each of said pairs, and means controlling said bit sweep, to produce sweep in one direction or in the opposite direction.

26. In an electronic data processing machine, electrostatic storage means comprising a plurality of pairs of cathode ray tubes, each pair comprising a right tube and a left tube and each tube having a cathode ray beam, and a target having allocatable addresses comprising a raster of columns and rows, circuits for positioning said beam, to a desired address to select, one address, on each of said tubes, circuits for unblanking said beams, and addressing means comprising a plurality of bit storage devices storing binary one or binary zero bit manifestations, respectively, means controlled by said stored bit manifestations controlling said unblanking circuits whereby said tubes are unblanked in a plurality of pairs, said pairs being grouped into two main units, and further circuits controlling said unblanking circuits of each of said main units whereby said tubes are selectively unblanked in smaller groups of tubes, each group comprising storage for a full word or two still smaller groups comprising storage for the left and right half respectively of said full word, means selectively controlled by the binary one or binary zero status, of one of said bit manifestations in said addressing means for selectively controlling said unblanking circuits, of one unit or the other, and means controlled by the binary one or binary zero condition, of another one of said addressing means bits, for selectively controlling the unblanking circuits of the tubes comprising the storage location of a left half word or a right half word, respectively.

27. In an electronic data processing machine electrostatic storage means comprising a plurality of pairs of cathode ray tubes, each pair comprising a right tube and a left tube and each tube having a cathode ray beam, and a target having allocatable addresses comprising a raster of columns and rows, circuits for positioning said beam, to a desired address to select, one address, on each of said tubes, circuits for unblanking said beams and addressing means comprising a plurality of bit storage devices storing binary one or binary zero bit manifestations, respectively, means controlled by said stored bit manifestations controlling said unblanking circuits whereby said tubes are unblanked, in a plurality of pairs said pairs being grouped into two main units, and further circuits controlling said unblanking circuits of each of said main units, whereby said tubes are selectively unblanked, in smaller groups of tubes, each group comprising storage for a full word or two still smaller groups comprising storage for the left and right half respectively of said full word, and means selectively controlled by the binary one or binary zero status, of one of said bit manifestations in said deflection register for selectively controlling said unblanking circuits, of one unit or the other.

28. In an electronic data processing machine, an addressable storage device for selectively storing binary zero or binary one manifestations of a bit stored at any selected address, means providing an input of binary ones and binary zeros, to said device, means normally storing manifestations, at a selected address, of respective binary one or binary zero inputs to said storage device, regardless of the previous binary one or binary zero nature of a previously stored bit, and means controlling said machine to produce an extract operation comprising means controlled by binary zero representations of said input, during said extract operation, for selectively storing binary zeros, in addresses selected, regardless of a previous binary one or binary zero bit stored at this selected address, and means, controlled by binary one representations of said input, during said extract operation, for leaving unaltered, respectively corresponding, binary one or binary zero bit manifestations, stored in a selected storage address.

29. In a cathode ray tube including a cathode ray beam producing means, a target having allocatable addresses, deflection means for positioning said beam selectively, at desired addresses of said target, means controlling said beam, for selectively writing binary ones or binary zeros, on said target, in accordance with a binary 1 or binary 0 input, and means rendered operative, during an extract operation, whereby said writing means are normally operative, during the presence of a binary 0 value on said input, but are rendered inoperative, by the presence of a binary 1 value on said input, whereby binary 0's are selectively written over the previous corresponding bit, at the address position but the bit at said selected address position, corresponding to the respective binary 1 inputs, remaining unaltered.

30. In combination, a switch, operable to an open or a closed condition, means comprising addressable storage, means controlling the selection of addresses in said storage means in a normal sequence of steps, said storage means comprising memory for an electronic data processing machine operative in cycles and controllable in accordance with a program to selectively produce desired operations and including means controlled in accordance with said program to produce a sense operation, said means comprising means sensing the open or closed status, of said switch, and means rendered operative upon sensing that said switch is closed, to control said selection controlling means, to produce a skipping, of one step, in said program, but operative, upon sensing that said switch is open, to enable normal progression of said program.

31. In combination, a computer including a multiplier quotient register and an electronic data processing machine for processing data under control of instructions comprising a program, certain ones of said instructions requiring use of said multiplier quotient register, input/output units for supplying data to said multiplier quotient register and for receiving data from said multiplier quotient register, selectively, under control of respective instructions calling for the use of one of said input/output units, means controlled, by one of said instructions for initiating a series of operations on one such input/output unit, interlock means, means rendering said interlock means operative while an input/output unit is being used, means for stepping along the series of instructions comprising said program during the operation of said input/output unit, one of said instructions comprising a sense instruction, in sequence in said program, subsequent to the instruction calling for the use of an input/output unit and prior to an instruction involving the use of the multiplier quotient register, means controlled by said sense instruction for producing a testing operation to ascertain if said interlock is ON or OFF, and means effective, if said interlock is ascertained as ON, for locking up said machine but effective, if the interlock is ascertained as OFF, for progressing to the instruction, in said program, subsequent to said sense instruction and involving the use of said multiplier quotient register.

32. In an electronic data processing machine controlled by a stored program, a memory device having allocatable addresses, means connected to said memory device for selecting desired addresses, means controlled by said selecting means for writing binary 1's or binary 0's at selected addresses in accordance with a binary 1 or binary 0 input, means controlled by one of the steps of said program calling for an extract operation controlling the means controlled by said selecting means for writing a binary 0 on a selected address provided a binary 0 input is present, but leaving the selected address undisturbed if a binary 1 input is present.

References Cited in the file of this patent
UNITED STATES PATENTS

| | | |
|---|---|---|
| 2,599,949 | Skellett | June 10, 1952 |
| 2,604,262 | Phelps et al. | July 22, 1952 |
| 2,642,550 | Williams | June 16, 1953 |
| 2,671,607 | Williams et al. | Mar. 9, 1954 |
| 2,681,424 | Hergenrother | June 15, 1954 |
| 2,777,635 | Tootill et al. | Jan. 15, 1957 |
| 2,807,005 | Weidenhammer | Sept. 17, 1957 |
| 2,902,675 | Shaw et al. | Sept. 1, 1959 |

FOREIGN PATENTS

| | | |
|---|---|---|
| 749,836 | Great Britain | June 6, 1956 |

OTHER REFERENCES

"A Storage System for Use with Binary-Digital Computing Machines" (Williams et al.), paper No. 763 of Measurements Section of Joint Meeting of the Measurements and Radio Sections, pages 81 to 99, Nov. 2, 1948.

A Functional Description of the Edvac, Moore School of Engineering, November 1949, pp. 1-7 of volume 1 directly pertinent. The entire report consists of 2 large volumes.

Description of a Magnetic Drum Calculator, Harvard University Prin., 1952, pp. 189-228 of a 318 page volume.

Progress Report on the Argonne-Oak Ridge Digital Computer, Mar. 5, 1951, pp. 62-71 of a 103 page volume.

"Electrical Engineering" for April 1952, pp. 352-356, article by W. E. Mutter on "Improved Cathode-Ray Tube for Application in Williams Memory System."

Chu: The Oak Ridge Automatic Computer, Proceeding Association for Computing Machinery, September 1952, pp. 142-147 (photostat in 235-61EPB).

Kates: A Method for Improving the Read-Around Ratio in Cathode-Ray Storage Tubes, Proceeding of the I.R.E., August 1953, pp. 1017-1023 (photostat in Div. 23, 235-51 HCR).

Holt et al.: article entitled "Computer Memory Uses Conventional C-R Tubes," Electronics, December 1953, pp. 178-182. (Photostat in Div. 23, 235-61 HCR.)